US012634332B1

(12) United States Patent
Al Zeibak et al.

(10) Patent No.: US 12,634,332 B1
(45) Date of Patent: May 19, 2026

(54) CYBERSECURITY ASSESSMENT SYSTEM AND METHOD FOR DIGITALLY TRANSFORMED ORGANIZATIONS

(71) Applicant: King Fahd University of Petroleum and Minerals, Dhahran (SA)

(72) Inventors: Malek Hasan Al Zeibak, Riyadh (SA); Mohammad Rabah Alshayeb, Dhahran (SA); Malak Baslyman, Dhahran (SA); Mahmood Niazi Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/224,599

(22) Filed: May 30, 2025

(51) Int. Cl.
*H04L 9/00* (2022.01)
*G06Q 10/0635* (2023.01)
*H04L 9/40* (2022.01)

(52) U.S. Cl.
CPC ..... *H04L 63/1433* (2013.01); *G06Q 10/0635* (2013.01)

(58) Field of Classification Search
CPC ............................. H04L 63/1433; G06Q 10/35
USPC ........................................................... 726/25
See application file for complete search history.

(56) References Cited

U.S. PATENT DOCUMENTS

2018/0322292 A1* 11/2018 Tedeschi ............. H04L 63/1433
2019/0228101 A1 7/2019 Grindstaff et al.

2019/0228161 A1* 7/2019 Grindstaff, II .......... G06F 9/542
2020/0356678 A1* 11/2020 Gourisetti ............. G06F 21/577
2021/0328033 A1 10/2021 Jeffery et al.
2021/0329033 A1* 10/2021 Jeffery ................... G06N 3/045
2022/0038486 A1 2/2022 Baragaba et al.
2025/0378172 A1* 12/2025 Abbad .................. G06F 21/577

OTHER PUBLICATIONS

Walter et al.; "Cybersecurity capability maturity models for providers of critical infrastructure"; www.timeview.ca, Oct. 2014, 7 pages.
Prof . SH (Basie) von Solms, "A Maturity Model for Part of the African Union Convention on Cyber Security" Science and Information Conference, Jul. 28-30, 2015, 5 Pages.

(Continued)

*Primary Examiner* — Christopher J Brown
(74) *Attorney, Agent, or Firm* — Oblon, McClelland, Maier & Neustadt, L.L.P.

(57) ABSTRACT

A web-based computer-implemented method for improving the cybersecurity maturity level of a digitally transforming organization involves determining one or more capability areas of the organization, where each capability area comprises related practice areas. The evaluation results of the practice areas are input using a web interface, and the rating value of each practice area is determined based on cybersecurity best practices. These rating values are displayed in a matrix format for each capability area. The cybersecurity maturity level is then calculated for each capability area based on these rating values. When the maturity level of any capability area is below a predefined threshold, a recommended action is displayed to improve it. After the action is completed, the maturity level is updated, and further guidance is provided to continually improve the cybersecurity maturity level across all capability areas.

20 Claims, 47 Drawing Sheets

(56) References Cited

OTHER PUBLICATIONS

Janice Mayer, et al., "A Model to Assess the Maturity Level of the Risk Management Process in Information Security", 2009 IFIP/IEEE Intl. Symposium on Integrated Network Management—Workshops, 10 Pages.

Ngoc T. ,Le, et al., "Capability Maturity Model and Metrics Framework for Cyber Cloud Security", 19 pages.

"FFIEC Cybersecurity Assessment Tool", Cybersecurity Maturity: Domain 5, May 2017, 27 Pages.

Marco Spruit, et al.. "ISFAM: The Information Security Focus Area Maturity Model", Association for Information Systems , AIS Electronic Library (AlSeL), ECIS 2014 Proceedings, Tel Aviv, Israel, Jun. 9-11, 2014, 16 Pages.

Luis Enrique Sànchez et al.. "MMISS-SME Practical Development: Maturity Model for Information Systems Security Management in SMEs", In Proceedings of the 5th International Workshop on Security in Information Systems, 2007, pp. 95-104, 12 pages.

Renato Rojas, et al., "Security Maturity Model of Web Applications for Cyber Attacks", ICCSP 2019, Jan. 19-21. 2019, 8 Pages.

Natalie Sjelin, et al., "Chapter 8 The Community Cyber Security Maturity Model", Springer International Publishing Switzerland 2017, 181-183 23 pages.

\* cited by examiner

900

1. Open coding

- Raw data
- Codes

~902

2. Axial coding

- Sub-categories

~904

3. Selective coding
- Categories
- Relationship

~906

1302                    1304                    1306

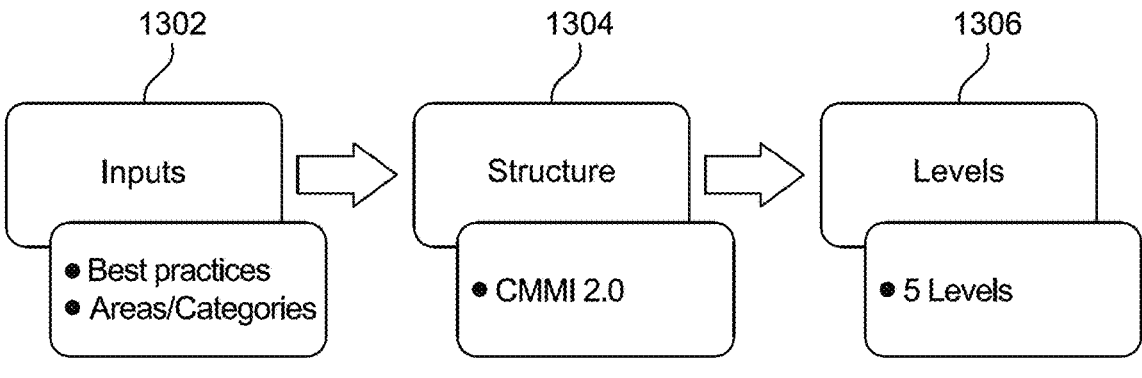

| Inputs | Structure | Levels |
|---|---|---|
| • Best practices<br>• Areas/Categories | • CMMI 2.0 | • 5 Levels |

| Phase 0: All practices in DT and CS | 1740 |
|---|---|

1404

| Phase 1: Digital transformation & cybersecurity definitions (V1) | 821 |
|---|---|

1406

| Phase 2: Best practice inclusion criteria (V1) | 454 |
|---|---|

1408

| Phase 3: Mapping categories with capability areas & practice areas | 313 |
|---|---|

1410

| Phase 4: Updating definitions and introducing core/optional flag | 194 |
|---|---|

1412

| Phase 5: Expert judgment | 179 |
|---|---|

Phases

Number of practices

FIG. 14

| Category of capability area | Capability area | Practice area | Count of core best practices per level L2 | L3 | L4 | L5 | Core | Count of optional best practices per level L2 | L3 | L4 | L5 | Optional | Total count of best practices per level L2 | L3 | L4 | L5 | Total |
|---|---|---|---|---|---|---|---|---|---|---|---|---|---|---|---|---|---|
| Doing | Software engineering & applications security (SWE) | Requirements (SRQ) |  |  |  |  | 0 | 1 | 5 |  |  | 6 | 1 | 5 | 0 | 0 | 6 |
| | | Design SDS |  |  |  |  | 0 | 1 | 4 |  |  | 5 | 1 | 4 | 0 | 0 | 5 |
| | | Development (SDV) |  |  |  |  | 0 | 1 | 4 |  |  | 5 | 1 | 4 | 0 | 0 | 5 |
| | | Testing (STS) | 1 | 2 |  |  | 3 |  |  |  |  | 0 | 1 | 2 | 0 | 0 | 3 |
| | | Deployment (SDP) |  | 2 | 1 |  | 3 |  |  |  |  | 0 | 0 | 2 | 1 | 0 | 3 |
| | | Application (SAP) | 3 | 1 |  |  | 4 |  | 3 |  |  | 3 | 3 | 4 | 0 | 0 | 7 |
| | | Documentation (SDC) | 1 | 2 |  |  | 3 |  |  |  |  | 0 | 1 | 2 | 0 | 0 | 3 |
| | Running operations (OPR) | Auditing (OAD) | 1 | 1 | 5 | 1 | 8 |  | 1 | 3 |  | 4 | 1 | 2 | 8 | 1 | 12 |
| | | Maintenance (OMT) | 2 | 5 | 7 | 2 | 16 | 1 |  |  |  | 1 | 3 | 5 | 7 | 2 | 17 |
| | | Trends (OTR) |  |  |  |  | 0 |  |  | 1 | 2 | 3 | 0 | 0 | 1 | 2 | 3 |
| Managing | Risks analysis & mitigation (RSK) | Contingency plan (RCP) | 2 | 3 | 6 | 1 | 12 |  |  | 1 | 1 | 2 | 2 | 3 | 7 | 2 | 14 |
| | | Mitigate risks (RMG) | 3 | 6 | 3 |  | 12 |  | 2 |  |  | 2 | 3 | 8 | 3 | 0 | 14 |
| | Information security & data protection (INF) | Store (IST) | 1 | 1 | 1 |  | 3 |  |  |  |  | 0 | 1 | 1 | 1 | 0 | 3 |
| | | Exchange (IXC) |  |  |  |  | 0 | 3 | 2 | 2 |  | 7 | 3 | 2 | 2 | 0 | 7 |
| | | Integration (INT) |  |  |  | 3 | 3 |  |  |  |  | 0 | 0 | 0 | 0 | 3 | 3 |
| Enabling | Human security & access management (PPL) | Access management (PAC) | 4 | 7 | 1 | 1 | 13 | 4 | 1 |  | 1 | 6 | 8 | 8 | 1 | 2 | 19 |
| | | Training and awareness programs (PTR) |  | 5 |  |  | 5 |  | 2 | 1 | 3 | 6 | 0 | 7 | 1 | 3 | 11 |
| | Infrastructure & assets security (STR) | Operations (SOP) | 3 | 2 |  |  | 5 |  |  |  |  | 0 | 3 | 2 | 0 | 0 | 5 |
| | | Systems (SSY) | 3 |  | 1 |  | 4 |  | 4 |  | 1 | 5 | 3 | 4 | 1 | 1 | 9 |
| Improving | Governance & policies (GOV) | Roadmap (GRM) | 1 | 1 | 1 | 1 | 4 | 1 | 2 | 1 |  | 4 | 2 | 3 | 2 | 1 | 8 |
| | | Governance (GGO) | 2 | 5 | 2 | 4 | 13 |  |  |  |  | 0 | 2 | 5 | 2 | 4 | 13 |
| | | Follow-up (GFU) |  |  |  |  | 0 |  | 3 | 2 | 4 | 9 | 0 | 3 | 2 | 4 | 9 |
| | | Total number of best practices per practice area level | 27 | 45 | 27 | 12 | 111 | 12 | 34 | 11 | 11 | 68 | 39 | 79 | 38 | 23 | 179 |

FIG. 18

2302 — Area
2304 — Evaluated
2306 — Pending

| Area | Evaluated | | | | | | | | | Pending |
|---|---|---|---|---|---|---|---|---|---|---|
| Human security and access management | P-1623 | P-1624 | P-1625 | P-1627 | P-1628 | P-1631 | P-1632 | P-1633 | P-1635 | |
| | P-1637 | P-1638 | P-1641 | P-1651 | P-1652 | P-1731 | P-1733 | P-1734 | P-1735 | |
| | P-1736 | P-1741 | P-1753 | P-1621 | P-1622 | P-1626 | P-1634 | P-1636 | P-1732 | |
| | P-1737 | P-1751 | P-1752 | | | | | | | |
| Software engineering and applications security | P-0121 | P-0131 | P-0132 | P-0133 | P-0134 | P-0135 | P-0221 | P-0231 | P-0232 | |
| | P-0233 | P-0234 | P-0321 | P-0331 | P-0332 | P-0333 | P-0334 | P-0421 | P-0431 | |
| | P-0432 | P-0531 | P-0532 | P-0541 | P-0621 | P-0622 | P-0623 | P-0631 | P-0632 | |
| | P-0633 | P-0634 | P-0721 | P-0731 | P-0732 | | | | | |
| Running operations | P-0821 | P-0831 | P-0832 | P-0841 | P-0842 | P-0843 | P-0844 | P-0845 | P-0846 | |
| | P-0847 | P-0848 | P-0851 | P-0921 | P-0922 | P-0923 | P-0931 | P-0932 | P-0933 | |
| | P-0934 | P-0935 | P-0941 | P-0942 | P-0943 | P-0945 | P-0946 | P-0947 | P-0951 | |
| | P-1041 | P-1051 | P-1052 | P-0944 | P-0952 | | | | | |

FIG. 23

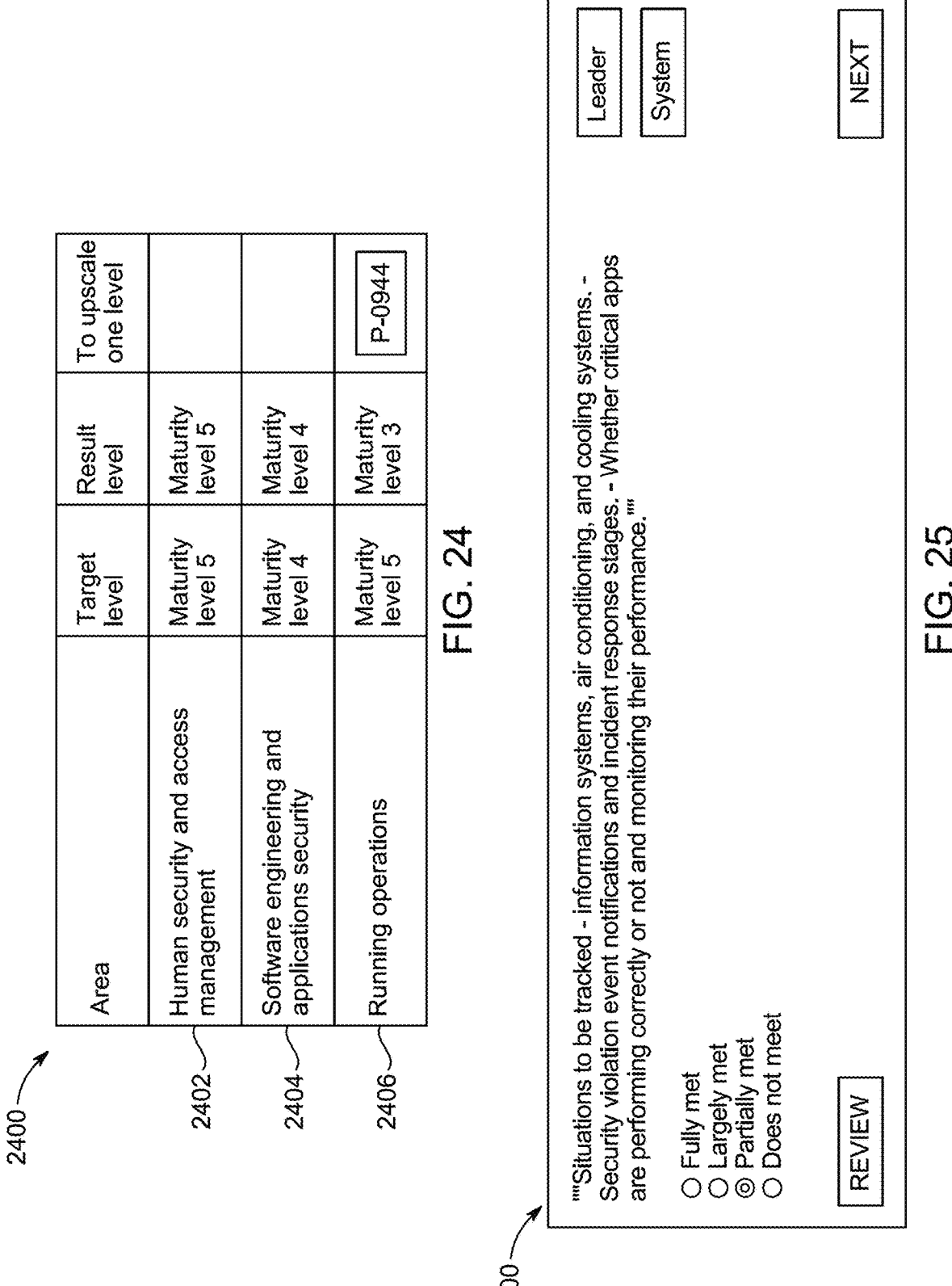

| Area | Target level | Result level | To upscale one level |
|------|------|------|------|
| Human security and access management | Maturity level 5 | Maturity level 5 | |
| Software engineering and applications security | Maturity level 4 | Maturity level 4 | |
| Running operations | Maturity level 5 | Maturity level 3 | P-0944 |

FIG. 24

""Situations to be tracked - information systems, air conditioning, and cooling systems. - Security violation event notifications and incident response stages. - Whether critical apps are performing correctly or not and monitoring their performance.""

Leader

System

○ Fully met
○ Largely met
◉ Partially met
○ Does not meet

REVIEW          NEXT

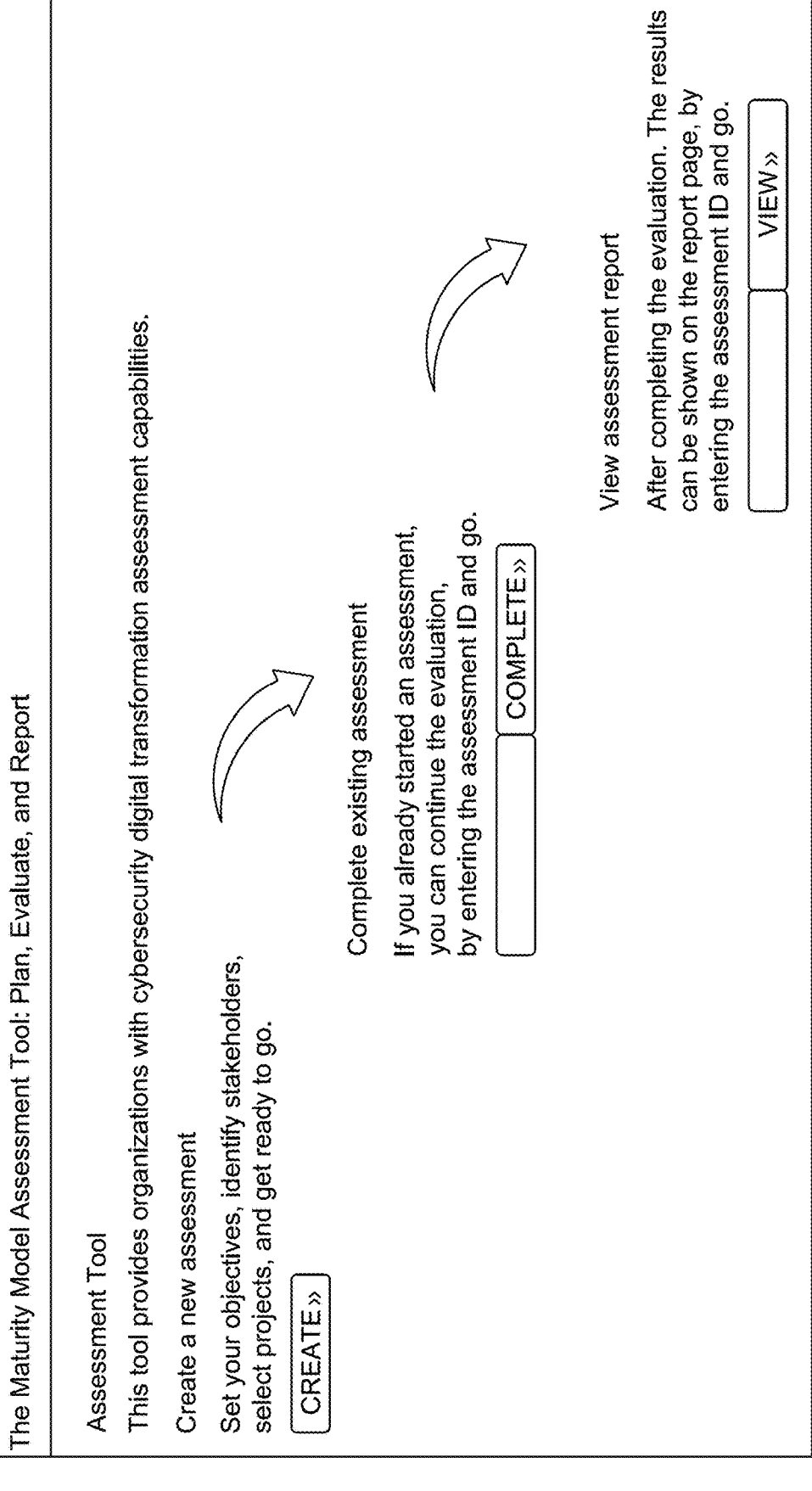

The Maturity Model Assessment Tool: Plan, Evaluate, and Report

Assessment Tool

This tool provides organizations with cybersecurity digital transformation assessment capabilities.

Create a new assessment

Set your objectives, identify stakeholders, select projects, and get ready to go.

CREATE »

Complete existing assessment

If you already started an assessment, you can continue the evaluation, by entering the assessment ID and go.

COMPLETE »

View assessment report

After completing the evaluation. The results can be shown on the report page, by entering the assessment ID and go.

VIEW »

Figure 27:
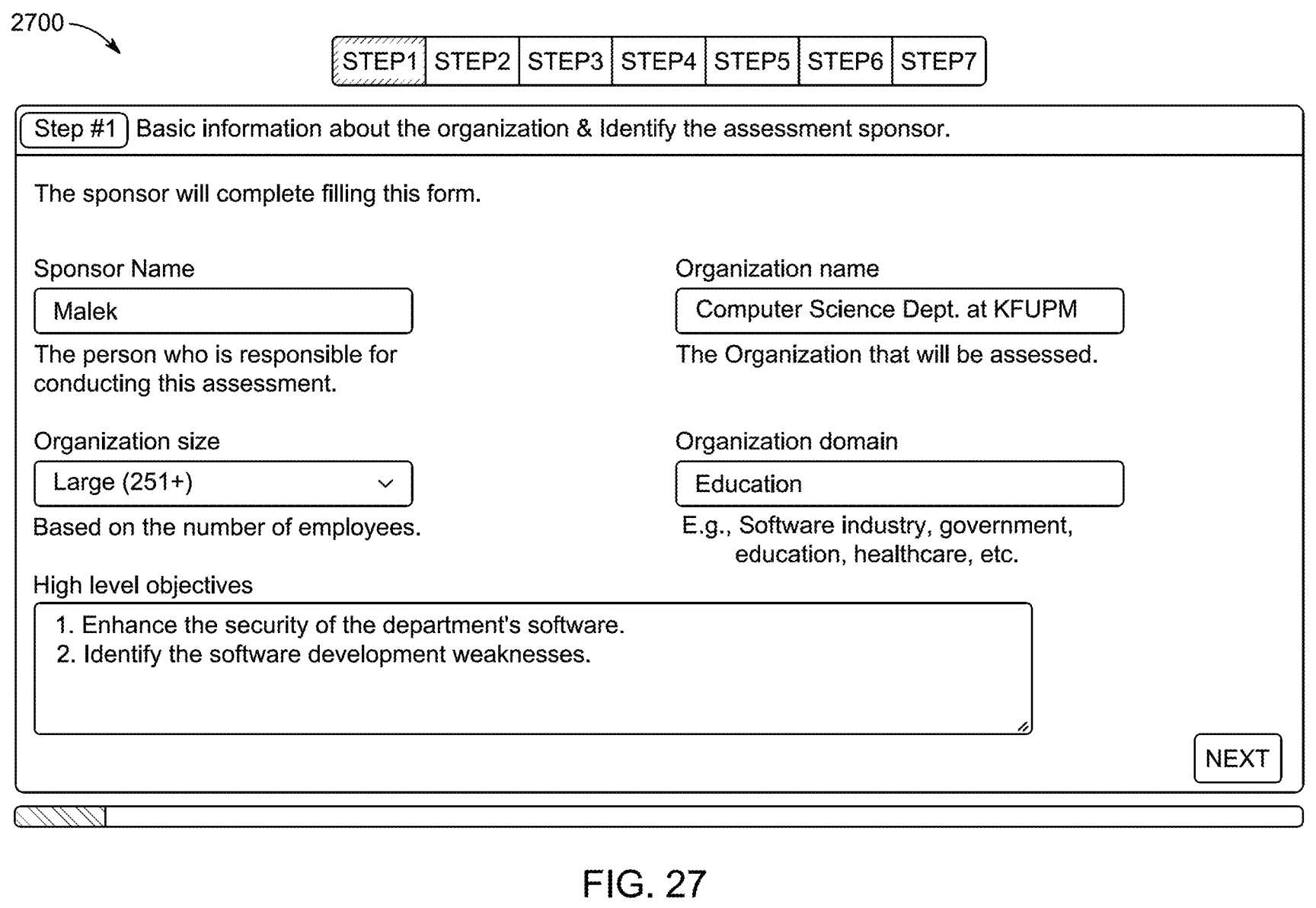

| STEP1 | STEP2 | STEP3 | STEP4 | STEP5 | STEP6 | STEP7 |

Step #1 Basic information about the organization & Identify the assessment sponsor.

The sponsor will complete filling this form.

Sponsor Name

Malek

The person who is responsible for conducting this assessment.

Organization size

Large (251+)

Based on the number of employees.

High level objectives

1. Enhance the security of the department's software.
2. Identify the software development weaknesses.

Organization name

Computer Science Dept. at KFUPM

The Organization that will be assessed.

Organization domain

Education

E.g., Software industry, government, education, healthcare, etc.

NEXT

Figure 28:
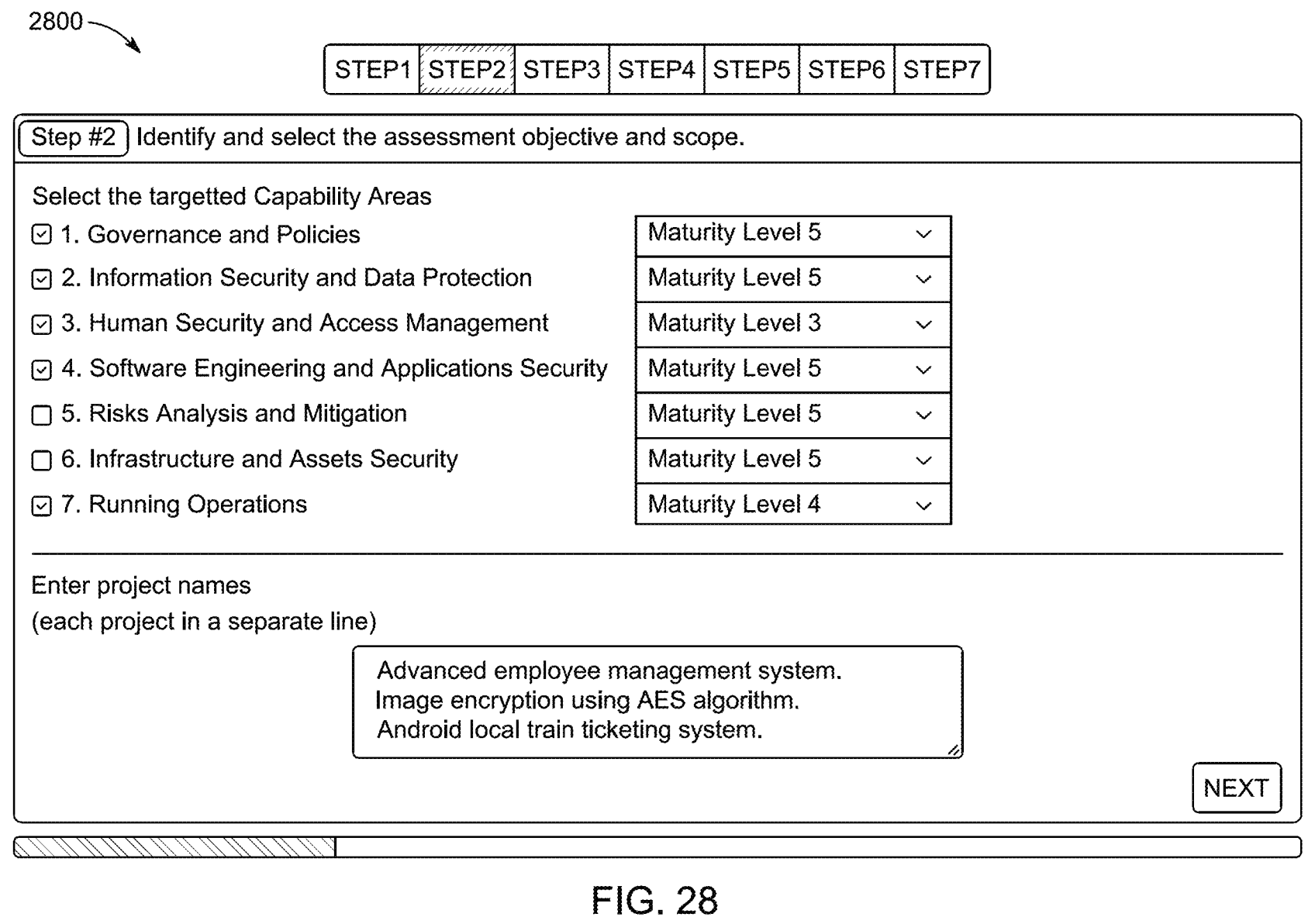

STEP1 | STEP2 | STEP3 | STEP4 | STEP5 | STEP6 | STEP7

Step #2 | Identify and select the assessment objective and scope.

Select the targetted Capability Areas

☑ 1. Governance and Policies | Maturity Level 5 | >

☑ 2. Information Security and Data Protection | Maturity Level 5 | >

☑ 3. Human Security and Access Management | Maturity Level 3 | >

☑ 4. Software Engineering and Applications Security | Maturity Level 5 | >

☐ 5. Risks Analysis and Mitigation | Maturity Level 5 | >

☐ 6. Infrastructure and Assets Security | Maturity Level 5 | >

☑ 7. Running Operations | Maturity Level 4 | >

Enter project names
(each project in a separate line)

Advanced employee management system.
Image encryption using AES algorithm.
Android local train ticketing system.

NEXT

| STEP1 | STEP2 | STEP3 | STEP4 | STEP5 | STEP6 | STEP7 |

Step #5 Assign stakeholders, capability areas, and projects.

For each capability area, identify its leader, other stakeholders, and projects.

Governance and Policies

Leader | Other stakeholders | Projects

| Malek ⌄ | ☐ Malek<br>☑ Ahmed A. ⌄<br>☑ Naser N. | ☑ Organizational level<br>☐ Advanced employee management system.<br>☐ Image encryption using AES algorithm. ⌄<br>☐ Android local train ticketing system. |

Information Security and Data Protection

Leader | Other stakeholders | Projects

| Ahmed A. ⌄ | ☐ Malek<br>☐ Ahmed A. ⌄<br>☐ Naser N. | ☐ Organizational level<br>☑ Advanced employee management system.<br>☑ Image encryption using AES algorithm. ⌄<br>☐ Android local train ticketing system. |

Human Security and Access Management

Leader | Other stakeholders | Projects

| Malek ⌄ | ☐ Malek<br>☐ Ahmed A. ⌄<br>☐ Naser N. | ☐ Organizational level<br>☐ Advanced employee management system.<br>☑ Image encryption using AES algorithm. ⌄<br>☐ Android local train ticketing system. |

Software Engineering and Application Security

Leader | Other stakeholders | Projects

| Naser N. ⌄ | ☐ Malek<br>☐ Ahmed A. ⌄<br>☐ Naser N. | ☐ Organizational level<br>☐ Advanced employee management system.<br>☑ Image encryption using AES algorithm. ⌄<br>☑ Android local train ticketing system. |

Running Operations

Leader | Other stakeholders | Projects

| Ahmed A. ⌄ | ☐ Malek<br>☐ Ahmed A. ⌄<br>☑ Naser N. | ☑ Organizational level<br>☐ Advanced employee management system.<br>☐ Image encryption using AES algorithm. ⌄<br>☐ Android local train ticketing system. |

NEXT

FIG. 31

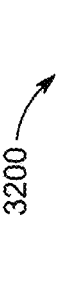
| STEP1 | STEP2 | STEP3 | STEP4 | STEP5 | STEP6 | STEP7 |
Step #6   Select the assessment type.
Please select how the assessment will be evaluated.
◎ Self-assessment, by an internal team
○ By an external appraisal, as described in the textbox:
Please review the assessment details before clicking on "Create" button.
CREATE
3200
FIG. 32

Figure 33:
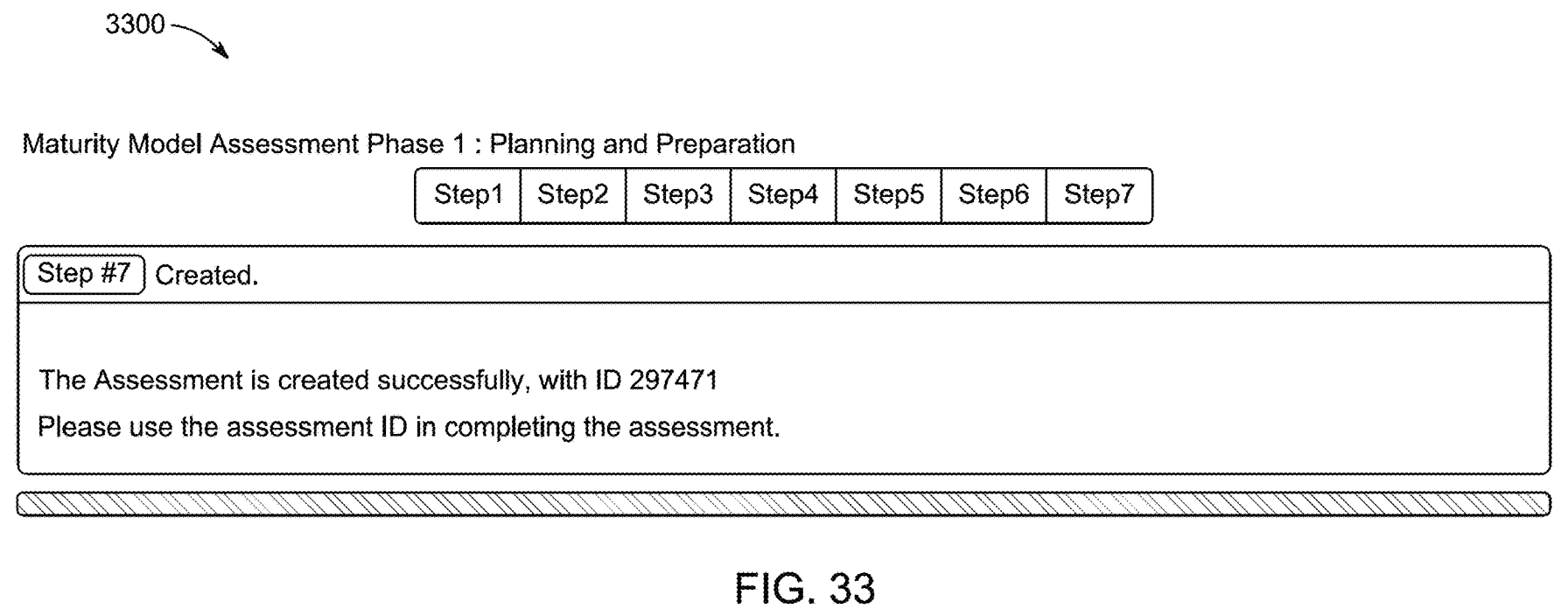

3300

Maturity Model Assessment Phase 1 : Planning and Preparation

| Step1 | Step2 | Step3 | Step4 | Step5 | Step6 | Step7 |

Step #7  Created.

The Assessment is created successfully, with ID 297471

Please use the assessment ID in completing the assessment.

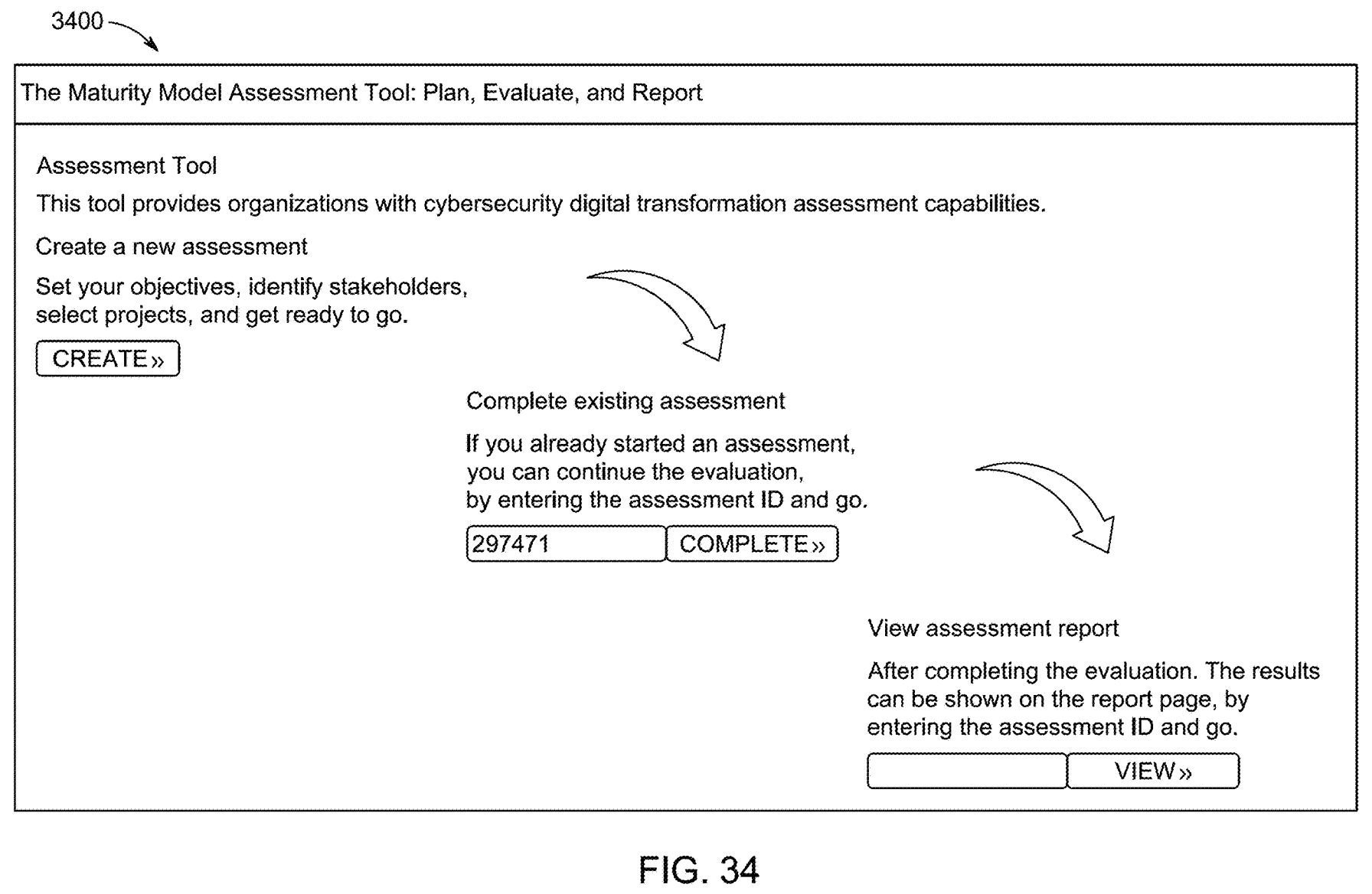

The Maturity Model Assessment Tool: Plan, Evaluate, and Report

Assessment Tool

This tool provides organizations with cybersecurity digital transformation assessment capabilities.

Create a new assessment

Set your objectives, identify stakeholders, select projects, and get ready to go.

CREATE »

Complete existing assessment

If you already started an assessment, you can continue the evaluation, by entering the assessment ID and go.

297471   COMPLETE »

View assessment report

After completing the evaluation. The results can be shown on the report page, by entering the assessment ID and go.

VIEW »

FIG. 34

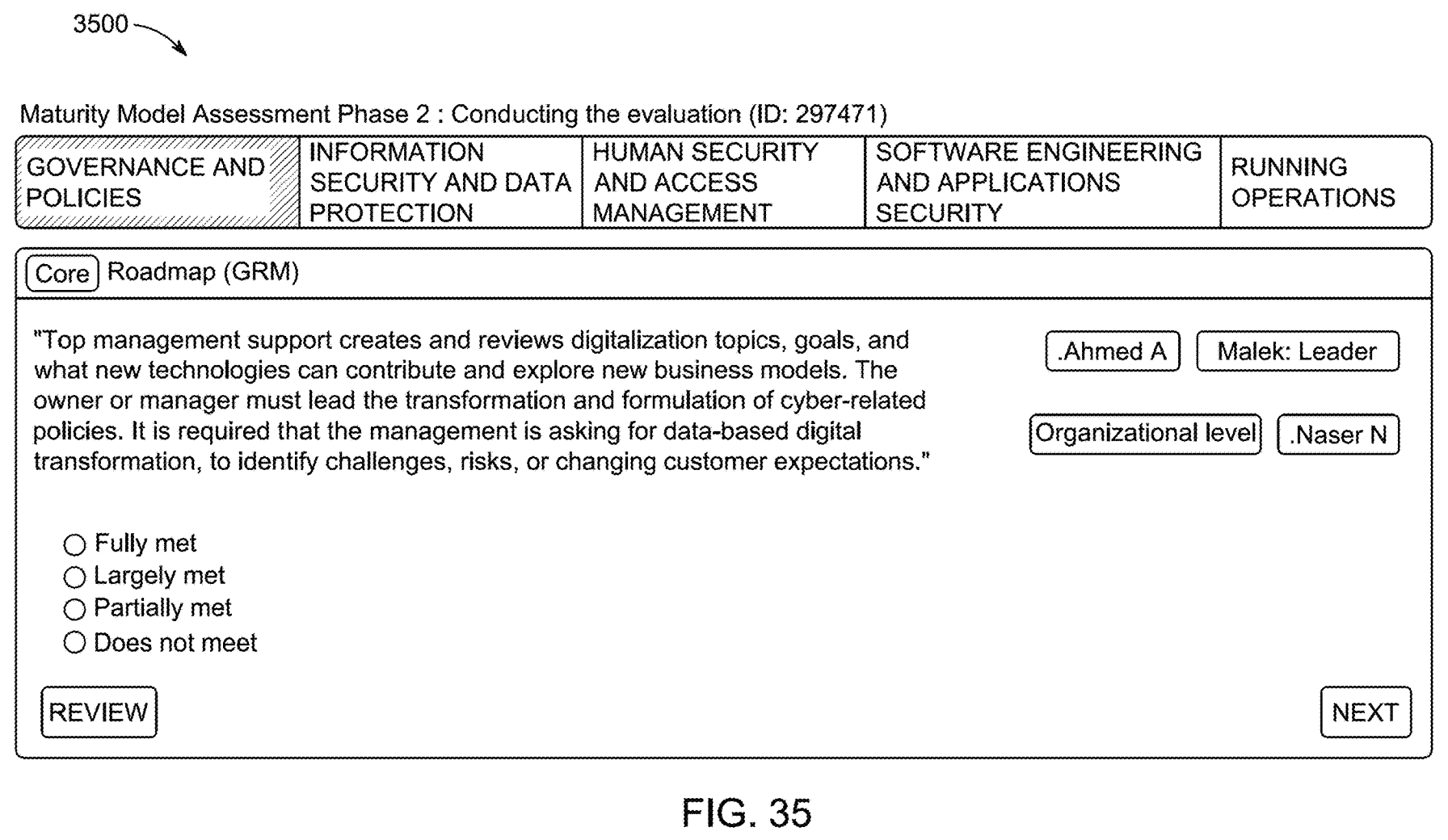

Maturity Model Assessment Phase 2 : Conducting the evaluation (ID: 297471)

3500

| GOVERNANCE AND POLICIES | INFORMATION SECURITY AND DATA PROTECTION | HUMAN SECURITY AND ACCESS MANAGEMENT | SOFTWARE ENGINEERING AND APPLICATIONS SECURITY | RUNNING OPERATIONS |
|---|---|---|---|---|

Core   Roadmap (GRM)

"Top management support creates and reviews digitalization topics, goals, and what new technologies can contribute and explore new business models. The owner or manager must lead the transformation and formulation of cyber-related policies. It is required that the management is asking for data-based digital transformation, to identify challenges, risks, or changing customer expectations."

.Ahmed A    Malek: Leader

Organizational level    .Naser N

○ Fully met
○ Largely met
○ Partially met
○ Does not meet

REVIEW

NEXT

FIG. 35

Maturity Model Assessment Phase 2 : Conducting the evaluation (ID: 297471)

Here you can review the evaluated and pending practices. The number of total pending practices is 38

3600

| Area | Evaluated | Pending |
|---|---|---|
| Governance and policies | P-2021 P-2022 P-2031 P-2032 P-2033 P-2041 P-2042 P-2051 P-2121<br>P-2122 P-2131 P-2132 P-2133 P-2134 P-2135 P-2141 P-2142 P-2151<br>P-2152 P-2153 P-2154 P-2231 P-2232 P-2233 P-2241 P-2242 P-2251<br>P-2252 P-2253 P-2254 | |
| Information Security and Data Protection | P-1321 P-1331 P-1341 P-1421 P-1422 | P-1423 P-1431 P-1432 P-1441 P-1442<br>P-1551 P-1552 P-1553 |
| Human Security and Access Management | P-1623 P-1624 P-1625 P-1627 P-1628 P-1631 P-1632 P-1633 P-1635<br>P-1637 P-1638 P-1731 P-1733 P-1734 P-1735 P-1736 P-1621 P-1622 | P-1626 P-1634 P-1636<br>P-1732 P-1737 |
| Software Engineering and Applications Security | P-0121 P-0131 P-0132 P-0133 P-0134 P-0135 P-0221 P-0231 P-0232<br>P-0233 P-0234 P-0321 P-0331 P-0332 P-0333 P-0334 | P-0421 P-0431 P-0432 P-0531 P-0532<br>P-0541 P-0621 P-0622 P-0623 P-0631<br>P-0632 P-0633 P-0634 P-0721 P-0731<br>P-0732 |
| Running Operations | P-0821 P-0831 P-0832 P-0841 P-0842 P-0843 P-0844 P-0845 P-0846<br>P-0847 P-0848 P-0921 P-0922 P-0923 P-0931 P-0932 P-0933 P-0934 | P-0935 P-0941 P-0942 P-0943 P-0945<br>P-0946 P-0947 P-1041 P-0944 |

FIG. 36

Maturity Model Assessment Phase 2 : Conducting the evaluation (ID: 297471)

Well done, there is no pending practices to be evaluated.

| Area | Evaluated | Pending |
|---|---|---|
| Governance and policies | P-2021 P-2022 P-2031 P-2032 P-2033 P-2041 P-2042 P-2051 P-2121 P-2122 P-2131 P-2132 P-2133<br>P-2134 P-2135 P-2141 P-2142 P-2151 P-2152 P-2153 P-2154 P-2231 P-2232 P-2233 P-2241 P-2242<br>P-2251 P-2252 P-2253 P-2254 | |
| Information Security and Data Protection | P-1321 P-1331 P-1341 P-1421 P-1422 P-1423 P-1431 P-1432 P-1441 P-1442 P-1551 P-1552 P-1553 | |
| Human Security and Access Management | P-1623 P-1624 P-1625 P-1627 P-1628 P-1631 P-1632 P-1633 P-1635 P-1637 P-1638 P-1731 P-1733<br>P-1734 P-1735 P-1736 P-1621 P-1622 P-1626 P-1634 P-1636 P-1732 P-1737 | |
| Software Engineering and Applications Security | P-0121 P-0131 P-0132 P-0133 P-0134 P-0135 P-0221 P-0231 P-0232 P-0233 P-0234 P-0321 P-0331<br>P-0332 P-0333 P-0334 P-0421 P-0431 P-0432 P-0531 P-0532 P-0541 P-0621 P-0622 P-0623 P-0631<br>P-0632 P-0633 P-0634 P-0721 P-0731 P-0732 | |
| Running Operations | P-0821 P-0831 P-0832 P-0841 P-0842 P-0843 P-0844 P-0845 P-0846 P-0847 P-0848 P-0921 P-0922<br>P-0923 P-0931 P-0932 P-0933 P-0934 P-0935 P-0941 P-0942 P-0943 P-0945 P-0946 P-0947 P-1041<br>P-0944 | |

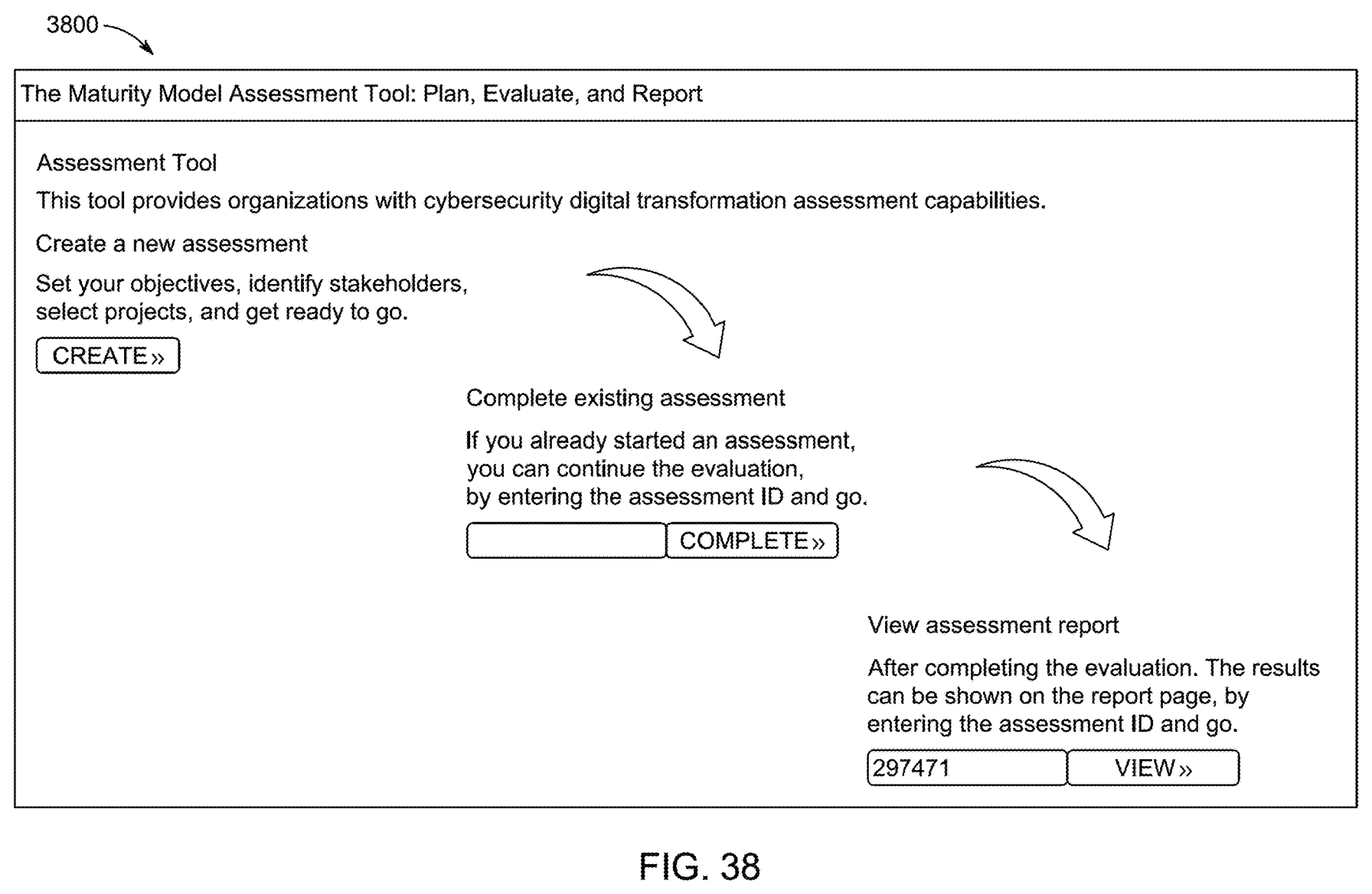

The Maturity Model Assessment Tool: Plan, Evaluate, and Report

Assessment Tool

This tool provides organizations with cybersecurity digital transformation assessment capabilities.

Create a new assessment

Set your objectives, identify stakeholders, select projects, and get ready to go.

CREATE »

Complete existing assessment

If you already started an assessment, you can continue the evaluation, by entering the assessment ID and go.

COMPLETE »

View assessment report

After completing the evaluation. The results can be shown on the report page, by entering the assessment ID and go.

297471     VIEW »

FIG. 38

Maturity Model Assessment Phase 3 : Reporting the results (ID:297471)

| Area | Target Level | Result Level | To upscale one level |
|------|-------------|--------------|---------------------|
| Governance and Policies | Maturity Level 5 | Maturity Level 2 | P-2131 |
| Information Security and Data Protection | Maturity Level 5 | Maturity Level 3 | P-1442 |
| Human Security and Access Management | Maturity Level 3 | Maturity Level 2 | P-1631  P-1637  P-1638  P-1735  P-1732 |
| Software Engineering and Applications Security | Maturity Level 5 | Maturity Level 1 | P-0621  P-0622  P-0623  P-0721 |
| Running Operations | Maturity Level 4 | Maturity Level 2 | P-0931  P-0932  P-0933  P-0934  P-0935 |

CYBERSECURITY ASSESSMENT SYSTEM AND METHOD FOR DIGITALLY TRANSFORMED ORGANIZATIONS

BACKGROUND

Technical Field

The present disclosure relates to cybersecurity and digital transformation, and more particularly to methods and systems for assessing and improving cybersecurity practices in organizations undergoing digital transformation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, the rapid advancement of technology and the widespread adoption of digital transformation initiatives have significantly altered organizational operations. Digital transformation involves integrating modern technologies, such as big data analytics, cloud computing, and the Internet of Things into all areas of an organization, fundamentally changing how it operates and delivers value to customers. While these advancements offer substantial benefits, they also introduce complex cybersecurity challenges.

Historically, cybersecurity efforts primarily focused on protecting computer systems from malware, viruses, and unauthorized access to files and software. Traditional security measures concentrated on detecting and mitigating malicious code, ensuring the integrity of software applications, and safeguarding essential computing tasks. However, as technology has evolved, cybersecurity threats have become more sophisticated and pervasive, encompassing a wide array of vulnerabilities across service infrastructures, authentication mechanisms, authorization protocols, and service requests.

The term "cybersecurity" now encompasses the protection of both systems and data within cyberspace, involving a comprehensive approach that includes technology, human factors, and information management. Cybersecurity practices aim to safeguard the confidentiality, integrity, and availability of information by managing risks, threats, and attacks throughout the entire lifecycle of data generation, processing, storage, and transmission. With the increasing use of cyberspace, even individuals who do not directly engage with online platforms can be at risk due to the interconnected nature of digital information.

The adoption of digital transformation strategies has led organizations to generate and process vast amounts of real-time data. This surge in data volume, coupled with the deployment of interconnected technologies, amplifies the potential attack surface for cyber threats. Consequently, organizations face heightened risks of data breaches, economic losses, service disruptions, customer dissatisfaction, and reputational damage if cybersecurity practices are inadequate or improperly implemented.

To address these challenges, organizations require practical methods to evaluate and improve their cybersecurity posture within the context of digital transformation. Maturity models have been developed as tools to assess the implementation of best practices and processes in organizations. One prominent example is the Capability Maturity Model Integration (CMMI), introduced by the Software Engineering Institute. CMMI provides a framework for process improvement by outlining a set of practices across various maturity levels. It assists organizations in enhancing their processes by providing guidelines for developing behaviors that decrease risks in software, product, and service development.

CMMI is structured into maturity levels that represent a path of improvement recommended for organizations. The levels include Initial, where processes are unpredictable and reactive; Managed, where processes are characterized for projects and are often reactive, with projects being planned, performed, measured, and controlled; Defined, where processes are characterized for the organization and are proactive, with a set of standard processes established and improved over time; Quantitatively Managed, where processes are measured and controlled, and the organization and projects are data-driven with quantitative performance improvement objectives; and Optimizing, where the focus is on process improvement, and the organization is stable and flexible with continuous improvement processes in place.

While CMMI has been instrumental in guiding organizations toward process maturity, it primarily focuses on software development and may not fully address the specific cybersecurity challenges posed by digital transformation.

Numerous cybersecurity maturity models have been established, often aligned with international standards such as those provided by the International Organization for Standardization (ISO) and the National Institute of Standards and Technology (NIST). ISO develops and publishes a wide range of proprietary, industrial, and commercial standards. Of particular relevance is the ISO/IEC 27000 series, which provides best practice recommendations on information security management, risks, and controls within the context of an overall Information Security Management System (ISMS). Key standards include ISO/IEC 27001, which specifies the requirements for establishing, implementing, maintaining, and continually improving an ISMS; ISO/IEC 27002, which provides guidelines for organizational information security standards and information security management practices, including the selection, implementation, and management of controls; and ISO/IEC 27005, which focuses on information security risk management, providing guidelines for risk assessment, risk treatment, risk acceptance, risk communication, and risk monitoring and review.

While ISO standards offer a comprehensive approach to information security management, they can be resource-intensive to implement and may not specifically address the dynamic challenges introduced by digital transformation.

The National Institute of Standards and Technology provides guidelines, standards, and frameworks to help organizations manage and reduce cybersecurity risk. Key contributions include the NIST Cybersecurity Framework (CSF), a voluntary framework consisting of standards, guidelines, and best practices to manage cybersecurity-related risk. The framework's core comprises five functions, Identify, Protect, Detect, Respond, and Recover. Each function is further divided into categories and subcategories that provide high-level objectives and specific outcomes. Additionally, the NIST Special Publication 800 Series offers guidelines, recommendations, and reference materials for information security. Notably, NIST SP 800-53 provides a catalog of security and privacy controls for federal information systems and organizations, and NIST SP 800-37 offers guidelines for applying the Risk Management Framework to federal information systems.

While NIST frameworks are comprehensive and widely respected, they are often complex and may require significant effort and expertise to implement effectively. The NIST framework may also lack specific guidance tailored to the nuances of digital transformation initiatives.

Existing maturity models and standards like CMMI, ISO, and NIST provide valuable frameworks for improving cybersecurity practices. However, such frameworks may not adequately address the unique cybersecurity challenges associated with digital transformation, such as rapid technological change, integration complexity, cultural shifts within organizations, and the explosion of data volume and variety. Digital transformation involves the adoption of emerging technologies that evolve quickly, making it challenging for static models to remain relevant. Combining legacy systems with new digital platforms introduces complexities that existing models may not fully capture. Additionally, digital transformation requires changes in organizational culture and behavior, which are not the primary focus of traditional cybersecurity models. The proliferation of diverse data types and sources necessitates new approaches to data security and privacy.

The lack of specialized models that evaluate cybersecurity practices within the context of digital transformation presents a gap in the ability of organizations to accurately identify their maturity level and receive targeted guidance for improvement. In the absence of such specialized frameworks, organizations may struggle to effectively measure and enhance their cybersecurity capabilities as they adopt new technologies.

Each of the existing technologies suffers from one or more drawbacks hindering their adoption. The one or more drawbacks include, but may not be limited to, the absence of cybersecurity maturity models specifically tailored for digitally enabled or transforming organizations, the varying goals and inconsistent quality in the design and implementation of existing models, and the lack of a unified framework that simultaneously addresses both cybersecurity and digital transformation. The existing maturity models are not adequately designed to evaluate cybersecurity practices within the context of digital transformation, nor do they support self-assessment capabilities that are generic and adaptable to different organizational domains or sizes.

Accordingly, it is one object of the present disclosure to provide a new maturity model that measures organizations' cybersecurity and digital transformation maturity. It is another object of the present disclosure to develop a model that aligns with established cybersecurity standards and frameworks, facilitating self-assessment by allowing organizations to evaluate themselves, identify their maturity levels, and receive suggestions for improvement. Yet another object is to offer a generic model that does not target a particular organizational domain or size, thereby providing tailoring options for different types of organizations. One more object is to bridge the gap in existing models by focusing specifically on organizations willing to assess their maturity in being digitally enabled with respect to cybersecurity.

SUMMARY

In an exemplary embodiment, a Web-based computer-implemented method for improving a cybersecurity maturity level of a digitally transforming organization, the digitally transforming organization having a plurality of networked computer-implemented devices with access to the Internet is described. The method includes determining, by processing circuitry, one or more capability areas of the digitally transforming organization. A capability area is a group of related practice areas. The method further includes inputting, by the processing circuitry, in at least one Web page screen evaluation results of practice areas in a selected at least one capability area using evaluation options, and determining, by the processing circuitry based on the evaluation results, a rating value of one or more practice areas of each capability area. Each practice area is a group of cybersecurity best practices. The method further includes displaying a rating value screen, by the processing circuitry, the rating value of each practice area arranged in a matrix for each capability area, determining, by the processing circuitry, for each capability area of the one or more capability areas of the digitally transforming organization, the cybersecurity maturity level of the capability area based on the rating value of the one or more practice areas, and displaying in a Web page maturity level screen, by the processing circuitry, when the cybersecurity maturity level of a respective capability area is below a threshold level, an action that would increase the cybersecurity maturity level of the respective capability area. Upon completion of the action, the method updates the cybersecurity maturity level of the respective capability area. The method further includes displaying in the Web page maturity level screen, a further action that would increase the cybersecurity maturity level of a capability level to give further guidance for improvement.

In another exemplary embodiment, a framework system for performing and improving a cybersecurity maturity level of a digitally transforming organization, the digitally transforming organization having a plurality of networked computer-implemented devices with access to the Internet is described. The framework system includes a memory storing a database of cybersecurity practice areas (PA) and respective PA maturity levels for a plurality of capability areas (CA). Each cybersecurity practice area is a group of cybersecurity best practices. The framework system further includes a Web-based interface for inputting a cybersecurity model using the database of cybersecurity practice areas, an administrative display device, for providing at least one Web page input screen for inputting the plurality of capability areas and respective target cybersecurity CA maturity levels, and at least one evaluation display device, for inputting screen evaluation results of practice areas in a selected at least one capability area using evaluation options.

The framework system further includes processing circuitry. The processing circuitry is configured to determine based on the evaluation results, a rating value of one or more practice areas of each capability area. Each practice area is a group of cybersecurity best practices. The processing circuitry is further configured to display in a rating value screen, via the display device, first indications for practice areas that have been evaluated and second indications for pending practice areas to be evaluated for each capability area, input evaluation results for the practice areas of the practice areas to be evaluated and determine updated CA maturity levels based on the PA maturity levels for practice areas associated with respective capability areas, and display, in a Web page via the display device, the determined updated CA maturity level, the target CA maturity level, along with practice areas that can be performed to upgrade the CA maturity level up one level for those capability areas that do not meet the target CA maturity level.

In another exemplary embodiment, a system for assessing a cybersecurity maturity level of a digitally transforming organization, the digitally transforming organization having a plurality of networked computer-implemented devices with access to the Internet is described. The system includes a processing circuitry implanting a spreadsheet that is configured to input best practices, identified as one of core practice or optional practice for a plurality of practice areas and practice sequences. Each practice area is a group of cybersecurity best practices. The processing circuitry is further configured to determine based on received data of the digitally transforming organization, a rating value of one or more practice areas of each capability area, wherein a capability area is a group of related practice areas, display the one or more practice areas with indications of the determined rating value, and determine for each capability area of the digitally transforming organization, the cybersecurity maturity level of the capability area using the rating value of the one or more practice areas.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 13 illustrates a process flow for developing a cybersecurity digital transformation maturity model, in accordance with an exemplary aspect of the disclosure;

FIG. 14 illustrates the phases of best practices filtration in a process diagram, in accordance with an exemplary aspect of the disclosure;

FIG. 18 illustrates a distribution of best practices across the maturity levels, in accordance with an exemplary aspect of the disclosure;

FIG. 23 illustrates a case study evaluation review conducted on three distinct capability areas (CAs), in accordance with an exemplary aspect of the disclosure;

FIG. 24 illustrates the case study evaluation results for the capability areas, in accordance with an exemplary aspect of the disclosure;

FIG. 25 illustrates a detailed view of a practice review under the running operations capability area, in accordance with an exemplary aspect of the disclosure;

FIG. 26 illustrates a user interface for an assessment tool designed to assist organizations with cybersecurity and digital transformation assessments, in accordance with an exemplary aspect of the disclosure;

FIG. 27 illustrates a first step of the assessment process using the assessment tool, in accordance with an exemplary aspect of the disclosure;

FIG. 28 illustrates a second step of the assessment process using the assessment tool, in accordance with an exemplary aspect of the disclosure;

FIG. 31 illustrates a fifth step of the assessment process using the assessment tool, in accordance with an exemplary aspect of the disclosure;

FIG. 32 illustrates a sixth step of the assessment process using the assessment tool, in accordance with an exemplary aspect of the disclosure;

FIG. 33 illustrates a seventh step of the assessment process using the assessment tool in accordance with an exemplary aspect of the disclosure;

FIG. 34 illustrates the start of phase two of the assessment tool, in accordance with an exemplary aspect of the disclosure;

FIG. 35 illustrates a sample evaluation interface during the second phase of the assessment tool, in accordance with an exemplary aspect of the disclosure;

FIG. 36 illustrates the interface for reviewing incomplete evaluations in the second phase of the assessment tool, in accordance with an exemplary aspect of the disclosure;

FIG. 37 illustrates the interface for reviewing the completed evaluation during the second phase of the assessment tool, in accordance with an exemplary aspect of the disclosure;

FIG. 38 illustrates the interface for viewing the results after completing an evaluation, in accordance with an exemplary aspect of the disclosure;

FIG. 39 illustrates reporting results during the third phase of the assessment tool, in accordance with an exemplary aspect of the disclosure;

DETAILED DESCRIPTION

Figure 1A:
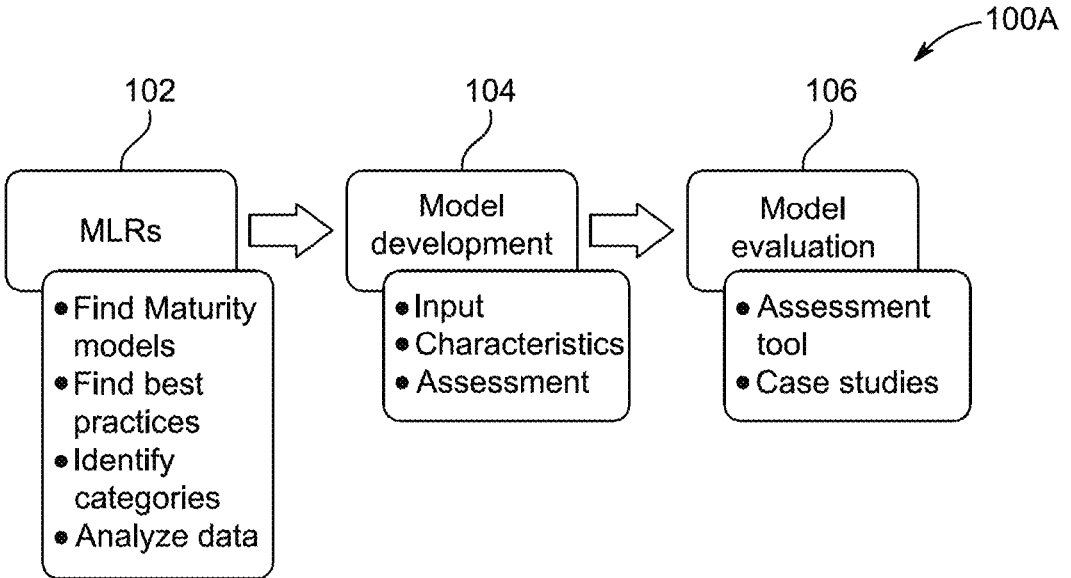
FIG. 1A illustrates a system for developing and evaluating maturity models using multivocal literature reviews (MLRs), in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system and method for improving the cybersecurity maturity level of a digitally transforming organization by evaluating capability areas using a web-based framework and processing circuitry. Existing methods for assessing cybersecurity maturity often rely on manual evaluations and limited scope, leading to inefficiencies in tracking improvements across various capability areas, such as software engineering, information security, and human access management. Traditional methods also fail to provide a dynamic and responsive system that can suggest targeted improvements based on real-time data input and evaluation results.

The present disclosure provides a web-based system and method that enables organizations to input evaluation results for various capability areas and corresponding practice areas, where each practice area represents a group of cybersecurity best practices. The system determines a rating value for each practice area and calculates a maturity level for each capability area based on the rating values. This approach allows for real-time assessment and immediate feedback on cybersecurity posture across different operational domains.

The system comprises a web-based interface, which provides one or more input screens for entering evaluation data related to the capability areas and their corresponding practice areas. Administrative and evaluation display devices are used to input and display results, allowing cybersecurity personnel to assess maturity levels in an organized manner. The processing circuitry is configured to process the evaluation results and determine the cybersecurity maturity level for each capability area, providing guidance on actions that can be performed to improve maturity levels.

Additionally, the processing circuitry displays a maturity level screen, which indicates the current cybersecurity maturity level of each capability area. If the maturity level is below a certain threshold, the system suggests actions that can raise the maturity level. After implementing the suggested actions, the system updates the maturity level of the respective capability area. Further, the system offers guidance on additional practice areas that can provide further improvements in cybersecurity maturity, facilitating continuous improvement and adaptation to emerging cybersecurity challenges.

FIG. 1A illustrates a system 100A for developing and evaluating maturity models using multivocal literature reviews (MLRs). The system 100A includes three main phases, referred to as MLRs 102, model development 104, and model evaluation 106.

The MLRs 102 phase comprises various operations that involve finding existing maturity models and identifying best practices. The MLRs 102 phase further involves identifying categories and analysing data related to the maturity models. This phase ensures a systematic approach to retrieve relevant maturity models from both formal and grey literature, and to classify them into appropriate categories for further analysis.

The model development 104 phase receives input from the MLRs 102 phase. The model development 104 phase focuses on processing the input data and applying it to the creation of a new maturity model. The input for this phase includes characteristics derived from the best practices and maturity models identified in the MLRs 102 phase. The model development 104 phase also involves conducting assessments to refine the developed model based on the identified inputs and characteristics.

The model evaluation 106 phase provides tools and case studies for evaluating the maturity model developed in the model development 104 phase. The model evaluation 106 phase includes the use of an assessment tool that measures the effectiveness of the model. Case studies are applied to validate the developed model in practical scenarios, ensuring its applicability across different organizational contexts.

The system 100A employs directional arrows between the MLRs 102, model development 104, and model evaluation 106 phases, illustrating the sequential flow of operations from data collection and categorization to model development and final evaluation.

Figure 1B:
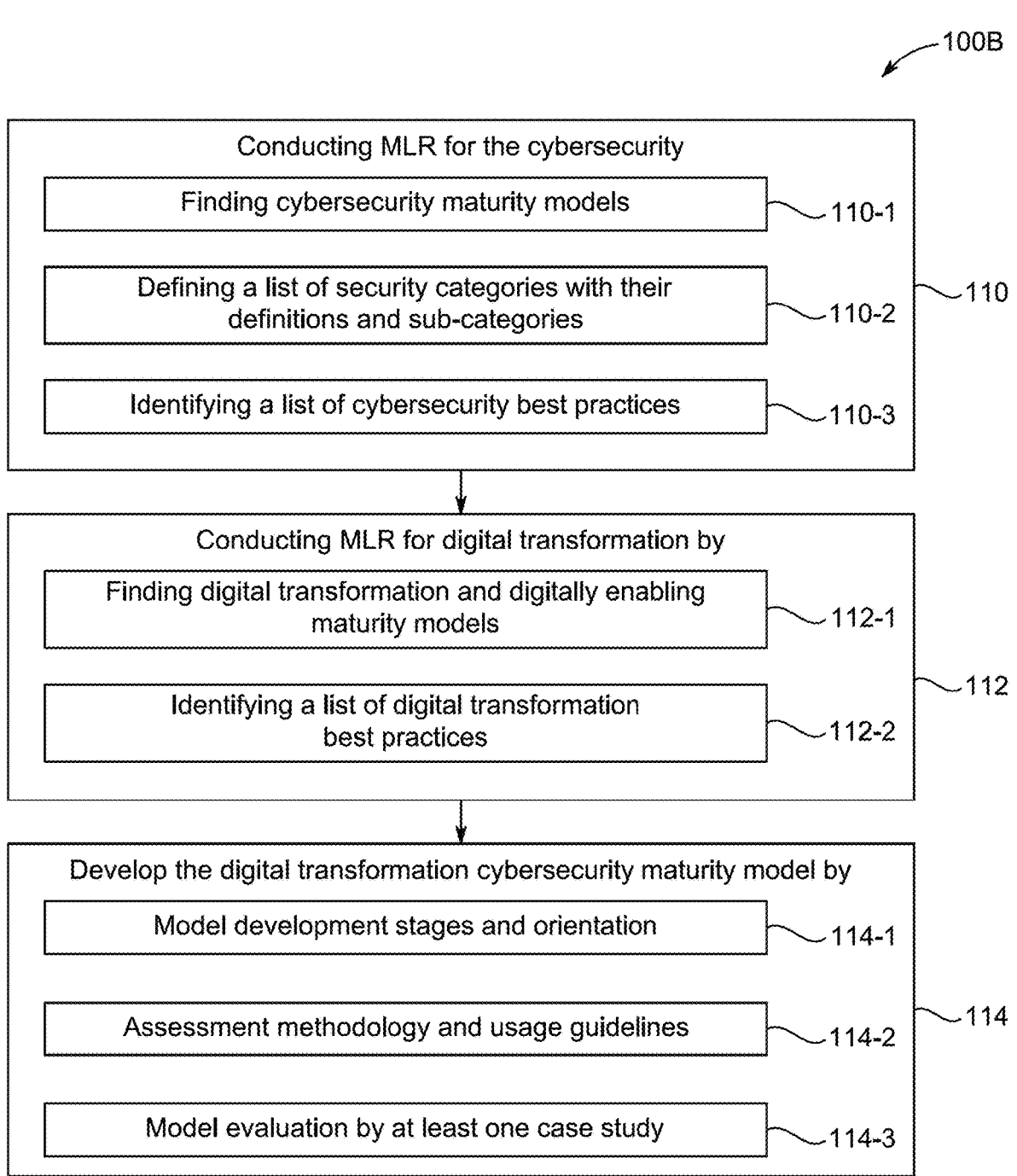
FIG. 1B illustrates a system for conducting MLRs and developing a digital transformation cybersecurity maturity model, in accordance with an exemplary aspect of the disclosure.

FIG. 1B illustrates a system 100B for conducting multivocal literature reviews (MLRs) and developing a digital transformation cybersecurity maturity model. The system 100B includes three main phases: conducting MLR for cybersecurity 110, conducting MLR for digital transformation 112, and developing a digital transformation cybersecurity maturity model 114.

The conducting MLR for cybersecurity 110 phase involves multiple steps aimed at identifying cybersecurity maturity models and best practices. This phase includes finding cybersecurity maturity models 110-1, defining a list of security categories with their definitions and sub-categories 110-2, and identifying a list of cybersecurity best practices 110-3.

The conducting MLR for digital transformation 112 phase involves identifying digital transformation maturity models and relevant best practices. The steps within this phase include finding digital transformation and digitally enabling maturity models 112-1, and identifying a list of digital transformation best practices 112-2. The developing the digital transformation cybersecurity maturity model 114 phase integrates the findings from both MLR phases. This phase involves defining model development stages and orientation 114-1, establishing an assessment methodology and usage guidelines 114-2, and performing model evaluation by at least one case study 114-3. The system 100B demonstrates a sequential process, with arrows connecting conducting MLR for cybersecurity 110, conducting MLR for digital transformation 112, and developing the digital transformation cybersecurity maturity model 114, indicating the flow of operations from one phase to the next.

Figure 1C:
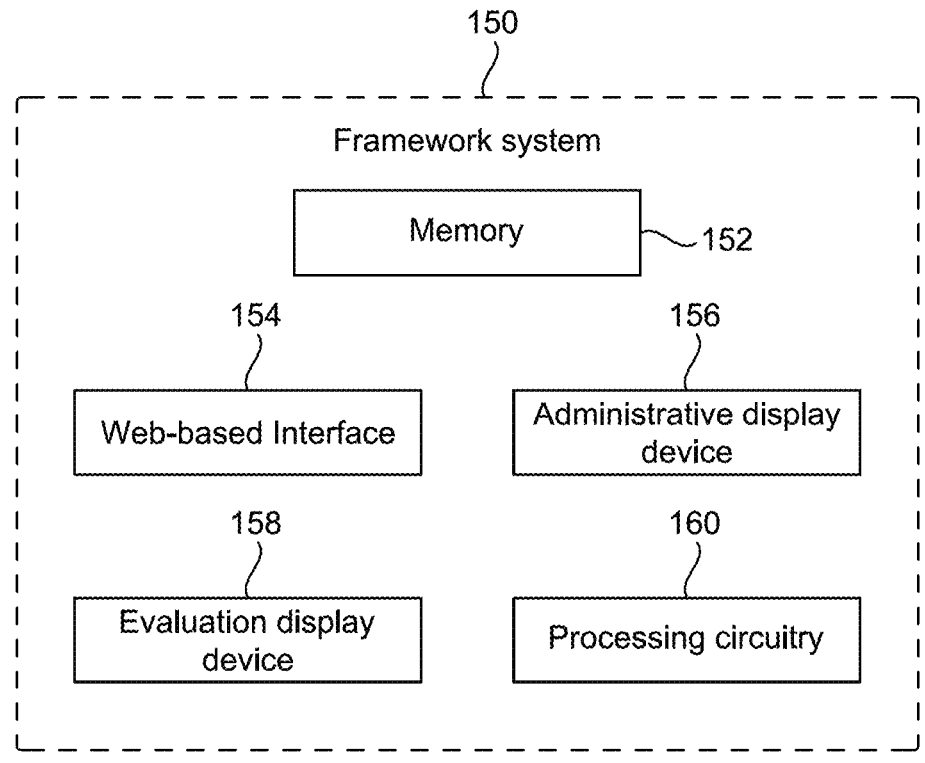
FIG. 1C illustrates a framework system configured to improve and assess the cybersecurity maturity level of a digitally transforming organization, in accordance with an exemplary aspect of the disclosure.

FIG. 1C illustrates a framework system 150 configured to assess and improve the cybersecurity maturity level of a digitally transforming organization, which contains a plurality of networked computer-implemented devices with access to the internet. The framework system 150 comprises a memory 152, a web-based interface 154, an administrative display device 156, a second administrative display device 158, and processing circuitry 160.

The memory 152 is a non-transitory computer-readable storage medium designed to store a database of cybersecurity practice areas (PA) and their respective maturity levels for multiple capability areas (CA). In an embodiment, the memory 152 is Random Access Memory (RAM), or any other dynamic storage device commonly known in the art. Read-only memory is any static storage device(s) e.g., but not limited to, a Programmable Read Only Memory (PROM) chips for storing static information e.g., start-up or Basic Input/Output System (BIOS) instructions for the processor.

In an embodiment, the mass storage is any current or future mass storage solution, which is used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g., an array of disks (e.g., SATA arrays).

Each cybersecurity practice area represents a group of cybersecurity best practices, which are aimed at enhancing the organization's cybersecurity posture across various operational domains. For example, the stored database may include capability areas that focus on software engineering, running operations, risk analysis, human access management, information security, infrastructure, and governance.

The web-based interface 154 provides users, primarily administrative personnel, access to the cybersecurity maturity model stored in the memory 152. The interface 154 enables users to input evaluation data related to various practice areas within the capability areas. It is accessible over the internet, presenting web pages that include input screens for entering capability areas, practice areas, and their corresponding target maturity levels.

The administrative display device 156 offers a graphical user interface (GUI) that allows users to input and view data related to the cybersecurity maturity assessment. It may be implemented on various devices such as desktop computers, tablets, or other network-enabled devices, allowing users to interact with the web-based interface 154. Similarly, the second administrative display device 158 can operate in parallel, enabling another user to input data or conduct evaluations simultaneously. For instance, a cybersecurity expert might use the administrative display device 156 while a network administrator operates the second administrative display device 158, working collaboratively on the cybersecurity maturity assessment.

The processing circuitry 160 performs operations based on the input data received through the web-based interface 154 and the administrative display devices 156 and 158. It processes the evaluation results for the practice areas and determines a rating value for one or more practice areas within each capability area. These rating values are then used to calculate the maturity levels of the associated capability areas. For instance, the processing circuitry 160 can evaluate the maturity level of a capability area like human access management by reviewing inputs regarding access control policies, role-based access control implementations, and audit trail logs.

In one aspect of the present disclosure, the framework system 150 is configured to include capability areas such as software engineering, running operations, risk analysis, information security, human access management, infrastructure, and governance. These capability areas are key categories for which the cybersecurity maturity level is assessed. This aspect of the disclosure supports the need to address diverse operational domains and enhance cybersecurity posture comprehensively across an organization.

In another aspect of the present disclosure, the framework system 150 categorizes the cybersecurity maturity model into five distinct levels. From the lowest to the highest, these levels include initial, management support, improved, quantitative, and continuous improvement, based on the number of best practices implemented. Each maturity level provides an incremental framework for the organization to enhance its cybersecurity capabilities. This structured progression allows organizations to systematically improve their cybersecurity maturity in a manageable and measurable way.

The processing circuitry 160 generates a rating value screen, which is displayed on the administrative display device 156. This screen provides visual feedback on the maturity levels of the evaluated capability areas. For each capability area, the practice areas are represented by icons or indicators that signify the current maturity status. A color-coded matrix might be used for this purpose, where green indicates fully compliant practice areas, yellow signifies partially compliant areas, and red highlights areas needing improvement.

In another aspect of the present disclosure, the processing circuitry 160 is configured to receive data of the digitally transforming organization, including practice area assessment information within each capability area. This data is used to determine one or more practice areas that can increase the maturity level of a specific capability area. For example, if the system identifies gaps in a practice area within risk analysis, the processing circuitry 160 can suggest best practices to address those gaps and improve the maturity level.

Additionally, the processing circuitry 160 identifies and flags practice areas that have not yet met the target cybersecurity maturity level. These flagged practice areas are displayed on the administrative display devices 156 or 158, with specific recommendations on how to improve the maturity level. For example, the system may suggest implementing multi-factor authentication (MFA) as a cybersecurity best practice to increase the maturity level in human access management.

In another aspect of the present disclosure, the framework system 150 provides detailed information of the one or more practice areas that, when implemented, will improve the cybersecurity maturity level. This detailed information is displayed on a web page via the administrative display device 156 or the second administrative display device 158. The ability to provide specific details and action items enables organizations to focus their efforts on critical areas for cybersecurity improvement.

Once actions to improve the maturity level have been taken, the processing circuitry 160 updates the database in memory 152 with new evaluation results. This process ensures that the framework system 150 maintains an up-to-date and accurate record of the organization's cybersecurity status, allowing continuous monitoring and improvement.

In another aspect of the present disclosure, the processing circuitry 160 is configured to display additional practice areas that can provide further guidance for improving the cybersecurity maturity level. This feature ensures that organizations are not only achieving the minimum required cybersecurity posture but are also provided with pathways for further enhancements. This may include more advanced cybersecurity practices that take the organization to the next level of maturity.

In yet another aspect of the present disclosure, the framework system 150 assesses a cybersecurity maturity level of the digitally transforming organization by implementing a spreadsheet configured to input best practices, identified as either core practices or optional practices, for a plurality of practice areas and practice sequences. The processing circuitry 160 determines the rating value for each practice area based on the received data of the digitally transforming organization and uses that information to calculate the cybersecurity maturity level of each capability area.

In another aspect of the present disclosure, the processing circuitry 160 assigns a rating level to each practice based on a plurality of ranges of rating values. This rating level is then used to determine the maturity level for each capability area. The system uses this granular rating system to provide an accurate assessment of the organization's cybersecurity maturity across various operational domains.

The processing circuitry 160 also categorizes data received from the digitally transforming organization into evidence categories for each capability area. In another aspect of the present disclosure, evidence is categorized as direct evidence, indirect evidence, or weakness evidence. The processing circuitry 160 assigns a rating level to each practice based on the type of evidence provided, and this rating is used to determine the overall cybersecurity maturity level for the respective capability area. The system uses this evidence-based approach to ensure that maturity assessments are based on verifiable data.

In another aspect of the present disclosure, the processing circuitry 160 displays the determined rating values as color-coded indications on the administrative display device 156 or the second administrative display device 158. These colors correspond to categories such as fully met, largely met, partially met, does not meet, or not applicable. This visual feedback allows users to quickly assess the cybersecurity posture of the organization and identify areas needing attention.

The framework system 150 provides a comprehensive solution for evaluating, improving, and monitoring the cybersecurity maturity levels of a digitally transforming organization. Through the coordinated operation of memory 152, the web-based interface 154, the administrative display devices 156 and 158, and processing circuitry 160, organizations are empowered to systematically enhance their cybersecurity practices across various critical capability areas.

Various aspects of embodiment described with reference to the FIG. 1C, relate to development of maturity model. The maturity is associated with the degree of regulation and optimization of processes, ranging from informal practices to defined actions, and extending to continuous optimization, as disclosed in reference. Accordingly, a maturity model can be defined as "a tool that helps individuals or groups assess their current effectiveness and aids in identifying the capabilities they need to acquire to enhance their performance".

Maturity models serve as effective tools to measure the status of measurable factors and evaluate organizations based on a set of criteria. Effective maturity models are designed to earn the trust of organizations, which is crucial for their adoption. One key method for building this trust is to align the models with international standards in the relevant domains or areas. Maturity models can also serve as tools to improve organizational functionality by identifying strengths and vulnerabilities and providing benchmarking information. Additionally, they help describe how activities, practices, and processes can influence the outcomes of an organization.

The differences between various maturity models stem from the goals and objectives for which they were developed, as well as the domains they target. For example, one of the most widely recognized maturity models in software engineering, the CMMI, was developed by the Software Engineering Institute (SEI). Maturity models assist organizations in improving their products by enhancing the underlying processes and practices applied. These models help clarify the relationship between the maturity of applied processes and the quality of the products generated.

Maturity models can generally be classified into three categories based on their goals: descriptive, prescriptive, and comparative. Descriptive models serve as diagnostic tools used for assessment and evaluation, wherein the existing capabilities of an organization are evaluated to assess its current situation. On the other hand, prescriptive models focus on identifying the necessary levels of maturity and guiding the organization toward enhancement measures. Finally, comparative models evaluate the performance of various factors by comparing historical evaluations to enable benchmarking across different industries.

In Table 1, examples of each of these three types of maturity models are provided:

TABLE 1

Maturity Model Types and Examples

| Type | Examples |
|------|----------|
| Descriptive | "Maturity model of digitization for SMEs." "Evaluate the analytic maturity of an organization." "Electronic business maturity in Portuguese SME and large enterprises." "Raising your digital quotient." |
| Prescriptive | "Maturity models for digitalization in manufacturing" "Towards a smart manufacturing maturity model for SMEs." "Measuring the ICT maturity of SMEs." "A maturity model for business model management in Industry 4.0" |
| Comparative | "A digital maturity model for telecom service providers" "An Industry 4.0 readiness assessment tool" |

Figure 1D:
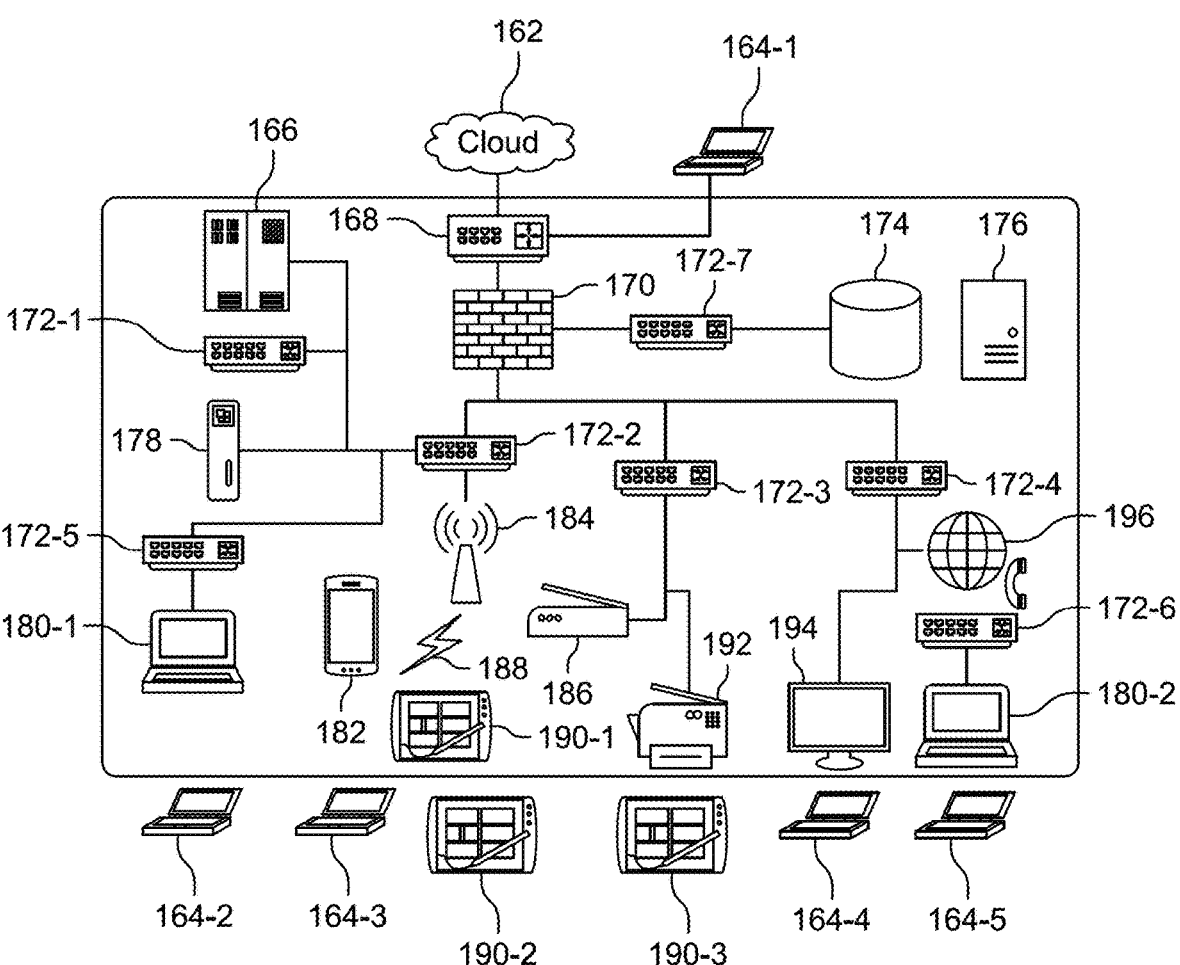
FIG. 1D an exemplary system for assessing the cybersecurity maturity level of a digitally transforming organization, in accordance with an exemplary aspect of the disclosure.

FIG. 1D illustrates an exemplary system for assessing the cybersecurity maturity level of a digitally transforming organization, comprising a plurality of interconnected, networked computing devices, which are communicatively coupled to the internet. The system is designed to implement sophisticated processes for cybersecurity maturity evaluation based on various capability areas and related best practices.

In FIG. 1D, cloud 162 is a cloud computing infrastructure, which facilitates the centralized computation and processing necessary for managing and assessing cybersecurity practices across the network. Cloud 162 operates as a dynamic, scalable resource capable of accommodating high computational loads, thereby providing an environment for real-time processing of cybersecurity data. Cloud 162 can be implemented as a private cloud, a public cloud, or a hybrid cloud system, supporting distributed data storage, multi-tenant environments, and secure data exchanges between interconnected devices.

User devices 164, such as desktop computers, laptops, and workstations, are configured to interface with cloud 162 for inputting, retrieving, and processing cybersecurity data, specifically in relation to the digitally transforming organization. User devices 164 may utilize network communication protocols such as Ethernet (IEEE 802.3), Wi-Fi (IEEE 802.11), or fiber optics for connectivity to other components within the system.

Mainframe 166 serves as the principal computational system for executing large-scale data processing functions. Mainframe 166 may be implemented using high-performance computing architectures such as IBM Z-series, or other comparable mainframe systems designed to handle intensive data processing tasks. Mainframe 166 is configured to interface with router 168, which facilitates the routing of data packets between the various components within the network. Router 168 may implement advanced routing protocols such as Border Gateway Protocol (BGP) or Open Shortest Path First (OSPF) for directing data between internal and external networks.

Firewall 170 is interposed between router 168 and the external network to ensure secure data transmission and prevent unauthorized access. Firewall 170 may be configured as a hardware firewall, such as a Cisco ASA, or a software-based firewall, such as those implemented by Palo Alto Networks, and operates in accordance with predefined security policies to monitor and filter inbound and outbound network traffic. Firewall 170 may include functionalities such as deep packet inspection (DPI), network address translation (NAT), and virtual private network (VPN) support to safeguard the integrity and confidentiality of transmitted data.

Switches 172 serve as the communication *nexus* between user devices 164, mainframe 166, and other backend systems. Switches 172 may include Layer 2 or Layer 3 switches, such as Cisco Catalyst or Juniper EX series, and are configured to perform packet forwarding, VLAN segmentation, and Quality of Service (QoS) enforcement within the network. Switches 172 enable efficient data exchange between various subsystems by regulating the flow of traffic and optimizing the transmission of data packets across multiple communication channels.

Data storage unit 174 provides a centralized repository for storing large volumes of data related to cybersecurity practices, assessment results, and historical analysis. Data storage unit 174 may be implemented using storage solutions such as Network Attached Storage (NAS) or Storage Area Networks (SAN), employing protocols such as Fibre Channel (FC), Internet Small Computer System Interface (iSCSI), or Network File System (NFS). Data storage unit 174 may be further integrated with redundant array of independent disks (RAID) configurations to enhance fault tolerance and data redundancy.

Server 176 performs the backend processing necessary for executing the spreadsheet-based calculations required to assess the cybersecurity maturity level. Server 176 may be a high-performance computing server such as Dell Power-Edge or HPE ProLiant, capable of handling parallel processing workloads. Server 176 is configured to retrieve input data from user devices 164, perform computational assessments using predefined cybersecurity best practices, and output the results for display on the user interfaces.

External hard drive 178, such as a Storage Area Network (SAN), offers additional storage capacity for external data storage and backup purposes. External hard drive 178 provides scalable storage solutions for the system's growing data needs. External hard drive 178 may implement advanced storage technologies such as Non-Volatile Memory Express (NVMe) over Fabrics, which allows for high-speed data transfers between the system and storage arrays.

User device 180 is a laptop or desktop computer configured as an administrative terminal for managing cybersecurity assessment operations. User device 182 represents a mobile device, such as a smartphone or tablet, equipped to enable remote monitoring and management of cybersecurity assessments. User device 186 is a scanner integrated into the network for digitizing paper-based records related to cybersecurity assessments. Personal Digital Assistants (PDA), represented by user device 190, may be employed for on-the-field data collection or real-time reporting of cybersecurity incidents.

User device 192, a copier, may be integrated with multifunction network printers to facilitate the printing and copying of cybersecurity reports. Desktop computer 194 serves as a general-purpose user terminal for performing tasks such as accessing assessment results, generating reports, or configuring cybersecurity parameters.

Voice over Internet Protocol (VoIP) phone 196 allows for voice communication over the network using protocols such as Session Initiation Protocol (SIP) or H.323. VoIP phone 196 may be employed for internal communications during cybersecurity incidents or routine operations. Communication links 188 interconnect all the devices within the system and ensure secure data flow between them. Communication links 188 may include wired connections such as Category 6 Ethernet cables, optical fiber connections for long-distance data transmission, or wireless communication protocols such as Wi-Fi 6 (IEEE 802.11ax) for mobile and portable devices. Wireless access point 184 facilitates the connection of mobile devices to the network, providing secure and high-speed wireless access for cybersecurity personnel managing the assessments.

Figure 2A:
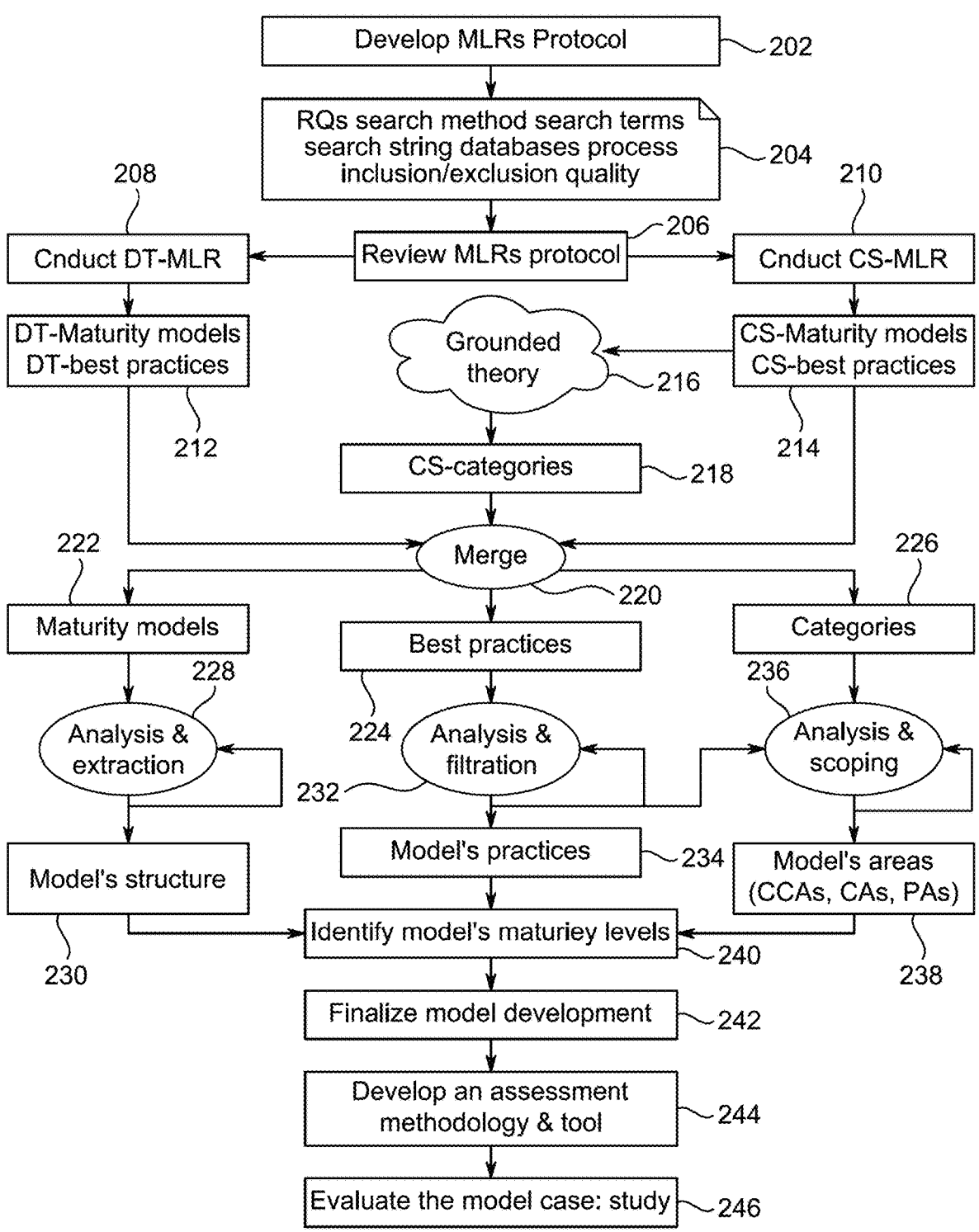
FIG. 2A illustrates a system for conducting the MLR and developing a maturity model for evaluating and enhancing cybersecurity, in accordance with an exemplary aspect of the disclosure.

FIG. 2A illustrates a system 200 for conducting a multivocal literature review (MLR) and developing a comprehensive maturity model for evaluating and enhancing the cybersecurity posture of a digitally transforming organization. The system 200 includes several interconnected components and processes, beginning with the development of MLRs protocol 202. The MLRs protocol 202 outlines the research process, including research questions (RQs), search methods, search terms, search strings, databases, and quality measures, as represented by block 204. This protocol ensures a systematic approach to conducting the review and sets the inclusion and exclusion criteria for relevant studies, combining both formal and grey literature.

The developed MLRs protocol 202 undergoes a review at step 206 to confirm that the methodology aligns with the research goals, such as identifying appropriate maturity models and best practices in the context of cybersecurity and digital transformation. Upon completion of the review, the protocol is applied in two distinct MLRs: the digital transformation MLR (DT-MLR) 208 and the cybersecurity MLR (CS-MLR) 210.

The DT-MLR 208 focuses on identifying digital transformation maturity models and best practices, shown as DT-maturity models and DT-best practices 212. Digital transformation, as described in the disclosure, refers to the adoption and integration of modern digital technologies, including cloud computing, big data, Internet of Things (IoT), and artificial intelligence (AI). Digital transformation is an ongoing process that requires continuous adjustment as new technologies emerge.

Simultaneously, the CS-MLR 210 identifies cybersecurity maturity models and best practices, illustrated as CS-maturity models and CS-best practices 214. Cybersecurity, especially in the context of digital transformation, is critical for protecting an organization's digital assets. With the rise of automation and the expansion of cloud technologies, organizations face new challenges in securing their data and ensuring compliance with cybersecurity best practices. The CS-best practices 214 identified in this phase aim to provide guidelines for establishing secure operational environments.

Once both DT-MLR 208 and CS-MLR 210 are applied, the results are analyzed through a grounded theory approach 216. The grounded theory 216 is used to categorize and organize the maturity models and best practices found in the literature. For cybersecurity, the system further refines the findings into CS categories 218, representing key areas such as human access management, risk analysis, information security, and infrastructure management.

The next phase involves merging the results from both DT-MLR 208 and CS-MLR 210, represented by block 220. This merged data serves as the foundation for developing an integrated maturity model that addresses both digital transformation and cybersecurity challenges.

The maturity models 222 are analyzed and extracted to form a structured model's architecture, illustrated as model's structure 230. This architecture ensures that the maturity model incorporates best practices derived from both digital transformation and cybersecurity, while being presented in a format that is both practical and implementable across various organizational settings. This model structure is based on multiple levels of organizational capabilities, defined through Capability Categories (CCAs), Capability Areas (CAs), and Practice Areas (PAS), which serve as the building blocks for the model's comprehensive assessment framework.

The best practices 224 are processed through a detailed and systematic procedure of analysis and filtration 232, which results in the identification of specific, actionable practices that are directly relevant to improving the organization's cybersecurity and digital transformation maturity. These identified practices are collectively referred to as the model's practices 234 and are critical for guiding the organization towards the desired maturity levels.

The analysis and filtration process 232 involves a multi-step approach to sift through a vast number of best practices gathered from both formal and grey literature sources, as outlined in the MLR. This process is designed to ensure that only the most relevant and effective practices are selected for inclusion in the maturity model, thereby filtering out practices that may be outdated, redundant, or not directly applicable to the organization's specific needs.

During the analysis phase, each best practice is carefully examined in terms of its applicability to various CAs and PAs within the organization. The examination includes assessing the practice against known industry standards, such as the NIST Cybersecurity Framework, ISO/IEC 27001, and Capability Maturity Model Integration (CMMI). The analysis ensures that the identified best practices align with established frameworks and reflect current cybersecurity and digital transformation requirements.

The filtration phase involves a critical evaluation of the practices, where the organization filters out practices that do not meet specific criteria, such as feasibility, cost-effectiveness, and compatibility with existing processes. For example, a best practice recommending multi-factor authentication (MFA) might be retained if the organization has the technological infrastructure to support it, while a practice that suggests a complete overhaul of the data management system may be filtered out if the evaluation determines that a complete overhaul is not practical for the organization's current operational environment.

The model's practices 234, resulting from this analysis and filtration, are then organized and categorized based on their relevance to improving both cybersecurity and digital transformation maturity. These practices provide actionable steps that an organization can take to close gaps in cybersecurity posture or enhance digital transformation efforts. For instance, in the context of cybersecurity, the model's practices may include recommendations for implementing encryption protocols, regular vulnerability assessments, and incident response plans. For digital transformation, the practices may focus on adopting cloud solutions, automating business processes, or integrating artificial intelligence (AI) into decision-making frameworks.

Capability Categories (CCAs) 238 represent a broad, high-level grouping of organizational functions that are critical to achieving maturity in cybersecurity and digital transformation. Each CCA comprises multiple CAs, which in turn contain related PAs. CCAs are intended to provide a top-level view of an organization's overall maturity and encompass key domains necessary for maintaining a secure and optimized operational environment. These categories include essential functions such as risk management, information security, infrastructure management, and human access management. By evaluating CCAs, the organization gains a clear understanding of its overarching strengths and vulnerabilities in relation to both cybersecurity and digital transformation.

Within each CCA, CAs 238 are defined as more specific domains or functions that contribute to the overall capability of the category. CAs are focused on particular aspects of an organization's operations that require evaluation and improvement in order to enhance its cybersecurity maturity. For example, under the CCA of information security, there might be CAs such as encryption protocols, access control, and network security. Each CA is designed to assess how well the organization implements best practices within that domain, identifying areas where additional measures are necessary to achieve maturity.

The CAs further break down into PAs 238, which are the most granular level of assessment within the maturity model. Practice Areas represent specific actions, processes, or technologies that the organization must adopt to improve its maturity within a given Capability Area. For instance, within the CA of access control, a PA might focus on the implementation of multi-factor authentication (MFA), ensuring that users are required to provide multiple forms of identification before accessing critical systems. In the context of risk management, a PA might include regular risk assessments and the implementation of incident response plans to mitigate potential security breaches.

Each PA is linked to cybersecurity best practices, providing the organization with actionable steps to improve its maturity within that area. The PAs are often informed by industry standards and frameworks, such as the NIST Cybersecurity Framework, ISO/IEC 27001, and CMMI, ensuring that the practices reflect both international standards and the latest developments in cybersecurity.

As part of the analysis and scoping 236 process, each PA is evaluated based on how well the organization has implemented the recommended practices. This evaluation is preferably performed using a rating system that assigns scores or maturity levels to each PA, depending on the degree of compliance with the best practices. For example, an organization might receive a high score in the PA of encryption protocols if it consistently implements strong encryption algorithms across all its data transmissions and storage. Conversely, a low score in the PA of incident response planning might indicate that the organization lacks a formalized process for responding to cybersecurity incidents, necessitating further action.

The comprehensive assessment of CCAs, CAs, and PAs allows the organization to develop a clear roadmap for improving its cybersecurity maturity. By addressing deficiencies at the PA level, the organization can gradually enhance its maturity within each CA, ultimately improving its performance within the broader CCA. The maturity model's multi-tiered structure provides flexibility, allowing an organization to focus on specific areas of need while still maintaining a holistic view of an overall cybersecurity and digital transformation efforts.

The defined model areas 238, including CCAs, CAs, and PAs, are essential for building a scalable and adaptable maturity model that can be applied across various industries and organizational sizes. The defined model areas 238 provide a structured approach to evaluating and improving the organization's cybersecurity practices, enabling continuous improvement and long-term resilience against emerging threats and operational challenges.

The system also supports progress tracking through iterative evaluations of CCAs, CAs, and PAs. As the organization implements the best practices identified in the PAs, its maturity level within each CA and CCA is updated accordingly. This continuous feedback loop allows an organization to not only address current vulnerabilities but also stay ahead of future challenges, ensuring that cybersecurity and digital transformation initiatives remain aligned with industry standards and evolving risks.

By breaking down the assessment into CCA, CA, and PA, the defined model 238 provides a detailed and systematic framework that enables organizations to assess their current capabilities, identify gaps, and take targeted actions to improve their maturity in both cybersecurity and digital transformation. The structure ensures that organizations can approach cybersecurity and digital transformation in a methodical and measurable manner, driving improvement at every level of the organization.

Following the analysis, the system 200 identifies the maturity levels of the models, shown as identifying maturity levels 240 of the model 238. The maturity levels indicate the degree of regulation, optimization, and implementation of best practices within each capability area. The system proceeds to finalize the model development 242, ensuring that the model incorporates all essential elements of digital transformation and cybersecurity maturity.

After finalizing the model, an assessment methodology and tool 244 is used to evaluate the maturity levels of the organization. The methodology allows for the structured assessment of the organization's capability areas and practice areas, providing insights into areas that need improvement. The model is evaluated through case studies, represented as evaluate the model, case study 246, ensuring that the model is applicable in real-world scenarios and provides actionable recommendations.

Figure 2B:
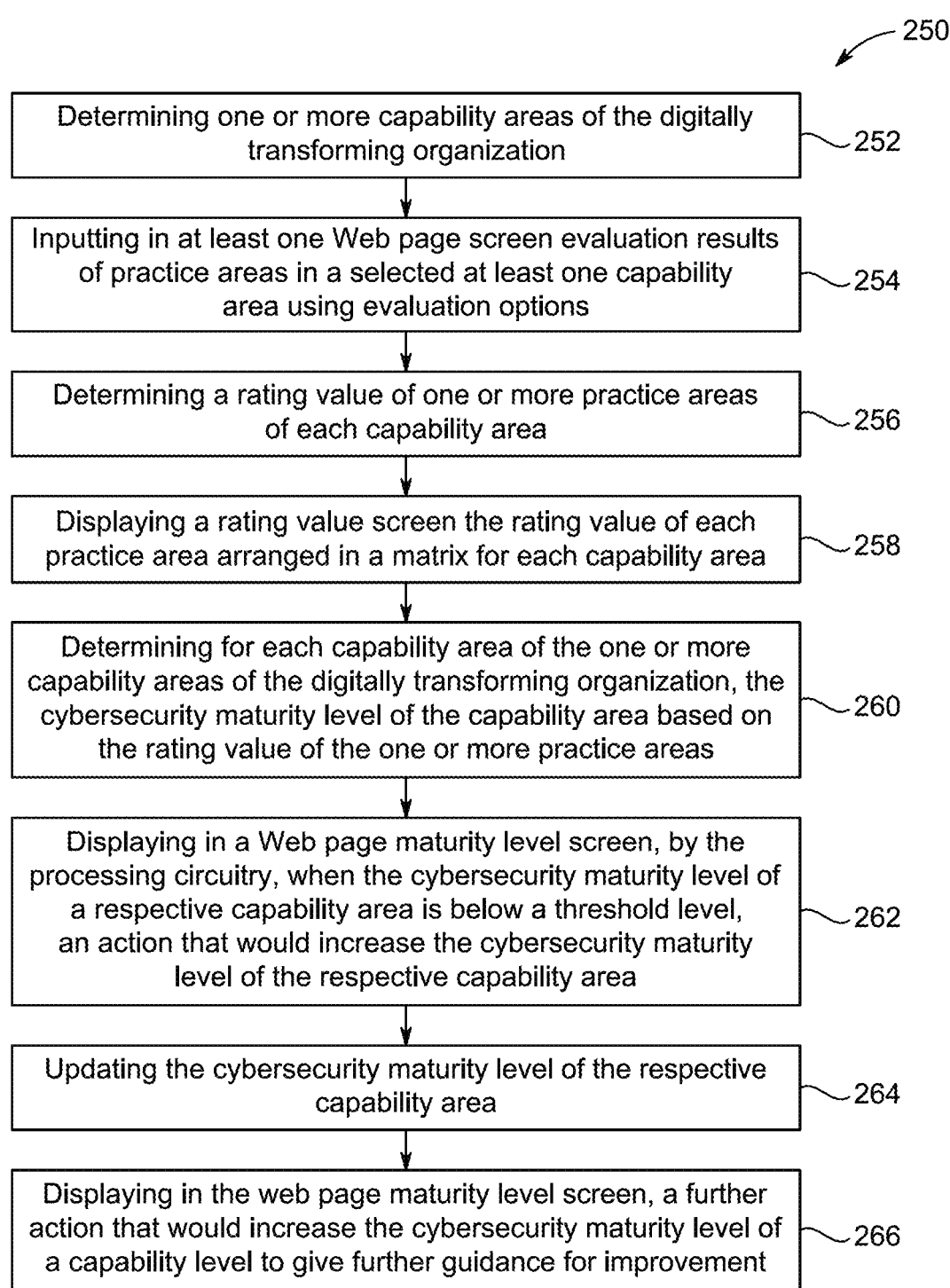
FIG. 2B illustrates a system for assessing and improving the cybersecurity maturity level of a digitally transforming organization, in accordance with an exemplary aspect of the disclosure.

FIG. 2B illustrates a system 250 for assessing and improving the cybersecurity maturity level of a digitally transforming organization. The system 250 initiates by determining one or more capability areas of the organization, as represented by block 252. A capability area is a group of related practice areas critical for maintaining secure operations. For instance, capability areas may include software engineering, running operations, risk analysis, information security, human access management, infrastructure, and governance.

The system involves inputting evaluation results for selected capability areas through a web-based interface, as depicted in block 254. The evaluation results may involve assessments of the digitally transforming organization's practice areas and their alignment with cybersecurity best practices. The processing circuitry of the system then determines a rating value for each practice area within the identified capability areas, as represented in block 256. This rating value is determined based on the evaluation results and the degree of compliance with cybersecurity best practices for each practice area.

The rating values are displayed as a matrix, represented by block 258. This matrix visually represents the current cybersecurity posture of the digitally transforming organization, where each practice area is rated and arranged within its corresponding capability area. The matrix provides immediate insight into the organization's cybersecurity maturity level across various domains.

Subsequently, the system determines the cybersecurity maturity level of each capability area based on the rating values of the corresponding practice areas, as illustrated in block 260. If the cybersecurity maturity level is determined to be below a predefined threshold, the system displays recommended actions for improving the maturity level, as shown in block 262. These actions may be in the form of security enhancements, such as implementing more stringent access control measures or adopting additional cybersecurity best practices.

Upon the completion of the recommended action, the system updates the cybersecurity maturity level of the respective capability area, as represented in block 264. This update reflects the improved cybersecurity posture resulting from the execution of the recommended actions. In an aspect, the system can display further actions that would improve the cybersecurity maturity level of the respective capability area. This ensures ongoing guidance for the digitally transforming organization to achieve further improvements and maintain robust cybersecurity measures. The ongoing guidance is shown in block 266, which facilitates continuous advancement in cybersecurity maturity.

Additionally, the system is designed to determine a target cybersecurity maturity level for each capability area of the digitally transforming organization. Upon comparison between the target and determined maturity levels, the system identifies candidate capability areas that need improvement. For the candidate capability areas, the system pinpoints one or more practice areas with the lowest rating values, aiding in focused remediation efforts.

The system is further configured to assign rating values to each practice area based on a range of predetermined values. The rating values are determined based on evidence related to each practice area, which may be classified as direct evidence, indirect evidence, or weakening evidence. Weakening evidence is evidence that lowers rating values. The evidence can be further categorized with positive or negative values, and the rating value is assigned accordingly based on a combination of such positive or negative assessments.

Moreover, the system supports the use of various cybersecurity maturity levels, which may include stages such as initial, management support, improved, quantitative, and continuous improvement. The specific cybersecurity maturity level for each capability area is determined by analyzing the degree to which cybersecurity best practices have been implemented in each respective practice area.

Detailed information regarding each practice area and the respective actions required to improve the cybersecurity maturity level is displayed through a web-based interface. This interface facilitates real-time evaluation, reporting, and guidance, ensuring that the organization's cybersecurity posture is continuously assessed and improved. For those capability areas that do not meet their target cybersecurity maturity levels, the system provides additional recommendations for achieving further improvements, ensuring that the organization can maintain a strong and evolving cybersecurity framework.

Figure 3:
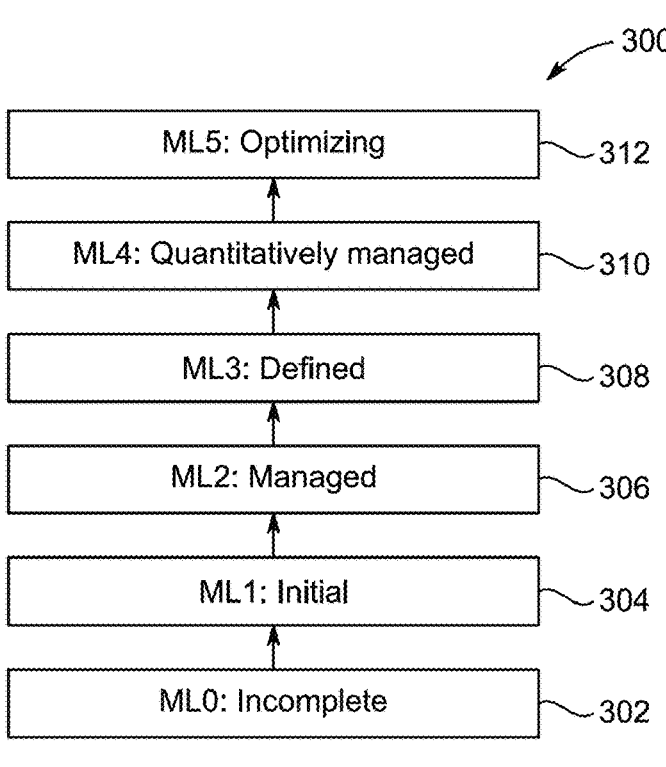
FIG. 3 illustrates a maturity level system 300 based on the Capability Maturity Model Integration (CMMI) framework, in accordance with an exemplary aspect of the disclosure.

FIG. 3 illustrates a maturity level system 300 based on the Capability Maturity Model Integration (CMMI) framework, used to assess and improve an organization's process maturity and capability. The system 300 is structured into six distinct maturity levels, referred to as ML0 through ML5, each representing incremental improvements in process control, effectiveness, and optimization.

At the base of system 300 is ML0: Incomplete 302, where the processes are either non-existent or fail to achieve their intended outcomes. At this stage, there is little or no formalized process in place, and outcomes are unpredictable. Processes at this level may be reactive, addressing problems as they arise but lacking any structured approach to prevent them from reoccurring. The absence of proper documentation, repeatability, or organizational learning characterizes this stage.

Above ML0, the next level is ML1: Initial 304. At this stage, the organization has begun to establish processes, but they remain chaotic and ad hoc. Success largely depends on individual effort rather than structured systems. Processes may be completed, but there is no formal process management or systematic follow-through. There is little predictability in terms of outcomes, and the organization may experience inconsistency in process performance.

The next maturity level is ML2: Managed 306. At this stage, basic processes are in place, documented, and followed. Processes are planned and executed in accordance with established policies. Management ensures that these processes are adhered to when projects are undertaken, leading to more predictable outcomes. However, these processes are not standardized across the organization; they are only applied within certain departments or for specific projects. While improvements in repeatability are seen, there is still a lack of overarching consistency across the entire organization.

ML3: Defined 308 represents a significant improvement, where processes are well-documented and standardized across the organization. These standardized processes are adapted from organizational process assets, ensuring that each department follows a uniform approach to process management. At this level, the organization has developed a comprehensive system for continuous process improvement. The processes are tailored to meet the needs of individual projects but are aligned with a broader organizational framework. Organizational learning becomes a key focus, with processes designed to capture lessons learned and integrate them into future operations.

At ML4: Quantitatively Managed 310, processes are not only standardized but also measured and controlled. Quantitative techniques are used to manage process performance, with defined metrics providing insight into process efficiency and effectiveness. Statistical techniques may be employed to identify variations in process performance, allowing for proactive adjustments to be made. The organization uses data to predict outcomes and improve decision-making, ensuring that processes consistently produce desired results.

At the top of the maturity level system 300 is ML5: Optimizing 312. At this stage, the organization is focused on continuous process improvement and innovation. Processes are systematically evaluated and refined based on feedback and data analysis. The organization actively seeks new technologies, methods, and practices to enhance process efficiency and adapt to changing business environments. Continuous improvement becomes ingrained in the organizational culture, ensuring that processes evolve to meet future challenges.

Figure 4:
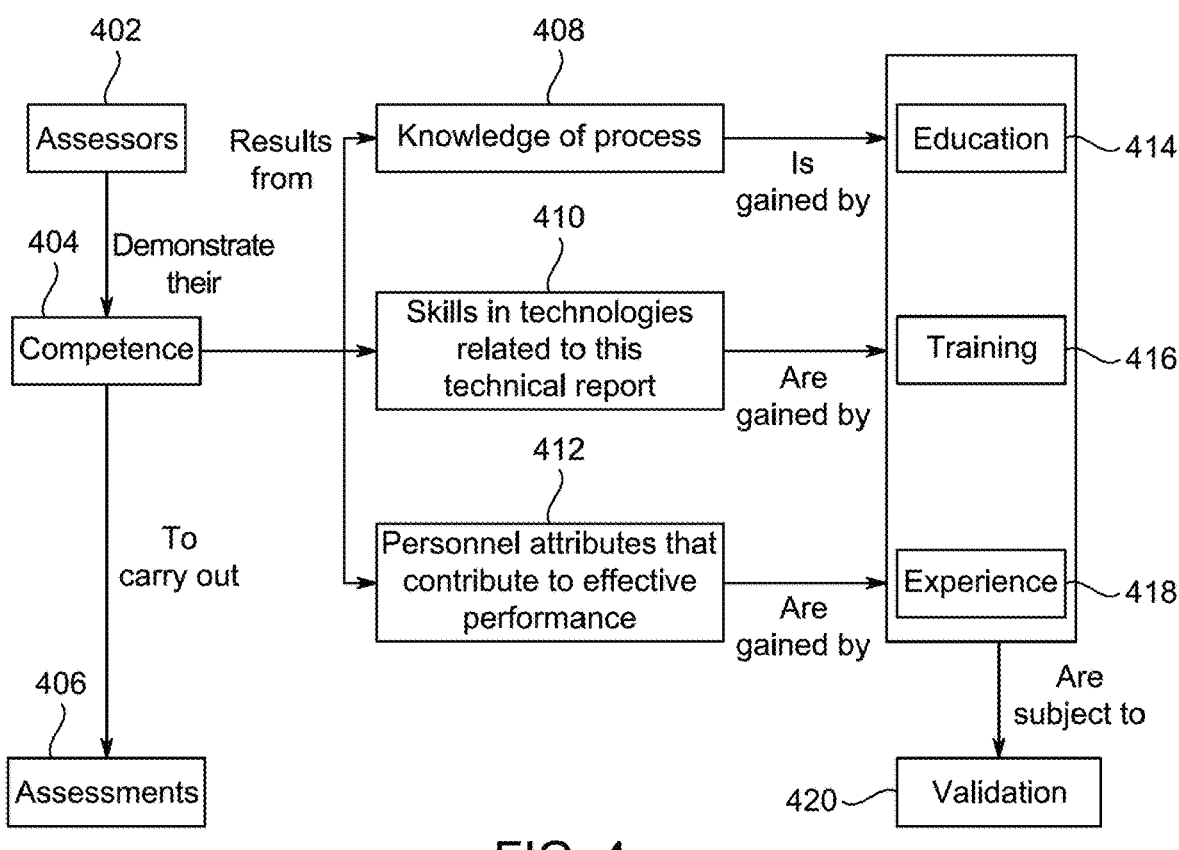
FIG. 4 illustrates a framework, based on a certain standard, in accordance with an exemplary aspect of the disclosure.

FIG. 4 illustrates a framework 400, based on ISO/SEC 33001, which outlines the relationships between key entities involved in process assessments. The framework 400 defines the competence of assessors and the key factors that contribute to their ability to perform assessments accurately and effectively. The framework is built around the interconnection between education, training, experience, and validation, as they relate to the competence of the assessors.

At the core of the framework 400 are assessors 402, who are responsible for conducting formal assessments 406 within the context of process evaluations. The assessors 402 must demonstrate their competence 404, which is defined by their ability to apply knowledge, skills, and personal attributes to their work. Competence 404 is critical to ensuring that the assessments are thorough, reliable, and aligned with established standards.

The competence 404 of assessors is developed through three main channels: knowledge of the process 408, skills in technologies related to the technical report 410, and personnel attributes that contribute to effective performance 412. These components define the foundational aspects of assessor competence.

Knowledge of the process 408 refers to the understanding assessors must have of the assessment process and the standards they are evaluating against, such as ISO/SEC 33001. This knowledge is typically gained through formal education 414, which provides the theoretical basis for the assessors' work. Education 414 ensures that assessors understand the processes they are assessing and the expected outcomes, as defined by relevant standards and protocols. The evaluation rating scale is between 0% and 100%, and these will be categorized as "not achieved," "partially achieved," "largely achieved," and "fully achieved," as shown in Table 2.

TABLE 2

| ISO/SEC 33001 process attribute rating scale | | |
|---|---|---|
| Rating Option | Value | Meaning |
| Not achieved (N) | 0-15% | "There is little or no evidence of achievement of the defined attribute in the assessed process." |
| Partially achieved (P) | 16-50% | "There is evidence of a sound, systematic approach to and achievement of the defined attribute in the assessed process, but some achievement may be unpredictable." |
| Largely achieved (L) | 51-85% | "There is evidence of a sound, systematic approach to and significant achievement of the defined attribute, but process performance may vary in some areas or work units." |
| Fully achieved (F) | 86-100% | "There is evidence of a complete and systematic approach to and full achievement of the defined attribute in the assessed process." |

Skills in technologies related to this technical report 410 represent the practical, hands-on abilities that assessors must have to effectively apply their knowledge during assessments. These skills are gained through training 416, which focuses on equipping assessors with the technical expertise needed to evaluate processes, identify areas for improvement, and ensure compliance with established frameworks. Training 416 includes familiarity with the specific tools, methods, and technologies used in the processes being assessed.

Personnel attributes that contribute to effective performance 412 refer to the individual characteristics that enhance an assessor's ability to perform assessments, such as communication skills, critical thinking, and leadership abilities. These attributes are typically developed through experience 418, as assessors gain practical exposure to various assessment scenarios. Experience 418 ensures that assessors can apply their knowledge and skills effectively in real-world settings, adapting to the specific context of each assessment.

The competence 404 of assessors is subject to validation 420, which ensures that they meet the necessary standards for conducting assessments. Validation 420 involves formal evaluation of the assessors' skills, knowledge, and experience to verify that they can carry out their responsibilities in accordance with the relevant standards and best practices.

Figure 5:
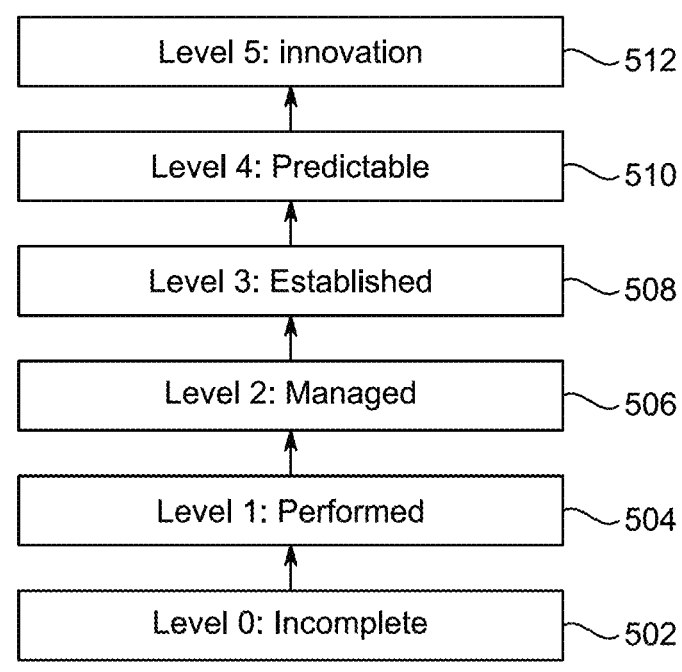
FIG. 5 illustrates a capability level system, which is defined according to the certain standard, in accordance with an exemplary aspect of the disclosure.

FIG. 5 illustrates a capability level system 500, which is defined according to ISO/IEC 33001. The system 500 represents six capability levels, ranging from Level 0: Incomplete 502 to Level 5: Innovation 512, and provides a structured approach for assessing the maturity of an organization's software processes.

At the base of the system 500 is Level 0: Incomplete 502, where processes are not implemented or fail to achieve their objectives. At this level, there is little or no control over how processes are performed, leading to inconsistent and unpredictable outcomes.

The next stage is Level 1: Performed 504, where basic processes are in place, but they are not standardized or repeatable. The organization is capable of performing essential tasks, but there is no guarantee that these tasks will be performed consistently over time. At this level, processes are reactive, and success depends on individual effort rather than a formalized process.

At Level 2: Managed 506, processes are implemented with basic management oversight. The organization has established policies to ensure that processes are followed consistently, leading to more predictable outcomes. However, while processes are managed, they are still not fully integrated across all areas of the organization.

Level 3: Established 508 indicates that processes are standardized across the organization and consistently followed by all departments and teams. The organization has developed a well-documented system of processes, ensuring that outcomes are predictable and repeatable. At this level, there is an emphasis on maintaining consistency and efficiency in how processes are executed.

Level 4: Predictable 510 refers to the stage where processes are quantitatively managed. The organization uses metrics to monitor and control process performance, allowing it to predict outcomes and make data-driven decisions. Statistical techniques are used to identify variations in process performance, enabling proactive adjustments to maintain consistent results.

At the top of the capability level system 500 is Level 5: Innovation 512. At this stage, the organization is focused on continuous improvement and innovation. Processes are regularly evaluated and refined to enhance efficiency and adapt to changing business needs. The organization actively seeks new technologies and methods to stay ahead of emerging trends, ensuring that its processes remain competitive and capable of supporting long-term growth.

FIG. 3, FIG. 4, and FIG. 5 relate to the literature, frameworks, and standards for cybersecurity maturity models and digital transformation. The literature describes the contributions of prominent organizations, such as the National Institute of Standards and Technology (NIST), the Cloud Security Alliance (CSA), and the MITRE Corporation, in framing the cybersecurity standards. Additionally, the literature compares existing cybersecurity maturity models through both generic and specialized lenses, having their characteristics, strengths, and areas for improvement. Key maturity models are analyzed in terms of their effectiveness in specific domains such as healthcare, critical infrastructure, and cloud computing. The review further explores the limitations of prior studies, identifying gaps in the existing literature, particularly the lack of comprehensive reviews that incorporate both formal and grey literature. The review culminates in the identification of a critical gap, specifically the absence of a maturity model that measures cybersecurity in the context of digital transformation. To address the gap, some embodiments of the present disclosure describe the development of a Digital Transformation Cybersecurity Maturity Model (DTCMM), aimed at providing organizations with a robust framework for assessing their cybersecurity maturity in digitally-enabled environments.

Figure 6:
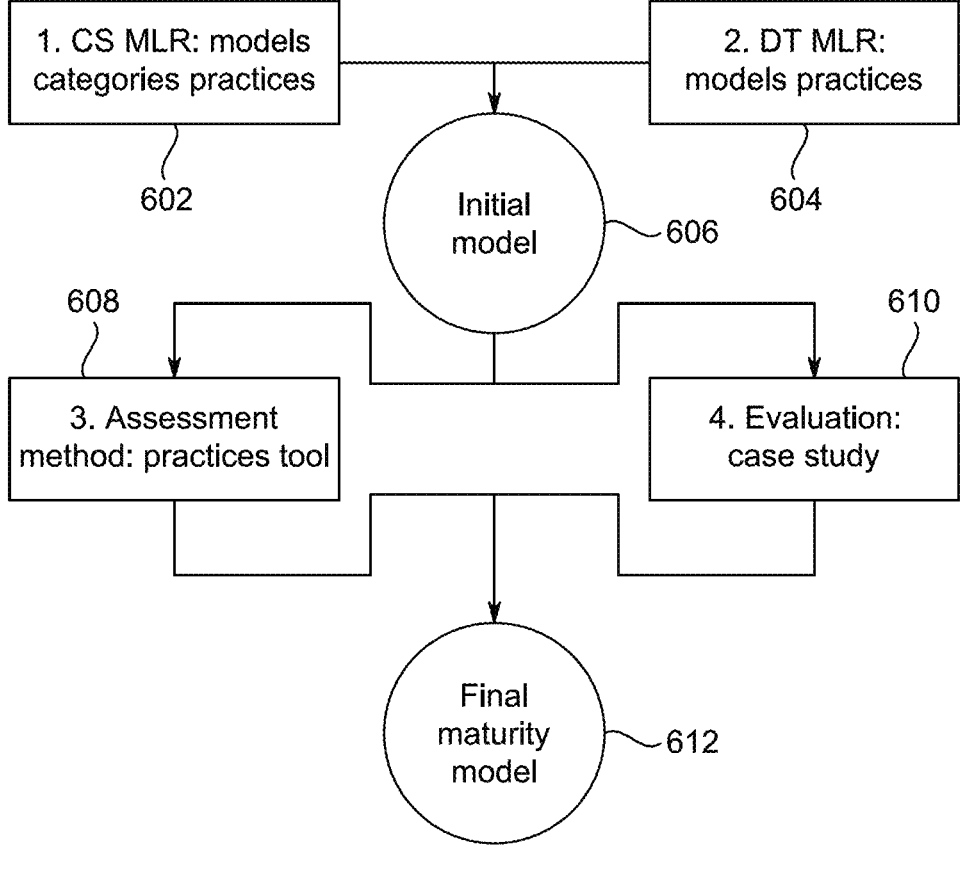
FIG. 6 illustrates a research methodology frame for developing a cybersecurity maturity model for digital transformation, in accordance with an exemplary aspect of the disclosure.

FIG. 6 illustrates a system 600 for developing a cybersecurity maturity model for digital transformation. The system 600 comprises multiple stages that are structured to ensure the systematic development of the maturity model. The stages include conducting multivocal literature reviews (MLRs) to identify relevant models and practices, creating an initial model, developing an assessment methodology, and conducting case studies to evaluate the model's effectiveness.

The first stage involves conducting a cybersecurity MLR 602 to identify existing models, categories, and practices relevant to cybersecurity. This stage is aimed at finding security-related models and best practices, which form the foundation for the initial model. The cybersecurity MLR 602 searches for models and practices published in both formal and grey literature to ensure comprehensive coverage of existing cybersecurity maturity models.

The second stage involves conducting a digital transformation MLR 604, which focuses on identifying digital transformation models and practices. The digital transformation MLR 604 builds on the cybersecurity findings and integrates models and practices related to digital transformation. The output of both the cybersecurity MLR 602 and the digital transformation MLR 604 is combined to form the Initial Model 606, which serves as the first version of the cybersecurity and digital transformation maturity model.

Following the creation of the initial model 606, the third stage involves performing an Assessment Methodology 608, including the specific practices and tools necessary to evaluate an organization's cybersecurity and digital transformation maturity. The assessment methodology 608 is designed to be user-friendly and enables organizations to perform self-assessments using a structured evaluation tool. The assessment methodology 608 is based on best practices identified in the previous MLRs and is tailored to ensure it meets the requirements of cybersecurity in a digitally transforming environment.

The final stage includes the Evaluation 610 of the model through one or more case studies. The case study evaluation 610 aims to validate the initial model 606 by applying it to real-world scenarios. This step helps in refining the model based on practical use cases, ensuring that the maturity model is adaptable and effective for organizations of various sizes and industries.

Once the case studies have been completed, the result is the Final Maturity Model 612, which integrates the findings from the initial model 606, the assessment methodology 608, and the case study evaluations 610. The final maturity model 612 provides the organization with a robust framework for assessing and improving the cybersecurity maturity within the context of digital transformation.

The methodology describes the process for developing a cybersecurity maturity model within the context of digital transformation. To achieve the objectives, the methodology is divided into four phases, as depicted in FIG. 6. The first phase involves conducting a multivocal literature review (MLR) to identify relevant security models and best practices in the field of cybersecurity. The second phase involves conducting an MLR for identifying digital transformation maturity models and best practices. The third phase involves the development of the maturity model, including its assessment methodology. The final phase involves conducting case studies to evaluate the effectiveness of the maturity model.

The MLR process is aligned with systematic literature review (SLR) guidelines, but the MLR places a specific focus on the identification of cybersecurity and digital transformation maturity models and their associated best practices. The systematic approach used for the selection and assessment of relevant studies is further elaborated in subsequent sections.

Considering both formal academic literature and industry grey literature, the questions addressed by the MLRs are structured to identify the available cybersecurity maturity models, the security categories utilized by these models, and the cybersecurity best practices. Similarly, in the domain of digital transformation, the research questions focus on identifying the available digital transformation maturity models and their best practices.

The search process begins with the identification of the search methodology, followed by the derivation of relevant search terms and the selection of research resources. The search was conducted using automated techniques to identify as many relevant studies as possible, focusing on maturity models and best practices within the fields of cybersecurity and digital transformation. Backward snowballing was also applied by reviewing the references of selected studies with a significant number of citations.

The search terms were constructed by breaking down the research questions into population, intervention, outcome, and context. Boolean operators "AND" and "OR" were used to formulate the search strings. The population focused on studies related to cybersecurity or digital transformation maturity models, security categories, and best practices. The intervention included maturity models and best practices developed for cybersecurity or digital transformation in both formal and grey literature. The outcome was the identification of lists of maturity models, best practices, and security categories. The context focused on maturity models and best practices within the relevant fields of cybersecurity or digital transformation.

The search for primary studies was conducted using various databases, including IEEE, ACM, Springer, Elsevier, Scopus, Web of Science, and Google Scholar. To minimize irrelevant results, the search was limited to titles and abstracts. The search process involved running the search string on the selected databases, adjusting the string as necessary for each database, and exporting the search results into formats suitable for further analysis. The selection process involved applying inclusion and exclusion criteria, followed by a quality assessment based on predefined criteria.

The source selection process followed a systematic approach to filter the search results and ensure that only relevant studies were included in the MLRs. In the initial stage, inclusion and exclusion criteria were applied to the titles and abstracts of the search results. In the subsequent stage, sources that met the inclusion criteria and passed the quality assessment were selected for further review. Finally, references of the selected studies were examined using backward snowballing to identify any additional relevant sources.

Inclusion criteria focused on sources that propose cybersecurity maturity models, identify best practices and recommendations in cybersecurity, information security, or digital transformation, categorize or classify security issues, risks, or assets, and that are published in reputable journals, conferences, or by trusted organizations. The selected sources were required to have been published starting from the introduction of the first maturity model in 1986.

The exclusion criteria involved filtering out abstracts, papers still in progress, sources unrelated to cybersecurity or digital transformation (such as those focused on teaching, gaming, or aviation), duplicate studies, non-English publications, and older versions of studies with the same title and authors.

The quality assessment process ensured that both formal and grey literature sources were valid and unbiased. Formal literature was assessed based on clearly stated objectives, methodology, contributions, and limitations. Grey literature was evaluated based on criteria customized for cybersecurity and digital transformation, including the reputation of the publisher, clarity of the publication's goals, clarity of the methodology, and the level of detail in the description of process areas and practices. Studies were scored based on these criteria, and only those with a quality score exceeding 50% were included in the review.

The maturity model combines elements of cybersecurity and digital transformation and is structured based on the framework of CMMI 2.0. The specific components of the model, such as maturity levels, practice areas, and domain categorizations, are derived from the results of the MLRs and the identified best practices.

A user-friendly assessment tool is also developed in parallel with the maturity model. This tool provides a structured methodology for organizations to conduct self-assessments, evaluating their maturity in terms of cybersecurity and digital transformation. After the model has been developed, it can be evaluated through case studies to provide insights into its applicability in real-world scenarios and to validate the generalization of its findings across different types of organizations.

Figure 7:
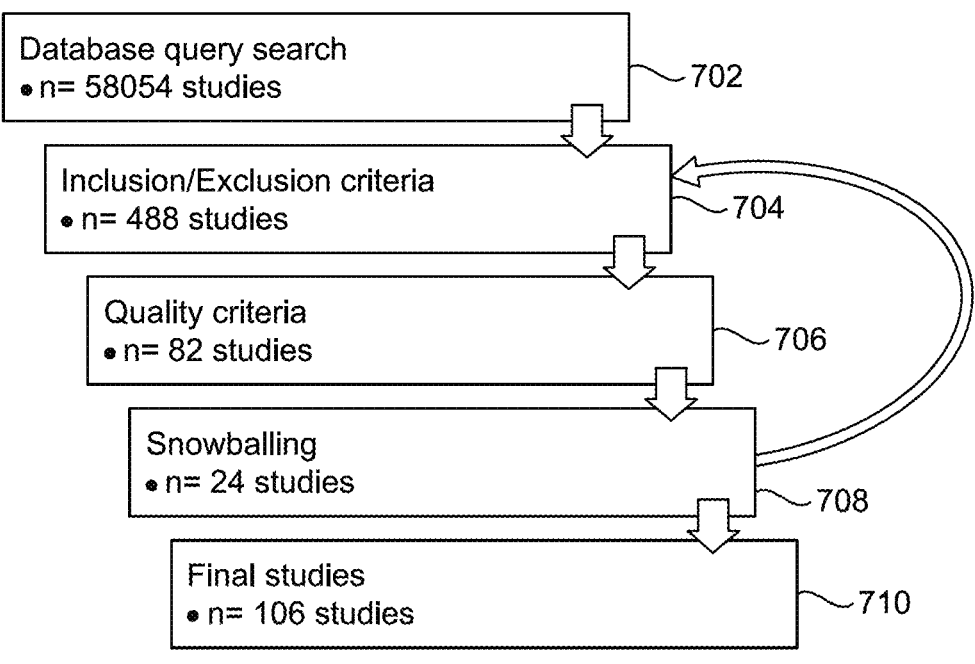
FIG. 7 illustrates a selection process for conducting the MLR of cybersecurity maturity models in accordance with an exemplary aspect of the disclosure.

FIG. 7 illustrates a selection process 700 for conducting the multivocal literature review (MLR) of cybersecurity maturity models. The process begins with a database query search 702, which results in the retrieval of a total of 58054 studies. The retrieved studies are then subjected to inclusion and exclusion criteria 704, which filter the studies down to 488 relevant studies. The next phase applies quality criteria 706 to further refine the selection, resulting in 82 studies that meet the quality standards for inclusion.

Following this, a snowballing step 708 is conducted, wherein references from selected papers are examined. This process adds an additional 24 studies to the overall selection. As a result, the final set of studies 710 includes a total of 106 studies that will be used for further analysis in the MLR.

The data extraction process for the identified studies is further detailed in Table 6, which outlines the items used to record relevant information about the studies. The process includes extracting metadata such as the study's title, authors, and source, as well as specific details relevant to the research questions. The cybersecurity maturity models extracted from the identified studies are listed in Table 8, while the cybersecurity categories and best practices are extracted and presented in Table 9 and Table 10, respectively.

In one aspect, a multivocal literature review (MLR) is conducted as per the methodology disclosed earlier. The MLR aims to systematically identify relevant cybersecurity maturity models, categories, and best practices from both formal and grey literature sources. The principal terms used for the literature search are derived from research questions and relevant synonyms, as reflected in Table 3. The keywords utilized for this process include terms such as cybersecurity, maturity model, categories, and best practices. The synonyms for each of these terms are also considered to ensure comprehensive coverage of the literature. A refined search string can be developed to optimize the search process across different databases. For example, the search string used was structured as: (cybersecur* OR "cyber secur*" OR secur* OR protect*) AND (maturity OR "maturity model" OR framework OR guideline OR model OR benchmark OR readiness) OR (categor* OR class* OR group* OR type*) OR (best AND (practice* OR approach* OR technique* OR method*)). Specific customized search strings were applied to databases as per their respective search capabilities for appropriate use of Boolean operators and wildcard functions.

TABLE 3

| Cybersecurity MLR Keywords and Synonyms | |
| --- | --- |
| Keyword | Synonyms |
| cybersecurity | (cyber secur* OR secur* OR protect |
| maturity model | (framework OR guideline OR model OR benchmark OR |
| categories | (class* OR group* OR type*) |
| best practices | best (approach* OR technique* OR method*) |

The search process can be initiated with 58054 initial studies. Application of the inclusion and exclusion criteria at the title and abstract level, with some evaluations conducted on the content level, result in a total of 488 studies remaining. Following this, the quality assessment criteria is applied, reducing the number of relevant studies to 82. Table 4 presents the number of studies sourced from each database at different phases of the selection process. An additional 24 studies can be included through the process of backward snowballing, whereby references from selected studies are reviewed to identify further relevant literature. The final number of studies included for analysis is 106, as depicted in FIG. 7. Table 5 provides the breakdown of the final selected studies according to each research question.

27

TABLE 4

Data Sources and the Number of Studies in Each Iteration

| Source Category | Name | URL | Initial | After phase 1 | After phase 2 |
|---|---|---|---|---|---|
| | | | | Number of Studies | |
| Publisher | IEEE Xplore | ieeexplore.ieee.org | 593 | 94 | 21 |
| | ACM Digital Library | dl.acm.org | 1445 | 45 | 7 |
| | SpringerLink | link.springer.com | 26072 | 99 | 15 |
| | Elsevier/ ScienceDirect | elsevier.com | 19104 | 105 | 17 |
| Search Engine | Scopus | scopus.com | 9282 | 86 | 11 |
| | Web of Science | webofknowledge.com | 561 | 43 | 10 |
| | Google Scholar | scholar.google.com | 997 | 16 | 1 |
| Total | | | 58054 | 488 | 82 |

TABLE 5

Number of Final Selected Studies Per Each Research Question

| Related to RQ | Number of Studies |
|---|---|
| RQ1 | 43 |
| RQ2 | 30 |
| RQ3 | 48 |

Data extraction can be performed by exporting data to a Microsoft Excel sheet where possible, while other data were manually entered into the extraction form. A standardized data extraction form, as illustrated in Table 6, is used to ensure consistent collection of information across the studies. This form captures various details such as study reference information, authors, abstract, methodology, and specific relevance to the research questions on cybersecurity maturity models, categories, and best practices.

TABLE 6

Sources Data Extraction Form

| # | Item Name | Description/Examples/Notes |
|---|---|---|
| 1 | ID | |
| 2 | Filename | |
| 3 | Source Reference | e.g., DOI or URL |
| 4 | Source Name | Publisher or Organization name |
| 5 | Year | |
| 6 | Type | journal/conference/thesis/standard/report |
| 7 | Authors | |
| 8 | Title | |
| 9 | Abstract | |
| 10 | Methodology | |
| 11 | The proposed Maturity Model Name | |
| 12 | Relevant to RQ1 | What are the available cybersecurity maturity models in the literature? |
| 13 | Relevant to RQ2 | What are the security categories that are used in the maturity models? |
| 14 | Relevant to RQ3 | What are the cybersecurity best practices? |
| 15 | Phase1: Included/Excluded | |
| 16 | Phase2: Included/Excluded | |

In relation to cybersecurity maturity models, the MLR implements an extraction framework as shown in Table 7. The MLR framework classifies models into general, maturity, and implementation categories. The general properties include model name, origin, purpose, and audience, providing insight into the overall agenda and application of the model. Maturity properties cover definitions, concepts, levels, standards, and dimensions associated with the model. Implementation and technical properties address aspects such as whether the model supports self-assessment, its clarity of implementation process, and its level of customization. Validation questions assess the extent to which the model is validated in practical scenarios, while evaluation questions provided insights into how the model is assessed in real-world applications. A total of 43 cybersecurity maturity models may be identified and extracted, with details provided in Table 8.

TABLE 7

Maturity Model Data Extraction Framework

| Category | Model Property | Description/Question |
|---|---|---|
| General | Name | descriptive texts |
| | Origin | the entity or the organization that developed the model |
| | Purpose Category | descriptive, prescriptive, comparative, or a combination |
| | Purpose or Goal | the actual announced goal that the model was developed in the first place |
| | Developed For | the entity or organization where the model was developed for |
| | Sources | where the model can be reached for usage |
| | Strengths | what makes this model a better option than others |
| | Category Specialization | generic or specialized if not generic, what is the model focus |
| | Domain | what type of organizations the model was applied to |
| | Audience | what the model is targeting when implemented |
| Maturity | First Release | the year when is was first announced to be applicable |
| | Definition | the maturity meaning for the model |
| | Concept | whether the maturity is process-oriented, user-oriented, or another orientation |
| | Levels | liner scales include the number, name, and description of each level |
| | Standards | standards that the model aligned and compliant with |
| | Dimensions | groups of common concepts of organizational processes, also known as maturity areas |
| Implementation | Implementation or assessment method | Does the model support self-assessment? (Y/N) To what extent does the implementation process explain clearly? (H/M/L/None) What is the level of customization or adaptation? (H/M/L/NA) Are the stakeholders identified? (Y/N) |
| | Validation Questions | Which type or domain of organization was the model validated on? (text) Which size of organizations was the model validated on? (Small/Medium/Large) |
| | Evaluation Questions | How was the model evaluated? (text) What are the evaluator's responsibilities? (text) What is the size of the evaluation team? (number) |

TABLE 8

Extracted Cybersecurity Maturity Models

| # | Model Name | Abb. | Specification or Domain | Year | Levels | Ref |
|---|---|---|---|---|---|---|
| 1 | Cybersecurity Maturity Model Certification | CMMC | Validation for Government | 2020 | 5 | [53] |
| 2 | Systems Security Engineering Capability Maturity Model | SSE-CMM | Generic | 1996 | 5 | [55] |
| 3 | Cybersecurity Capability Maturity Model | C2M2 | Generic | 2014 | 4 | [56] |
| 4 | Community Cyber Security Maturity Model | CCSMM | Data from Government Officials | 2006 | 5 | [57] |
| 5 | Cybersecurity Workforce Framework—Capability Maturity Model | NICE-CWF-CMM | Governance | 2014 | 3 | [58] |
| 6 | Information Security Management Maturity Model | ISM3 | Generic | 2009 | 5 | [59] |
| 7 | Information Security Maturity Model | ISM2 by NIST-PRISMA | Generic | 2007 | 5 | [6] |
| 8 | NIST Cybersecurity Framework (CSF) | NIST-CSF | Governance | 2018 | 4 | [60] |
| 9 | Information Security Focus Area Maturity Model | ISFAM | Generic | 2014 | 12 | [45] |
| 10 | The Cybersecurity Focus Area Maturity Model | CYSFAM | Cloud security | 2021 | 12 | [62] |
| 11 | Cloud Security Capability Maturity Model | CSCMM | Financial | 2017 | 4 | [18] |
| 12 | Federal Financial Institute of Examination Council (FFIEC) Cybersecurity Assessment Tool | FFIEC | African union Convention | 2017 | 5 | [63] |
| 13 | African union maturity model for cybersecurity | AUMMCS | Small and medium enterprises | 2015 | 4 | [64] |
| 14 | Maturity Model for Information Systems Security Management in SMEs | MMISS-SME | Immaturity | 2007 | 3 | [65] |
| 15 | An ISMS (Im)-Maturity capability model | | Network security | 2008 | 9 | [66] |
| 16 | Network security policy assessment Methodology based on security capability | | Risk management | 2008 | 5 | [67] |
| 17 | A model to assess the maturity level of the risk management process in information security | MMGRseg | Generic | 2009 | 5 | [68] |
| 18 | Security Engineering Capability Maturity Model | SECMM | e-Government | 2010 | 5 | [69] |
| 19 | Information Security Maturity Model for Secure e-Government Services | eGovISMM | SOA | 2011 | 5 | [70] |
| 20 | Service oriented architecture Security Maturity Model | SOASMM | Generic | 2012 | 5 | [71] |
| 21 | Cyclical evaluation model for information security | | Generic | 2014 | 5 | [72] |
| 22 | Cybersecurity Capability Maturity Model | CM$^2$ | Governance | 2014 | 6 | [73] |
| 23 | Cyber security governance maturity model | CSGMM | National security preparedness | 2015 | 4 | [74] |
| 24 | Vulnerability-driven cyber security maturity model for measuring national critical infrastructure protection preparedness | | Payment card industry | 2016 | NA | [75] |
| 25 | Information security maturity model a best practice driven approach to PCI DSS compliance | ISMM-PCI | Security metrics evaluation | 2016 | 4 | [76] |
| 26 | Security metrics maturity model for operational security | SM-Mi | Cyber Counterintelligence | 2016 | 3 | [77] |
| 27 | Cyber Counter Intelligence Maturity countries | CCIMM | Privacy in Financial | 2017 | 4 | [78] |

TABLE 8-continued

Extracted Cybersecurity Maturity Models

| # | Model Name | Abb. | Specification or Domain | Year | Levels | Ref |
|---|---|---|---|---|---|---|
| 28 | Personal data protection maturity model for the micro financial sector in Peru | PDPM | Generic | 2018 | 5 | [79] |
| 29 | Citigroup Information Security Evaluation Model | Citi-ISEM | NIS Directive Compliant | 2000 | 5 | [80] |
| 30 | Cybersecurity Maturity Assessment Framework | CMAF | Software Development | 2020 | 6 | [81] |
| 31 | The Secure Design and Development Cybersecurity Capability Maturity Model | SD2-C2M2 | Web Applications in Healthcare | 2019 | 4 | [82] |
| 32 | Security Maturity Model of Web Applications | | Software Development in IoT | 2019 | 5 | [31] |
| 33 | Secure IOT-Requirement Implementation Maturity Model | SIOT-RIMM | Privacy in Healthcare | 2020 | 5 | [83] |
| 34 | Cybersecurity and Privacy Capabilities Model for Data Management Against Cyber-Attacks in the Health Sector | | National | 2021 | 5 | [84] |
| 35 | National CyberSecurity Maturity Model | NCSecMM | Governance | 2009 | 5 | [85] |
| 36 | Capacity maturity framework for cybersecurity governance | CYBERGov | Clouds in Healthcare | 2021 | 5 | [86] |
| 37 | Maturity Model for Health-care Cloud Security | M2HCS | Gereric | 2019 | 4 | [87] |
| 38 | Cyber Security Assessing Maturity for Organization | CSAMO | Generic | 2019 | 5 | [88] |
| 39 | A Dynamic Capability Maturity Model for Improving Cyber Security | | Information Sharing | 2013 | 4 | [89] |
| 40 | Information Sharing Maturity Model | | Generic | 2017 | 5 | [90] |
| 41 | A Cybersecurity Assessment Model for Small and Medium-Sized Enterprises | | Small and Medium-Sized Enterprises | 2021 | 5 | [91] |
| 42 | Information Security Maturity Model | ISMM | Generic | 2011 | 5 | [92] |
| 43 | Information Security Management Systems—Maturity Model Based on ISO/IEC 27001 | ISMS-ISO | Generic | 2018 | 5 | [93] |

[53] "Cybersecurity Maturity Model Certification (CMMC)," 2020. https://www.acq.osd.mil/cmmc/(accessed Nov. 28, 2021).

[55] K. Ferraiolo, "The Systems Security Engineering Capability Maturity Model."

[56] Kristina Dorville, "Cybersecurity Capability Maturity Model-White Paper," 2014. Accessed: Nov. 30, 2021. [Online]. Available: https://niccs.cisa.gov/sites/default/files/Capability % 20Maturity %20Model %20White %2Paper.pdf

[57] N. Sjelin and G. White, "The Community Cyber Security Maturity Model," *Cyber-Physical Security*, pp. 161-183, 2017, doi: 10.1007/978-3-319-32824-9_8.

[58] W. Newhouse, S. Keith, . . . . B. S.-N. special, and undefined 2017, "National initiative for cybersecurity education (NICE) cybersecurity workforce framework," *scadahacker.com*, doi: 10.6028/NIST.SP.800-181.

[6] P. Bowen and R. Kissel, *Program review for information security management assistance (PRISMA)*. 2007. doi: 10.6028/NIST.IR.7358.

[60] M. B.-N. I. of S. and and undefined 2018, "Framework for improving critical infrastructure cybersecurity," *isa-waterwastewater.com*, Accessed: Nov. 29, 2021. [Online]. Available: http://isawaterwastewater.com/wp-content/uploads/2018/08/WWAC-2018-NIST-Barrett_final.pdf

[45] "Making Security Measurable MSM Archive." http://makingsecuritymeasurable.mitre.org/directory/archive/ (accessed Apr. 15, 2021).

[62] B. Yigit Ozkan, S. van Lingen, and M. Spruit, "The Cybersecurity Focus Area Maturity (CYSFAM) Model," *Journal of Cybersecurity and Privacy*, vol. 1, no. 1, pp. 119-139, 2021, doi: 10.3390/jcp1010007.

[63] "Federal Financial Institutions Examination Council (FFIEC)," 2017. https://www.ffiec.gov/cyberassessment-tool.htm (accessed Nov. 29, 2021).

[64] S. von S.-2015 S. and I. Conference and undefined 2015, "A maturity model for part of the African Union Convention on Cyber Security," *ieeexplore.ieee.org*, Accessed: Nov. 29, 2021. [Online]. Available: https://ieeexplore.ieee.org/abstract/document/7237313

[65] L. E. Sánchez, D. Villafranca, and M. Piattini, "MMISS-SME practical development: Maturity model for information systems security management in SMEs," *Proceedings of the 5th International Workshop on Secu-*

*rity in Information Systems—WOSIS 2007; In Conjunction with ICEIS 2007, no. 2007, pp. 233-244, 2007, doi: 10.5220/0002430402330244.*

[66] S. Woodhouse, "An ISMS (im)-maturity capability model," *Proceedings—8th IEEE International Conference on Computer and Information Technology Workshops, CIT Workshops* 2008, no. Im, pp. 242-247, 2008, doi: 10.1109/CIT.2008. Workshops.46.

[67] T. Chenghua and Y. Shunzheng, "Assessment of network security policy based on security capability," *Proceedings—International Conference on Computer Science and Software Engineering, CSSE* 2008, vol. 3, pp. 906-910, 2008, doi: 10.1109/CSSE.2008.651.

[68] J. Mayer and L. L. Fagundes, "A model to assess the maturity level of the risk management process in information security," 2009 *IFIP IEEE International Symposium on Integrated Network Management-Workshops, IM* 2009, no. 5, pp. 61-70, 2009, doi: 10.1109/ INMW.2009.5195935.

[69] G. B. Regulwar, V. S. Gulhane, and P. M. Jawandhiya, "A security engineering capability maturity model," *ICEIT* 2010—2010 *International Conference on Educational and Information Technology, Proceedings*, vol. 1, no. Iceit, pp. 306-311, 2010, doi: 10.1109/ ICEIT.2010.5607700.

[70] G. Karokola, S. Kowalski, L. Y.-HAISA, and undefined 2011, "Towards An Information Security Maturity Model for Secure e-Government Services: A Stakeholders View.," *books.google.com*, Accessed: Nov. 29, 2021. [Online]. Available: https://books.google.com/books?hl=en&lr=&id=3apGAwAAQBAJ&oi=fnd&pg-PA58&dq=Karokola, +Geoffrey,+Stewart+Kowalski, + and+Louise+Yngstr % C3% B6m.+% 22Towards+An+Information+Security+Maturity+Model+for+Secure+e-Government+Services: +A+Stakeholders+View. % 22+HAISA.+2011.&ots-80W5zuEigy&sig-B Hg_KnYFZrpFPaZSsMdIRf02hI8

[71] M. Kassou and L. Kjiri, "SOASMM: A novel service oriented architecture Security Maturity Model," *Proceedings of* 2012 *International Conference on Multimedia Computing and Systems, ICMCS* 2012, pp. 912-918, 2012, doi: 10.1109/ICMCS.2012.6320279.

[72] E. A. Rigon, C. M. Westphall, D. R. dos Santos, and C. B. Westphall, "A cyclical evaluation model of information security maturity," *Information Management and Computer Security*, vol. 22, no. 3, pp. 265-278, 2014, doi: 10.1108/IMCS-04-2013-0025.

[73] C. B.-P. of the 2014 I. kaleidoscope and undefined 2014, "Sustainable security advantage in a changing environment: The Cybersecurity Capability Maturity Model (CM2)," ieeexplore.ieee.org, 2014, doi: 10.1109/ Kaleidoscope.2014.6858466.

[74] R. de Bruin and S. H. von Solms, "Modelling Cyber Security Governance Maturity," in *International Symposium on Technology and Society, Proceedings*, March 2016, vol. 2016-March. doi: 10.1109/IS-TAS.2015.7439415.

[75] B. Karabacak, S. O. Yildirim, and N. Baykal, "A vulnerability-driven cyber security maturity model for measuring national critical infrastructure protection preparedness," *International Journal of Critical Infrastructure Protection*, vol. 15, pp. 47-59, 2016, doi: 10.1016/ j.ijcip.2016.10.001.

[76] S. Yulianto, C. Lim, and B. Soewito, "Information security maturity model: A best practice driven approach to PCI DSS compliance," *Proceedings—2016 IEEE*

Region 10 *Symposium, TENSYMP* 2016, pp. 65-70, 2016, doi: 10.1109/TENCONSpring.2016.7519379.

[77] S. M. Muthukrishnan and S. Palaniappan, "Security metrics maturity model for operational security," *ISCAIE* 2016—2016 *IEEE Symposium on Computer Applications and Industrial Electronics*, pp. 101-106, 2016, doi: 10.1109/ISCAIE.2016.7575045.

[78] V. Jaquire and S. von Solms, "Developing a cyber counterintelligence maturity model for developing countries," 2017 *IST-Africa Week Conference, IST-Africa* 2017, no. Cci, pp. 1-8, 2017, doi: 10.23919/ ISTAFRICA.2017.8102288.

[79] A. García, F. Dominguez, L. Calle, J. Martinez, and C. Raymundo, "Personal data protection maturity model for the micro financial sector in Peru," *International Journal of Engineering Research and Technology*, vol. 11, no. 4, pp. 649-660, 2018, doi: 10.1109/CATA.2018.8398649.

[80] Citigroup, "Citigroup Information Security Evaluation Model (Citi-ISEM)," 2000. https://csrc.nist.rip/csspab/ june13-15/Citigroup.pdf (accessed Dec. 1, 2021).

[81] G. Drivas, A. Chatzopoulou, L. Maglaras, C. Lambrinoudakis, A. Cook, and H. Janicke, "A nis directive compliant cybersecurity maturity assessment framework," *ieeexplore.ieee.org*, Accessed: November 2021. 15, [Online]. Available: https://ieeexplore.ieee.org/abstract/document/9202470/

[31] R. Rojas, A. Muedas, and D. Mauricio, "Security Maturity Model of Web Applications for Cyber Attacks," 2019. Accessed: Apr. 14, 2021. [Online]. Available: https://doi.org/10.1145/3309074.3309096

[82] S. N. G. Gourisetti, S. Mix, M. Mylrea, C. Bonebrake, and M. Touhiduzzaman, "Secure design and development cybersecurity capability maturity model (SD2-C2M2): Next-generation cyber resilience by design," *Pervasive-Health: Pervasive Computing Technologies for Health-care*, April 2019, doi: 10.1145/3332448.3332461.

[83] M. Hamza, H. Hu, M. A. Akbar, F. Mehmood, Y. Hussain, and A. M. Baddour, "SIOT-RIMM: Towards Secure IoT-Requirement Implementation Maturity Model," *Pervasive Health: Pervasive Computing Technologies for Healthcare*, pp. 463-468, April 2020, doi: 10.1145/3383219.3383286.

[84] H. L. S. Jara, H. B. P. Navarro, and J. Armas-Aguirre, "Cybersecurity and Privacy Capabilities Model for Data Management Against Cyber-Attacks in the Health Sector," *Smart Innovation, Systems and Technologies*, vol. 233, pp. 359-367, 2021, doi: 10.1007/978-3-030-75680-2_40.

[85] M. D. E. C. el Kettani and T. Debbagh, "NCSecMM: A national cyber security maturity model for an interoperable 'National cyber security' framework," *Proceedings of the European Conference on e-Government*, ECEG, pp. 236-247, 2009.

[86] Y. Maleh, A. Sahid, M. B.-EDPACS, and undefined 2021, "A MATURITY FRAMEWORK FOR CYBERSECURITY GOVERNANCE IN ORGANIZATIONS," *Taylor & Francis*, vol. 63, no. 6, pp. 1-22, 2021, doi: 10.1080/07366981.2020.1815354.

[87] O. O. Akinsanya, M. Papadaki, and L. Sun, "Towards a maturity model for health-care cloud security (M2HCS)," *Information and Computer Security*, vol. 28, no. 3, pp. 321-345, 2019, doi: 10.1108/ICS-05-2019-0060.

[88] S. S. Veerapaneni and K. R. Sekhar, "A systematic study of asset management using hybrid cyber security maturity model," *International Journal of Recent Technology and Engineering*, vol. 7, no. 6, pp. 140-145, April 2019.

[89] R. A.-I. I. C. on T. for and undefined 2013, "A dynamic capability maturity model for improving cyber security," *ieeexplore.ieee.org*, Accessed: Nov. 29, 2021. [Online]. Available: https://ieeexplore.ieee.org/abstract/document/6699005/

[90] W. Zhao, G. W.-P. of the 50th Hawaii, and undefined 2017, "An evolution roadmap for community cyber security information sharing maturity model," *scholarspace.manoa.hawaii.edu*, Accessed: 2021. November 15, [Online]. Available: https://scholarspace.manoa.hawaii.edu/handle/10125/41443

[91] A. Emer, M. Unterhofer, E. R.-I. Engineering, and undefined 2021, "A Cybersecurity Assessment Model for Small and Medium-Sized Enterprises," *ieeexplore.ieee.org*, Accessed: Nov. 15, 2021. [Online]. Available: https://ieeexplore.ieee.org/abstract/document/9424999/

[92] M. F. Saleh, "The three dimensions of security," *researchgate.net*, no. 5, p. 85, 2011, Accessed: Nov. 29, 2021. [Online]. Available: https://www.researchgate.net/profile/Malik-Saleh/publication/216462798_The_Three_Dimensions_of_Security/links/0c960519f190ca74eb0 00000/The-Three-Dimensions-of-Security.pdf

[93] D. Proença, J. B.-I. C. on B. Information, and undefined 2018, "Information security management systems-a maturity model based on ISO/IEC 27001," *Springer*, vol. 320, pp. 102-114, 2018, doi: 10.1007/978-3-319-93931-5_8.

The extracted cybersecurity categories are primarily based on the established CIA triad, which encompasses Confidentiality, Integrity, and Availability. In addition to this triad, other models and initiatives expand on the concept of cybersecurity to include various other elements. The identified categories are organized using a simple extraction table, as demonstrated in Table 9, which captures details such as the reference ID, source title, code, and description. The total number of identified cybersecurity categories may be 74, derived from the final selected studies, as summarized in Table 42, shown below

TABLE 9

| | Categories Data Extraction Form | |
| --- | --- |
| # | Item Name |
| 1 | Reference ID |
| 2 | Source Title |
| 3 | Code |
| 4 | Description |

Moreover, the MLR can identify more than 1400 cybersecurity best practices from the final selected studies. During the extraction process for research question 2, these practices can be classified into different categories, using the form shown in Table 10. The classification of best practices provides an organized understanding of the various approaches and techniques used in cybersecurity management across different industries and domains. The extracted best practices are later used for further analysis and evaluation of cybersecurity maturity models.

TABLE 10

| | Best Practices Data Extraction Form | |
| --- | --- |
| # | Item Name |
| 1 | Reference ID |
| 2 | Source Title |
| 3 | Source Subtitle |
| 4 | Best Practice Text |
| 5 | Category |
| 6 | Sub-Category |

Figure 8:
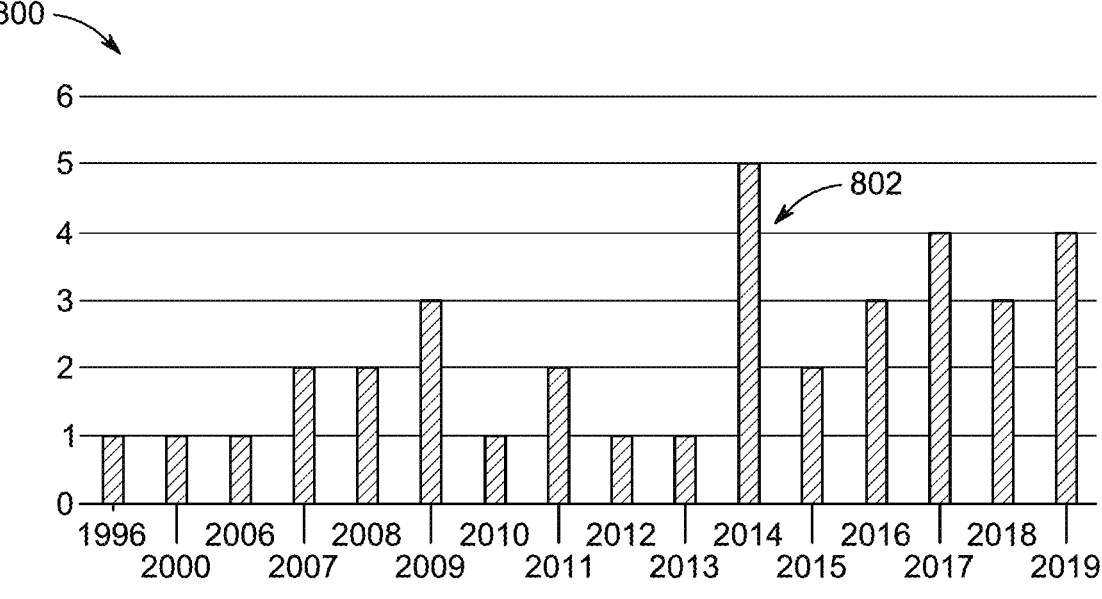
FIG. 8 illustrates a graphical representation of the distribution of cybersecurity maturity models over specific years in accordance with an exemplary aspect of the disclosure.

FIG. 8 illustrates a graphical representation of the distribution of cybersecurity maturity models over the years, indicated by reference numeral 800. The x-axis of the graph displays the range of years from 1996 to 2019, while the y-axis represents the number of maturity models released during each corresponding year. The graph visualizes the increasing trend in the development and publication of cybersecurity maturity models, with the number of models peaking in 2014, as indicated by reference numeral 802.

According to the analysis of the studies, a total of 43 cybersecurity maturity models were identified and extracted from the literature spanning from 1996 to 2021. The bar graph provides a clear depiction of the frequency and distribution of these models over time, showcasing how the development of these models has accelerated in recent years, particularly after 2008. This surge can be correlated to the rising awareness and demand for cybersecurity measures within various industries.

The figure further illustrates the importance of continuous re-evaluation of cybersecurity practices over time, as the field has evolved in response to changing internal and external environments. This aspect is also reflected in the literature, as discussed in Table 13, which identifies the number of maturity levels present in various cybersecurity models. Each model adopts a different structure, but the re-evaluation of cybersecurity practices remains a consistent factor across all models.

Furthermore, the majority of these models follow a five-level maturity structure, while others incorporate varying numbers of levels as outlined in Table 13. Additionally, as shown in Table 14, certain models also define explicit thresholds for each level, indicating the specific practices that must be met before an organization can progress to the next level.

A detailed analysis and discussion is provided based on the results obtained from the primary studies and aims to address the research questions, particularly focusing on cybersecurity maturity models, security categories, and best practices is described here. The available cybersecurity maturity models found in the literature generally share similar characteristics, including predefined maturity levels and specified focus areas. Each maturity model type is classified based on its security domains, which can include but are not limited to infrastructure, networks, data, individuals, applications, and regulatory compliance. Maturity is typically determined over time, necessitating periodic re-evaluation due to changes in internal and external environments.

The analysis includes 106 resources from primary studies, with the majority published within the last decade. A total of 43 cybersecurity maturity models are identified, ranging from the years 1996 to 2021, as illustrated in the distribution presented in FIG. 8. These cybersecurity maturity models exhibit varying styles in terms of structure, namely the leveling style, CMMI style, and WH question style, as shown in Table 11. In the leveling style, models are explained based on their maturity levels and corresponding best practices. This style is advantageous in providing clear explanations for incremental levels; however, clarity in assessment methods and dimensions is often lacking. In contrast, the CMMI style outlines a set number of maturity levels, often based on CMMI level names and numbers, thus increasing the model's trustworthiness. However, the levels within each model operate independently, with some models beginning at zero, while others start at one. The WH question style focuses on answering key questions, including "who," "from what," "how," "when," and "why" to guide the structure of the maturity model, as shown in Table 12.

TABLE 11

Maturity Models Styles

| Criteria/Style | Leveling style | CMMI style | WH style |
|---|---|---|---|
| incremental levels are clearly explained | YES | YES | NO |
| assessment method clarity | NO | YES | YES |
| dimensions clarity | NO | YES | NO |

TABLE 12 -

WH Questions Samples

| WH | Examples |
|---|---|
| WHO/WHAT | Equipment, humans, infrastructure, and data |
| FROM WHAT | Risks, vulnerabilities, and attacks. |
| HOW | Short-term countermeasures for prevention and protection solutions. |
| WHY | Protect people, assets, and reputation. |
| | Also, long-term plans for continuous improvement. |
| WHEN | Scheduled tasks. Before, during, and after attacks. |

The number of maturity levels varies across models, though the most common structure adopts five maturity levels, followed by four levels in other models. A few models utilize 12 levels grouped into upper levels to address industry and technical elements in greater detail. Additionally, one model utilizes a nine-level system, offering both upper levels for maturity and negative levels for immaturity. Table 13 provides a comprehensive breakdown of maturity levels and their counts. These maturity levels can generally be grouped into three stages: an initial stage, where no cybersecurity policies are applied; intermediate stages, where specific standards are followed to mitigate risks; and a final stage representing the most optimal state of cyber-security.

TABLE 13

Cybersecurity Maturity Models Number of Levels

| Levels | Count | Ref |
|---|---|---|
| 3 | 3 | [58] [65] [77] |
| 4 | 10 | [56] [60][18][64] [74][76][78][82][87][89] |
| 5 | 24 | [53][55] [57] [59] [6][63] [67] [68][69] [70][71][72] [79][80][31][83][84][85][86][88][90][91][92][93] |
| 6 | 2 | [73][81] |
| 9 | 1 | [66] |
| 12 | 2 | [45][62] |
| NA | 1 | [75] |

[6] P. Bowen and R. Kissel, *Program review for information security management assistance (PRISMA)*. 2007. doi: 10.6028/NIST.IR.7358.

[18] "Developing Maturity Models for IT Management-A Procedure Model and its Application 1 The importance of maturity models for IT management", doi: 10.1007/s12599-009-0044-5.

[31] R. Rojas, A. Muedas, and D. Mauricio, "Security Maturity Model of Web Applications for Cyber Attacks," 2019. Accessed: Apr. 14, 2021. [Online]. Available:

[45] "Making Security Measurable MSM Archive." http://makingsecuritymeasurable.mitre.org/directory/archive/ (accessed Apr. 15, 2021).

[53] "Cybersecurity Maturity Model Certification (CMMC)," 2020. https://www.acq.osd.mil/cmmc/(accessed Nov. 28, 2021).

[55] K. Ferraiolo, "The Systems Security Engineering Capability Maturity Model."

[56] Kristina Dorville, "Cybersecurity Capability Maturity Model-White Paper," 2014. Accessed: Nov. 30, 2021. Available: [Online]. https://niccs.cisa.gov/sites/default/files/Capability%20Maturity%20Model%20White%2Paper.pdf

[57] N. Sjelin and G. White, "The Community Cyber Security Maturity Model," *Cyber-Physical Security*, pp. 161-183, 2017, doi: 10.1007/978-3-319-32824-9_8.

[58] W. Newhouse, S. Keith, . . . . B. S.-N. special, and undefined 2017, "National initiative for cybersecurity education (NICE) cybersecurity workforce framework," *scadahacker.com*, doi: 10.6028/NIST.SP.800-181.

[59] Vicente Aceituno Canal, "ISM3 1.0," *Citeseer*, 2009, Accessed: Nov. 28, 2021. [Online]. Available: http://citeseerx.ist.psu.edu/viewdoc/download?doi=10.1.1.674.7546&rep-rep1&type=pdf

[60] M. B.-N. I. of S. and and undefined 2018, "Framework for improving critical infrastructure cybersecurity," *isawaterwastewater.com*, Accessed: Nov. 29, 2021. [Online]. Available: http://isawaterwastewater.com/wp-content/uploads/2018/08/WWAC-2018-NIST-Barrett_final.pdf

[45] "Making Security Measurable MSM Archive." http://makingsecuritymeasurable.mitre.org/directory/archive/ (accessed Apr. 15, 2021).

[62] B. Yigit Ozkan, S. van Lingen, and M. Spruit, "The Cybersecurity Focus Area Maturity (CYSFAM) Model," *Journal of Cybersecurity and Privacy*, vol. 1, no. 1, pp. 119-139, 2021, doi: 10.3390/jcp1010007.

[63] "Federal Financial Institutions Examination Council (FFIEC)," 2017. https://www.ffiec.gov/cyberassessment-tool.htm (accessed Nov. 29, 2021).

[64] S. von S.-2015 S. and I. Conference and undefined 2015, "A maturity model for part of the African Union Convention on Cyber Security," *ieeexplore.ieee.org*, Accessed: Nov. 29, 2021. [Online]. Available: https://ieeexplore.ieee.org/abstract/document/7237313/L.

[65] E. Sánchez, D. Villafranca, and M. Piattini, "MMISS-SME practical development: Maturity model for information systems security management in SMEs," *Proceedings of the 5th International Workshop on Security in Information Systems—WOSIS 2007; In Conjunction with ICEIS 2007*, no. 2007, pp. 233-244, 2007, doi: 10.5220/0002430402330244.

[66] S. Woodhouse, "An ISMS (im)-maturity capability model," *Proceedings—8th IEEE International Conference on Computer and Information Technology Workshops, CIT Workshops* 2008, no. Im, pp. 242-247, 2008, doi: 10.1109/CIT.2008. Workshops.46.

[67] T. Chenghua and Y. Shunzheng, "Assessment of network security policy based on security capability," *Proceedings—International Conference on Computer Science and Software Engineering, CSSE* 2008, vol. 3, pp. 906-910, 2008, doi: 10.1109/CSSE.2008.651.

[68] J. Mayer and L. L. Fagundes, "A model to assess the maturity level of the risk management process in information security," 2009 *IFIP IEEE International Symposium on Integrated Network Management-Workshops, IM* 2009, no. 5, pp. 61-70, 2009, doi: 10.1109/INMW.2009.5195935.

[69] G. B. Regulwar, V. S. Gulhane, and P. M. Jawandhiya, "A security engineering capability maturity model," *ICEIT* 2010—2010 *International Conference on Educational and Information Technology, Proceedings*, vol. 1, no. Iceit, pp. 306-311, 2010, doi: 10.1109/ICEIT.2010.5607700.

[70] G. Karokola, S. Kowalski, L. Y.-HAISA, and undefined 2011, "Towards An Information Security Maturity Model for Secure e-Government Services: A Stakeholders View.," *books.google.com*, Accessed: Nov. 29, 2021. [Online]. Available: https://books.google.com/books?hl=en&lr=&id=3apGAwAAQBAJ&oi=fnd&pg-PA58&dq=Karokola, +Geoffrey,+Stewart+Kowalski, +and+Louise+Yngstr % C3% B6m.+% 22Towards+An+Information+Security+Maturity+Model+for+Secure+e-Government+Services: +A+Stakeholders+View. % 22+HAISA.+2011.&ots-80W5zuEigy&sig-B Hg_KnYFZrpFPaZSsMdIRf02hI8

[71] M. Kassou and L. Kjiri, "SOASMM: A novel service oriented architecture Security Maturity Model," *Proceedings of* 2012 *International Conference on Multimedia Computing and Systems, ICMCS* 2012, pp. 912-918, 2012, doi: 10.1109/ICMCS.2012.6320279.

[72] E. A. Rigon, C. M. Westphall, D. R. dos Santos, and C. B. Westphall, "A cyclical evaluation model of information security maturity," *Information Management and Computer Security*, vol. 22, no. 3, pp. 265-278, 2014, doi: 10.1108/IMCS-04-2013-0025.

[73] C. B.-P. of the 2014 I. kaleidoscope and undefined 2014, "Sustainable security advantage in a changing environment: The Cybersecurity Capability Maturity Model (CM2)," ieeexplore.ieee.org, 2014, doi: 10.1109/Kaleidoscope.2014.6858466.

[74] R. de Bruin and S. H. von Solms, "Modelling Cyber Security Governance Maturity," in *International Symposium on Technology and Society, Proceedings*, March 2016, vol. 2016-March. doi: 10.1109/IS-TAS.2015.7439415.

[75] B. Karabacak, S. O. Yildirim, and N. Baykal, "A vulnerability-driven cyber security maturity model for measuring national critical infrastructure protection preparedness," *International Journal of Critical Infrastructure Protection*, vol. 15, pp. 47-59, 2016, doi: 10.1016/j.ijcip.2016.10.001.

[76] S. Yulianto, C. Lim, and B. Soewito, "Information security maturity model: A best practice driven approach to PCI DSS compliance," *Proceedings—2016 IEEE Region* 10 *Symposium, TENSYMP* 2016, pp. 65-70, 2016, doi: 10.1109/TENCONSpring.2016.7519379.

[77] S. M. Muthukrishnan and S. Palaniappan, "Security metrics maturity model for operational security," *ISCAIE* 2016—2016 *IEEE Symposium on Computer Applications and Industrial Electronics*, pp. 101-106, 2016, doi: 10.1109/ISCAIE.2016.7575045.

[78] V. Jaquire and S. von Solms, "Developing a cyber counterintelligence maturity model for developing coun-

[79] A. García, F. Dominguez, L. Calle, J. Martinez, and C. Raymundo, "Personal data protection maturity model for the micro financial sector in Peru," *International Journal of Engineering Research and Technology*, vol. 11, no. 4, pp. 649-660, 2018, doi: 10.1109/CATA.2018.8398649.

[80] Citigroup, "Citigroup Information Security Evaluation Model (Citi-ISEM)," 2000. https://csrc.nist.rip/csspab/june13-15/Citigroup.pdf (accessed Dec. 1, 2021).

[81] G. Drivas, A. Chatzopoulou, L. Maglaras, C. Lambrinoudakis, A. Cook, and H. Janicke, "A nis directive compliant cybersecurity maturity assessment framework," ieeexplore.ieee.org, Accessed: November 2021. 15, [Online]. Available: https://ieeexplore.ieee.org/abstract/document/9202470/https://doi.org/10.1145/3309074.3309096

[82] S. N. G. Gourisetti, S. Mix, M. Mylrea, C. Bonebrake, and M. Touhiduzzaman, "Secure design and development cybersecurity capability maturity model (SD2-C2M2): Next-generation cyber resilience by design," *Pervasive-Health: Pervasive Computing Technologies for Health-care*, April 2019, doi: 10.1145/3332448.3332461.

[83] M. Hamza, H. Hu, M. A. Akbar, F. Mehmood, Y. Hussain, and A. M. Baddour, "SIOT-RIMM: Towards Secure IoT-Requirement Implementation Maturity Model," *Pervasive Health: Pervasive Computing Technologies for Healthcare*, pp. 463-468, April 2020, doi: 10.1145/3383219.3383286.

[84] H. L. S. Jara, H. B. P. Navarro, and J. Armas-Aguirre, "Cybersecurity and Privacy Capabilities Model for Data Management Against Cyber-Attacks in the Health Sector," *Smart Innovation, Systems and Technologies*, vol. 233, pp. 359-367, 2021, doi: 10.1007/978-3-030-75680-2_40.

[85] M. D. E. C. el Kettani and T. Debbagh, "NCSecMM: A national cyber security maturity model for an interoperable 'National cyber security' framework," *Proceedings of the European Conference on e-Government*, ECEG, pp. 236-247, 2009.

[86] Y. Maleh, A. Sahid, M. B.-EDPACS, and undefined 2021, "A MATURITY FRAMEWORK FOR CYBERSECURITY GOVERNANCE IN ORGANIZATIONS," *Taylor & Francis*, vol. 63, no. 6, pp. 1-22, 2021, doi: 10.1080/07366981.2020.1815354.

[87] O. O. Akinsanya, M. Papadaki, and L. Sun, "Towards a maturity model for health-care cloud security (M2HCS)," *Information and Computer Security*, vol. 28, no. 3, pp. 321-345, 2019, doi: 10.1108/ICS-05-2019-0060.

[88] S. S. Veerapaneni and K. R. Sekhar, "A systematic study of asset management using hybrid cyber security maturity model," *International Journal of Recent Technology and Engineering*, vol. 7, no. 6, pp. 140-145, April 2019.

[89] R. A.-I. I. C. on T. for and undefined 2013, "A dynamic capability maturity model for improving cyber security," ieeexplore.ieee.org, Accessed: Nov. 29, 2021. [Online]. Available: https://ieeexplore.ieee.org/abstract/document/6699005/

[90] W. Zhao, G. W.-P. of the 50th Hawaii, and undefined 2017, "An evolution roadmap for community cyber security information sharing maturity model," scholarspace.manoa.hawaii.edu, Accessed: 2021. November 15, [Online]. Available: https://scholarspace.manoa.hawaii.edu/handle/10125/41443

[91] A. Emer, M. Unterhofer, E. R.-I. Engineering, and undefined 2021, "A Cybersecurity Assessment Model for Small and Medium-Sized Enterprises," *ieeexplore. ieee.org*, Accessed: Nov. 15, 2021. [Online]. Available: https://ieeexplore.ieee.org/abstract/document/9424999/

[92] M. F. Saleh, "The three dimensions of security," *researchgate.net*, no. 5, p. 85, 2011, Accessed: Nov. 29, 2021. [Online]. Available: https://www.researchgate.net/profile/Malik-Saleh/publication/216462798_The_Three_Dimensions_of_Security/links/0c960519f190ca74eb0 00000/The-Three-Dimensions-of-Security.pdf

[93] D. Proença, J. B.-I. C. on B. Information, and undefined 2018, "Information security management systems-a maturity model based on ISO/IEC 27001," *Springer*, vol. 320, pp. 102-114, 2018, doi: 10.1007/978-3-319-93931-5_8.

Not all models provide clearly defined thresholds between levels, though some models specify the requirements necessary to progress to the next level. For instance, eight models explicitly identify thresholds between levels, as detailed in Table 14.

TABLE 14

Cybersecurity Maturity Models with thresholds

| Model Name | #levels | L1 | L2 | L3 | L4 | L5 | Out of |
|---|---|---|---|---|---|---|---|
| Cybersecurity Maturity Model Certification (CMMC)[53] | 5 | 1 | 18 | 73 | 131 | 157 | 171 |
| Maturity Model for Information Systems Security Management in SMEs (MMISS-SME) | 3 | 0 | 25 | 75 | — | — | 100 |
| Network security policy assessment Methodology based on security capability [67] | 5 | 0 | 20 | 40 | 60 | 80 | 100 |
| Security metrics maturity model for operational security (SM-Mi) [77] | 3 | 0 | 41 | 91 | — | — | 100 |
| Personal data protection maturity model for the micro financial sector in Peru (PDPM) [79] | 5 | 0 | 20 | 40 | 60 | 80 | 100 |
| Security Maturity Model of Web Applications [31] | 5 | 0 | 21 | 41 | 61 | 81 | 100 |
| The Cybersecurity Focus Area Maturity (CYSFAM) Model—levels categories [62] | 5 | 0.25 | 0.50 | 0.75 | 1.00 | 1.25 | 1.25 |
| Information Security Maturity Model (ISMM)[60] | 5 | 0.0 | 1.6 | 2.6 | 3.6 | 4.6 | 5 |

Many cybersecurity maturity models adhere to international security standards, which enhances their credibility. Furthermore, the origin or source of a model adds to its trustworthiness. The analysis revealed that the cybersecurity maturity models originated from a variety of sources, including universities, governmental bodies, and international organizations. The distribution of maturity model origins is detailed in Table 15, reflecting a diverse range of contributors across different countries and organizations.

TABLE 15

Maturity Models Origins Distribution

| Origin | Ref | Country |
|---|---|---|
| The World Soil Information Service (WoSIS) | [65] | — |
| Pacific Northwest National Laboratory (PNNL) | [82] | — |

TABLE 15-continued

Maturity Models Origins Distribution

| Origin | Ref | Country |
|---|---|---|
| ISM3 Consortium | [59] | — |
| International Business Machines Corporation (IBM) | [45][62] | — |
| African Union | [64] | — |
| International Conference on Educational and Information Technology City Group | [69] | — |
| EDP Audit, Control, and Security Newsletter | [80] | — |
| Blue Eyes Intelligence Engineering & Sciences Publication | [86] | — |
| | [88] | — |
| University of Technology Sydney | [18] | Australia |
| Charles Sturt University | [66] | |
| Universidade do Vale do Rio dos Sinos, São Leopoldo | [68] | Brazil |
| Federal University of Santa Catarina (UFSC), Florianópolis | [72] | |
| Zhongshan (Sun Yat-Sen) | [67] | China |

TABLE 15-continued

Maturity Models Origins Distribution

| Origin | Ref | Country |
|---|---|---|
| University, Guangzhou Chongqing University, Chongqing 401331 | [83] | |
| National Cybersecurity Authority of Greece | [81] | Greece |
| Swiss German University, Tangerang | [76] | Indonesia |
| Free University of Bolzano, 000039100 Bolzano | [91] | Italy |
| University of Technology | [73] | Jamaica |
| Malaysian University of Science and Technology (MUST), Kuala Lumpur | [77] | Malaysia |
| Mohammed V University | [71] [85] | Morocco |
| Peruvian University of Applied Sciences | [79] [31] [84] | Peru |
| University of Lisbon | [93] | Portugal |

43

TABLE 15-continued

Maturity Models Origins Distribution

| Origin | Ref | Country |
|---|---|---|
| Prince Mohammad Bin Fahd University, Al Khobar | [92] | Saudi Arabia |
| University of Johannesburg | [74] | South Africa |
| University of Johannesburg | [78] | |
| Stockholm University | [70] | Sweden |
| Universiteler Mahallesi | [75] | Turkey |
| School of Computing, Electronics and Mathematics, University of Plymouth, Plymouth | [87] | United Kingdom |
| Department of Defense (DoD) | [53] | United States |
| The National Security Agency (NSA) | [55] | |
| The Department of Energy & Carnegie Mellon University | [56] | |
| The Center for Infrastructure Assurance and Security (CIAS), University of San Antonio | [57] | |
| The National Cybersecurity Education Initiative (NICE), Integral Cyber Security Initiative (CNCI) | [58] | |
| National Institute of Standards and Technology (NIST), Department of Commerce | [6] | |
| Federal Financial Institutions Examination Council (FFIEC) | [63] | |
| DecisionPath Inc, Winchester, Massachusetts | [89] | |
| The University of Texas at San Antonio (UTSA) | [90] | |
| National Institute of Standards and Technology | [60] | |

[65] E. Sánchez, D. Villafranca, and M. Piattini, "MMISS-SME practical development: Maturity model for information systems security management in SMEs," *Proceedings of the 5th International Workshop on Security in Information Systems—WOSIS 2007; In Conjunction with ICEIS 2007*, no. 2007, pp. 233-244, 2007, doi: 10.5220/0002430402330244.

[82] S. N. G. Gourisetti, S. Mix, M. Mylrea, C. Bonebrake, and M. Touhiduzzaman, "Secure design and development cybersecurity capability maturity model (SD2-C2M2): Next-generation cyber resilience by design," *Pervasive Health: Pervasive Computing Technologies for Healthcare*, April 2019, doi: 10.1145/3332448.3332461.

[59] Vicente Aceituno Canal, "ISM3 1.0," *Citeseer*, 2009, Accessed: Nov. 28, 2021. [Online]. Available: http://citeseerx.ist.psu.edu/viewdoc/download?doi=10.1.1.674.7546&rep-rep1&type=pdf

[45] "Making Security Measurable MSM Archive." http://makingsecuritymeasurable.mitre.org/directory/archive/ (accessed Apr. 15, 2021).

[62] B. Yigit Ozkan, S. van Lingen, and M. Spruit, "The Cybersecurity Focus Area Maturity (CYSFAM) Model," *Journal of Cybersecurity and Privacy*, vol. 1, no. 1, pp. 119-139, 2021, doi: 10.3390/jcp1010007.

[64] S. von S.-2015 S. and I. Conference and undefined 2015, "A maturity model for part of the African Union Convention on Cyber Security," *ieeexplore.ieee.org*, Accessed: Nov. 29, 2021. [Online]. Available: https://ieeexplore.ieee.org/abstract/document/7237313

[69] G. B. Regulwar, V. S. Gulhane, and P. M. Jawandhiya, "A security engineering capability maturity model," *ICEIT 2010—2010 International Conference on Educational and Information Technology, Proceedings*, vol. 1, no. Iceit, pp. 306-311, 2010, doi: 10.1109/ICEIT.2010.5607700.

[80] Citigroup, "Citigroup Information Security Evaluation Model (Citi-ISEM)," 2000. https://csrc.nist.rip/csspab/june13-15/Citigroup.pdf (accessed Dec. 1, 2021).

[86] Y. Maleh, A. Sahid, M. B.-EDPACS, and undefined 2021, "A MATURITY FRAMEWORK FOR CYBERSECURITY GOVERNANCE IN ORGANIZATIONS," *Taylor & Francis*, vol. 63, no. 6, pp. 1-22, 2021, doi: 10.1080/07366981.2020.1815354.

[88] S. S. Veerapaneni and K. R. Sekhar, "A systematic study of asset management using hybrid cyber security maturity model," *International Journal of Recent Technology and Engineering*, vol. 7, no. 6, pp. 140-145, April 2019.

[18] A. Maier, J. Moultrie, and P. J. Clarkson, "Developing maturity grids for assessing organisational capabilities: Practitioner guidance." 2009 Accessed: Apr. 15, 2021. [Online]. Available: https://orbit.dtu.dk/en/publications/developing-maturity-grids-for-assessing-organisational-capability

[66] S. Woodhouse, "An ISMS (im)-maturity capability model," *Proceedings—8th IEEE International Conference on Computer and Information Technology Workshops, CIT Workshops* 2008, no. Im, pp. 242-247, 2008, doi: 10.1109/CIT.2008. Workshops.46.

[68] J. Mayer and L. L. Fagundes, "A model to assess the maturity level of the risk management process in information security," 2009 *IFIP IEEE International Symposium on Integrated Network Management-Workshops, IM* 2009, no. 5, pp. 61-70, 2009, doi: 10.1109/INMW.2009.5195935.

[72] E. A. Rigon, C. M. Westphall, D. R. dos Santos, and C. B. Westphall, "A cyclical evaluation model of information security maturity," *Information Management and Computer Security*, vol. 22, no. 3, pp. 265-278, 2014, doi: 10.1108/IMCS-04-2013-0025.

[67] T. Chenghua and Y. Shunzheng, "Assessment of network security policy based on security capability," *Proceedings—International Conference on Computer Science and Software Engineering, CSSE* 2008, vol. 3, pp. 906-910, 2008, doi: 10.1109/CSSE.2008.651.

[83] M. Hamza, H. Hu, M. A. Akbar, F. Mehmood, Y. Hussain, and A. M. Baddour, "SIOT-RIMM: Towards Secure IoT-Requirement Implementation Maturity Model," *Pervasive Health: Pervasive Computing Technologies for Healthcare*, pp. 463-468, April 2020, doi: 10.1145/3383219.3383286.

[81] G. Drivas, A. Chatzopoulou, L. Maglaras, C. Lambrinoudakis, A. Cook, and H. Janicke, "A nis directive compliant cybersecurity maturity assessment framework," *ieeexplore.ieee.org*, Accessed: November 2021. 15, [Online]. Available: https://ieeexplore.ieee.org/abstract/document/9202470/https://doi.org/10.1145/3309074.3309096

[76] S. Yulianto, C. Lim, and B. Soewito, "Information security maturity model: A best practice driven approach to PCI DSS compliance," *Proceedings—2016 IEEE Region 10 Symposium, TENSYMP* 2016, pp. 65-70, 2016, doi: 10.1109/TENCONSpring.2016.7519379.

[91] A. Emer, M. Unterhofer, E. R.-I. Engineering, and undefined 2021, "A Cybersecurity Assessment Model for Small and Medium-Sized Enterprises," *ieeexplore.ieee.org*, Accessed: Nov. 15, 2021. [Online]. Available: https://ieeexplore.ieee.org/abstract/document/9424999/

[73] C. B.-P. of the 2014 I. kaleidoscope and undefined 2014, "Sustainable security advantage in a changing environment: The Cybersecurity Capability Maturity Model (CM2)," ieeexplore.ieee.org, 2014, doi: 10.1109/Kaleidoscope.2014.6858466.

[77] S. M. Muthukrishnan and S. Palaniappan, "Security metrics maturity model for operational security," *ISCAIE* 2016—2016 *IEEE Symposium on Computer Applications*

45 46

*and Industrial Electronics*, pp. 101-106, 2016, doi: 10.1109/ISCAIE.2016.7575045.

[71] M. Kassou and L. Kjiri, "SOASMM: A novel service oriented architecture Security Maturity Model," *Proceedings of* 2012 *International Conference on Multimedia Computing and Systems, ICMCS* 2012, pp. 912-918, 2012, doi: 10.1109/ICMCS.2012.6320279.

[31] R. Rojas, A. Muedas, and D. Mauricio, "Security Maturity Model of Web Applications for Cyber Attacks," 2019. Accessed: Apr. 14, 2021. [Online]. Available: https://doi.org/10.1145/3309074.3309096

[84] H. L. S. Jara, H. B. P. Navarro, and J. Armas-Aguirre, "Cybersecurity and Privacy Capabilities Model for Data Management Against Cyber-Attacks in the Health Sector," *Smart Innovation, Systems and Technologies*, vol. 233, pp. 359-367, 2021, doi: 10.1007/978-3-030-75680-2_40.

[93] D. Proença, J. B.-I. C. on B. Information, and undefined 2018, "Information security management systems-a maturity model based on ISO/IEC 27001*," Springer*, vol. 320, pp. 102-114, 2018, doi: 10.1007/978-3-319-93931-5_8.

[92] M. F. Saleh, "The three dimensions of security," *researchgate.net*, no. 5, p. 85, 2011, Accessed: Nov. 29, 2021. [Online]. Available: https://www.researchgate.net/profile/Malik-Saleh/publication/216462798_The_Three Dimensions_of_Security/links/0c960519f190ca74eb0 00000/The-Three-Dimensions-of-Security.pdf

[74] R. de Bruin and S. H. von Solms, "Modelling Cyber Security Governance Maturity," in *International Symposium on Technology and Society, Proceedings*, March 2016, vol. 2016-March. doi: 10.1109/IS-TAS.2015.7439415.

[78] V. Jaquire and S. von Solms, "Developing a cyber counterintelligence maturity model for developing countries," 2017 *IST-Africa Week Conference, IST-Africa* 2017, no. Cci, pp. 1-8, 2017, doi: 10.23919/ISTAFRICA.2017.8102288.

[70] G. Karokola, S. Kowalski, L. Y.-HAISA, and undefined 2011, "Towards An Information Security Maturity Model for Secure e-Government Services: A Stakeholders View.," *books.google.com*, Accessed: Nov. 29, 2021. [Online]. Available: https://books.google.com/books?hl=en&lr=&id=3apGAwAAQBAJ&oi=fnd&pg-PA58&dq=Karokola, +Geoffrey,+Stewart+Kowalski, + and+Louise+Yngstr % C3% B6m.+% 22Towards+An+Information+Security+Maturity+Model+for+Secure+e-Government+Services: +A+Stakeholders+View. % 22+HAISA.+2011.&ots-80W5zuEigy&sig-B Hg_KnYFZrpFPaZSsMdIRf02hI8

[75] B. Karabacak, S. O. Yildirim, and N. Baykal, "A vulnerability-driven cyber security maturity model for measuring national critical infrastructure protection preparedness," *International Journal of Critical Infrastructure Protection*, vol. 15, pp. 47-59, 2016, doi: 10.1016/j.ijcip.2016.10.001.

[87] O. O. Akinsanya, M. Papadaki, and L. Sun, "Towards a maturity model for health-care cloud security (M2HCS)," *Information and Computer Security*, vol. 28, no. 3, pp. 321-345, 2019, doi: 10.1108/ICS-05-2019-0060.

[53] "Cybersecurity Maturity Model Certification (CMMC)," 2020. https://www.acq.osd.mil/cmmc/(accessed Nov. 28, 2021).

[55] K. Ferraiolo, "The Systems Security Engineering Capability Maturity Model."

[56] Kristina Dorville, "Cybersecurity Capability Maturity Model-White Paper," 2014. Accessed: Nov. 30, 2021. [Online]. Available: https://niccs.cisa.gov/sites/default/files/Capability % 20Maturity %20Model %20White %2Paper.pdf

[57] N. Sjelin and G. White, "The Community Cyber Security Maturity Model," *Cyber-Physical Security*, pp. 161-183, 2017, doi: 10.1007/978-3-319-32824-9_8.

[58] W. Newhouse, S. Keith, . . . . B. S.-N. special, and undefined 2017, "National initiative for cybersecurity education (NICE) cybersecurity workforce framework," *scadahacker.com*, doi: 10.6028/NIST.SP.800-181.

[6] P. Bowen and R. Kissel, *Program review for information security management assistance (PRISMA)*. 2007. doi: 10.6028/NIST.IR.7358.

[63] "Federal Financial Institutions Examination Council (FFIEC)," 2017. https://www.ffiec.gov/cyberassessment-tool.htm (accessed Nov. 29, 2021).

[89] R. A.-I. I. C. on T. for and undefined 2013, "A dynamic capability maturity model for improving cyber security," *ieeexplore.ieee.org*, Accessed: Nov. 29, 2021. [Online]. Available: https://ieeexplore.ieee.org/abstract/document/6699005/

[90] W. Zhao, G. W.-P. of the 50th Hawaii, and undefined 2017, "An evolution roadmap for community cyber security information sharing maturity model," *scholarspace.manoa.hawaii.edu*, Accessed: 2021. November 15, [Online]. Available: https://scholarspace.manoa.hawaii.edu/handle/10125/41443

[60] M. B.-N. I. of S. and and undefined 2018, "Framework for improving critical infrastructure cybersecurity," *isawaterwastewater.com*, Accessed: Nov. 29, 2021. [Online]. Available: http://isawaterwastewater.com/wp-content/uploads/2018/08/WWAC-2018-NIST-Barrett_final.pdf Several cybersecurity maturity models exhibit common features, such as the ability to be applied using automated tools or to support self-assessment processes. Self-assessment features allow organizations to evaluate their cybersecurity maturity internally without external auditing. The application of cybersecurity maturity models typically involves several stages, starting with the evaluation process, identifying security gaps, setting priorities, developing a security plan, and subsequently implementing the security measures.

Conventional cybersecurity maturity models include both generic and domain-specific models. Generic models can be applied to multiple domains but may require customization to be effective in a particular organization or industry. Domain-specific models, while more tailored, may face limitations in their applicability to other sectors or environments.

Figure 9:
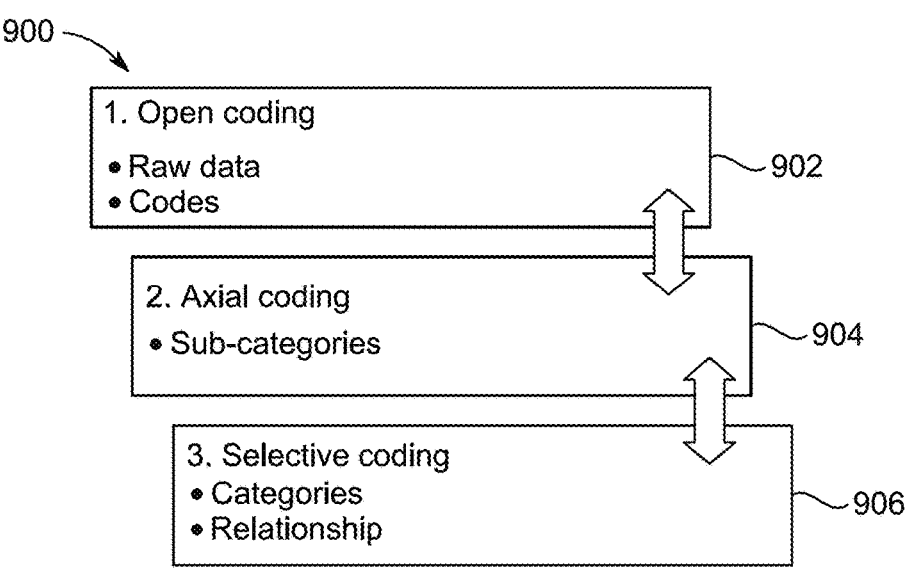
FIG. 9 illustrates a process steps of coding techniques employed for analyzing data in accordance with grounded theory, in accordance with an exemplary aspect of the disclosure.

Referring to FIG. 9, the illustrated process 900 details the steps involved in coding techniques employed for analyzing data in accordance with grounded theory. The process includes three primary phases, where each phase builds upon the results of the previous phase to progressively develop a structured relationship between categories derived from raw data. In the first phase, referred to as "Open Coding" 902, raw data and codes are generated, serving as the basis for the subsequent stages. The open coding phase primarily focuses on creating initial codes from the analyzed raw data, laying the groundwork for further refinement.

Following the open coding stage, the process transitions into the second phase, identified as "Axial Coding" 904, in which the relationships between the previously identified codes are analyzed and clarified. This phase is characterized by the creation of sub-categories that represent the structured interactions between various codes. Through axial coding, the data undergoes systematic categorization, allowing for a more detailed and organized analysis.

The third phase, "Selective Coding" 906, includes the identification and development of the core categories from the sub-categories established in the axial coding phase. In addition, this phase establishes the relationships between categories, ensuring the overall cohesiveness and comprehensiveness of the data analysis. As illustrated, the coding process enables a thorough examination of the data, progressing from raw codes to structured categories with clearly defined relationships. The interconnections between the phases are depicted through arrows, indicating the iterative nature of the analysis process, which allows for revisions and refinements based on ongoing insights.

In analyzing the obtained results, an inductive approach is adopted, utilizing techniques derived from the grounded theory for identifying the categories of security and cybersecurity. Grounded theory was introduced in 1967 by Glaser and Strauss as a research methodology focused on generating theory from systematically collected and analyzed data. The analysis process involves three primary stages. Initially, the open coding stage involves analyzing the raw data to develop codes, forming the foundational elements of the final theory. Subsequently, axial coding is conducted to establish the relationships between the identified codes and clarify sub-categories. In the third stage, selective coding, the categories are finalized, and their interrelationships are determined. These stages of analysis enable the final form of the theory to be identified. In the present case, only the first three stages of the analysis are considered, without proceeding to the development of the theory. The process is represented in FIG. 9.

A model based on the CIA triad, referred to as the Parkerian Hexad (PH) model, was developed by Donn B. Parker as a more comprehensive cybersecurity model. Additionally, the Reference Model of Information Assurance & Security (RMIAS) was introduced by the Information Assurance & Security (IAS) domain. This domain continuously evolves in response to the changing needs of society, businesses, and technology. Various standards, including ISO/IEC 27000 and NIST, also emphasize the goals of cybersecurity. A simplified summary of cybersecurity principles and goals is presented in Table 16, while examples of cybersecurity topics and groups are listed in Table 17.

TABLE 16

| Cybersecurity Principles and Goals jointly | |
| --- | --- |
| Cybersecurity Principle | References |
| Accountability | [80][81] |
| Availability | [44][79][80] |
| Authenticity & Trustworthiness | [44][79][80][81] |
| Auditability | [97] |
| Confidentiality & Privacy | [44][79][80][81] |
| Integrity | [44][79][80][81] |
| Non-repudiation | [44][80][81] |
| Possession & Control | [96] |
| Reliability | [98] |
| Utility | [96] |

[44] "The MITRE Corporation." https://www.mitre.org/(accessed Apr. 14, 2021).

[79] A. García, F. Dominguez, L. Calle, J. Martinez, and C. Raymundo, "Personal data protection maturity model for the micro financial sector in Peru," *International Journal*

*of Engineering Research and Technology*, vol. 11, no. 4, pp. 649-660, 2018, doi: 10.1109/CATA.2018.8398649.

[80] Citigroup, "Citigroup Information Security Evaluation Model (Citi-ISEM)," 2000. https://csrc.nist.rip/csspab/june13-15/Citigroup.pdf (accessed Dec. 1, 2021).

[81] G. Drivas, A. Chatzopoulou, L. Maglaras, C. Lambrinoudakis, A. Cook, and H. Janicke, "A nis directive compliant cybersecurity maturity assessment framework," *ieeexplore.ieee.org*, Accessed: November 2021. 15, [Online]. Available: https://ieeexplore.ieee.org/abstract/document/9202470/https://doi.org/10.1145/3309074.3309096

[96] G. P.-B.-I. S. P. at L. University and undefined 2019, "The parkerian hexad," cs.lewisu.edu, Accessed: Feb. 5, 2022. [Online]. Available: cs.lewisu.edu/mathcs/msis-projects/papers/georgiependerbey.pdf.

[97] Y. Cherdantseva and J. Hilton, "A reference model of information assurance & security," *Proceedings—2013 International Conference on Availability, Reliability and Security, ARES* 2013, pp. 546-555, 2013, doi: 10.1109/ARES.2013.72.

[98] "ISO—ISO/IEC 27000—key International Standard for information security revised." www.iso.org/news/ref2266.html (accessed Feb. 5, 2022).

TABLE 17

| Cybersecurity Topics and Groups | |
| --- | --- |
| Cybersecurity Topic | References |
| Access control | [44][81][86][87] |
| Assessment/Compliance | [44][81][87] |
| Assets | [86][87] |
| Audit | [81][84][85] |
| Awareness | [81][99] |
| Communications | [86][87] |
| Configuration | [81][86][87] |
| Contingency | [81][99][100] |
| Maintenance & Testing | [81][86][87] |
| Personnel | [99] |
| Physical | [81][99] |
| Planning & Requirements | [81][99][100] |

[44] "The MITRE Corporation." https://www.mitre.org/(accessed Apr. 14, 2021).

[81] G. Drivas, A. Chatzopoulou, L. Maglaras, C. Lambrinoudakis, A. Cook, and H. Janicke, "A nis directive compliant cybersecurity maturity assessment framework," *ieeexplore.ieee.org*, Accessed: November 2021. 15, [Online]. Available: https://ieeexplore.ieee.org/abstract/document/9202470/https://doi.org/10.1145/3309074.3309096

[86] Y. Maleh, A. Sahid, M. B.-EDPACS, and undefined 2021, "A MATURITY FRAMEWORK FOR CYBERSECURITY GOVERNANCE IN ORGANIZATIONS," *Taylor & Francis*, vol. 63, no. 6, pp. 1-22, 2021, doi: 10.1080/07366981.2020.1815354.

[87] O. O. Akinsanya, M. Papadaki, and L. Sun, "Towards a maturity model for health-care cloud security (M2HCS)," *Information and Computer Security*, vol. 28, no. 3, pp. 321-345, 2019, doi: 10.1108/ICS-05-2019-0060.

[84] H. L. S. Jara, H. B. P. Navarro, and J. Armas-Aguirre, "Cybersecurity and Privacy Capabilities Model for Data Management Against Cyber-Attacks in the Health Sector," *Smart Innovation, Systems and Technologies*, vol. 233, pp. 359-367, 2021, doi: 10.1007/978-3-030-75680-2_40.

[85] M. D. E. C. el Kettani and T. Debbagh, "NCSecMM: A national cyber security maturity model for an interoperable 'National cyber security' framework," *Proceedings of the European Conference on e-Government*, ECEG, pp. 236-247, 2009.

[86] Y. Maleh, A. Sahid, M. B.-EDPACS, and undefined 2021, "A MATURITY FRAMEWORK FOR CYBERSE-CURITY GOVERNANCE IN ORGANIZATIONS," *Taylor & Francis*, vol. 63, no. 6, pp. 1-22, 2021, doi: 10.1080/07366981.2020.1815354.

[87] O. O. Akinsanya, M. Papadaki, and L. Sun, "Towards a maturity model for health-care cloud security (M2HCS)," *Information and Computer Security*, vol. 28, no. 3, pp. 321-345, 2019, doi: 10.1108/ICS-05-2019-0060.

[99] C. Barria, D. Cordero, L. Galeazzi, and A. Acuña, "Proposal of a multi-standard model for measuring maturity business levels with reference to information security standards and controls," *Advances in Intelligent Systems and Computing*, vol. 1243 AISC, pp. 121-132, 2021, doi: 10.1007/978-3-030-53651-0_10.

[100] N. Moreira, E. Molina, J. Lázaro, . . . E. J. . . . and S. E., and undefined 2016, "Cyber-security in substation automation systems," *Elsevier*, Accessed: Nov. 15, 2021. [Online]. Available: https://www.sciencedirect.com/science/article/pii/S1364032115012034

Cybersecurity is structured around four elements that require protection: information, human factors, processes, and technologies, along with the interactions between these elements. The first element, information, encompasses meaningful data exchanged within an organization, representing valuable assets. The second element, people, includes all individuals involved in the organization. The third element, processes, refers to the practices adopted by the organization to ensure cybersecurity. The fourth element, technologies, consists of the hardware, software, networks, and systems used within the organization or by external entities. These elements, along with examples, are provided in Table 18.

TABLE 18

Cybersecurity Elements

| Element | Examples | References |
|---|---|---|
| Information | employees and customers data, sales reports, and expansion plans | [102] |
| People | rules creators, managers, and any user on the systems | [102][101][103] |
| Processes | email best practices, software usage regulations, and recurring procedures | [79][83][103] |
| Technologies | hardware, software, computers, networks, detecting systems, and protection systems | [102][101][103] |

[79] A. García, F. Dominguez, L. Calle, J. Martinez, and C. Raymundo, "Personal data protection maturity model for the micro financial sector in Peru," *International Journal of Engineering Research and Technology*, vol. 11, no. 4, pp. 649-660, 2018, doi: 10.1109/CATA.2018.8398649.

[83] M. Hamza, H. Hu, M. A. Akbar, F. Mehmood, Y. Hussain, and A. M. Baddour, "SIOT-RIMM: Towards Secure IoT-Requirement Implementation Maturity Model," *Pervasive Health: Pervasive Computing Technologies for Healthcare*, pp. 463-468, April 2020, doi: 10.1145/3383219.3383286.

[101] M. T.-2021 I. C. on Military and undefined 2021, "Cybersecurity as a New Type of Security and Its New Perception," *ieeexplore.ieee.org*, Accessed: Feb. 5, 2022. [Online]. Available: https://ieeexplore.ieee.org/abstract/document/9502751/

[102] M. Hentea, "Principles of Cybersecurity," 2021, Accessed: Feb. 5, 2022. [Online]. Available: https://ieeexplore.ieee.org/abstract/document/9415355/

[103] T. Campbell, "Standards, Frameworks, Guidelines, and Legislation," *Practical Information Security Management*, pp. 71-93, 2016, doi: 10.1007/978-1-4842-1685-9_6.

The characteristics of the cyber environment contribute to its complexity. The environment is intangible, with data being encoded and decoded as needed. It also features global accessibility without physical boundaries, rapid data transmission and processing, and constant availability. Users can change or hide their identities and operate anonymously. These characteristics define cyberspace and the data generated by cyber devices, which must be protected.

In some existing methods, data sources were classified into passive and active types. Passive data can be analysed offline, while active data requires real-time analysis. Understanding the types of data sources enables the selection of appropriate cybersecurity measures. Examples of passive and active data sources are presented in Table 19.

TABLE 19

Examples of Passive and Active Data sources

| Source Type | Source Name | Examples |
|---|---|---|
| Passive | Computer-based | "IP location, computer security health certificates, keyboard patterns, WAP data" |
| | Mobile-based | "GPS location, network location, WAP data" |
| | Physical | "time and location of physical access to the network" |
| | Human Resource | "organizational role and privilege of the user" |
| | Travel | "travel patterns, destinations, and itineraries" |
| | System | "network logs, threat database, application access data" |
| | From external sources | "rogue IPs, external threats" |
| Active | One-time passwords | "for online access" |
| | Credential data Digital Certificates | "username and password" |
| | Knowledge-based | "What is your typical activity on Saturdays 3 PM to 6 PM?" |
| | Biometric | "fingerprint, facial recognition, voice recognition" |
| | Social media | "Twitter, Facebook, internal office network" |

The types and levels of potential attacks vary depending on the nature of the systems and the volume of data exchanged between system components. The present analysis identifies various cybersecurity issues and attacks, as shown in Table 41, below. These issues are subject to continuous updates, as new attacks and countermeasures emerge to protect organizational assets.

Multiple tools, including software and hardware systems, aim to enhance cybersecurity within organizations. Durmus et al. provide a list of cybersecurity tools, which include antivirus systems, data leakage prevention systems, firewalls, intrusion prevention systems (IPS), and intrusion detection systems (IDS), among others.

The analysis reveals that many well-recognized organizations have contributed to standardizing measurable elements, which are employed by various maturity models for security regulations and guidelines. The goal is to achieve quality standards and ensure the ability for measurements and benchmarking. Standards organizations have gained credibility through numerous projects implemented success- fully over the years. Among the most widely adopted standards are the ISO/IEC 27000 Series, which provide guidelines for creating new information security manage- ment systems. Additional standards are listed in Table 20.

TABLE 20

Security Standards in Maturity Models

| Standard | Model Ref. |
|---|---|
| ISO/IEC 27000 Series | [18] [59] [45] [68] [85] [90] |
| ISO 9000 | [59] |
| ISO 21827 | [55] |
| COBIT | [18][53][63] |
| DFARS 252.204-7012 | [53] |
| FFIEC IT Handbook | [63] |
| IPPF & OWASP | [31] |
| ITU | [85] |

[18] "Developing Maturity Models for IT Management-A Procedure Model and its Application 1 The importance of maturity models for IT management", doi: 10.1007/ s12599-009-0044-5.

[31] R. Rojas, A. Muedas, and D. Mauricio, "Security Maturity Model of Web Applications for Cyber Attacks," 2019. Accessed: Apr. 14, 2021. [Online]. Available: https://doi.org/10.1145/3309074.3309096

[59] Vicente Aceituno Canal, "ISM3 1.0," Citeseer, 2009, Accessed: Nov. 28, 2021. [Online]. Available: http:// citeseerx.ist.psu.edu/viewdoc/ download?doi=10.1.1.674.7546&rep=rep1&type=pdf

[45] "Making Security Measurable MSM Archive." http:// makingsecuritymeasurable.mitre.org/directory/archive/ (accessed Apr. 15, 2021).

[53] "Cybersecurity Maturity Model Certification (CMMC)," 2020. https://www.acq.osd.mil/cmmc/(ac- cessed Nov. 28, 2021).

[63] "Federal Financial Institutions Examination Council (FFIEC)," 2017. https://www.ffiec.gov/cyberassessment- tool.htm (accessed Nov. 29, 2021).

[55] K. Ferraiolo, "The Systems Security Engineering Capa- bility Maturity Model."

[68] J. Mayer and L. L. Fagundes, "A model to assess the maturity level of the risk management process in infor- mation security," 2009 *IFIP IEEE International Sympo- sium on Integrated Network Management-Workshops, IM* 2009, no. 5, pp. 61-70, 2009, doi: 10.1109/ INMW.2009.5195935.

[85] M. D. E. C. el Kettani and T. Debbagh, "NCSecMM: A national cyber security maturity model for an interoper- able 'National cyber security' framework," *Proceedings of the European Conference on e-Government*, ECEG, pp. 236-247, 2009.

[90] W. Zhao, G. W.-P. of the 50th Hawaii, and undefined 2017, "An evolution roadmap for community cyber secu- rity information sharing maturity model," *scholarspace- .manoa.hawaii.edu*, Accessed: 2021. November 15, [On- line]. Available: https://scholarspace.manoa.hawaii.edu/ handle/10125/41443

Category 1 addresses practices that establish the organi- zation's cybersecurity baseline. These practices include fun- damental concepts, strategic planning, directions, guide- lines, and policies. Two subcategories are identified within Category 1: "Strategy," which involves the strategic plan- ning and governance of cybersecurity to ensure that confi- dentiality, integrity, and availability (CIA) are incorporated into organizational plans; and "Policy," which includes documents that outline regulations, rules, and requirements governing operations and workspace. These policies must be evaluated to ensure that tasks reflect cybersecurity principles and define expectations and limitations.

Category 2 focuses on the secure exchange and storage of information in various forms while addressing the principles and goals of cybersecurity. This category contains two subcategories: "Storing Data," which addresses the secure storage and management of the organization's data, includ- ing raw data, financial data, and customer data; and "Sharing Information," which covers secure data exchange between departments and external parties, ensuring that the process adheres to secure information-sharing practices. Addition- ally, Category 2 includes the protection of assets from potential threats, addressing the principles, goals, and objec- tives of cybersecurity, which include confidentiality, pri- vacy, integrity, availability, non-repudiation, authenticity, trustworthiness, auditability, accountability, reliability, encryption, and cryptography.

Category 3 pertains to human security and access man- agement. This category highlights the importance of training and awareness in addressing cybersecurity risks. Training and awareness are critical prevention strategies that must be implemented across all levels of stakeholders. Category 3 consists of two subcategories: "Training and Awareness," which emphasizes the need for people to understand the level of threat, current trends, and attack impacts, as well as address vulnerabilities; and "Access Management," which involves creating and managing identities for individuals who need access to organizational resources. Access man- agement covers authentication, authorization, password management, and login processes, which are essential ele- ments of security. The subcategory also includes practices such as personnel security, accounts management, monitor- ing, and control of privileged accounts.

Category 4 addresses software engineering and applica- tion security. This category encompasses the role of software engineering in preventing cyberattacks, particularly during the software development lifecycle. Category 4 outlines best practices in software engineering that aim to identify risks and mitigate threats early in the development process. Sev- eral aspects of software engineering are covered, including benchmarking, secure requirements, secure design, secure implementation, code and version control, secure testing, and secure deployment. In addition, Category 4 includes applications security, focusing on the protection of email, web, and mobile applications.

Category 5 focuses on risks analysis and mitigation. This category addresses risks, threats, and vulnerabilities, as well as the best practices necessary to prevent, handle, and recover from cybersecurity threats. These practices are criti- cal in managing risks both before, during, and after an attack. Subcategories within Category 5 include attack tax- onomy, contingency planning, vulnerability assessment and remediation, cyberthreat information sharing, data recovery, malware management, incident response, penetration test- ing, vulnerability management, and remediation strategies.

Category 6 pertains to infrastructure and asset security. Given the critical role infrastructure plays in cybersecurity, this category outlines best practices that apply to different types of infrastructures. Customized practices are required based on the specific nature of the infrastructure involved. For example, customized practices for industrial environments and critical infrastructure are essential. Category 6 addresses several aspects, including physical security, resource security, systems security, operations and process security, and network security. In addition, Category 6 covers wireless security, communications protection, transmission protection, endpoint protection, and control over ports, protocols, and services.

Category 7 completes the cybersecurity requirements by ensuring that follow-up measures are in place to maintain the secure status of the organization. Verification, validation, and evaluation processes are necessary to confirm the secure state of policies and operations. Category 7 addresses elements such as logging, auditing, monitoring, event management, log analysis, maintenance utilities, third-party assessments, compliance, configuration management, updating, and upgrading processes.

Each of the categories mentioned, Category 1 through Category 7, offers a comprehensive structure for the various facets of cybersecurity management, from strategic planning and data protection to human security, software engineering, risk mitigation, infrastructure, and operational security. The categories are designed to be adaptable based on the specific technologies used, but they also highlight the necessity for customization to address unique organizational needs.

Figure 10:
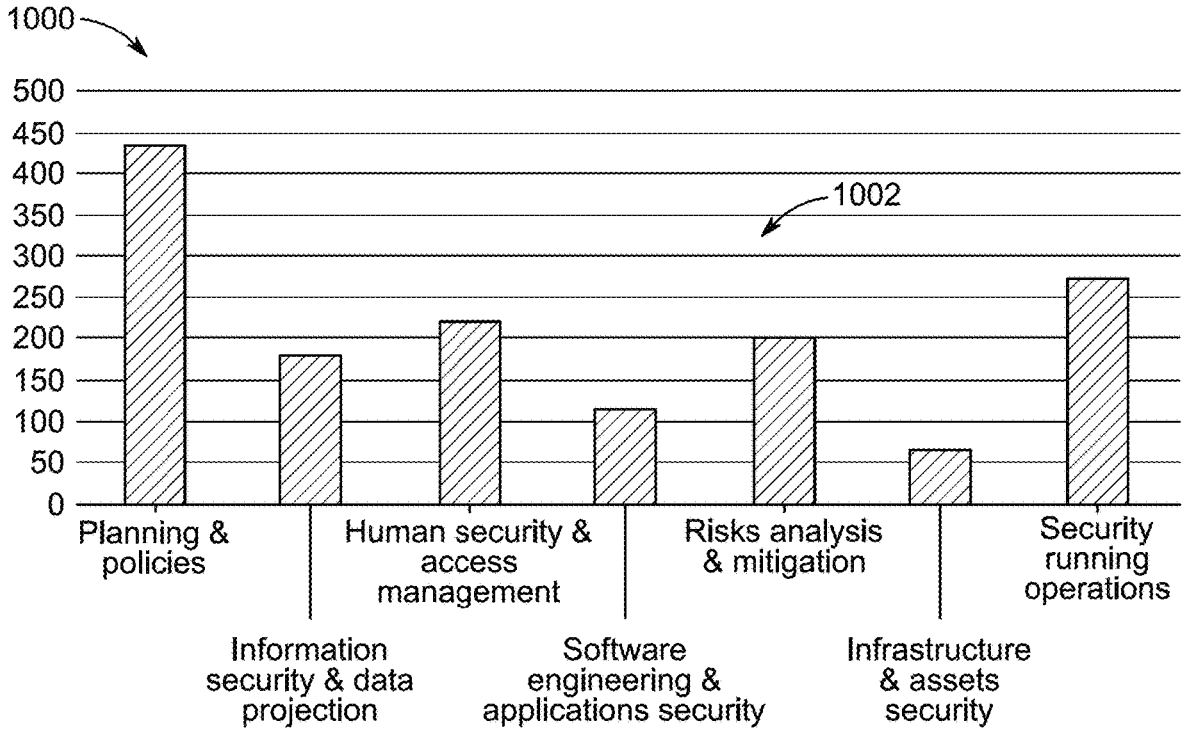
FIG. 10 illustrates a bar chart representing the distribution of cybersecurity best practices across several categories, in accordance with an exemplary aspect of the disclosure.

FIG. 10 illustrates a bar chart, designated by reference numeral 1000, representing the distribution of cybersecurity best practices across several categories. The horizontal axis of bar chart 1000 shows various cybersecurity categories, including Planning and Policies, Information Security and Data Protection, Human Security and Access Management, Software Engineering and Applications Security, Risks Analysis and Mitigation, Infrastructure and Assets Security, and Security Running Operations. The vertical axis of bar chart 1000 reflects the number of best practices derived from relevant studies, displayed in increments ranging from 0 to 500.

The bar representing the category of Planning and Policies, identified by reference numeral 1002, highlights the highest number of cybersecurity best practices, with approximately 400 practices. Each of the other categories in bar chart 1000 displays varying numbers of best practices, ranging between approximately 100 and 350, indicating the focus of best practices across these different cybersecurity domains.

Bar chart 1000 clearly visualizes the different focus areas, including the category of Information Security and Data Protection, Human Security and Access Management, Software Engineering and Applications Security, and other categories, with respective emphasis based on the extracted best practices. Each category relates to specific cybersecurity practices, such as strategic planning for cybersecurity policies, management of access controls, risk analysis, mitigation techniques, and ensuring infrastructure security.

In addition, bar chart 1000 effectively illustrates the distribution and prioritization of these best practices within each category, which is further analyzed and described in the accompanying tables and discussions provided within the disclosure. The number of practices extracted from authoritative sources, such as NIST and ISO standards, for each category is presented in relevant tables for comprehensive assessment of best practices within the cybersecurity domain.

In reviewing the compiled data, an aggregate of 1482 cybersecurity best practices have been catalogued. These practices span across both generic and specialized categories. Generic best practices encompass broad security measures not confined to specific sectors, whereas specialized best practices target precise domains or aspects.

Specialized best practices detailed in Table 21 exemplify this targeted approach with varied applications across mobile, behaviors, access control, data sharing, email security, home and PC security, website cybersecurity, infrastructure, the Internet of Things, software engineering, automated vehicles, and domain-specific governance and regulations.

TABLE 21

| Specialized Best Practices Examples | | |
| --- | --- | --- |
| Topic Name | Sources | #Practices |
| Mobile | [85][86] | 28 |
| Behaviors | [87] | 20 |
| Access Control | [88][89] | 11 |
| Data and Sharing | [107][123][106] | 33 |
| Email Security | [88][124] | 8 |
| Home and PC | [88] | 35 |
| Websites Cybersecurity | [125] | 10 |
| Infrastructure | [105] | 47 |
| Internet of Things | [94] | 6 |
| Software Engineering | [95] [96] [89] | 23 |
| Automated Vehicles | [97] | 10 |
| Specific Domain | [98] [99] [100] | 34 |
| Governance and Regulations | [57][84][86][88][90][100][101] [102][103][104][105] | 88 |

[57] N. Sjelin and G. White, "The Community Cyber Security Maturity Model," Cyber-Physical Security, pp. 161-183, 2017, doi: 10.1007/978-3-319-32824-9_8.

[84] H. L. S. Jara, H. B. P. Navarro, and J. Armas-Aguirre, "Cybersecurity and Privacy Capabilities Model for Data Management Against Cyber-Attacks in the Health Sector," Smart Innovation, Systems and Technologies, vol. 233, pp. 359-367, 2021, doi: 10.1007/978-3-030-75680-2_40.

[85] M. D. E. C. el Kettani and T. Debbagh, "NCSecMM: A national cyber security maturity model for an interoperable 'National cyber security' framework," Proceedings of the European Conference on e-Government, ECEG, pp. 236-247, 2009.

[86] Y. Maleh, A. Sahid, M. B.-EDPACS, and undefined 2021, "A MATURITY FRAMEWORK FOR CYBERSECURITY GOVERNANCE IN ORGANIZATIONS," Taylor & Francis, vol. 63, no. 6, pp. 1-22, 2021, doi: 10.1080/07366981.2020.1815354.

[87] O. O. Akinsanya, M. Papadaki, and L. Sun, "Towards a maturity model for health-care cloud security (M2HCS)," Information and Computer Security, vol. 28, no. 3, pp. 321-345, 2019, doi: 10.1108/ICS-05-2019-0060.

[88] S. S. Veerapaneni and K. R. Sekhar, "A systematic study of asset management using hybrid cyber security maturity model," International Journal of Recent Technology and Engineering, vol. 7, no. 6, pp. 140-145, April 2019.

[89] R. A.-I. I. C. on T. for and undefined 2013, "A dynamic capability maturity model for improving cyber security," ieeexplore.ieee.org, Accessed: Nov. 29, 2021. [Online]. Available: https://ieeexplore.ieee.org/abstract/document/6699005/

[90] W. Zhao, G. W.-P. of the 50th Hawaii, and undefined 2017, "An evolution roadmap for community cyber security information sharing maturity model," scholarspace- .*manoa.hawaii.edu*, Accessed: 2021. November 15, [Online]. Available: https://scholarspace.manoa.hawaii.edu/handle/10125/41443

[94] B. G. Glaser and A. L. Strauss, *Discovery of grounded theory: Strategies for qualitative research*. Taylor and Francis, 2017. doi: 10.4324/9780203793206.

[95] A. Strauss and J. Corbin, *Basics of qualitative research*. 1990. Accessed: Feb. 8, 2022. [Online]. Available: https://genderopen-develop.ub.huberlin.de/bitstream/handle/25595/12/whatsnew7.pdf?sequence=1

[96] G. P.-B.-I. S. P. at L. University and undefined 2019, "The parkerian hexad," *cs.lewisu.edu*, Accessed: Feb. 5, 2022. [Online]. Available: http://cs.lewisu.edu/mathcs/msisprojects/papers/georgiependerbey.pdf

[97] Y. Cherdantseva and J. Hilton, "A reference model of information assurance & security," *Proceedings—2013 International Conference on Availability, Reliability and Security, ARES* 2013, pp. 546-555, 2013, doi: 10.1109/ARES.2013.72.

[98] "ISO—ISO/IEC 27000—key International Standard for information security revised." https://www.iso.org/news/ref2266.html (accessed Feb. 5, 2022).

[99] C. Barria, D. Cordero, L. Galeazzi, and A. Acuña, "Proposal of a multi-standard model for measuring maturity business levels with reference to information security standards and controls," *Advances in Intelligent Systems and Computing*, vol. 1243 AISC, pp. 121-132, 2021, doi: 10.1007/978-3-030-53651-0_10.

[100] N. Moreira, E. Molina, J. Lazaro, . . . . E. J . . . and S. E., and undefined 2016, "Cyber-security in substation automation systems," *Elsevier*, Accessed: Nov. 15, 2021. [Online]. Available: https://www.sciencedirect.com/science/article/pii/S1364032115012034

[101] M. T.-2021 I. C. on Military and undefined 2021, "Cybersecurity as a New Type of Security and Its New Perception," ieeexplore.ieee.org, Accessed: Feb. 5, 2022. [Online]. Available: https://ieeexplore.ieee.org/abstract/document/9502751/

[102] M. Hentea, "Principles of Cybersecurity," 2021, Accessed: Feb. 5, 2022. [Online]. Available: https://ieeexplore.ieee.org/abstract/document/9415355/

[103] T. Campbell, "Standards, Frameworks, Guidelines, and Legislation," *Practical Information Security Management*, pp. 71-93, 2016, doi: 10.1007/978-1-4842-1685-9_6.

[104] S. Curry, E. Kirda, E. Schwartz, H. Stewart, and A. Yoran, "Big Data Fuels Intelligence-Driven Security," *RSA Security Brief*. January 2013.

[105] Ö. Durmus, A. Varol, N. V.-2019 1st I. Informatics, and undefined 2019, "Infrastructure Requirements for Cybersecurity," *ieeexplore.ieee.org*, Accessed: Nov. 15, 2021. [Online]. Available: https://ieeexplore.ieee.org/abstract/document/8965503/

[106] S. Ghernaouti, . . . . L. C.-2019 3rd C. S. in, and undefined 2019, "Information sharing in cybersecurity: Enhancing security, trust and privacy by capacity building," *ieeexplore.ieee.org*, Accessed: Nov. 15, 2021. [Online]. Available: https://ieeexplore.ieee.org/abstract/document/9108944/

[107] T. Mahmood, U. A.-2013 2nd national conference on, and undefined 2013, "Security analytics: Big data analytics for cybersecurity: A review of trends, techniques and tools," ieeexplore.ieee.org, Accessed: Nov. 15, 2021. [Online]. Available: https://ieeexplore.ieee.org/abstract/document/6725337/

[123] M. Angelini, C. Ciccotelli, A. Marchetti-Spaccamela, L. Querzoni, and L. Franchina, "Italian National Frame-work for Cybersecurity and Data Protection," *Springer*, vol. 12121 LNCS, pp. 127-142, 2020, doi: 10.1007/978-3-030-55196-4_8.

[124] M. S.-N. Security and undefined 2005, "Email security best practice," *Elsevier*, Accessed: Nov. 13, 2021. [Online]. Available: https://www.sciencedirect.com/science/article/pii/S1353485805703111

[125] J. Zhao, S. Z.-G. I. Quarterly, and undefined 2010, "Opportunities and threats: A security assessment of state e-government websites," *Elsevier*, Accessed: Nov. 15, 2021. [Online]. Available: https://www.sciencedirect.com/science/article/pii/S0740624X09001099

In exploring the utility sector, a specific methodology begins with an evaluation of existing guidelines, assessing business and process needs, and subsequently identifying critical organizational assets. The Cybersecurity Maturity Assessment Framework (CMAF) aligns with specified requirements, focusing on identification, protection, and response tactics.

Cybersecurity management is crucial for operational viability. Recommended guidelines, which span general usability, technological complexity, organizational complexity, and task specificity, address this. Cybersecurity frameworks and standards continually evolve, driven by prominent organizations setting benchmarks such as ISO and NIST standards. Specializations and domains within these frameworks are outlined in Table 22, covering extensive cybersecurity facets from access management to physical and environmental security.

TABLE 22

| Specializations is NIST 800-53 and ISO 27001:27002 | | |
| --- | --- | --- |
| Category/Domain | NIST 800-53 | ISO 27001:27002 |
| Access Management | Access Control Identification and Authentication Security Assessment and Authorization | Access Control |
| People | Awareness and Training Personnel Security | Human Resource Security |
| Risks | Risk Assessment Contingency Planning Incident Response | Information Security Incident Management |
| Information | Media Protection | Information Security Policies Organization of Information Security Cryptography |
| Governance | Planning Program Management | Information Security Aspect of Information Business Continuity Management |
| Systems | System and Information Security System and Service Acquisition System and Communication Protection | System Acquisition, Development, and Maintenance |
| Running Operations | Audit and Accountability Maintenance | Compliance Operation Security |
| Assets | Physical/Environmental Security | Asset Management Physical and Environmental Security |
| Others | Configuration Management | Supplier Relationships Communication Security |

An array of entities adapts these frameworks to craft bespoke cybersecurity strategies, emphasizing the adaptability of the guidelines to various organizational needs. Notably, significant contributions have been made towards a conceptual model that integrates 21 security categories, each underpinned by distinct practices.

Substantial best practices are identified within the NICE Cybersecurity Workforce Framework, illustrating a comprehensive distribution across various security categories as depicted in FIG. 10.

The analysis underscores the dual nature of cybersecurity best practices, both generic for broad application and specialized for targeted needs. While many practices span various infrastructural elements, there remains a gap in practices specifically addressing digital transportation.

Figure 11:
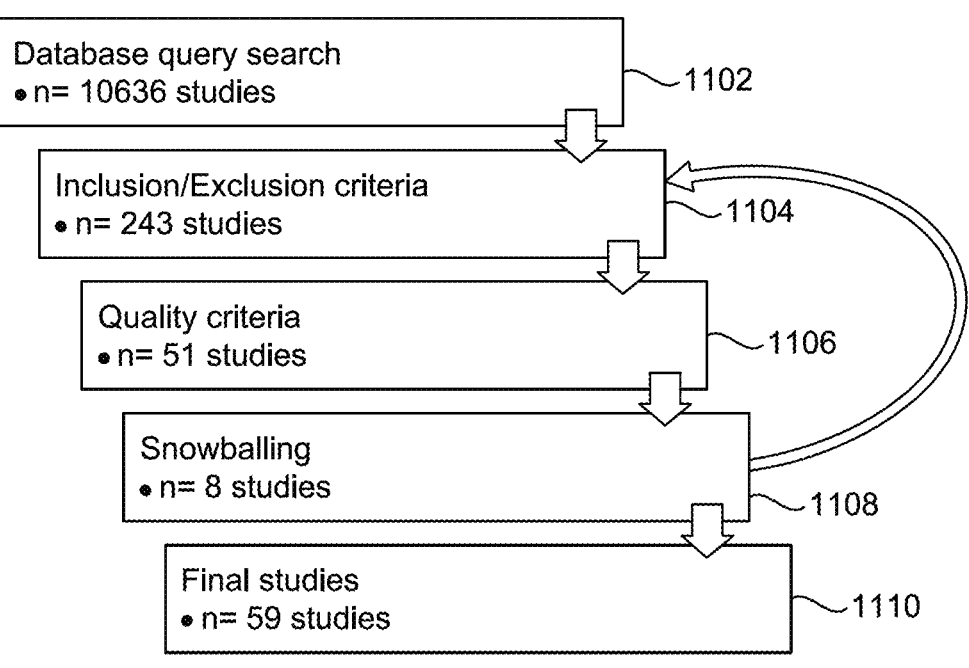
FIG. 11 illustrates a flow diagram illustrating a selection process for the Digital Transformation Maturity Models Multivocal Literature Review (MLR), in accordance with an exemplary aspect of the disclosure.

Referring to FIG. 11, the flow diagram 1100 depicts the various stages that may be involved in the selection process for the Digital Transformation Maturity Models Multivocal Literature Review (MLR). The first component of the diagram is identified as Database Query Search 1102, which indicates an initial collection of 10,636 studies. The studies retrieved during this search may be subjected to a filtering process based on Inclusion/Exclusion Criteria 1104, resulting, for example, in the selection of 243 studies.

Subsequently, these filtered studies may undergo further assessment based on Quality Criteria 1106, reducing the count to 51 studies. Following this, a snowballing technique may be employed, as indicated by Snowballing 1108, leading to the identification and inclusion of 8 additional studies. Finally, after these iterative stages, the process may conclude with Final Studies 1110, comprising a total of 59 studies. This series of sequential steps outlines the comprehensive approach adopted to filter, assess, and finalize the studies for the Digital Transformation MLR2 as represented in FIG. 11.

The present embodiment as described in FIG. 11 pertains to the completion of a second multivocal literature review (MLR), which was performed in accordance with the methodology described earlier. The principal terms necessary for the search are derived from research questions, as well as any relevant synonyms, as shown in Table 23. The search string for the digital transformation MLR includes terms related to digital transformation, maturity models, frameworks, guidelines, and best practices. After verification of these keywords through a preliminary search in various databases, the final search string was constructed to optimize the results. The customized search strings for each database are illustrated in the appended section.

TABLE 23

| Digital Transformation MLR Keywords and Synonyms | |
| --- | --- |
| Keyword | Synonyms |
| digital transformation | digitaliz* |
| maturity model | (framework OR guideline OR model OR benchmark OR readiness) |
| best practices | best (approach* OR technique* OR method*) |

The selection process may start with an initial retrieval of, for example, 10,636 studies, as shown in Table 24. These studies can undergo an inclusion and exclusion criteria assessment during phase 1, which is based on the title, abstract, and, in some cases, the content of the studies. Following this phase, the number of studies can be reduced to 243. Subsequently, the quality assessment criteria may be applied in phase 2, leaving 51 studies that passed the quality threshold. Finally, a snowballing method may be employed, which involved reading selected references from the chosen papers, applying both inclusion/exclusion and quality assessment criteria. This process adds an additional eight studies, as shown in FIG. 11.

TABLE 24

Data Sources and the Number of Studies in Each Iteration for MLR2

| Source Category | Name | URL | Initial | After phase 1 | After phase 2 |
| --- | --- | --- | --- | --- | --- |
| | | | | Number of Studies | |
| Publisher | IEEE Xplore | ieeexplore.ieee.org | 538 | 36 | 9 |
| | ACM Digital Library | dl.acm.org | 16 | 8 | 1 |
| | SpringerLink | link.springer.com | 6024 | 57 | 19 |
| | Elsevier/ ScienceDirect | elsevier.com | 2714 | 46 | 12 |
| Search Engine | Scopus | scopus.com | 448 | 33 | 4 |
| | Web of Science | webofknowledge.com | 296 | 14 | 1 |
| | Google Scholar | scholar.google.com | 600 | 49 | 5 |
| | Total | | 10636 | 243 | 51 |

Table 24 provides an overview of the data sources and the number of studies included at each stage of the selection process for the digital transformation MLR. The databases that may be queried include IEEE Xplore, ACM Digital Library, SpringerLink, Elsevier/ScienceDirect, Scopus, Web of Science, and Google Scholar, resulting in a final tally of studies used for further analysis. The final related studies count relevant to the research questions is shown in Table 25, which outlines the studies aligned with each research question.

TABLE 25

Number of Final Selected Studies Per Each Research Question for MLR2

| Related To RQ | Number of Studies |
| --- | --- |
| RQ4 | 26 |
| RQ5 | 38 |

Data extraction is performed on the selected studies, with relevant data exported to a Microsoft Excel sheet where necessary. The form used for data extraction is consistent with that described earlier in Table 6. This allows for detailed review and summarization of the extracted digital transformation maturity models, as shown in Table 26, which lists the total of 26 digital transformation maturity models.

TABLE 26

Extracted Digital Transformation Maturity Models

| # | Model Name | Abb. | Year | Levels | Ref |
| --- | --- | --- | --- | --- | --- |
| 1 | Staged digital transformation capability maturity model framework | | 2019 | 6 | [141] |
| 2 | Digital Transformation Maturity Model for IT Companies | | 2020 | NA | [142] |
| 3 | Digitalization Maturity Model for the manufacturing sector | | 2018 | 4 | [143] |
| 4 | Digital Maturity and Readiness Model for Kazakhstan SMEs | | 2021 | 6 | [144] |

TABLE 26-continued

Extracted Digital Transformation Maturity Models

| # | Model Name | Abb. | Year | Levels | Ref |
|---|------------|------|------|--------|-----|
| 5 | Maturity Model for Manufacturing 4.0 in Emerging Countries | | 2020 | 5 | [145] |
| 6 | Assessing Industry 4.0 Readiness in Manufacturing Companies from Serbia | | 2020 | 4 | [146] |
| 7 | Smart Manufacturing Maturity Model for SMEs | SM3E | 2018 | 5 | [147] |
| 8 | Maturity Model for Intra-logistics 4.0 in SME | | 2019 | 5 | [147] |
| 9 | SPICE-based Industry 4.0-MM | 4.0-MM | 2017 | 4 | [148] |
| 10 | Maturity and Readiness Model for Industry 4.0 Strategy | | 2018 | 4 | [149] |
| 11 | Readiness and Maturity Assessment Model to Measure the Industry 4.0 Ecosystem | | 2021 | 5 | [150] |
| 12 | Integrated work system design in digitalized production companies | InAsPro | 2021 | 4 | [151] |
| 13 | The Industry 4.0 maturity assessment model and solution | CCMS 2.0 | 2021 | 5 | [152] |
| 14 | Three Stage Maturity Model in SME's towards Industry 4.0 | | 2016 | 5 | [153] |
| 15 | Framework for digital transformation based on the concepts of capability maturity and alignment | Industrie 4.0 roadmap | 2016 | 4 | [154] |
| 16 | Industry 4.0 Maturity Model | | 2016 | 5 | [155] |
| 17 | A maturity assessment approach for conceiving context-specific roadmaps in the Industry 4.0 era | | 2019 | 6 | [156] |
| 18 | Logistics 4.0 maturity model | | 2019 | 5 | [157] |
| 19 | 360 Digital Maturity Assessment | | 2018 | 6 | [158] |
| 20 | A Digital Maturity Model for Telecommunications Service Providers | | 2016 | 6 | [159] |
| 21 | The Digital Maturity Model 4.0 | | 2019 | 4 | [160] |
| 22 | Maturity Model of Digital Strategizing | MMDS | 2017 | 3 | [161] |
| 23 | Digital REadiness Assessment MaturitY model | DREAMY | 2017 | 5 | [162], [163] |
| 24 | System Integration Maturity Model Industry 4.0 | SIMMI 4.0 | 2016 | 5 | [164] |
| 25 | IMPULS-Industrie 4.0 Readiness | IMPULS | 2015 | 5 | [165] |
| 26 | Industry 4.0 Readiness Assessment for South African Industries | | 2019 | 6 | [166] |

[141] T. Aguiar, S. B. Gomes, P. R. da Cunha, and M. M. da Silva, "Digital transformation capability maturity model framework," *Proceedings—2019 IEEE 23rd International Enterprise Distributed Object Computing Conference, EDOC* 2019, no. Section VI, pp. 51-57, 2019, doi: 10.1109/EDOC.2019.00016.

[142] T. Gollhardt, S. Halsbenning, A. Hermann, A. Karsakova, and J. Becker, "Development of a Digital Transformation Maturity Model for IT Companies," *Proceedings—2020 IEEE 22nd Conference on Business Informatics, CBI* 2020, vol. 1, pp. 94-103, June 2020, doi: 10.1109/CBI49978.2020.00018.

[143] L. Canetta, A. Barni, and E. Montini, "Development of a Digitalization Maturity Model for the Manufacturing Sector," 2018 *IEEE International Conference on Engineering, Technology and Innovation, ICE/ITMC* 2018—*Proceedings,* 2018, doi: 10.1109/ICE.2018.8436292.

[144] A. Yezhebay, V. Sengirova, D. Igali, Y. O. Abdallah, and E. Shehab, "Digital Maturity and Readiness Model for Kazakhstan SMEs," SIST 2021—2021 *IEEE International Conference on Smart Information Systems and Technologies,* April 2021, doi: 10.1109/SIST50301.2021.9465890.

[145] R. G. G. Caiado, L. F. Scavarda, D. L. de M. Nascimento, P. Ivson, and V. H. C. Cunha, "A Maturity Model for Manufacturing 4.0 in Emerging Countries," pp. 393-402, December 2018, doi: 10.1007/978-3-030-23816-2_38.

[146] V. D. Majstorović, R. M. Mitrović, and Ž. Z. Mišković, "Assessing Industry 4.0 Readiness in Manufacturing Companies from Serbia," *Lecture Notes in Mechanical Engineering,* pp. 69-79, 2020, doi: 10.1007/978-3-030-46212-3_4.

[147] K. Krowas and R. Riedel, "Planning Guideline and Maturity Model for Intra-logistics 4.0 in SME," *IFIP Advances in Information and Communication Technology,* vol. 567, pp. 331-338, September 2019, doi: 10.1007/978-3-030-29996-5_38.

[148] E. Gökalp, U. Şener, and P. E. Eren, "Development of an Assessment Model for Industry 4.0: Industry 4.0-MM," *Communications in Computer and Information Science,* vol. 770, pp. 128-142, 2017, doi: 10.1007/978-3-319-67383-7_10.

[149] K. Yagiz, A. Ustundag, and E. Cevikcan, *Maturity and Readiness Model for Industry* 4.0 *Strategy Implementation of Industry* 4.0 *strategies require wide applications in companies.* 2017. [Online]. Available: https://doi.org/10.1007/978-3-319-57870-5_4

[150] A. Govindasamy and A. Arularasan, "Readiness and Maturity Assessment Model to Measure the Industry 4.0 Ecosystem," *Lecture Notes in Electrical Engineering,* vol. 355, pp. 57-67, 2021, doi: 10.1007/978-981-16-1244-2_5.

[151] C. Siedler et al., "Maturity model for determining digitalization levels within different product lifecycle phases," *Production Engineering,* vol. 15, no. 3-4, pp. 431-450, June 2021, doi: 10.1007/S11740-021-01044-4/FIGURES/10.

[152] G. Nick, T. Kovács, A. Ko, and B. Kádár, "Industry 4.0 readiness in manufacturing: Company Compass 2.0, a renewed framework and solution for Industry 4.0 maturity assessment," *Procedia Manufacturing,* vol. 54, pp. 39-44, January 2021, doi: 10.1016/J.PROMFG.2021.07.007.

[153] J. Ganzarain, N. E.-J. of I. E. and, and undefined 2016, "Three stage maturity model in SME's toward industry 4.0," *econstor.eu,* 2073, doi: 10.3926/jiem.2073.

[154] A. Issa, B. Hatiboglu, A. Bildstein, and T. Bauernhansl, "Industrie 4.0 roadmap: Framework for digital transformation based on the concepts of capability maturity and alignment," *Procedia CIRP,* vol. 72, pp. 973-978, January 2018, doi: 10.1016/J.PROCIR.2018.03.151.

[155] A. Schumacher, S. Erol, and W. Sihn, "A Maturity Model for Assessing Industry 4.0 Readiness and Maturity of Manufacturing Enterprises," *Procedia CIRP,* vol. 52, pp. 161-166, January 2016, doi: 10.1016/J.PROCIR.2016.07.040.

[156] M. Colli, U. Berger, M. Bockholt, O. Madsen, C. Møller, and B. V. Wæhrens, "A maturity assessment approach for conceiving context-specific roadmaps in the Industry 4.0 era," *Annual Reviews in Control,* vol. 48, pp. 165-177, January 2019, doi: 10.1016/J.ARCONTROL.2019.06.001.

61

[157] J. Olesskόw-Szłapka, H. Wojciechowski, R. Domański, and G. Pawłowski, "Logistics 4.0 Maturity Levels Assessed Based on GDM (Grey Decision Model) and Artificial Intelligence in Logistics 4.0-Trends and Future Perspective," *Procedia Manufacturing*, vol. 39, pp. 1734-1742, January 2019, doi: 10.1016/J.PROMFG.2020.01.266.

[158] M. Colli, O. Madsen, U. Berger, C. Møller, B. V. Wæhrens, and M. Bockholt, "Contextualizing the outcome of a maturity assessment for Industry 4.0," *IFAC-PapersOnLine*, vol. 51, no. 11, pp. 1347-1352, January 2018, doi: 10.1016/J.IFACOL.2018.08.343.

[159] O. Valdez-de-Leon, "A Digital Maturity Model for Telecommunications Service Providers," *Technology Innovation Management Review*, vol. 6, no. 8, pp. 19-32, 2016, doi: 10.22215/timreview1008.

[160] K. S. R. Warner and M. Wäger, "Building dynamic capabilities for digital transformation: An ongoing process of strategic renewal," *Long Range Planning*, vol. 52, no. 3, pp. 326-349, June 2019, doi: 10.1016/J.LRP.2018.12.001.

[161] E. Boström and O. C. Celik, "Towards a Maturity Model for Digital Strategizing: A qualitative study of how an organization can analyze and assess their digital business strategy," pp. 30-2017, 2017, Accessed: Feb. 13, 2022. [Online]. Available: http://urn.kb.se/resolve?urn-urn: nbn: se: umu: diva-136736

[162] A. de Carolis, M. MacChi, E. Negri, and S. Terzi, "Guiding manufacturing companies towards digitalization a methodology for supporting manufacturing companies in defining their digitalization roadmap," 2017 *International Conference on Engineering, Technology and Innovation: Engineering, Technology and Innovation Management Beyond 2020: New Challenges, New Approaches, ICE ITMC 2017—Proceedings*, vol. 2018-January, pp. 487-495, February 2018, doi: 10.1109/ICE.2017.8279925.

[163] A. de Carolis, M. Macchi, E. Negri, and S. Terzi, "A Maturity Model for Assessing the Digital Readiness of Manufacturing Companies," *IFIP Advances in Information and Communication Technology*, vol. 513, pp. 13-20, 2017, doi: 10.1007/978-3-319-66923-6_2.

[164] C. Leyh, K. Bley, T. Schaffer, and S. Forstenhausler, "SIMMI 4.0-a maturity model for classifying the enterprise-wide it and software landscape focusing on Industry 4.0," *Proceedings of the* 2016 *Federated Conference on Computer Science and Information Systems, FedCSIS* 2016, vol. 8, pp. 1297-1302, 2016, doi: 10.15439/2016F478.

[165] K. Lichtblau et al., "IMPULS-Industrie 4.0-Readiness," 2015. http://www.impuls-stiftung.de/documents/3581372/4875835/Industrie+4.0+Readniness+IMPULS+Studie+Oktober+2015.pdf (accessed Feb. 13, 2022).

[166] W. Maisiri and L. van Dyk, "Industry 4.0 readiness assessment for South African industries," *South African Journal of Industrial Engineering*, vol. 30, no. 3, pp. 134-148, November 2019, doi: 10.7166/30-3-2231.

The models range from various industries and geographies, such as a staged digital transformation capability maturity model (CMM) framework, a digital transformation maturity model for IT companies, and a digitalization maturity model for the manufacturing sector. The details of each model, including the abbreviation, year of release, and maturity levels, are also indicated.

The best practices for digital transformation, as identified from the studies, consist of approximately 260 best practices. These best practices are categorized during the extraction process using a predefined form, similar to that shown in Table 10. The extraction process enables a classification of practices, aiding in the analysis and application of these digital transformation strategies across various sectors and models.

Figure 12:
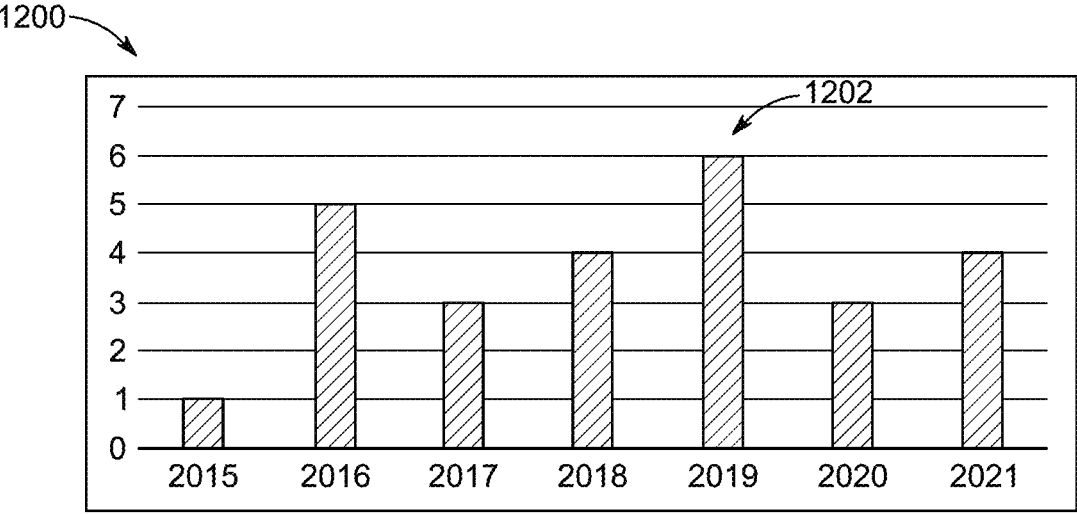
FIG. 12 is the graphical representation of distribution of digital transformation maturity models over the years between specific years, accordance with an exemplary aspect of the disclosure.

FIG. 12 is the graphical representation of the distribution of digital transformation maturity models over the years between 2015 and 2021, shown by a graph of 1200. The vertical axis of the graph 1200 represents the number of models introduced, and the horizontal axis represents the corresponding years.

In the year 2015, a single model was introduced, which is represented by the lowest point on the vertical axis. This model is depicted by the first bar positioned at the 2015 mark on the horizontal axis. The year 2016 shows a significant rise in the introduction of models, with five models, as indicated by the second bar, extending vertically to the number five on the vertical axis.

Similarly, the year 2017 reflects a slight decrease, with three models represented by the third bar extending to the number three on the vertical axis. In 2018, four models are indicated, with the fourth bar reaching the corresponding level. The most prominent year is 2019, in which six models were introduced, as indicated by the peak bar at position 1202, extending vertically to the number six on the vertical axis.

The subsequent years of 2020 and 2021 show three and four models respectively, with the bars extending to their respective levels, indicating a slight reduction in the number of introduced models compared to 2019.

Thus, the graphical representation illustrates the fluctuating introduction of digital transformation maturity models over the observed period, with a notable peak in the year 2019. The information provided in FIG. 12 corresponds to the data discussed in the disclosure, indicating that the distribution of models ranges from one to six per year, as detailed in Table 27.

FIG. 12 provides an analysis of the results obtained from the primary studies and further analyzes the findings to address the research questions concerning the digital transformation maturity models and best practices.

In response to research question 4, the available digital transformation maturity models in the literature are examined. The multivocal literature review includes 59 primary studies, 26 of which propose digital transformation maturity models released between the years 2015 and 2021. The distribution of these maturity models over the years is illustrated in FIG. 12, which depicts the frequency of digital transformation models introduced over time. As illustrated, there is a noticeable peak in the number of models introduced in 2019, reaching six, as indicated by the bar at position 1202, extending to six on the vertical axis.

In terms of the number of maturity levels and their thresholds, the digital transformation maturity models differ in the number of levels they adopt. Most of the models adopt five maturity levels. Table 27 provides a complete list of the maturity levels along with their corresponding counts. Six of these models have clearly defined thresholds for their maturity levels, as shown in Table 28. The thresholds and corresponding levels for each model vary, offering a structured approach to measuring and assessing the maturity of digital transformation within different sectors and organizations.

TABLE 27

| Digital Transformation Maturity Models Number of Levels | | |
| --- | --- | --- |
| Levels | Count | Ref |
| 3 | 1 | [161] |
| 4 | 7 | [143][146][148][149][151][154][160] |
| 5 | 10 | [145][147][150][152][161][155][157][162], [163][164][165] |
| 6 | 6 | [141][144][156][158][159][166] |

[141] T. Aguiar, S. B. Gomes, P. R. da Cunha, and M. M. da Silva, "Digital transformation capability maturity model framework," *Proceedings—2019 IEEE 23rd International Enterprise Distributed Object Computing Conference, EDOC* 2019, no. Section VI, pp. 51-57, 2019, doi: 10.1109/EDOC.2019.00016.

[143] L. Canetta, A. Barni, and E. Montini, "Development of a Digitalization Maturity Model for the Manufacturing Sector," 2018 *IEEE International Conference on Engineering, Technology and Innovation, ICE/ITMC* 2018—*Proceedings,* 2018, doi: 10.1109/ICE.2018.8436292.

[144] A. Yezhebay, V. Sengirova, D. Igali, Y. O. Abdallah, and E. Shehab, "Digital Maturity and Readiness Model for Kazakhstan SMEs," SIST 2021—2021 *IEEE International Conference on Smart Information Systems and Technologies,* April 2021, doi: 10.1109/ SIST50301.2021.9465890.

[145] R. G. G. Caiado, L. F. Scavarda, D. L. de M. Nascimento, P. Ivson, and V. H. C. Cunha, "A Maturity Model for Manufacturing 4.0 in Emerging Countries," pp. 393-402, December 2018, doi: 10.1007/978-3-030-23816-2_38.

[146] V. D. Majstorović, R. M. Mitrović, and Ž. Z. Mišković, "Assessing Industry 4.0 Readiness in Manufacturing Companies from Serbia," *Lecture Notes in Mechanical Engineering,* pp. 69-79, 2020, doi: 10.1007/ 978-3-030-46212-3_4.

[147] K. Krowas and R. Riedel, "Planning Guideline and Maturity Model for Intra-logistics 4.0 in SME," *IFIP Advances in Information and Communication Technology,* vol. 567, pp. 331-338, September 2019, doi: 10.1007/978-3-030-29996-5_38.

[148] E. Gökalp, U. Şener, and P. E. Eren, "Development of an Assessment Model for Industry 4.0: Industry 4.0-MM," *Communications in Computer and Information Science,* vol. 770, pp. 128-142, 2017, doi: 10.1007/978-3-319-67383-7_10.

[149] K. Yagiz, A. Ustundag, and E. Cevikcan, *Maturity and Readiness Model for Industry* 4.0 *Strategy Implementation of Industry* 4.0 *strategies require wide applications in companies.* 2017. [Online]. Available: https://doi.org/ 10.1007/978-3-319-57870-5_4

[150] A. Govindasamy and A. Arularasan, "Readiness and Maturity Assessment Model to Measure the Industry 4.0 Ecosystem," *Lecture Notes in Electrical Engineering,* vol. 355, pp. 57-67, 2021, doi: 10.1007/978-981-16-1244-2_5.

[151] C. Siedler et al., "Maturity model for determining digitalization levels within different product lifecycle phases," *Production Engineering,* vol. 15, no. 3-4, pp. 431-450, June 2021, doi: 10.1007/S11740-021-01044-4/ FIGURES/10.

[152] G. Nick, T. Kovács, A. Ko, and B. Kádár, "Industry 4.0 readiness in manufacturing: Company Compass 2.0, a renewed framework and solution for Industry 4.0 maturity assessment," *Procedia Manufacturing,* vol. 54, pp. 39-44, January 2021, doi: 10.1016/J.PROMFG.2021.07.007.

[154] A. Issa, B. Hatiboglu, A. Bildstein, and T. Bauernhansl, "Industrie 4.0 roadmap: Framework for digital transformation based on the concepts of capability maturity and alignment," *Procedia CIRP,* vol. 72, pp. 973-978, January 2018, doi: 10.1016/J.PROCIR.2018.03.151.

[155] A. Schumacher, S. Erol, and W. Sihn, "A Maturity Model for Assessing Industry 4.0 Readiness and Maturity of Manufacturing Enterprises," *Procedia CIRP,* vol. 52, pp. 161-166, January 2016, doi: 10.1016/J.PROCIR.2016.07.040.

[156] M. Colli, U. Berger, M. Bockholt, O. Madsen, C. Møller, and B. V. Wæhrens, "A maturity assessment approach for conceiving context-specific roadmaps in the Industry 4.0 era," *Annual Reviews in Control,* vol. 48, pp. 165-177, January 2019, doi: 10.1016/J.ARCONTROL.2019.06.001.

[157] J. Olessków-Szłapka, H. Wojciechowski, R. Domański, and G. Pawłowski, "Logistics 4.0 Maturity Levels Assessed Based on GDM (Grey Decision Model) and Artificial Intelligence in Logistics 4.0-Trends and Future Perspective," *Procedia Manufacturing,* vol. 39, pp. 1734-1742, January 2019, doi: 10.1016/ J.PROMFG.2020.01.266.

[158] M. Colli, O. Madsen, U. Berger, C. Møller, B. V. Wæhrens, and M. Bockholt, "Contextualizing the outcome of a maturity assessment for Industry 4.0," *IFAC-PapersOnLine,* vol. 51, no. 11, pp. 1347-1352, January 2018, doi: 10.1016/J.IFACOL.2018.08.343.

[159] O. Valdez-de-Leon, "A Digital Maturity Model for Telecommunications Service Providers," *Technology Innovation Management Review,* vol. 6, no. 8, pp. 19-32, 2016, doi: 10.22215/timreview1008.

[160] K. S. R. Warner and M. Wäger, "Building dynamic capabilities for digital transformation: An ongoing process of strategic renewal," *Long Range Planning,* vol. 52, no. 3, pp. 326-349, June 2019, doi: 10.1016/ J.LRP.2018.12.001.

[161] E. Boström and O. C. Celik, "Towards a Maturity Model for Digital Strategizing: A qualitative study of how an organization can analyze and assess their digital business strategy," pp. 30-2017, 2017, Accessed: Feb. 13, 2022. [Online]. Available: http://urn.kb.se/resolve?urn-urn: nbn: se: umu: diva-136736

[162] A. de Carolis, M. MacChi, E. Negri, and S. Terzi, "Guiding manufacturing companies towards digitalization a methodology for supporting manufacturing companies in defining their digitalization roadmap," 2017 *International Conference on Engineering, Technology and Innovation: Engineering, Technology and Innovation Management Beyond* 2020: *New Challenges, New Approaches, ICE ITMC* 2017—*Proceedings,* vol. 2018-January, pp. 487-495, February 2018, doi: 10.1109/ ICE.2017.8279925.

[163] A. de Carolis, M. Macchi, E. Negri, and S. Terzi, "A Maturity Model for Assessing the Digital Readiness of Manufacturing Companies," *IFIP Advances in Information and Communication Technology,* vol. 513, pp. 13-20, 2017, doi: 10.1007/978-3-319-66923-6_2.

[164] C. Leyh, K. Bley, T. Schaffer, and S. Forstenhausler, "SIMMI 4.0-a maturity model for classifying the enterprise-wide it and software landscape focusing on Industry 4.0," *Proceedings of the* 2016 *Federated Conference on Computer Science and Information Systems, FedCSIS* 2016, vol. 8, pp. 1297-1302, 2016, doi: 10.15439/ 2016F478.

[165] K. Lichtblau et al., "IMPULS-Industrie 4.0-Readiness," 2015. http://www.impuls-stiftung.de/documents/ 3581372/4875835/Industrie+4.0+Readiness+IMPULS+ Studie+Oktober+2015.pdf (accessed Feb. 13, 2022).

[166] W. Maisiri and L. van Dyk, "Industry 4.0 readiness assessment for South African industries," *South African Journal of Industrial Engineering,* vol. 30, no. 3, pp. 134-148, November 2019, doi: 10.7166/30-3-2231.

TABLE 28

| | | | | Digital Transformation Maturity Models with thresholds | | | | |
|---|---|---|---|---|---|---|---|---|
| Model Name | #levels | L1 | L2 | L3 | L4 | L5 | L6 | Out of |
| Digitalization Maturity Model for the manufacturing sector [143] | 4 | 0 | 25 | 50 | 75 | — | — | 100 |
| SPICE-based Industry 4.0-MM [148] | 4 | 0 | 16 | 51 | 86 | — | — | 100 |
| Maturity and Readiness Model for Industry 4.0 Strategy [149] | 4 | 0 | 0.9 | 1.8 | 2.7 | — | — | 3 |
| Integrated work system design in digitalized production companies [151] | 4 | 1 | 1.5 | 2.5 | 3.5 | — | — | 4 |
| The Digital Maturity Model 4.0 [160] | 4 | 0 | 34 | 53 | 72 | — | — | 84 |
| Industry 4.0 Readiness Assessment for South African Industries [166] | 6 | 0 | 1 | 51 | 91 | 121 | 146 | 160 |

The summary of research question 4 highlights that a substantial number of maturity models are directly related to digital transformation. However, a key issue remains the lack of a specific standard in the literature that directly addresses digital transformation, although several standards indirectly support it. Furthermore, the adoption of new technologies introduces risks, such as potential failure, people's acceptance, and security threats.

In addressing research question 5, regarding the best practices in digital transformation, several sources discuss best practices and recommendations across various sectors and company sizes. As the field of digital transformation and related technologies is relatively new compared to other areas, the first digital transformation model was identified in 2015. Consequently, a total of 260 best practices and activities related to digital transformation have been extracted from the primary studies.

The driving factors and trends for digital transformation include technological advancements and innovations in various domains, such as sensor technology, electronic commerce, social media, Industry 4.0, artificial intelligence, blockchain, and the Internet of Things, among others. These trends emphasize the growing importance of digital transformation across multiple industries and sectors.

Additionally, there are certain misconceptions associated with digital transformation. For instance, digital transformation is not solely about technology adaptation; it is also a cultural shift. Furthermore, recruiting the best talent in a chosen technology may not always be the optimal solution. Several best practices have been proposed based on the risks and misconceptions identified during the digital transformation process.

The summary of research question 5 concludes that digital transformation best practices focus on the adoption of specific technologies and managerial methodologies. However, no unified international standards for digital transformation were identified, as there is no singular approach applicable to all organizations. Digital transformation emphasizes the adoption of selective concepts that enhance organizational flexibility and adaptability to change.

FIG. 13 illustrates a process flow for developing a cybersecurity digital transformation maturity model. The process flow 1300 includes three primary components representing the stages of development: Inputs 1302, Structure 1304, and Levels 1306. The component labelled as Inputs 1302 represents the initial phase, comprising best practices and areas/categories gathered from prior studies in digital transformation and cybersecurity. The arrow leading to the next phase, Structure 1304, represents the model's foundation being based on CMMI 2.0 standards, showing a structural approach to the development process. Finally, the Levels 1306 component highlights the assignment of five maturity levels to the developed model.

FIG. 14 illustrates the phases of best practices filtration in a process diagram 1400. The filtration begins at Phase 0 1402, where all practices in digital transformation (DT) and cybersecurity (CS) are considered, amounting to 1740 practices. Next, Phase 1 1404 applies digital transformation and cybersecurity definitions (V1), filtering the practices to 821. Phase 2 1406 involves applying the first version of best practice inclusion criteria, reducing the practices to 454. In Phase 3 1408, the practices are mapped to categories and practice areas, further narrowing them to 313. Phase 4 1410 updates definitions and introduces a core or optional flag, filtering the practices to 194. In Phase 5 1412, expert judgment is applied to the practices, concluding the process with 179 practices.

In the development of the cybersecurity digital transformation maturity model, it is essential to define both digital transformation and cybersecurity within the context of the proposed model. The scope of the model was defined by considering existing definitions of these terms. Digital transformation is recognized as a process aimed at improving an entity by initiating significant changes to its attributes through combinations of information, computing, communication, and connectivity technologies. On the other hand, cybersecurity is defined as the organization and coordination of resources, processes, and structures used to protect cyberspace and systems from occurrences that deviate from established property rights.

The first phase in the filtration of best practices involves removing duplicate practices and identifying those that intersect between digital transformation and cybersecurity. As a result of this filtration, a total of 821 best practices are retained, as indicated in Table 29.

In the second phase, it is determined that definitions alone were insufficient to define the model's scope. Consequently, additional inclusion criteria are developed based on the definitions of digital transformation and cybersecurity. These criteria include practices aimed at improving organizational aspects, processes, or culture to align with modern technologies or customer behaviors. Additionally, practices relating to the adoption of new software development methodologies or design patterns to ensure security while using state-of-the-art technologies are considered. Further, practices supporting training and awareness programs are included, with the understanding that digital transformation involves cultural shifts and many cyberattacks are attributed to user behavior and lack of awareness. Practices relating to integrating systems to securely store and transfer digital data, replacing traditional paper-based methods, are also included. Moreover, practices that focus on reviewing and updating guidelines, standards, rights, and duties, thus promoting flexibility, are incorporated. Practices associated with the protection of people, data, and technologies, in compliance with specific standards and guidelines, are also included. Ongoing processes such as auditing, budgeting, and maintenance aimed at clarifying capabilities and establishing financial boundaries are retained. Finally, practices offering different techniques to achieve similar goals are considered as alternatives.

After applying the aforementioned criteria, a total of 454 best practices remain, as shown in Table 29.

TABLE 29

| | | Best Practices Filtration Phases | |
|---|---|---|---|
| Phase | Phase Name | Phase Description | #Practices |
| 0 | All practices | all founded practices. | 1740 |
| 1 | Definition V1 | practices have an intersection between DT & CS | 821 |
| 2 | Criteria V1 | practices based on the inclusion criteria | 454 |
| 3 | Capabilities Areas & Practice Areas | practices after scoping and mapping security categories and the model's capabilities areas and identifying the excluding criteria. | 313 |
| 4 | Definition V2 Criteria V2 | practices after (1) re-identifying DT and CS, (2) enhancing the including and excluding criteria, and (3) classifying practices as core or optional. | 194 |
| 5 | Expert Judgment | practices after having some experts' judgment | 179 |

In the third phase, the practices are further filtered by mapping them to the security categories and capability areas defined in response to Research Question 2. The filtration criteria is summarized and categorized, as indicated in Table 30. The filtration is conducted based on governance and policies, which include practices related to governance, regulations, laws, and standards governing operations. Practices relating to requirements and scope definition are excluded. Information security and data protection practices, particularly those aimed at securely storing and transferring data, are included, while practices addressing privacy-related processes are excluded. Human security and access management practices, specifically those aimed at supporting training programs and access management, are included, whereas practices related to specific training programs, such as social engineering, are excluded. Similarly, software engineering and application security practices that adopted state-of-the-art methodologies and managed software products are included, while practices focused on specific software development technologies are excluded. Practices aimed at risk analysis and mitigation, including those related to protecting people, data, and technologies from threats, vulnerabilities, and risks, are retained. Legal aspects and forensics practices are excluded. Infrastructure and asset security practices that aimed to improve any aspect, process, or technology of the organization are included, while practices related to networking and data transition devices are excluded. Finally, practices related to security running operations, particularly those concerning auditing, maintenance, and upgrading, are included. Practices addressing the checking and updating of requirements are excluded.

Following the application of these criteria, 313 best practices remained, as indicated in Table 30.

TABLE 30

| | Phase 3-Practices Filtration Inclusion and Exclusion Summary | |
|---|---|---|
| Category | Include practices related to | Exclude practices related to |
| 1. Governance and Policies | governance, regulations, standards, documents that govern operations | requirements defining scope, costs, penalties for not following policies |
| 2. Information Security and Data Protection | integrating systems store and transfer data | specific aspects like privacy processes |
| 3. Human Security and Access Management | training programs access control | specific training program ethics, rights, duties and responsibility, qualifications |
| 4. Software Engineering and Applications Security | state-of-art software development methodology and design patterns, through software lifecycle. managing the software products | specific software development technology |
| 5. Risks Analysis and Mitigation | protecting people, data, and technologies from risks. threats, vulnerability, | legal aspects, crimes cases, forensics. |

TABLE 30-continued

| Phase 3-Practices Filtration Inclusion and Exclusion Summary | | |
|---|---|---|
| Category | Include practices related to | Exclude practices related to |
| 6. Infrastructure and Assets Security | contingency planning risk mitigation to improve any organization aspect, process, technology, or culture; | specific aspects networking |
| 7. Security Running Operations | auditing, upgrading, following trends, compliance reviewing guidelines encouraging flexibility | updating requirements |

By the end of the third phase, despite a fair distribution of practices across categories, as shown in Table 31, the total number of best practices is still high. Consequently, the fourth phase is introduced to further narrow the scope of the model. In this phase, the definitions of digital transformation and cybersecurity are re-identified, and the inclusion and exclusion criteria are updated accordingly. The revised definition of digital transformation encompassed topics such as culture, improvement, business processes, technology, data, and customers. Digital transformation is defined as a cultural process aimed at improving business processes by leveraging appropriate technologies to better utilize, analyze, and evaluate data, ultimately improving customer relationships. The cybersecurity definition is updated to focus on the protection of cyberspace data and systems from threats, ensuring confidentiality, integrity, and availability. The combined definition of digital transformation and cybersecurity focuses on the continued protection of organizations in cyberspace while improving business processes, adopting modern technologies, and utilizing data to protect people and foster trust in technology.

are excluded. Human security and access management practices focuses on awareness programs and access management are included as core practices, while social engineering training programs and practices concerning ethics and responsibilities are excluded. Software engineering practices focuses on running applications and proper documentation are included as core practices, while practices related to specific software development technologies are excluded. Risk analysis and mitigation practices related to protecting people, data, and technologies from risks are included as core practices, while legal aspects and forensics are excluded. Infrastructure and asset security practices aim at improving organizational aspects are included as core practices, while networking practices are excluded. Security running operations practices related to auditing, maintenance, and upgrading are included as core practices, while practices focused on updating requirements are excluded.

After applying the fourth phase of filtration, the total number of best practices is reduced to 194, as shown in Table 31. Some practice areas are renamed, merged, or deleted. Fourteen practice areas with core practices remain,

TABLE 31

| Best practices distribution on categories in Phase 2 and Phase 3 | | | | |
|---|---|---|---|---|
| Category/Sub-category | CS-Phase2 | DT-Phase2 | CS-Phase3 | DT-Phase3 |
| Governance and Policies | 60 | 18 | 23 | 11 |
| Information Security and Data Protection | 25 | 17 | 17 | 15 |
| Human Security and Access Management | 79 | 15 | 36 | 10 |
| Software Engineering and Applications Security | 53 | 23 | 47 | 14 |
| Risks Analysis and Mitigation | 44 | 3 | 40 | 2 |
| Infrastructure and Assets Security | 28 | 6 | 28 | 6 |
| Security Running Operations | 75 | 8 | 56 | 8 |
| Totals for each CS/DT | 364 | 90 | 247 | 66 |
| Totals after merging CS&DT | 454 | | 313 | |

As a result of this phase, the model introduces the concept of core and optional practices. Core practices are defined as those applicable across all domains, regardless of whether they are primary or advanced. Optional practices are deemed important but not necessarily applicable to all domains. Practices that do not fit within the category definitions or are unnecessary are excluded. The filtration criteria are summarized as follows: governance and policy practices related to management support, governance, regulations, laws, and standards are included as core practices, while practices relating to scope definition, responsibilities, and penalties are excluded. Information security and data protection practices relating to the secure storage and transfer of data are included as core practices, while privacy-related processes while six areas are designated as optional. The final practice areas include governance, data storage and exchange, access management, training, software testing, deployment, applications, documentation, contingency planning, risk mitigation, operations, systems, and auditing.

The fifth and final phase of filtration involves expert judgment. Experts are consulted to validate the remaining practices by classifying them into core, optional, or excluded categories. The classification is performed using the format shown in Table 32, are experts are asked to evaluate each practice based on their knowledge and experience. For each practice, a consensus is reached through the expert evaluations, and the final classification is determined based on predefined criteria. After applying expert judgment, a total of 179 practices remained, with 107 classified as core practices and 72 as optional practices. The results before and after expert judgment are summarized in Table 33.

TABLE 32

Expert Judgement Filtration Form

| Column | Meaning |
| --- | --- |
| No. | Practice serial number |
| Main Category | Where the practice falls under |
| Sub-Category | |
| Practice | Where it needs to be classified |
| Text | |
| Judgment | classify the practice based on the expert's knowledge and experience to: CORE, OPTIONAL, EXCLUDE, DON'T KNOW |
| Notes | Additional note or suggestion |

TABLE 33

Total Number of Practices Before and After the Expert Judgment

| | Core Practices | Optional Practices | Excluded Practices | Total Practices |
| --- | --- | --- | --- | --- |
| Before experts' judgment | 121 | 73 | — | 194 |
| After experts' judgment | 107 | 72 | 15 | 179 |

Figure 15:
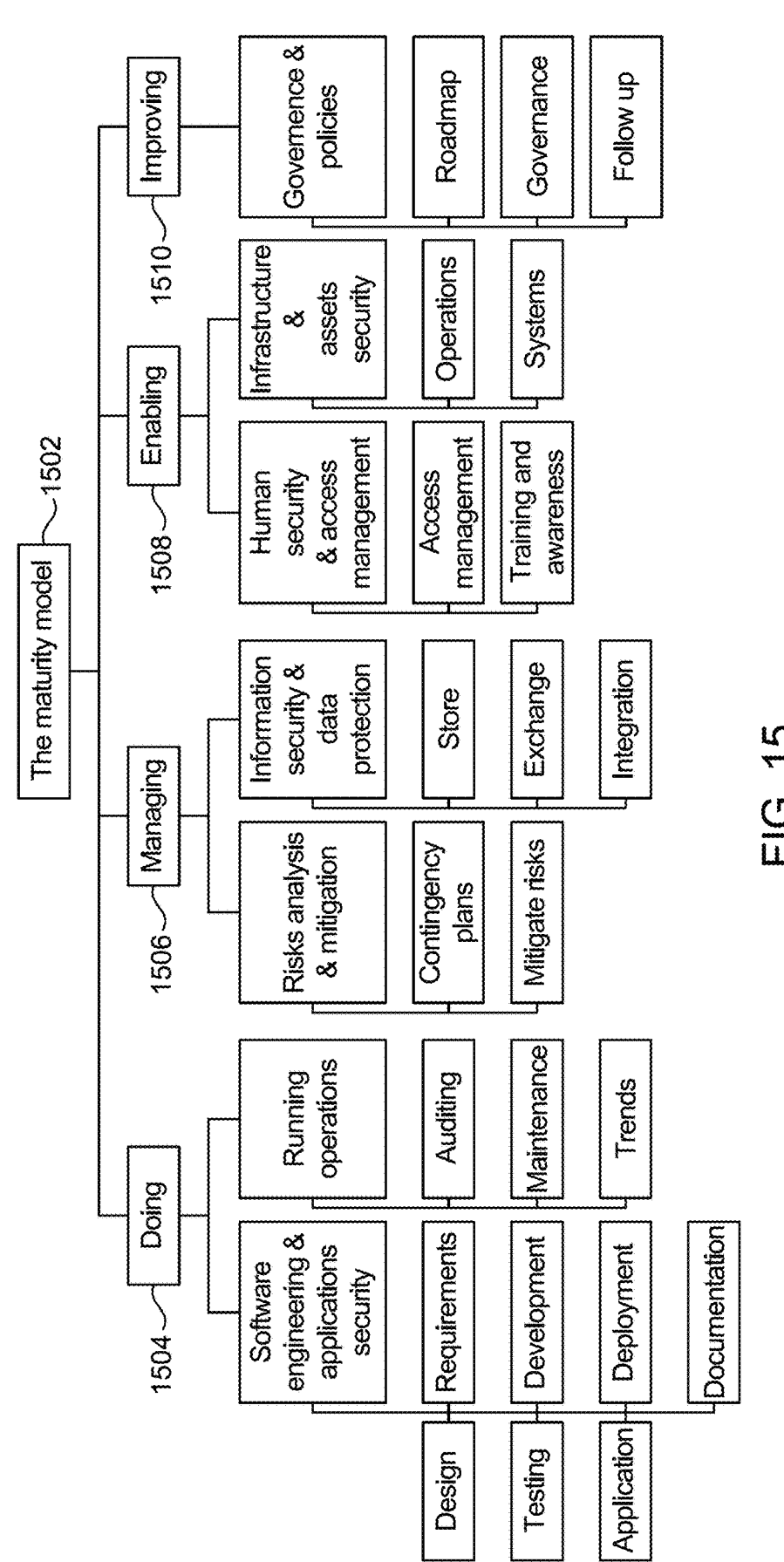
FIG. 15 illustrates the components of the maturity model for cybersecurity and digital transformation, in accordance with an exemplary aspect of the disclosure.

FIG. 15 illustrates the components of the Maturity Model 1502 for cybersecurity and digital transformation. The Maturity Model 1502 is structured into four primary functional categories, which include Doing 1504, Managing 1506, Enabling 1508, and Improving 1510. Each category is designed to represent distinct organizational capabilities required to support secure and effective digital transformation.

Within the Doing category 1504, there exists a component identified as Software Engineering & Applications Security. This component is further subdivided into various process areas, including Design, Testing, Application, Requirements, Development, Deployment, and Documentation. These process areas are essential for addressing the development, implementation, and secure management of software applications throughout the lifecycle. Design refers to the architectural and structural planning of applications. Testing represents the validation and verification of security protocols within the software, while Application refers to the secure running of software post-deployment. Requirements relate to the initial identification of security and functional needs. Development refers to the creation and coding of secure software, Deployment involves the secure installation of software into production environments, and Documentation ensures comprehensive records of all software processes.

In the Managing category 1506, the model includes the components of Running Operations and Risks Analysis & Mitigation. Running Operations is divided into Auditing, Maintenance, and Trends. Auditing refers to the process of systematically examining security processes and systems. Maintenance involves the continuous upkeep and updating of security protocols, while Trends refers to the tracking and adaptation of emerging cybersecurity threats and best practices. The Risks Analysis & Mitigation component is divided into Contingency Plans and Mitigate Risks. Contingency Plans represent the proactive strategies for managing unforeseen cybersecurity events, while Mitigate Risks refers to the processes implemented to reduce potential risks and vulnerabilities within the digital infrastructure.

The Enabling category 1508 focuses on Information Security & Data Protection and Human Security & Access Management. The Information Security & Data Protection component includes Store, Exchange, and Integration. Store represents the secure storage of data, Exchange refers to the secure transmission of data between systems, and Integration involves the seamless and secure merging of various systems to ensure consistent data protection. The Human Security & Access Management component is further divided into Access Management and Training & Awareness. Access Management refers to the control and regulation of user access to digital systems, while Training & Awareness addresses the education of personnel on cybersecurity risks and best practices.

The Improving category 1510 encompasses the components of Governance & Policies and Infrastructure & Assets Security. The Governance & Policies component includes Roadmap, Governance, and Follow-up. Roadmap refers to the long-term planning of cybersecurity initiatives, Governance relates to the enforcement of security policies and regulations, and Follow-up represents the continuous evaluation and updating of governance protocols. The Infrastructure & Assets Security component includes Operations and Systems. Operations represent the secure management of day-to-day IT activities, while Systems refer to the secure architecture and infrastructure that support the organization's digital transformation initiatives.

In the maturity model for cybersecurity and digital transformation, categories for capability areas (CCA) define practices aimed at improving organizational performance and project efficiency. The CCA in the model includes the areas of doing, managing, enabling, and improving, all structured to customize and enhance security practices. The doing category pertains to practices and processes concerning software and security development, which include capability areas related to software engineering, applications security, and running operations. The managing category encompasses practices related to managing and ensuring security, which includes risks analysis, mitigation, and information security. The enabling category focuses on making informed decisions and enabling technologies and infrastructure, covering human security, access management, infrastructure, and assets security. Lastly, the improving category addresses practices and processes related to enhancing the organization's performance, which includes governance and policies.

The capability area (CA) within the maturity model is structured to group related practices for performance improvement. The model comprises seven defined capability areas. The first capability area is governance and policies, which includes practices related to management support, governance, regulations, culture, laws, and standards. This capability area also includes practices focused on updating and ensuring compliance with operational rules. The second area is information security and data protection, which covers practices aimed at secure information exchange and storage, focusing on achieving cybersecurity goals. The third capability area, human security and access management, addresses practices involving people, including training and awareness programs, which are critical as many cyberattacks arise from user behavior. The fourth area is software engineering and applications security, which includes practices addressing the full lifecycle of software development to ensure security. Risks analysis and mitigation is the fifth capability area, which involves practices protecting people, data, and technologies from risks, covering threats, vulnerability, contingency planning, and risk mitigation. The sixth area is infrastructure and assets security, with practices aimed at improving organizational aspects, processes, and adopted technologies to keep pace with modern technologies. The final area is running operations, focusing on ongoing processes like auditing, upgrading, and ensuring compliance with cybersecurity standards and guidelines, which are essential for operational flexibility and security.

The practice areas (PA) within each capability area are defined to achieve specific objectives and outline essential activities. The governance and policies capability area includes the practice areas of roadmap, governance, and follow-up. Roadmap encompasses management, culture, and strategy practices, while governance focuses on verifying and aligning regulations and standards. Follow-up involves updating and maintaining knowledge through feedback and learned lessons. The information security and data protection capability area include the practice areas of store, exchange, and integration. Store covers data storage practices with a focus on confidentiality, integrity, and encryption, while exchange addresses the secure transfer of data. Integration focuses on transferring data between systems and data migration practices.

In the human security and access management capability area, the practice areas include access management and training and awareness. Access management addresses authentication, authorization, and password management practices, while training and awareness covers the organization's efforts to educate and increase awareness of cybersecurity risks and practices. The software engineering and applications security capability area includes various practice areas relevant to the entire software development lifecycle (SDLC). These areas include requirements, design, development, testing, deployment, application, and documentation. Requirements focus on gathering and storing requirements during the SDLC, while design, development, and testing address each corresponding phase. Deployment refers to the secure release of software, application pertains to securely running software, and documentation ensures that proper records are maintained throughout the SDLC.

Risks analysis and mitigation is another capability area, containing the practice areas of contingency plans and mitigate risks. Contingency plans involve practices for incident response and management, while mitigate risks covers practices related to risk mitigation and vulnerability management. Infrastructure and assets security includes operations and systems as its practice areas. Operations focus on the ongoing management of organizational infrastructure, while systems refer to specific named systems necessary for organizational security.

In the running operations capability area, the practice areas include auditing, maintenance, and trends. Auditing focuses on logging, monitoring, and analyzing audit logs to identify potential incidents. Maintenance includes tasks such as updates, testing, diagnosing, and troubleshooting, which are critical for maintaining the health of systems. Trends refer to the identification and analysis of emerging cybersecurity trends and integrating them into ongoing operations to ensure the organization remains up to date with best practices.

The structure of the maturity model ensures that each capability area and its corresponding practice areas provide a comprehensive approach to enhancing cybersecurity and managing digital transformation initiatives. The organization of these practices into distinct categories ensures that all aspects of digital security and transformation are addressed comprehensively, with the flexibility to adapt to new challenges and opportunities as they arise.

Figure 16:
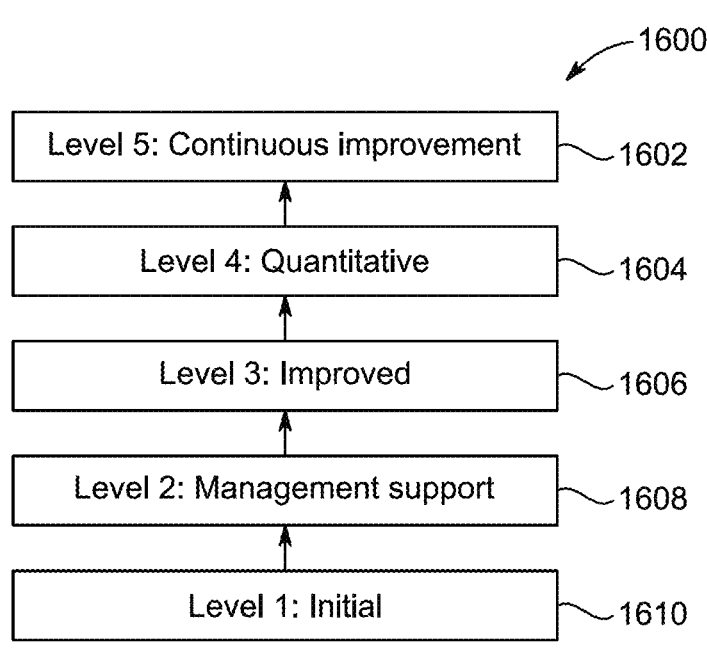
FIG. 16 illustrates the maturity model that is utilized to represent the progression of an organization's processes through various stages of digital transformation and cybersecurity enhancement, in accordance with an exemplary aspect of the disclosure.

FIG. 16 illustrates maturity model levels 1600 that are utilized to represent the progression of an organization's processes through various stages of digital transformation and cybersecurity enhancement. The maturity model levels 1600 comprises five distinct levels of maturity, each depicting the organization's capability to manage and implement secure, digitized operations. The first level of the maturity model 1600 is denoted as "Level 1: Initial" 1610, wherein the organization lacks structured technological tools necessary for creating a reliable infrastructure. At this stage, the processes are poorly defined, with no systematic assessment of vulnerabilities or understanding of the business risks. As a result, security threats remain unmitigated, leading to higher risks and inefficiencies in addressing security challenges.

At the second level, referred to as "Level 2: Management Support" 1608, the organization begins to develop a formalized digital transformation vision, with management actively supporting digital initiatives. Despite this progress, practices at this stage remain partially defined and reactive, with inconsistent implementation across departments and a lack of comprehensive training or awareness programs.

The third level, referred to as "Level 3: Improved" 1606, signifies that most divisions within the organization are involved in the digital transformation process. Security practices become more proactive and are aligned with known standards, resulting in an organization-wide focus on digitization. The organization's cybersecurity efforts are based on predefined policies and procedures, effectively mitigating risks.

At the fourth level, "Level 4: Quantitative" 1604, the organization employs quantitative analysis and measurement practices to predict and manage security risks. Data is utilized to derive business insights, and security is embedded into the organizational culture. This level emphasizes secure data handling, customer-focused processes, and the use of advanced technologies to manage large datasets securely.

The fifth and final level of the maturity model, "Level 5: Continuous Improvement" 1602, represents an organization that is adaptable to internal and external changes, consistently reviewing and improving its digital transformation and cybersecurity objectives. At this stage, practices are stable, flexible, and frequently evaluated to align with strategic goals, ensuring ongoing organizational growth and performance enhancement.

Figure 17:
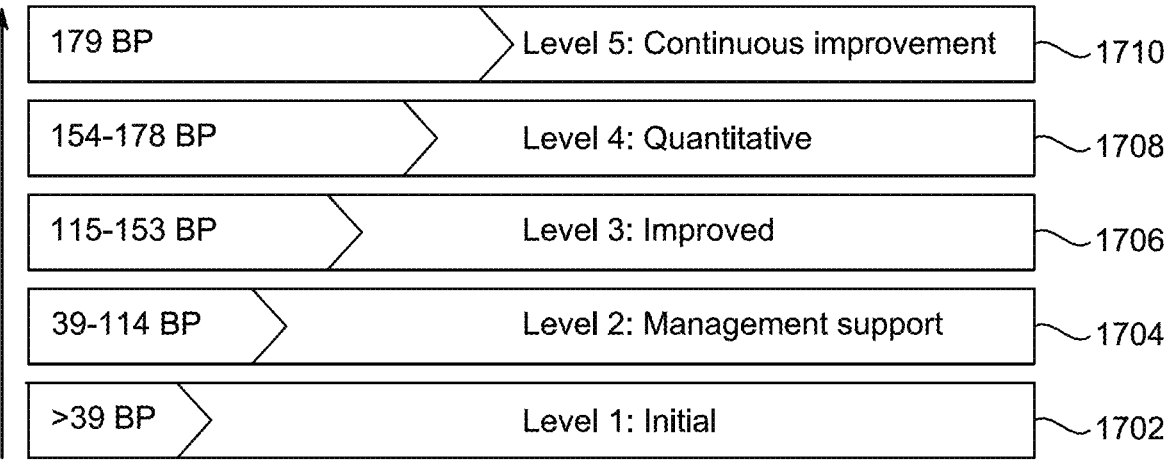
FIG. 17 illustrates a detailed breakdown of the maturity levels based on the total number of best practices (BP) implemented by an organization, in accordance with an exemplary aspect of the disclosure.

[Table 43] FIG. 17 illustrates a detailed breakdown of the maturity levels based on the total number of best practices (BP) implemented by an organization. The total number of best practices is based on best practices as listed in Table 43, shown below. The first level of maturity, "Level 1: Initial" 1702, corresponds to organizations implementing fewer than 39 best practices. Organizations that adopt between 39-114 best practices are classified under "Level 2: Management Support" 1704. As the organization advances and implements 115-153 best practices, it is classified as "Level 3: Improved" 1706. The "Level 4: Quantitative" stage 1708 is attained by organizations that implement between 154-178 best practices. Finally, organizations that adopt the complete set of 179 best practices are classified as "Level 5: Continuous Improvement" 1710.

The distribution of best practices across the maturity levels, as shown in FIG. 18, provides a structured approach to evaluating the organization's progression through the maturity model 1600. The organization's advancement through these levels signifies its commitment to secure digital transformation and enhanced cybersecurity processes.

FIG. 18 depicts Table 34 illustrating a structured representation of the distribution of best practices across various maturity levels within the maturity model 1600, providing a comprehensive approach for assessing the organization's cybersecurity progression and digital transformation initiatives. This model evaluates the cybersecurity posture by categorizing practices and capability areas essential for the organization's advancement through the maturity levels.

At the top of the hierarchy, category of capacity area 1802 represents the broad classifications of organizational cybersecurity capabilities. Each category of capacity area 1802 encompasses a set of core domains critical to assessing the organization's cybersecurity framework, including categories such as risk management, incident response, and system resilience.

Beneath the category of capacity area 1802, capability area 1804 denotes specific subsets of these domains, each representing a collection of related cybersecurity practices. Capability area 1804 may encompass areas such as threat detection, vulnerability management, or policy enforcement, each contributing to a holistic cybersecurity strategy. The structured identification of capacity areas facilitates targeted assessments, ensuring that all critical aspects of an organization's cybersecurity infrastructure are evaluated.

Within each capability area 1804, practice area 1806 further delineates individual cybersecurity best practices. Each practice area 1806 includes specific actions, processes, or configurations that the organization is expected to implement. Examples may include regular security audits, employee cybersecurity training, and encryption of sensitive data. These practice areas provide granular detail on the steps the organization should take to progress through the maturity model 1600.

FIG. 18 also presents the count of core best practices per level 1808, which signifies the number of essential best practices that an organization must fulfill to achieve a given level of cybersecurity maturity. These core best practices 1808 represent the fundamental requirements for securing the organization's digital assets and processes. For instance, at lower maturity levels, the core best practices might focus on establishing basic security controls, whereas at higher levels, they may involve advanced threat intelligence and proactive risk mitigation strategies.

The count of optional best practices per level 1810 indicates the supplementary cybersecurity practices that, while not mandatory, enhance the organization's overall security posture. Optional best practices 1810 provide organizations with flexibility in selecting practices that best align with their specific operational needs or risk profiles. These practices could include advanced monitoring systems, specialized employee training programs, or automated incident response protocols.

The total count of best practices per level 1812 provides a comprehensive view of both the core and optional best practices aggregated at each maturity level. Total count 1812 serves as a key metric for evaluating the organization's overall progress within the maturity model 1600. This metric allows the organization to measure its advancement in implementing cybersecurity measures and achieving higher levels of security maturity.

Figure 19:
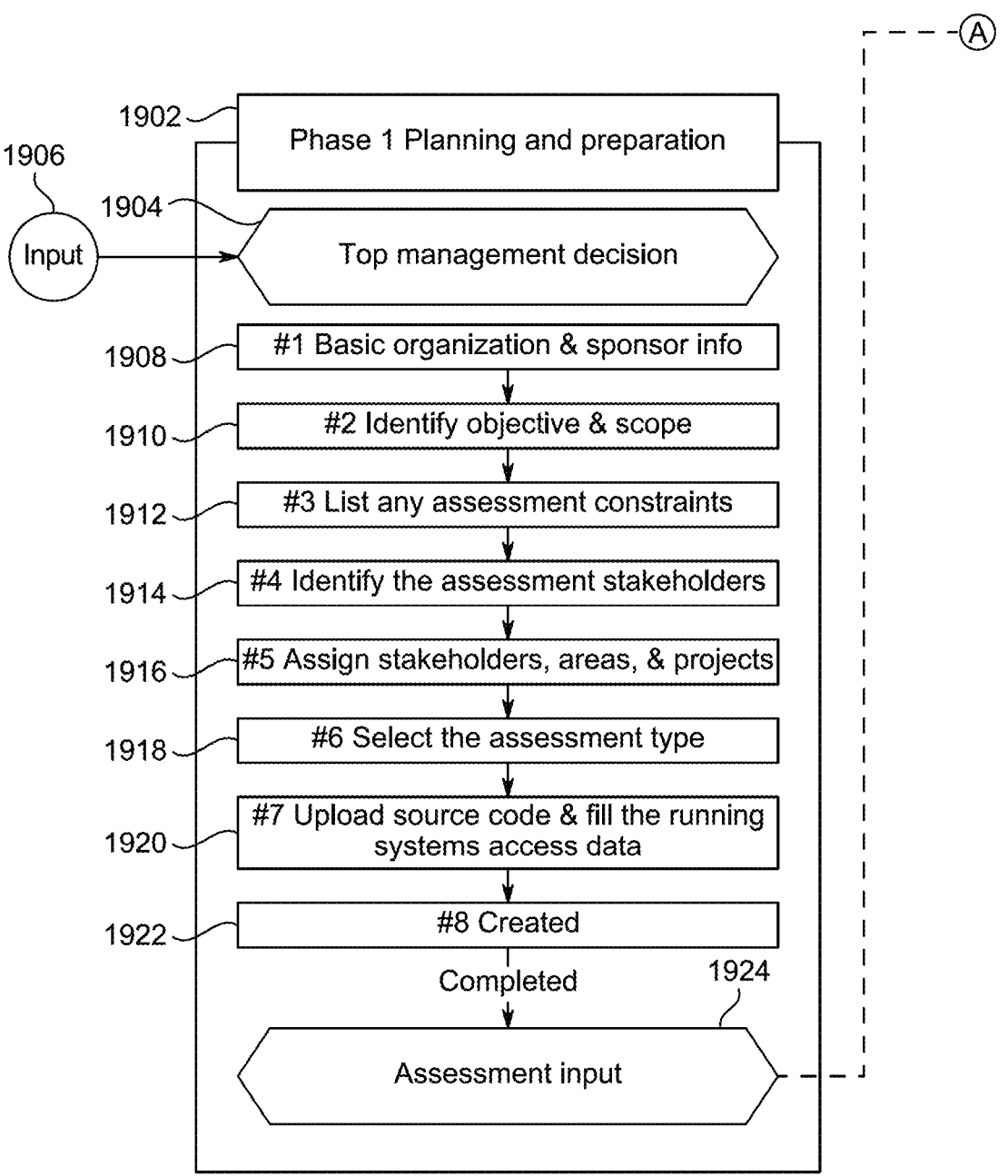
FIG. 19 illustrates an assessment methodology, in accordance with an exemplary aspect of the disclosure.
Figure 19:
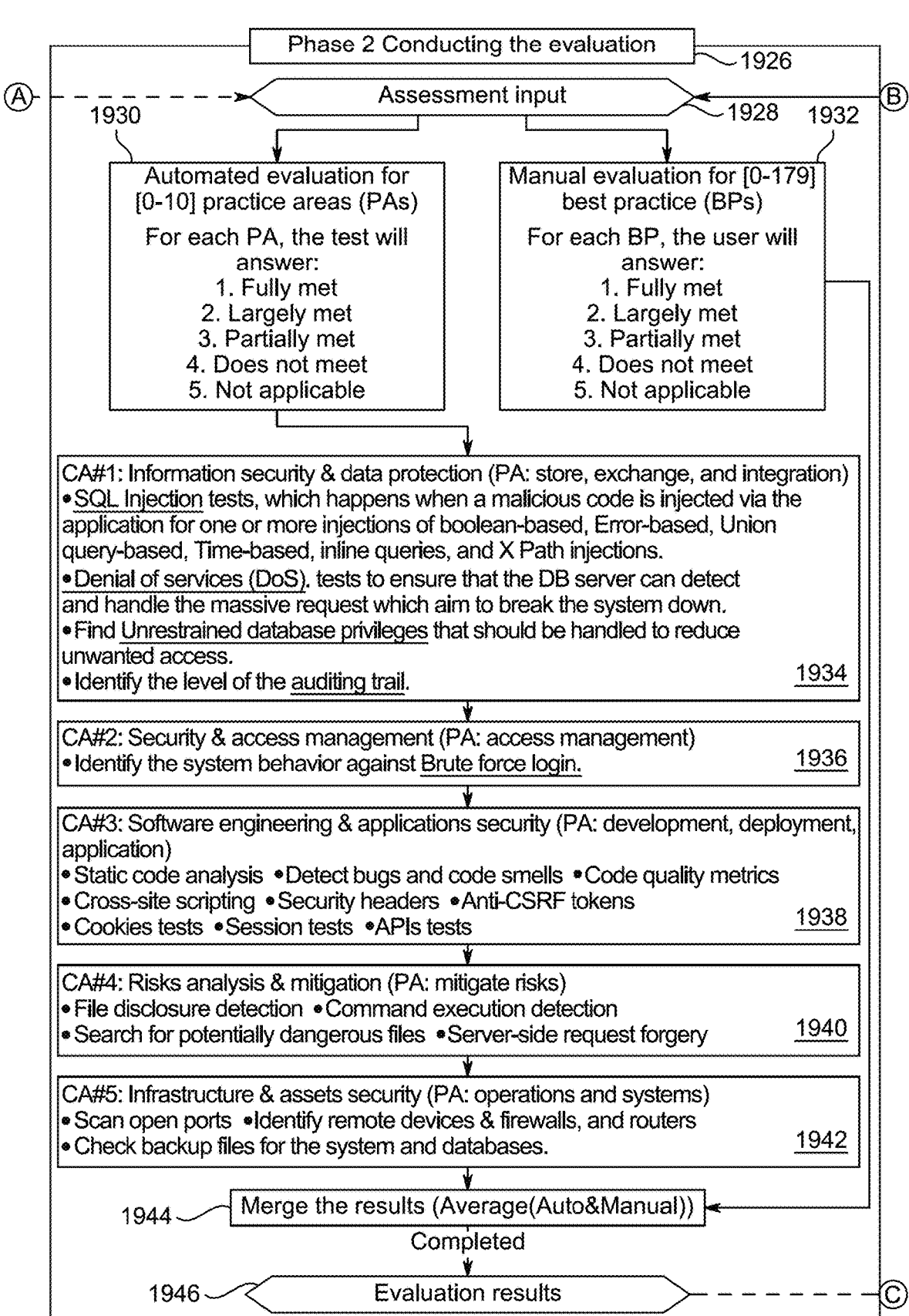
Figure 19:
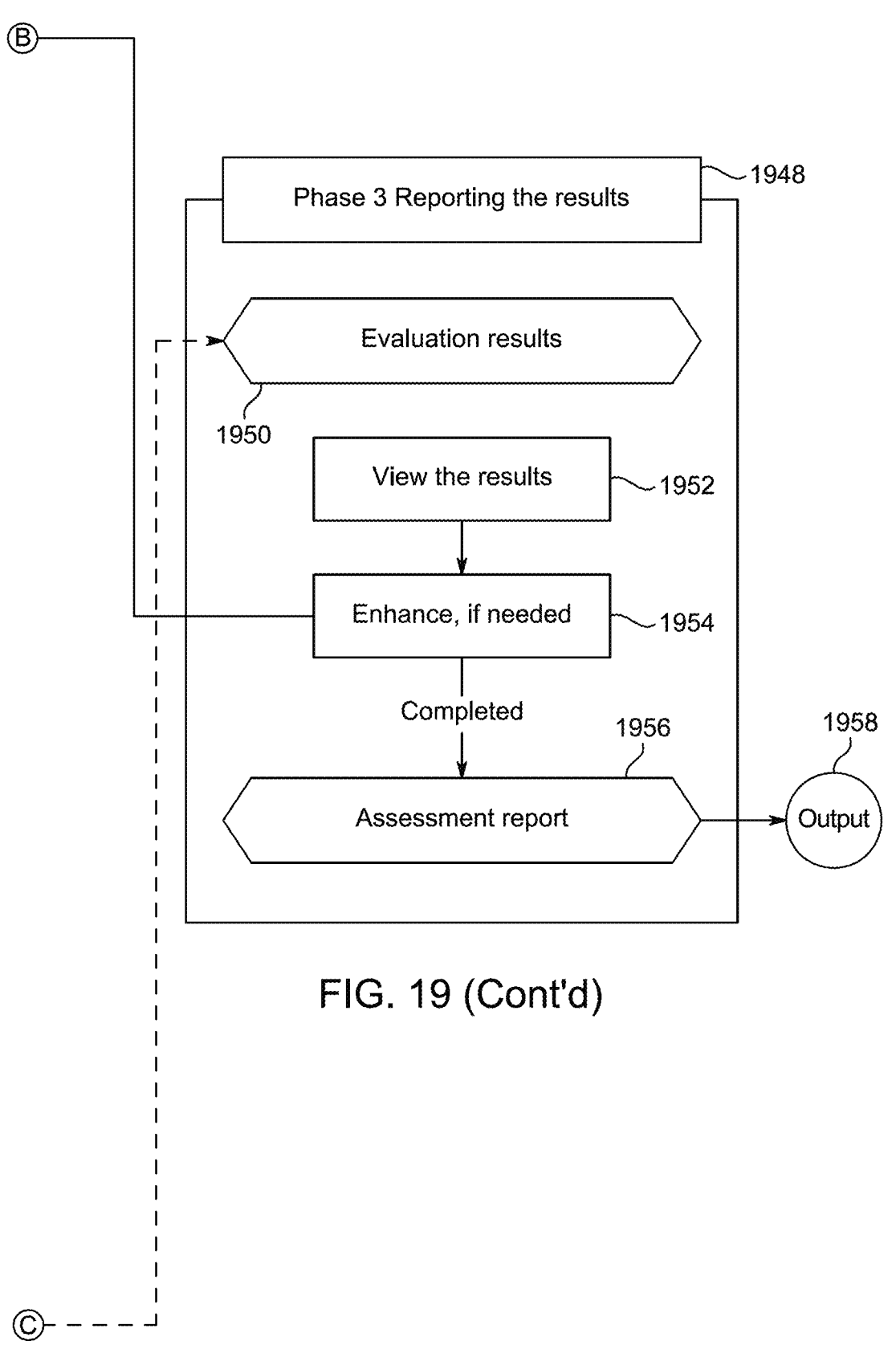

FIG. 19 illustrates an assessment system that facilitates the execution of a maturity model assessment process designed for digital transformation and cybersecurity practices. The figure represents Phase 1, referred to as the planning and preparation phase, step 1902, which encompasses multiple critical components essential for organizing and preparing an organization to conduct a maturity model assessment.

The planning and preparation phase starts with making a top management decision, at step 1904. The top management decision represents the initiation of the assessment process, wherein the senior management agrees on undertaking the maturity model assessment. This decision lays the foundation for all subsequent activities by providing authorization and support from the organization's leadership.

Following the management decision, input to the top management is gathered, at step 1906. Input to the top management involves collecting all necessary information required for senior management to make informed decisions regarding the scope, resources, and objectives of the assessment. This input helps align the assessment objectives with the organization's strategic goals and sets expectations for the process.

At step 1908, basic organization and sponsor information is collected. Basic organization and sponsor information pertains to gathering foundational details about the organization, including the identification of the sponsor. The sponsor represents a senior-level individual within the organization responsible for overseeing the assessment process and ensuring alignment with organizational objectives. Basic organization and sponsor information is fundamental to establishing the scope and context of the assessment.

Following the sponsor information, at step 1910, identifying objective and scope involves defining the primary objectives and scope of the assessment. The objective and scope identification is crucial as it specifies the key focus areas of the assessment, such as evaluating cybersecurity practices and digital transformation efforts, and helps set clear boundaries for what will and will not be included in the assessment.

At step 1912, any assessment constraint identifies limitations that could affect the assessment process. These constraints may include factors like resource availability, time restrictions, or technological limitations that need to be considered to ensure that the assessment is feasible and realistic. Listing assessment constraints helps in setting practical expectations and preparing for any challenges that may arise during the process.

The system then proceeds to identify the assessment stakeholders at step 1914, wherein stakeholders who will be involved in the assessment are identified and listed. Stakeholders may include project managers, technical experts, team leads, and other personnel with the necessary expertise to contribute to the evaluation process. Identifying assessment stakeholders ensures that all relevant individuals are included and assigned specific roles.

Subsequently, at step 1916 stakeholders, areas, and projects are assigned that involves allocating specific capability areas, projects, or processes to the identified stakeholders. Assigning stakeholders, areas, and projects ensures that each aspect of the assessment is handled by knowledgeable personnel, thereby providing structure and accountability to the assessment process.

At step 1918 the assessment type is selected. During this phase, the type of assessment to be conducted is determined. The assessment type 1918 can vary based on the organization's needs, such as a comprehensive assessment covering all areas or a targeted assessment focusing on specific aspects of digital transformation and cybersecurity. The selection of assessment type 1918 is vital to ensure that the methodology aligns with the assessment objectives.

Following the assessment type selection, at step 1920, upload source code and fill the running systems access data involves gathering technical input required for the assessment. This step requires uploading source code and providing access details to running systems, which are necessary for evaluating the technical aspects of the organization's cybersecurity and digital transformation practices. Uploading source code and system access data 1920 ensures that the assessment team has the resources needed to perform an in-depth analysis.

The assessment input is created at step 1922, which refers to the formal creation and compilation of all preparatory information for the assessment. The assessment input ensures that all previously gathered inputs, including stakeholder information, constraints, objectives, and logistical preparations, are compiled, reviewed, and made ready for use during the assessment.

Assessment input creation is completed 1924 marks the completion of all input requirements needed for the assessment. This component ensures that all preparatory tasks, including gathering information, assigning roles, validating input data, and logistical arrangements, are finalized. Completing assessment input creation ensures that the assessment process can proceed smoothly, with all necessary preparations addressed.

At Phase 2, referred to as conducting the evaluation, step 1926, which encompasses multiple critical components for systematically evaluating the organization's maturity in terms of digital transformation and cybersecurity practices.

At step 1928, assessment input is gathered, which serves as the foundational data used throughout the evaluation process. The assessment input includes various metrics, parameters, and supporting information required to evaluate the organization's practices in a structured manner.

The assessment process is divided into two distinct parts: automated evaluation, at step 1930, and manual evaluation, at step 1932. In the automated evaluation at step 1930, a set of practice areas (PAs), ranging from 0 to 10, are evaluated. For each practice area, the evaluation requires an answer based on specific criteria, rated on a scale of 1 to 5, including "Fully met," "Largely met," "Partially met," "Does not meet," and "Not applicable." The automated evaluation ensures a systematic and unbiased assessment of quantifiable parameters.

Parallel to the automated evaluation is the manual evaluation, at step 1932, which focuses on assessing best practices (BPs), ranging from 0 to 179, as listed in Table 43. In the manual evaluation, the user assesses each best practice, providing responses similar to those in the automated evaluation, based on the level of adherence. The manual evaluation relies on expert judgment to evaluate areas where subjective analysis and contextual understanding are necessary.

At step 1934, the evaluation focuses on Capability Area (CA) #1, titled information security and data protection. This involves practice areas related to storing, exchanging, and integrating data securely. The evaluation includes SQL injection tests to determine vulnerabilities from malicious code injections, denial of service (DoS) tests to verify the resilience of database servers, checks for unrestrained database privileges that could lead to unauthorized access, and an audit trail review to ensure proper monitoring.

Following CA #1, at step 1936, Capability Area (CA) #2, titled security and access management, is evaluated. This involves assessing access management practices, including evaluating the system's resilience against brute force login attempts to ensure robust access control mechanisms.

Next, at step 1938, the system evaluates Capability Area (CA) #3, titled software engineering and applications security. This includes evaluating the software development and deployment processes. Tests in CA #3 involve static code analysis to detect bugs and ensure code quality, cross-site scripting checks, anti-CSRF token verification, and tests for session security and API communication.

At step 1940, Capability Area (CA) #4, titled risks analysis and mitigation, is assessed. This includes tests aimed at identifying and mitigating potential security risks. The assessment involves file disclosure detection, command execution detection to prevent unauthorized commands, and server-side request forgery checks to verify defenses against server exploitation.

The system then proceeds to assess Capability Area (CA) #5, titled infrastructure and assets security, at step 1942. This capability area includes evaluating the organization's operational systems and infrastructure. Assessments include scanning ports, identifying remote devices and firewall rules, and verifying backup files to ensure compliance with security protocols and safeguard data integrity.

At step 1944, the results obtained from both automated and manual evaluations are merged. The merging process involves averaging the outcomes of both types of evaluations, ensuring a comprehensive result that combines objective data and expert judgment, thereby providing a holistic view of the organization's cybersecurity and digital transformation maturity level.

At step 1946, the evaluation process is completed. The completed evaluation results represent the outcome of the entire assessment, intended to guide the organization in understanding its current maturity level and identifying specific areas for improvement to enhance its cybersecurity and digital transformation practices.

Phase 3, referred to as reporting the results, at step 1948, which encompasses multiple critical components for documenting and conveying the outcomes of the assessment to relevant stakeholders.

At step 1950, evaluation results are generated. This step involves consolidating the findings of the maturity model assessment, encompassing both the automated and manual evaluations conducted in the previous phases. The evaluation results provide a detailed overview of the organization's current maturity level regarding digital transformation and cybersecurity practices.

Following the generation of evaluation results, at step 1952, the results are viewed by the relevant stakeholders. Viewing the results allows stakeholders to review the findings in detail, gaining insights into the strengths and weaknesses of the organization's cybersecurity and digital transformation efforts. This step is crucial for providing stakeholders with a clear understanding of the assessment outcomes and facilitating informed decision-making.

At step 1954, the results are enhanced if needed. Enhancing the results involves further refining or adjusting the evaluation outcomes based on additional insights or feedback from stakeholders. This may include incorporating supplementary information or addressing any discrepancies identified during the initial review. The enhancement process ensures that the results accurately reflect the organization's current status and provide meaningful insights for improvement.

Step 1956 represents the completion of the assessment report. The assessment report is completed by compiling all relevant findings, conclusions, and recommendations derived from the evaluation process. This report serves as an official document detailing the results of the assessment and providing actionable guidance for enhancing the organization's cybersecurity and digital transformation practices. The completion of the assessment report signifies the culmination of the evaluation phase.

At step 1958, the output is generated. The generated output includes the final assessment report and any supplementary documents or data that support the findings of the assessment. This output is intended for dissemination to relevant stakeholders, providing them with the necessary information to make strategic decisions and implement improvements based on the assessment results.

Table 36 illustrates the overall assessment phases and outputs associated with the assessment process, while Table 37 provides a sample assessment input, demonstrating the structure and necessary elements involved in planning a maturity model assessment. The assessment planning and preparation phase 1902 effectively guides the organization through the preparatory stages of conducting a digital transformation and cybersecurity assessment, ensuring all necessary components are identified and addressed before proceeding to the evaluation phase.

The assessment methodology, as illustrated by FIG. 19, for the maturity model is described in the following section. After the development of the model, it is necessary to determine and implement an assessment method utilizing a tested tool before its application in real case studies. The developed model is generic and not specific to any targeted domain, making it applicable to organizations of varying sizes, irrespective of the software and system types in use. The model also supports continuous representation with the ability to set selective goals and objectives. Furthermore, the model is designed to allow for self-assessment through clearly defined steps, as described herein.

The assessment examines the organization's practices and processes in comparison to the maturity model. Several recognized assessment standards exist for reference. For instance, the ISO/IEC 33001 assessment process consists of five stages: planning, data collection, data validation, process rating, and reporting. Additionally, the SCAMPI assessment comprises three stages: planning and preparation, conducting the evaluation, and reporting the results to the sponsor. The comparison between the phases of these standards is provided in Table 35.

Figure 20:
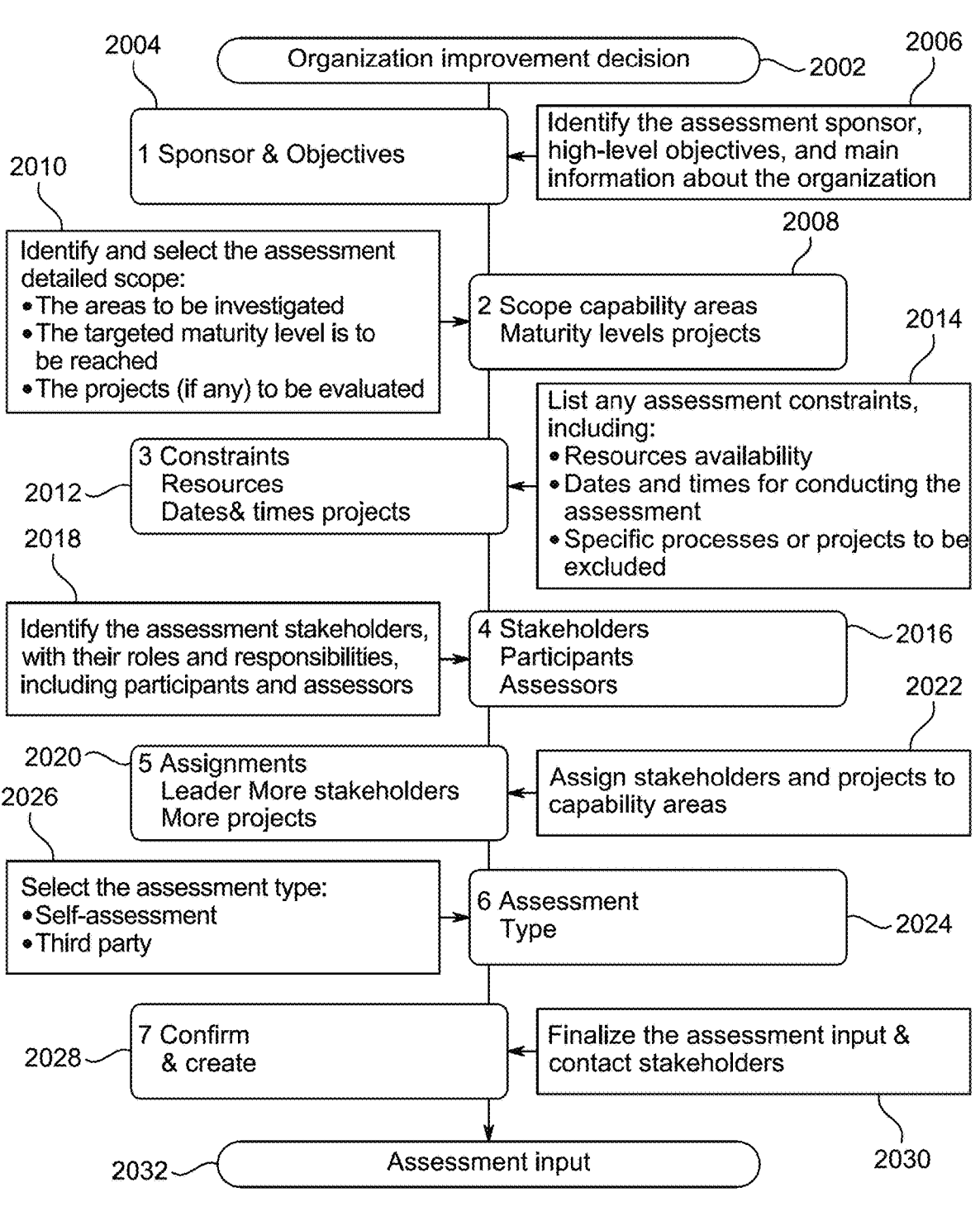
FIG. 20 is a flow diagram of the improvement decision method, in accordance with an exemplary aspect of the disclosure.

FIG. 20 illustrates an assessment system that facilitates the execution of an organization improvement decision, represented as step 2002, in the context of assessing digital transformation and cybersecurity maturity. FIG. 20 represents Phase 1, the planning and preparation phase, and encompasses multiple components essential for organizing and preparing an organization to conduct the assessment.

The planning and preparation phase starts with the organization improvement decision, at step 2002. The organization improvement decision represents the initiation of the assessment process, wherein the organization's management decides to undertake an improvement effort. This decision lays the foundation for all subsequent activities, authorizing further assessment and planning steps.

Following the decision, the system identifies the assessment sponsor, objectives, and the main organizational information at step 2006. The identification of sponsor and objectives provides context to the entire assessment process, at step 2004, by aligning it with high-level objectives and gathering foundational information about the organization, such as strategic priorities and intended outcomes of the improvement initiative.

At step 2010, the system identifies the sponsor and objectives in more detail. This includes selecting areas to be investigated, defining the targeted maturity level to be reached, and determining if any projects are to be evaluated. The identification of the sponsor and objectives sets the scope and high-level goals for the assessment.

At step 2008, scope capability areas are defined, which include specifying capability areas and maturity levels related to the projects. This step helps in setting clear boundaries for the assessment, detailing the organizational capabilities to be evaluated and ensuring alignment with the improvement objectives.

At step 2012, assessment constraints are identified. The assessment constraints include listing resources, dates, times, and any limitations related to the assessment. This helps to define the framework within which the assessment must be conducted, ensuring that practical considerations such as resource availability and scheduling are taken into account.

At step 2014, assessment constraints are listed in more detail, so that resources are allocated, dates and times for conducting the assessment are established, and specific processes or projects to be excluded from the assessment are

TABLE 35

| | | SCAMPI vs. ISO/IEC 33001 assessment phases | |
| --- | --- | --- | --- |
| Phase | SCAMPI | ISO/IEC 33001 | Notes |
| 1 | Planning and preparation | Planning | Plan for the assessment |
| 2 | Conducting the evaluation | Data collection | Prepare and collect data using the appropriate tools, documents, projects, and stakeholders. |
| | | Data validation | The assessors' role is to validate the collected data. |
| | | Process rating | Evaluate each practice and give it the correct rating based on its measurement definitions. |
| 3 | Reporting the results | Reporting | Review and report the assessment results to the sponsor, including the improvement feedback. |

In order to facilitate self-assessment and provide insights into the strengths and limitations of practices, along with suggestions for improvement in subsequent cycles, a tailored assessment methodology is developed. FIG. 20 is a flow diagram of the improvement decision method.

clearly specified. By defining these constraints, the assessment remains feasible and realistic, and provides clarity regarding the scope.

The system then identifies the assessment stakeholders at step 2016, including participants and assessors. Identifying stakeholders involves determining who will be involved in the assessment and specifying their roles and responsibilities. Stakeholders can include project managers, technical experts, or team leaders who possess the necessary expertise to contribute effectively to the evaluation.

At step 2018, stakeholder details are elaborated further, including defining participants, assessors, and their roles within the assessment process. This step is crucial for ensuring that every relevant individual is accounted for and understands their responsibilities in the assessment.

Step 2020 involves assigning stakeholders and projects to capability areas. At this step, stakeholders, leaders, and projects are allocated to specific capability areas based on their expertise. Assigning stakeholders to particular areas ensures that knowledgeable personnel handle each aspect of the assessment, contributing to a structured and well-coordinated process.

At step 2024, the assessment type is selected. The assessment type may be a self-assessment or may involve a third-party evaluation. Selecting the assessment type ensures that the methodology used aligns with the organization's objectives and available resources, providing either an internal or an external perspective on the maturity level.

Step 2028 involves confirming and creating the assessment input. Step 2028 signifies the formal preparation of all necessary components required for conducting the assessment. It also includes finalizing the involvement of stakeholders, confirming the logistics, and creating the overall assessment plan.

At step 2030, the finalized assessment input is formally documented. The assessment input is created at step 2032. The assessment input is a critical component that includes all necessary information required for conducting the evaluation, such as objectives, scope, stakeholder involvement, capability areas, and project details. It serves as a reference for executing the assessment in a consistent and systematic manner.

The methodology described through FIG. 20 merges and customizes elements from the ISO/IEC 33001 and SCAMPI standards. The proposed phases of the assessment are outlined in Table 36 and include planning and preparation, conducting the evaluation, and reporting the results.

TABLE 36

Assessment Phases and Outputs

| Phase | Phase Name | Outputs |
| --- | --- | --- |
| — | — | Top management decision |
| 1 | Planning and preparation | Assessment input (Sponsor, Objectives, Areas, Levels, Projects, Constraints, Type, Stakeholders) |
| 2 | Conducting the evaluation | Evaluation results (input modification, gathered data, assessment approach, practices profiles) |
| 3 | Reporting the results | Assessment report (maturity level for each area, improvement feedback) |

Phase 1, planning and preparation, involves careful planning to ensure the organization maximizes the benefits of the maturity model's feedback. The assessment input must be prepared by the organization and must include the identified sponsor, objectives of the evaluation, scope, requirements, constraints, targeted practice areas, sample projects, and participants. The steps of this phase are illustrated in FIG. 20. The output of this phase is the assessment input, which will inform the next phase. These steps are the responsibility of the sponsor, with the exception of the first step, which is initiated by senior management.

The initial step involves (1) identifying the sponsor, high-level objectives, and primary information. The sponsor must possess the necessary authority within the assessment scope. Typically, the sponsor is a senior manager responsible for the organization's development. Additionally, essential information about the organization must be provided, such as its name, size, domain, and the primary goal for conducting the assessment.

The second step (2) entails identifying the objectives or purposes of the assessment. This includes determining the gaps within the selected areas and projects. The extent to which the sponsor wishes to evaluate specific areas and levels must be identified. For instance, the objective may be to achieve level 4 of maturity in the evaluation of three selected capability areas (CAs), including governance and policies, risk analysis and mitigation, and running operations.

The third step (3) requires identifying the constraints that may impact the assessment. Constraints depend on the specific characteristics of the assessment and may include factors such as dates, duration, and projects to evaluate. These constraints must be clearly documented.

The fourth step (4) involves selecting and contacting the stakeholders who will participate in the assessment. Stakeholders may include participants and assessors, such as team leaders, project managers, and information technology specialists. Their availability and commitment to the assessment process must be confirmed.

The fifth step (5) assigns one or multiple stakeholders to each capability area (CA). Among the stakeholders, a leader for each CA is identified. Additionally, relevant projects for evaluation must be selected. Certain practices apply to the organization as a whole, while others pertain to specific projects. Stakeholders assigned to each CA must have access to the necessary information, including documents and materials relevant to the assessment.

The sixth step (6) involves selecting the assessment type, which may be a self-assessment or conducted by a third party. In the case of self-assessment, the assessors are typically members of the stakeholder group. However, if an external assessment is required, the external assessors must be identified and authorized accordingly.

The seventh (7) and final step in this phase is to confirm the assessment period and contact the stakeholders to finalize the assessment input. Table 37 provides a sample assessment input containing the key elements required for this phase.

TABLE 37

Assessment Input
Digital Transformation Cybersecurity Assessment Input

| Sponsor name | SP1 | Organization name | ORG1 |
| --- | --- | --- | --- |
| Organization size | Small | Organization domain | DOM1 |

TABLE 37-continued

| Assessment Input | | | |
|---|---|---|---|
| Digital Transformation Cybersecurity Assessment Input | | | |
| Objectives | 1. Enhance the security of the organization's software. 2. Identify the software development weaknesses. | | |
| Constraints | 1. P1 project is under development 2. The evaluation period is 8-23 May 2022 (12 working days) | | |
| Assessment Type | Self | | |
| Capability Area | Leader | Other Stakeholders | Scope |
| CA1 (Level 4) | S1 (Software Developer) | | P1, P2 |
| CA2 (Level 5) | S2 (Project Manager) | | Org |
| CA3 (Level 5) | S3 (Security Specialist) | S1 | Org |
| CA4 (Level 5) | S4 (General Manager) | S3 | P2 |
| CA5 (Level 4) | S5 (IT Manager) | | Org |

Once the planning and preparation phase (Phase 1) is complete, Phase 2, conducting the evaluation, begins. During this phase, the evaluation team conducts investigations to determine the extent to which practices have been implemented, and data is collected and validated. Data collection can be accomplished through system documentation, interviews, or direct observation. A checklist summarizing the evaluation requirements for each selected CA is provided, ensuring that all necessary elements are in place. Each CA is assessed based on objectives, maturity levels, selected stakeholders, identified constraints, and available documentation.

Data is then evaluated using a set of indicators to assign ratings. The process attribute ratings are recorded as the practice profile for the evaluated project or organizational unit. Additionally, the decision-making process used to derive rating judgments is documented, such as the area leader's final judgment or majority voting. Depending on the nature of the practice, two evaluation cases are possible, as described in Table 38.

TABLE 38

| Rating Options | | | |
|---|---|---|---|
| Answer | Meaning | By Range | By Presenting Evidence |
| FM | Fully met | 86-100% | 1 + direct and 1 + indirect and 0 weakness |
| LM | Largely met | 51-85% | 1 + direct and 1 + indirect and 1 + weakness |
| PM | Partially met | 16-50% | (1 + direct or 1 + indirect) and 1 + weakness |
| DM | Does not meet | 0-15% | 0 direct and 0 indirect and 0 + weakness |
| NA | Not Applicable | — | — |

In the first case, a quantitative percentage measurement from 0% to 100% is applied, with a four-point rating scale based on ISO/IEC 33001. The second case, which applies when quantitative measurements are not feasible, involves evaluating direct or indirect evidence alongside the number of weaknesses identified. This case uses a rating scale consistent with SCAMPI. If neither case applies, and the assessed practice is not relevant to the organization, a not applicable (NA) rating may be selected for optional practices.

Table 38 outlines the various rating options, including "fully met," "largely met," "partially met," "does not meet," and "not applicable," along with their respective criteria. Additionally, the types of assessment evidence include direct evidence (proof of functional performance), indirect evidence (affirmation of implementation), and weaknesses (noted risks or deficiencies).

Following the evaluation, Phase 3 involves reporting the results. During this phase, the evaluation results are reviewed, and a maturity level is assigned to each CA based on the results. The assessment report also includes a summary of the organization's strengths and weaknesses, along with recommendations for improvement. A sample assessment report is provided in Table 39, showing the targeted and actual maturity levels for each CA and the corresponding improvement feedback.

TABLE 39

| Assessment report example | | | |
|---|---|---|---|
| Capability Area | Targeted ML | Actual ML | Improvement feedback |
| CA1 | 4 | 3 | |
| CA2 | 4 | 4 | |
| CA3 | 4 | 2 | |
| CA4 | 4 | 3 | |
| CA5 | 4 | 1 | |

Figure 21:
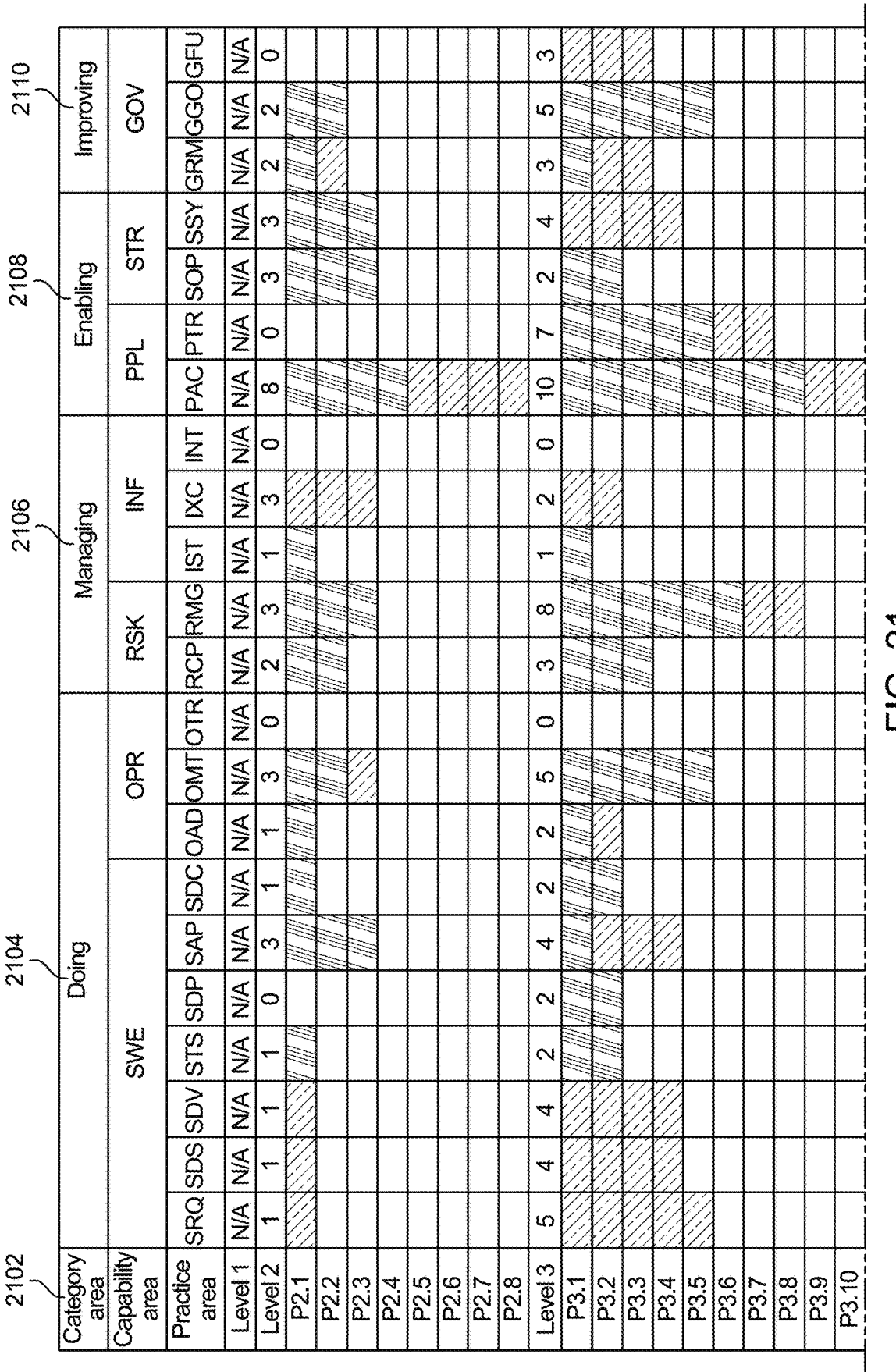
FIG. 21 illustrates an assessment tool configured in an excel spreadsheet format, in accordance with an exemplary aspect of the disclosure.
Figure 21:
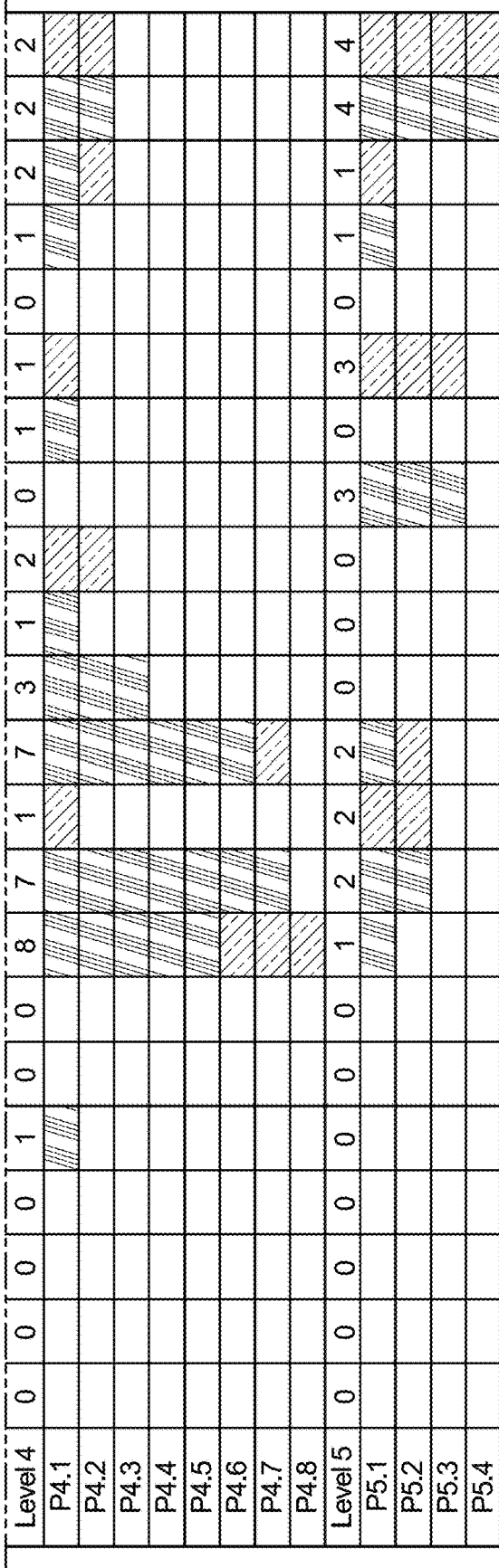

FIG. 21 illustrates an assessment tool configured in a spreadsheet, such as an Excel format, referenced herein as 2100. The spreadsheet assessment tool 2100 provides a framework where assessors can input their evaluations of various practice areas, facilitating the structured analysis of a capability area's maturity level. The table, as depicted in FIG. 21, comprises multiple rows and columns with cells that are categorized and coded for assessment purposes. Each row in FIG. 21 represents a specific practice area within a capability area, while each column, categorized under "doing 2104" "managing 2106" "enabling 2108" and "improving 2110" corresponds to the different aspects of the maturity model's assessment framework.

For instance, the column under the "doing" category 2104 is designated for software engineering practices, SWE and OPR and further subdivided into sub-practices, as shown in the cells. The table displays the assessed status of each sub-practice by marking the cells according to their respective evaluations. Color coding can be applied, with blue representing optional practices 2102, grey indicating practices that have no applicable assessment data and white indicating areas where core practices were assessed. The column under the "managing" category 2106 is further sub divided into RSK and INF. The column under the "enabling" category 2108 is further sub divided into PPL and STR. The column under the "improving" category 2110 is further sub divided into GOV. FIG. 21 defines the level separator (Pn.m), indicating the sequential order of practices assessed at each level. Additional assessment scales, such as fully met (FM), largely met (LM), partially met (PM), and not applicable (NA), are used to quantify the degree of completion or applicability of each practice. As such, FIG. 21 serves as a visual representation of the current assessment tool, with the assessor filling in the various cells according to the practice's performance against the targeted criteria.

Table 35 and Table 36 provide further context to the assessment process and evaluation steps, highlighting the different assessment phases. The tools and process described in FIG. 21 align with the methodology specified in these tables, supporting a structured and systematic evaluation of maturity levels across various capability areas.

Figure 22:
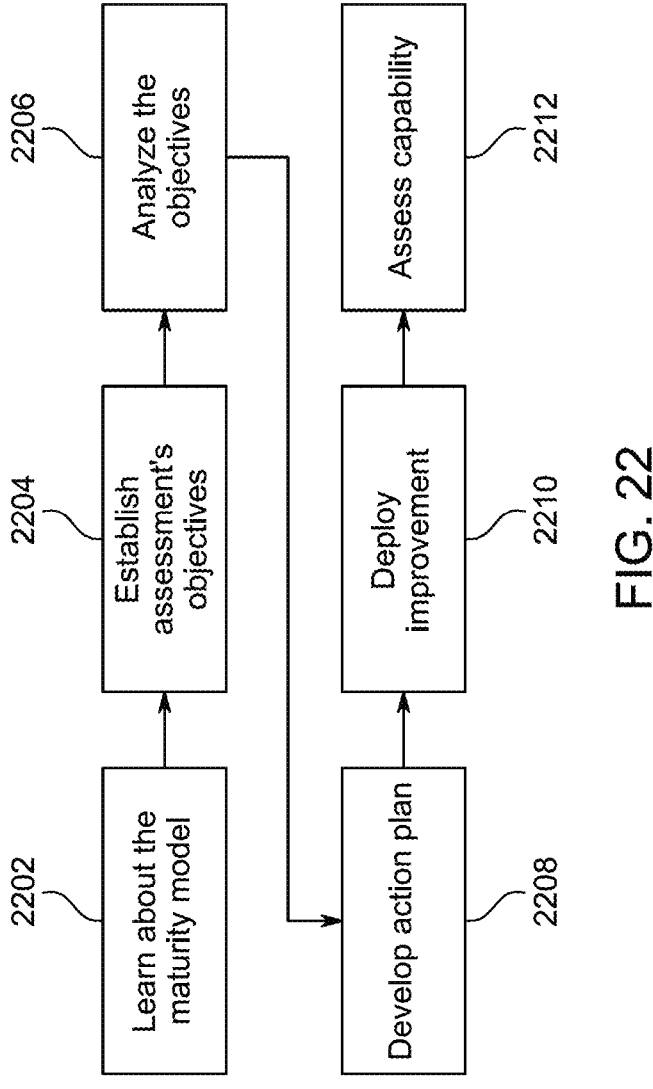
FIG. 22 depicts the continuous improvement process using the model, in accordance with an exemplary aspect of the disclosure.

FIG. 22 depicts the continuous improvement process using the model 2200. In this figure, the maturity assessment model follows six primary steps that guide the organization towards continuous improvement, as outlined in the disclosure. These steps are visually represented as sequential blocks within FIG. 22, each representing a distinct stage of the assessment methodology. The first block, labeled as "learn" 2202, emphasizes the importance of organizational learning and understanding of the applied maturity model. The second step, "establish objectives" 2204, involves defining the organization's objectives, particularly focusing on improvement in targeted practice areas.

The next step, "analyze" 2206, emphasizes analyzing the collected data to identify gaps and opportunities for improvement. In the subsequent step, "develop an action plan" 2208, a strategic action plan is formulated based on the analysis to drive organizational improvement. The fifth step, "deploy improvement" 2210, involves implementing the proposed action plan and integrating the improvements into the organization's ongoing processes. Finally, the last block, "assess capability" 2212, measures the outcomes of the improvements and ensures that the organization continuously progresses towards its goals.

The present embodiment relates to an assessment methodology for evaluating organizational maturity using the disclosed maturity model. Prior to applying the model, it is essential to understand how it will benefit the organization and the relevance of maturity from the model's perspective. It is equally important to recognize that the core strengths of any organization reside in the triad of people, processes, and tools. A thorough understanding and investment in these areas requires consistent commitment from top management, supported by a clear organizational vision. Each element of this triad is interdependent, creating a cohesive framework for the organization's development.

The "people" component refers to both internal and external stakeholders, including individuals such as project managers and developers, who must be equipped with the necessary knowledge and skills. The "processes" component encompasses all organizational practices and methodologies, which should be aligned with best industry practices, such as agile frameworks. The "tools" component involves the assets that support systems security and operations, enabling the organization to undertake secure digitalization.

These tools may include software systems, devices, support kits, and reporting mechanisms that ensure the organization's objectives are met.

As part of the organization's overall vision, establishing clear objectives is paramount. Objectives may arise from prior successes that need to be maintained or from challenges that must be overcome. Once these have been identified, the organization can establish specific performance improvement objectives, which are aligned with its overarching goals. The objectives must meet predefined criteria to ensure they are specific, measurable, achievable, realistic, and time bound.

The next step in the assessment process involves analysing the objectives defined in the previous phase. The assessment sponsor takes these objectives, along with current organizational processes, as inputs and maps them against the model's defined elements, such as capability areas. Following this mapping, a gap analysis is performed between the current processes and the defined practice areas within the model, allowing the organization to identify practices that require improvement.

Subsequent to this analysis, an action plan is developed. This step includes formulating or updating the organization's strategy and outlining the necessary activities to achieve the defined objectives. It is crucial that the strategy remains flexible, as adaptability is one of the core principles of a successful digital transformation. This flexibility allows for iterative enhancements and improvements, with cybersecurity considerations integrated into each stage of development. Additionally, the priorities outlined in the action plan must be aligned with the objectives. Any modifications to the strategy must be supported by top management, with full commitment from the relevant stakeholders.

The improvement phase involves the careful selection of pilot projects and the corresponding assessment stakeholders. Projects selected for assessment should be recent and easily accessible, while the chosen stakeholders should be individuals who play an active role in the organization's digital transformation strategy. The maturity model provides reports and feedback for improvement, but it is important to remember that the model itself is a tool for continuous enhancement, not the ultimate goal. Improvements should be implemented based on the findings and insights generated from the model.

The assessment of capability is then conducted through either an evaluation or appraisal method, depending on the specific goals of the assessment. While formal and informal evaluations are commonly employed, the disclosed model utilizes a self-assessment approach supported by a web-based tool, as previously described in this chapter. This self-assessment allows the organization to measure its progress against the maturity model and identify areas for future growth and development.

Case studies can be used to obtain information based on real world-perspectives. A case study was conducted using the disclosed maturity model for a government organization. The selected organization has a strong reputation for its digital transformation during the past two years. Therefore, the case study was conducted on one of the projects on selected CAs: assessment input was prepared using the assessment tool, as shown in Table 40.

TABLE 40

Case Study Assessment Input
Digital Transformation Cybersecurity Assessment Input

| | | | |
|---|---|---|---|
| Sponsor name | Development leader | Organization name | Classified |
| Organization size | Large | Organization domain | Government |
| Objectives | 1. Evaluate the maturity model 2. Get any recommendations from the assessment to enhance the security. | | |
| Constraints | 1. Only one project will be evaluated. | | |
| Assessment Type | Self | | |
| Capability Area | Leader | Other Stakeholders | Scope |
| Human Security and Access Management (Level 4) | AK (SW Developer) | MA (SW Developer) | Project |
| Software Engineering and Applications Security (Level 4) | AK | MA | Project |
| Running Operations (Level 5) | AK | MA | Project |

FIG. 23 illustrates a case study evaluation review 2300 conducted on three distinct capability areas (CAs) 2302: human security and access management, software engineering and applications security, and running operations. The review is segmented into evaluated practices and pending practices, as shown in column 2304, where the evaluation focuses on practices that are fully met, largely met, partially met, or not applicable. Pending status is indicated in column 2306. Each practice is identified with a specific identifier, such as P-1623 or P-0121, depending on the capability area. The human security and access management capability area 2302 is shown with various practices such as P-1623 and P-1624 evaluated and some pending practices such as P-1737 and P-1752. The software engineering and applications security capability area 2304 displays evaluated practices, including P-0121 and P-0131, as well as pending practices such as P-0634. Similarly, the running operations capability area 2306 presents evaluated practices like P-0821 and P-0831, alongside pending practices such as P-1041 and P-1052. The evaluation visually displays the status of all practices in terms of completion and pending reviews.

FIG. 24 illustrates the case study evaluation results 2400 for the same capability areas assessed in FIG. 23. The results reflect the organization's maturity levels achieved in each area. For the human security and access management area 2402, the target level was maturity level 5, which was successfully achieved. In the software engineering and applications security area 2404, the target level was maturity level 4, which was also reached. However, in the running operations area 2406, the organization achieved only maturity level 3, with the next level requiring the implementation of practice P-0944 to upscale to the next maturity level, as indicated in the "to upscale one level" column 2408. The table format highlights the targeted and actual maturity levels for each area and identifies the practices required for further improvement.

FIG. 25 illustrates a detailed view of a practice review 2500, focusing on maintenance under the running operations capability area. The practice in review is associated with security violations, event notifications, and incident response stages. The evaluation details include statements on tracking information systems, air conditioning, and cooling systems, as well as ensuring whether critical applications are performing correctly or not monitoring their performance. The assessor is presented with evaluation options including "fully met," "largely met," "partially met," and "does not meet." In the given example, the assessment outcome was determined as "partially met", which was selected and indicated by the assessor.

FIG. 26 illustrates a user interface 2600 for an assessment tool designed to assist organizations with cybersecurity and digital transformation assessments. The assessment tool interface is structured into three main functions, each denoted with respective navigational elements. The left side of the interface displays a button "Create" for initiating a new assessment, allowing users to set objectives, select stakeholders, and define project parameters. The central portion of the interface shows a "Complete" button, which enables users to continue an existing assessment by entering an assessment ID. The right side contains a "View" button for accessing the final assessment report after evaluation completion, allowing users to review the generated results based on previously conducted assessments. The entire interface is focused on simplifying the assessment process with clear and distinct options for creating, completing, or viewing assessments.

FIG. 27 illustrates a first step 2700 of the assessment process using the assessment tool shown in FIG. 26, wherein the basic information of the organization is collected. The user, labeled as the sponsor, is prompted to fill in the details of the assessment sponsor's name, shown as "Malek", who is responsible for the assessment. Further details include organization name "Computer Science Dept. at KFUPM", and organization size selection, where "Large (251+)" is indicated, representing an organization with over 251 employees. Additionally, the organization domain is specified as "Education", denoting the sector under evaluation. The form includes a section for specifying high-level objectives 2710, which in this example are outlined as (1) enhancing the security of the department's software and (2) identifying software development weaknesses. This step concludes the initiation phase of data entry required for the planning and preparation of the assessment process.

FIG. 28 illustrates a second step 2800 of the assessment process using the assessment tool, where the user identifies and selects the assessment objectives and scope. The interface provides options for selecting the targeted capability areas, which include governance and policies, information security and data protection, human security and access management, software engineering and applications security, risks analysis and mitigation, infrastructure and assets security, and running operations. Each capability area is assigned a maturity level, with options ranging from maturity level 3 to maturity level 5, depending on the organization's goals. Additionally, the user is prompted to enter the names of the projects that will be evaluated during the assessment. In this example, the projects listed are the advanced employee management system, image encryption using the AES algorithm, and the Android local train ticketing system.

Figure 29:
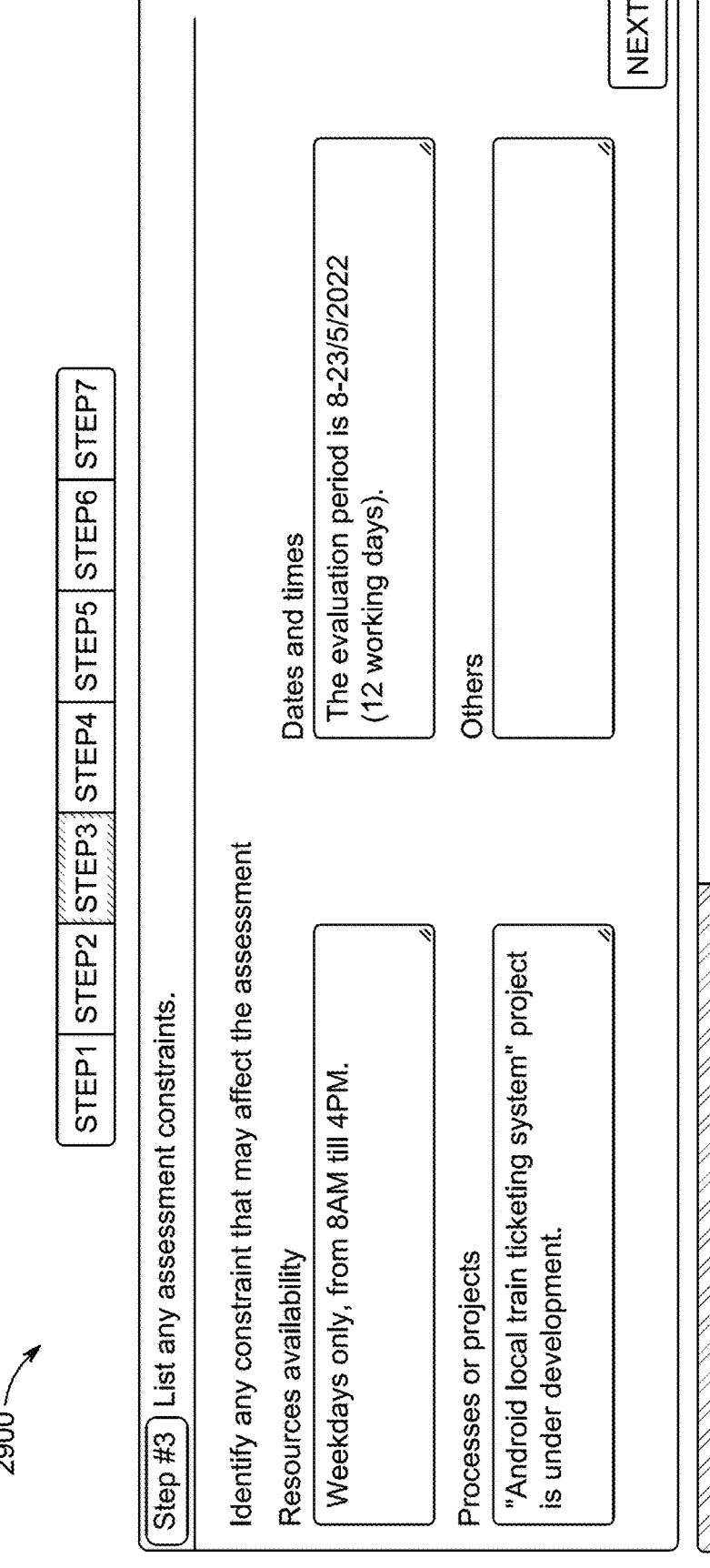
FIG. 29 illustrates a third step of the assessment process using the assessment tool, in accordance with an exemplary aspect of the disclosure.

FIG. 29 illustrates a third step 2900 of the assessment process using the assessment tool, where the user identifies any constraints that may affect the assessment. The interface provides input fields for specifying resource availability, project status, dates and times for the evaluation, and other potential constraints. In this example, the resources are available only on weekdays from 8 AM until 4 PM, and one of the projects, the Android local train ticketing system, is still under development. The evaluation period is defined as occurring between the 8th and 23rd of May 2022, totaling 12 working days.

Figure 30:
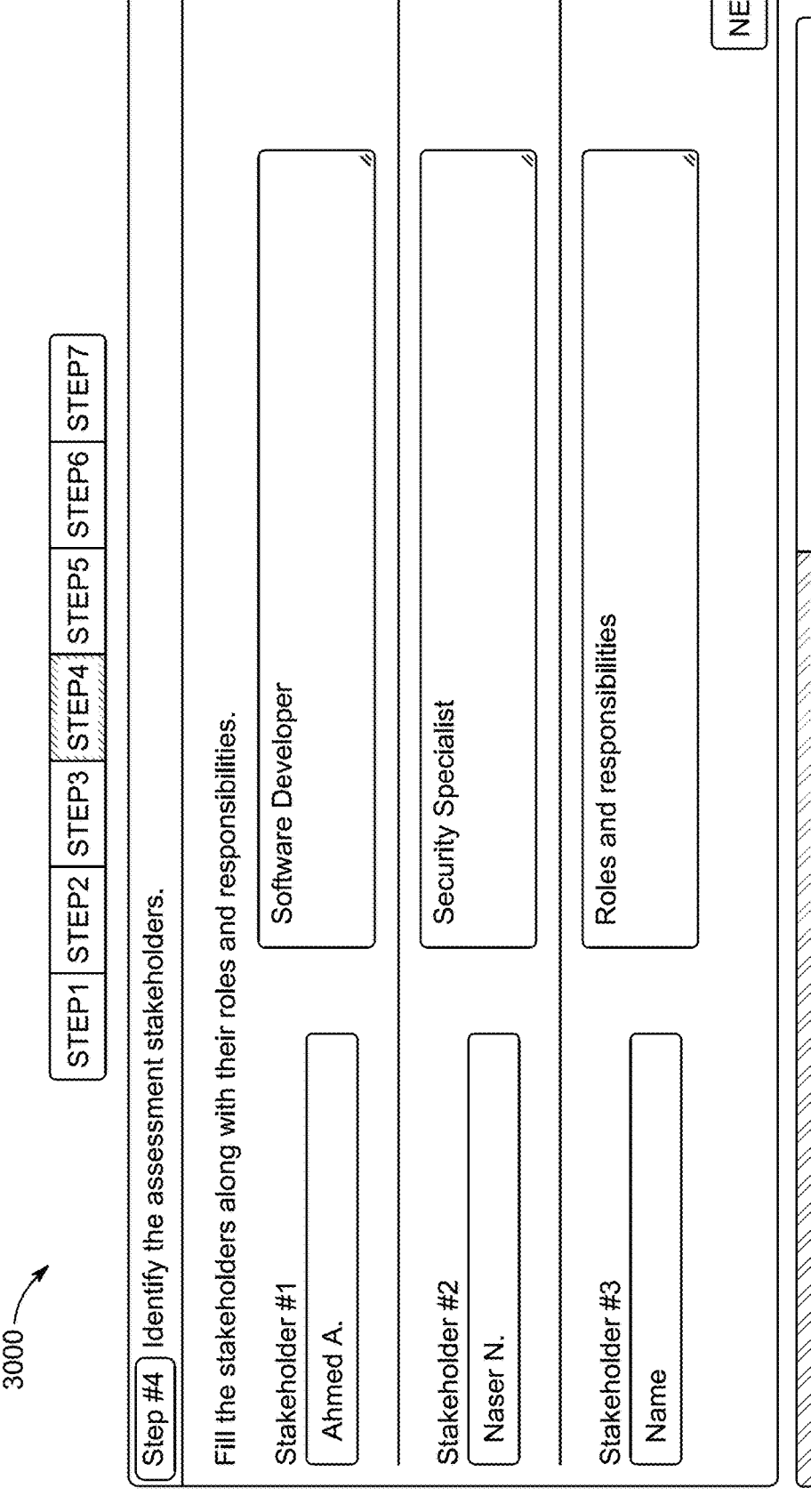
FIG. 30 illustrates a fourth step of the assessment process using the assessment tool, in accordance with an exemplary aspect of the disclosure.

FIG. 30 illustrates a fourth step 3000 of the assessment process using the assessment tool, where the user is required to identify the assessment stakeholders. The interface provides input fields for the stakeholders' names and their roles and responsibilities within the assessment process. In this example, two stakeholders are entered, one identified as a software developer and the other as a security specialist. Additional fields allow for the inclusion of further stakeholders if necessary. This step ensures that the assessment team is clearly defined with respect to each stakeholder's role, facilitating the organization and management of the evaluation process.

FIG. 31 illustrates a fifth step 3100 of the assessment process, where the user is prompted to assign stakeholders to capability areas, designate leaders, and associate projects with each capability area. The interface displays a list of the selected capability areas, including governance and policies, information security and data protection, human security and access management, software engineering and applications security, and running operations. For each capability area, a leader is selected, and additional stakeholders are assigned to support the evaluation of each area. In this example, multiple projects are associated with the capability areas, including the organizational level, the advanced employee management system, image encryption using the AES algorithm, and the Android local train ticketing system. This step organizes the distribution of responsibilities across stakeholders and ensures that each capability area and associated project is properly managed within the scope of the assessment.

FIG. 32 illustrates a sixth step 3200 of the assessment tool, where the user is required to select the type of assessment to be conducted. The options available include either self-assessment by an internal team or an external appraisal conducted by an outside party. In this example, the self-assessment option is selected, with an additional textbox provided for further details in the case of an external appraisal. The user is prompted to review all assessment details before proceeding by clicking the create button. This step finalizes the selection of the assessment method and ensures clarity on how the evaluation will proceed.

FIG. 33 illustrates a seventh step 3300 of the assessment tool, where the planning and preparation phase is completed. After successfully creating the assessment, the system generates an assessment ID, which is displayed to the user. This ID is necessary for continuing with the assessment process. The interface indicates that the assessment has been successfully created, completing the initial setup phase of the assessment.

FIG. 34 illustrates the start of phase two 3400 of the assessment tool, where the user is provided with three options. The first option allows the user to create a new assessment by setting objectives, identifying stakeholders, and selecting projects. The second option provides a field where the user can enter an existing assessment ID, generated in the previous phase, to continue the assessment process. The third option enables the user to view the assessment report after completing the evaluation. The interface facilitates easy navigation between the stages of the assessment process by providing clear access to each respective phase.

FIG. 35 illustrates a sample evaluation interface 3500 during the second phase of the assessment tool. This phase involves conducting the evaluation. The figure displays different categories, such as governance and policies, information security and data protection, human security and access management, software engineering and applications security, and running operations. The system prompts the user to evaluate each category based on specific criteria. The evaluation process allows the user to select one of the provided rating options-fully met, largely met, partially met, or does not meet-based on the performance of the practices related to each category. This interface helps ensure that the organization's practices are systematically reviewed and evaluated. Once the evaluation for a specific practice is completed, the system stores the rating and proceeds to the next evaluation item.

FIG. 36 illustrates the interface 3600 for reviewing incomplete evaluations in the second phase of the assessment tool. This display shows the evaluated and pending practices for various areas, such as governance and policies, information security and data protection, human security and access management, software engineering and applications security, and running operations. The practices marked as evaluated are displayed in one section, while pending practices that require further evaluation are shown separately. This visual representation ensures that the user can easily track the completion status of the evaluation process and identify any remaining tasks.

FIG. 37 illustrates the interface 3700 for reviewing the completed evaluation during the second phase of the assessment tool. The interface 3700 provides a summary of the areas that were evaluated, with practices grouped by their respective categories such as governance and policies, information security and data protection, human security and access management, software engineering and applications security, and running operations. Each category displays the practices that have been evaluated, indicating that there are no pending practices left for evaluation. This visual confirmation ensures that all necessary evaluations have been conducted and completed, allowing the user to proceed to the next phase.

FIG. 38 illustrates the interface 3800 for viewing the results after completing an evaluation. The interface 3800 allows users to either create a new assessment, complete an existing assessment, or view the results of a completed assessment. The tool enables the user to input an assessment identification to retrieve the corresponding report, which includes a summary of the evaluation results. This step marks the transition from the evaluation phase to the reporting phase, where results are reviewed and analyzed.

FIG. 39 illustrates the detailed reporting results 3900 during the third phase of the assessment tool, where the results of the evaluation are displayed. The report shows different areas such as governance and policies, information security and data protection, human security and access management, software engineering and applications security, and running operations. For each area, the report specifies the target maturity level, the result maturity level achieved, and the necessary practices required to upscale the maturity to the next level. The system visually organizes the assessment data, highlighting the gaps between the target and result levels, while also identifying the specific practices that need to be addressed to achieve the desired maturity level. This phase is crucial for organizations as it provides actionable feedback for continuous improvement and growth in cybersecurity and digital transformation capabilities.

Figure 40:
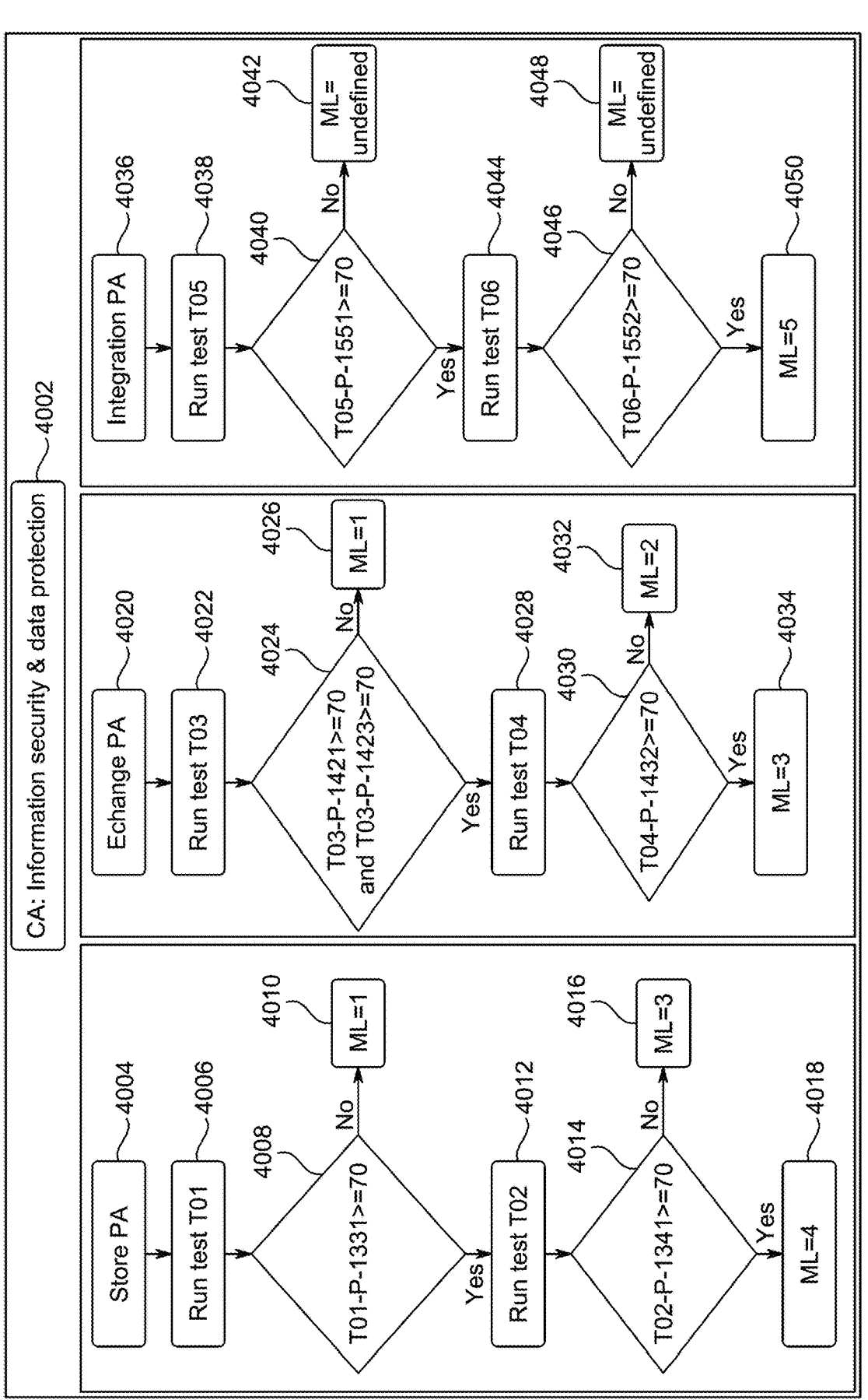
FIG. 40 illustrates an automated assessment process for information security and data protection practices, in accordance with an exemplary aspect of the disclosure.

FIG. 40 illustrates an automated assessment process for information security and data protection practices, focusing on storing, exchanging, and integrating data securely. The figure outlines the sequential process for evaluating various practice areas (PAS) within an organization, ensuring adherence to cybersecurity standards.

The assessment begins with the Information Security and Data Protection practice area, identified as step 4002. This practice area encompasses various processes related to securing data across multiple stages of handling and exchange, following core cybersecurity principles.

At step 4004, the store practice area (PA) is evaluated, focusing on storing data securely in compliance with the confidentiality, integrity, and availability (CIA) principles. The assessment proceeds with step 4006, which involves running Test T01. This test includes various SQL Injection tests designed to detect vulnerabilities in the storage of sensitive data, such as user information, application data, system information, and passwords. The T01 test includes multiple sub-tests: Union, Boolean, Error-based, Out-of-band, and Time-based tests. Each sub-test is used to assess specific vulnerabilities, such as combining multiple SQL queries, evaluating conditions through Boolean logic, inducing database errors to reveal information, using alternate communication channels, or delaying response times.

Following the execution of Test T01, step 4008 checks the result of T01-P-1331. If the result is lower than or equal to 70, the maturity level (ML) is set to 1 at step 4010. If the result is greater than or equal to 70, the assessment proceeds to run Test T02 at step 4012.

Test T02, described at step 4012, involves finding unrestrained database privileges that should be managed to prevent unwanted access. This test includes archive checks, logs checks, and audit checks to ensure that sensitive data is properly stored, archived, and audited. At step 4014, the system checks the result of T02-P-1341. If the result is lower than or equal to 70, the maturity level is set to 3 at step 4016. If the result is greater than or equal to 70, the maturity level is set to 4 at step 4018.

At step 4020, the assessment shifts to the exchange practice area (PA), focusing on data exchange and transfer processes. Step 4022 involves running Test T03, which includes Denial of Service (DoS) tests to assess the resilience of database systems against potential attacks. The assessment proceeds to step 4024, where the results of T03-P-1421 and T03-P-1423 are evaluated. If the results are lower than or equal to 70, the maturity level is set to 1 at step 4026. If the results are greater than or equal to 70, the process moves to run Test T04 at step 4028.

Step 4030 involves evaluating the result of T04-P-1432, which checks the level of auditing in exchanged data, including inspecting request and response headers and security aspects. If the result is lower than or equal to 70, the maturity level is set to 2 at step 4032. If the result is greater than or equal to 70, the maturity level is set to 3 at step 4034.

At step 4036, the integration practice area (PA) is assessed, focusing on transferring data between systems and performing data migration. Step 4038 involves running Test T05, which assesses the validity and security of data migration tools. At step 4040, the result of T05-P-1551 is evaluated. If the result is lower than or equal to 70, the maturity level is left undefined, as indicated in step 4042. If the result is greater than or equal to 70, the process moves to run Test T06 at step 4044.

At step 4046, the system checks the result of T06-P-1552, which evaluates integration standards and the effectiveness of data integration processes. If the result is lower than or equal to 70, the maturity level is left undefined, as noted in step 4048. If the result is greater than or equal to 70, the maturity level is set to 5 at step 4050.

Figure 41:
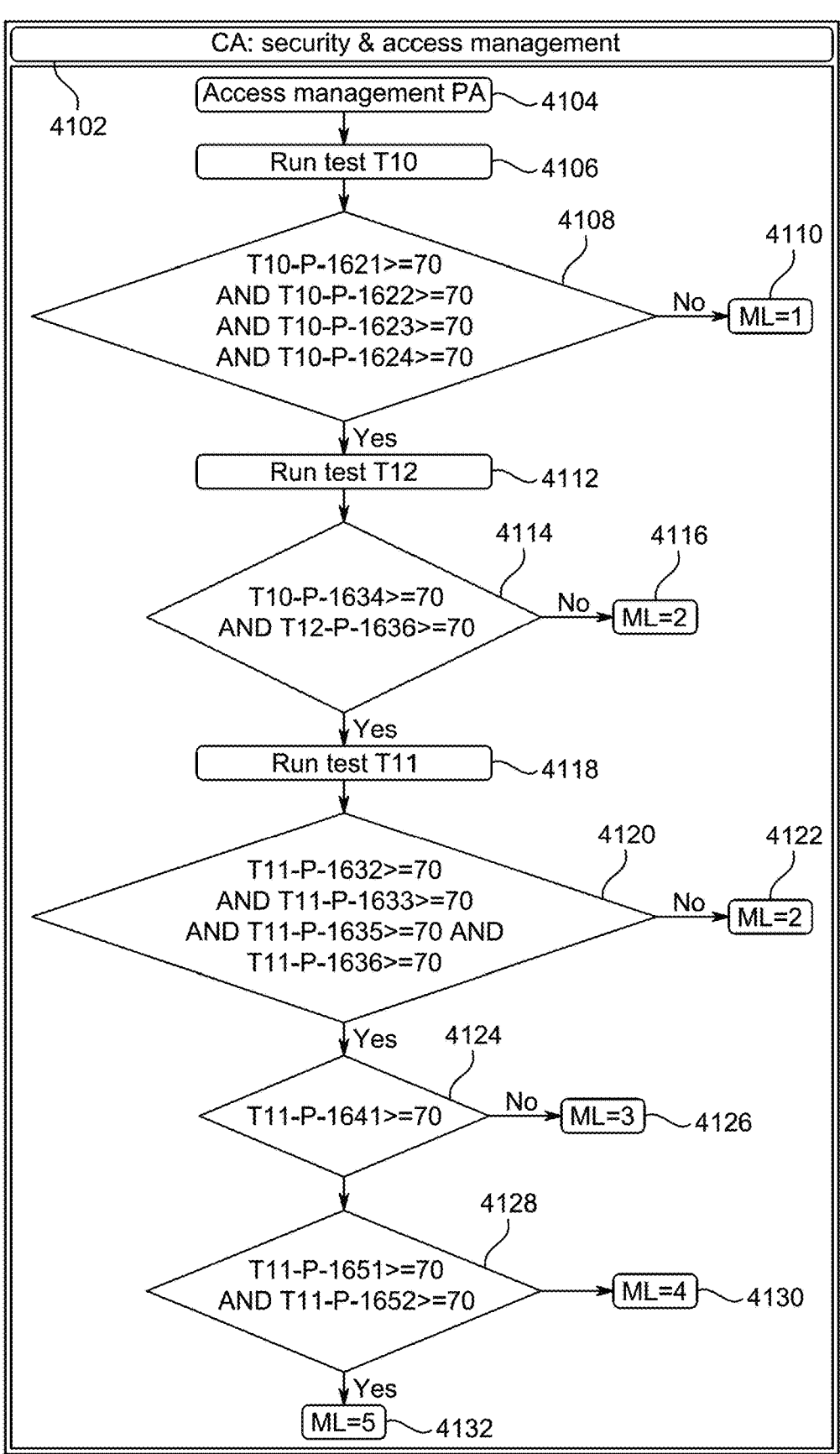
FIG. 41 illustrates an assessment system designed for evaluating the maturity level of access management practices in the context of digital transformation and cybersecurity, in accordance with an exemplary aspect of the disclosure.

FIG. 41 illustrates an assessment system designed for evaluating the maturity level of access management practices in the context of digital transformation and cybersecurity. The assessment process is divided into multiple steps, beginning with defining the capability area (CA) for security and access management, followed by a series of automated and manual evaluations to determine the maturity level (ML) of the access management practices.

The process starts with identifying the capability area (CA) for security and access management at step 4102. The capability area specifies the focus on access management, including authentication, authorization, and password practices.

At step 4104, the system proceeds to assess the practice area (PA) related to access management. This includes practices such as password management, access control, and secure authentication.

Step 4106 involves running test T10, which is an automated evaluation of password management practices. Test T10 examines multiple aspects of password management, including the use of strong passwords, the handling of invalid login attempts, password hashing, and the use of salt for password security.

At step 4108, the system checks if the results from test T10 meet the defined threshold. Specifically, it checks if T10-P-1621, T10-P-1622, T10-P-1623, and T10-P-1624 are each greater than or equal to 70. If any of these results are lower than or equal to 70, the maturity level (ML) is assigned as ML=1 at step 4110, and no further testing is performed. If all results meet the threshold, the system proceeds to step 4112 to run test T12.

Step 4114 checks if the results from T10-P-1634 and T12-P-1636 meet the threshold of 70 or above. If either result is lower than or equal to 70, the maturity level is assigned as ML=2 at step 4116, and no further testing is performed. If both results meet the threshold, the system proceeds to run test T11 at step 4118.

In step 4118, test T11 is run to evaluate additional access management practices, focusing on multi-level access control, least privilege principles, and access control list maintenance.

At step 4120, the system checks if the results from T11-P-1632, T11-P-1633, T11-P-1635, and T11-P-1636 meet the threshold of 70 or above. If any of these results are lower than or equal to 70, the maturity level is assigned as ML=2 at step 4122, and no further testing is performed. If all results meet the threshold, the system proceeds to step 4124 to check T11-P-1641.

At step 4124, if the result for T11-P-1641 is lower than 70, the maturity level is assigned as ML=3 at step 4126. If T11-P-1641 is greater than or equal to 70, the system checks if T11-P-1651 and T11-P-1652 are both greater than or equal to 70 at step 4128.

If either T11-P-1651 or T11-P-1652 is lower than 70, the maturity level is assigned as ML=4 at step 4130. If both results are greater than or equal to 70, the maturity level is assigned as ML=5 at step 4132, indicating the highest level of access management maturity.

Figure 42:
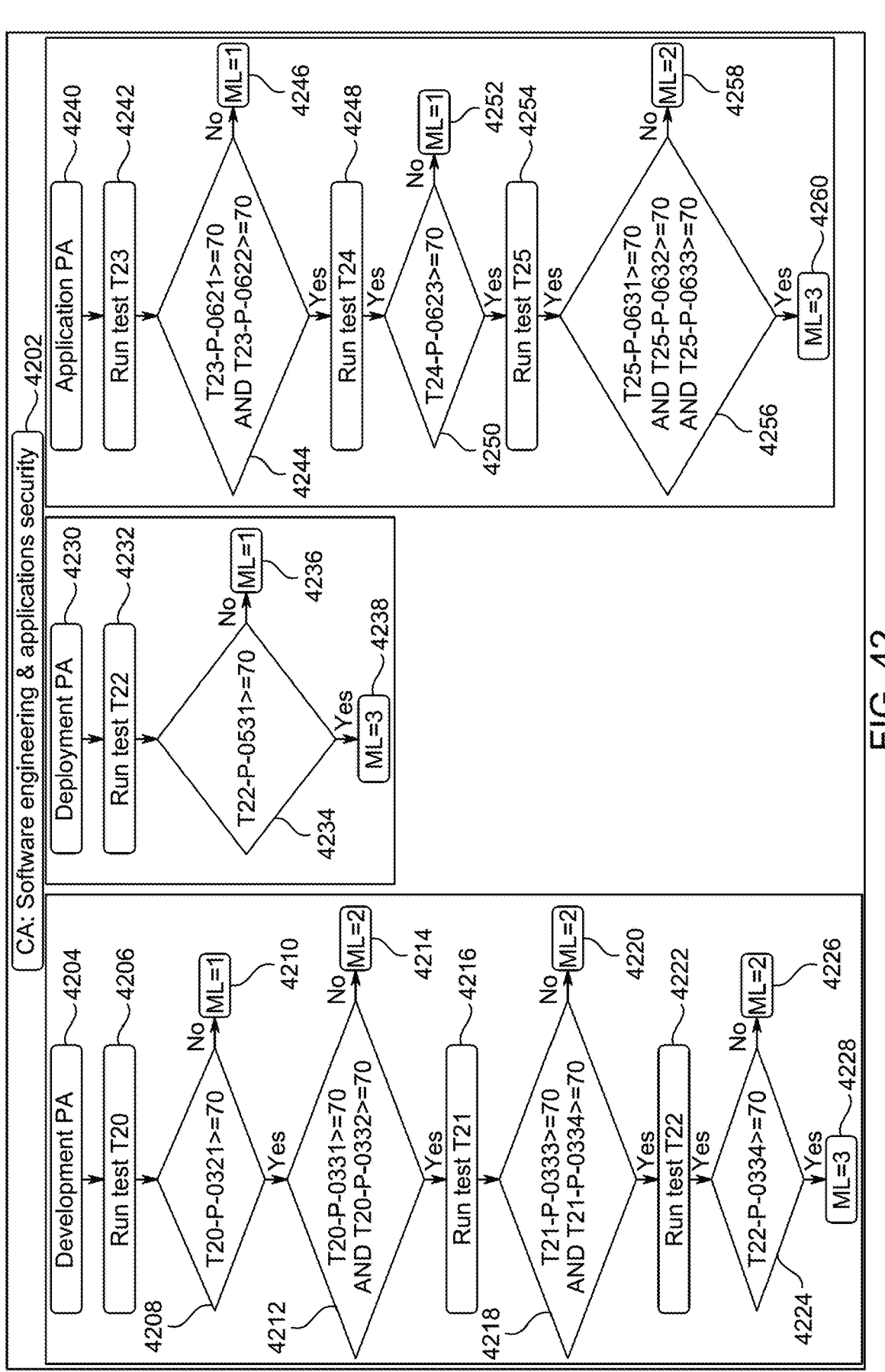
FIG. 42 illustrates an assessment system for evaluating the maturity level (ML) of software engineering and application security practices, in accordance with an exemplary aspect of the disclosure.

FIG. 42 illustrates an assessment system for evaluating the maturity level (ML) of software engineering and application security practices, particularly focusing on development, deployment, and application phases. The system is designed to determine and improve the maturity of various processes within software engineering and application security.

The assessment process begins with the development practice area (PA) at step 4204, where the initial assessment is performed by running test T20 at step 4206. The output of test T20 is evaluated at step 4208 by checking if T20-P-0321 is greater than or equal to 70. If the result is less than or equal to 70, then the maturity level is set to ML=1 at step 4210. If the result is greater than or equal to 70, the system proceeds to step 4212, where it checks if both T20-P-0331 and T20-P-0332 are greater than or equal to 70. If either result is less than or equal to 70, the maturity level is set to ML=2 at step 4214. If both results are greater than or equal to 70, the system proceeds to step 4216, where test T21 is run.

Following test T21, the system evaluates the output at step 4218 by checking if both T21-P-0333 and T21-P-0334 are greater than or equal to 70. If either result is less than or equal to 70, the maturity level is set to ML=2 at step 4220. If both results are greater than or equal to 70, test T22 is run at step 4222. At step 4224, the system checks if T22-P-0334 is greater than or equal to 70. If the result is less than or equal to 70, the maturity level is set to ML=2 at step 4226. If the result is greater than or equal to 70, the maturity level is set to ML=3 at step 4228.

The system then moves to the deployment practice area at step 4230. Test T22 is run at step 4232, and its output is evaluated at step 4234 by checking if T22-P-0531 is greater than or equal to 70. If the result is less than or equal to 70, the maturity level is set to ML=1 at step 4236. If the result is greater than or equal to 70, the maturity level is set to ML=3 at step 4238.

The next phase is the application practice area at step 4240, where the system runs test T23 at step 4242. At step 4244, the system checks if both T23-P-0621 and T23-P-0622 are greater than or equal to 70. If either result is less than or equal to 70, the maturity level is set to ML=1 at step 4246. If both results are greater than or equal to 70, test T24 is run at step 4248, and the system checks if T24-P-0623 is greater than or equal to 70 at step 4250. If T24-P-0623 is less than 70, the maturity level is set to ML=1 at step 4252. If T24-P-0623 is greater than or equal to 70, test T25 is run at step 4254.

At step 4256, the system checks if T25-P-0631, T25-P-0632, and T25-P-0633 are all greater than or equal to 70. If any of these results is less than 70, the maturity level is set to ML=2 at step 4258. If all results are greater than or equal to 70, the maturity level is set to ML=3 at step 4260.

Figure 43:
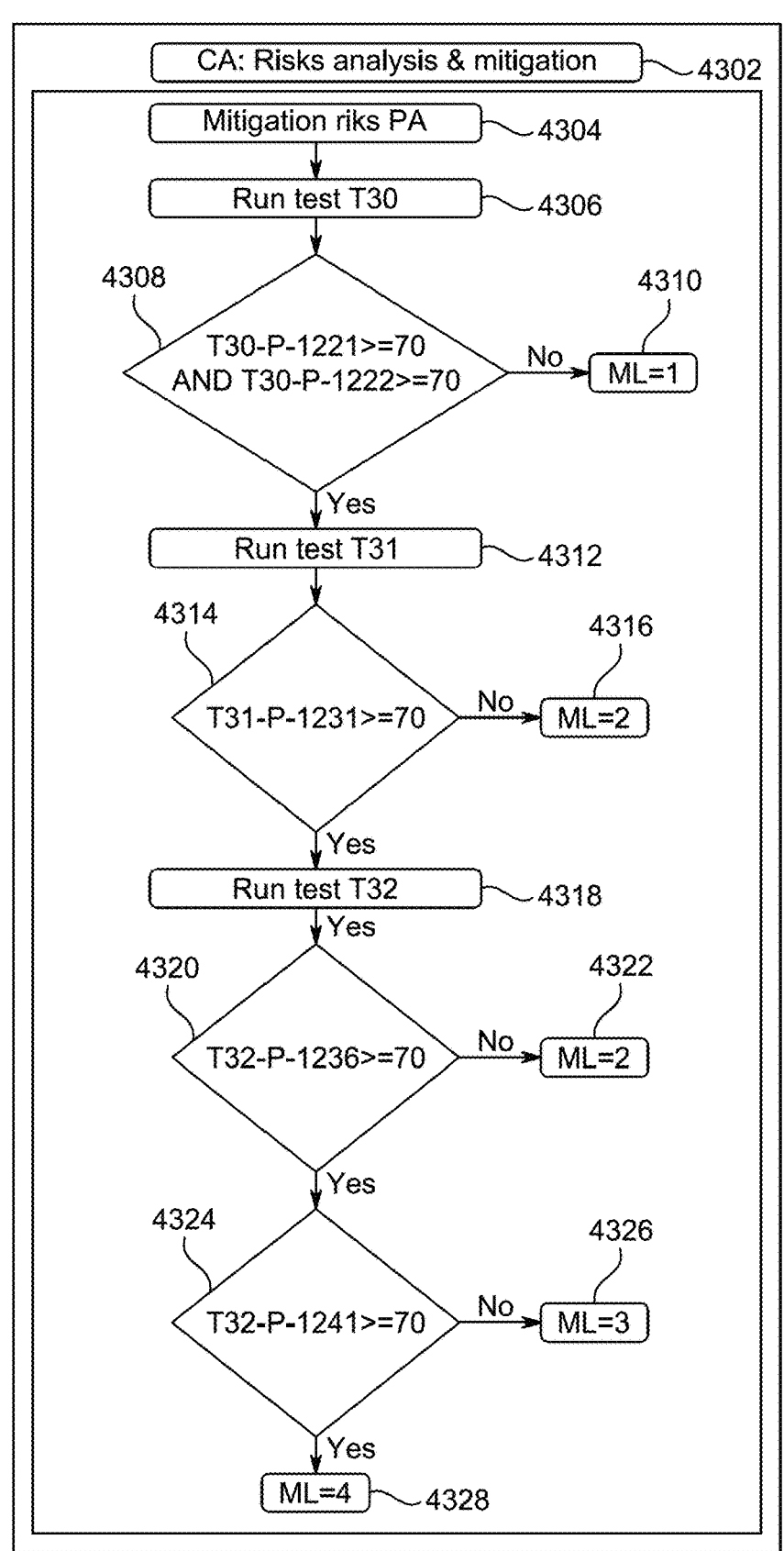
FIG. 43 illustrates a system for risk analysis and mitigation assessment in the context of digital transformation and cybersecurity practices, in accordance with an exemplary aspect of the disclosure.

FIG. 43 illustrates a system for risk analysis and mitigation assessment in the context of digital transformation and cybersecurity practices. The system represents the "Mitigation Risk Practice Area," step 4304, which involves executing several sequential tests to evaluate risk management maturity and implement appropriate mitigations.

Initially, at step 4306, the system runs the test T30, which is designed to assess basic risk mitigation measures. At step 4308, the system checks if T30-P-1221 and T30-P-1222 are each greater than or equal to 70. T30-P-1221 and T30-P-1222 pertain to key parameters for evaluating the initial risk mitigation capabilities.

If the result for either T30-P-1221 or T30-P-1222 is lower than or equal to 70, the system determines that the maturity level (ML) is 1, as indicated at step 4310. If the result for both parameters is greater than or equal to 70, the system proceeds to run test T31 at step 4312.

Following the execution of test T31, at step 4314, the system checks if the result for T31-P-1231 is greater than or equal to 70. T31-P-1231 is a key parameter indicating the effectiveness of the next stage of risk mitigation.

If the result for T31-P-1231 is lower than or equal to 70, the maturity level is set to 2, as shown at step 4316. If the result is greater than or equal to 70, the system proceeds to run test T32 at step 4318.

At step 4320, the system checks if the result for T32-P-1236 is greater than or equal to 70. T32-P-1236 assesses more advanced aspects of risk mitigation.

If the result for T32-P-1236 is lower than or equal to 70, the maturity level is set to 2, as indicated at step 4322. If the result is greater than or equal to 70, the system proceeds to step 4324, where it checks if T32-P-1241 is greater than or equal to 70. T32-P-1241 represents a higher-level criterion for risk management, focusing on proactive and preventive measures.

If the result for T32-P-1241 is lower than or equal to 70, the maturity level is determined to be 3, as depicted at step 4326. If the result for T32-P-1241 is greater than or equal to 70, the system concludes that the maturity level is 4, as shown at step 4328.

Figure 44:
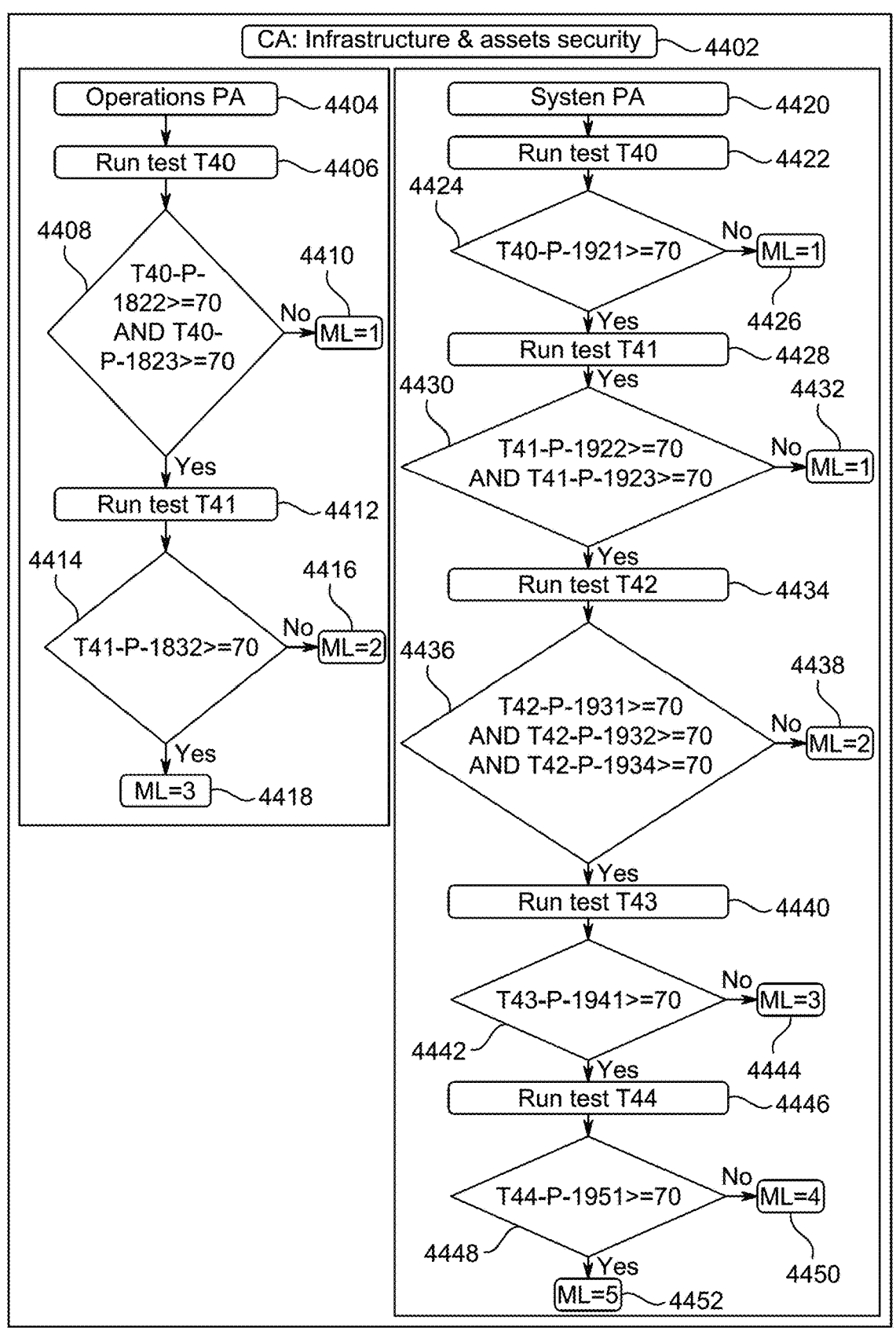
FIG. 44 illustrates a system for infrastructure and assets security in an organization, with a specific focus on the operation and system practice areas, in accordance with an exemplary aspect of the disclosure.

FIG. 44 illustrates a system for infrastructure and assets security in an organization, with a specific focus on the operation and system practice areas. The figure is divided into multiple steps representing the different phases of evaluation and security enhancement.

At step 4402, the process begins with the infrastructure and assets security, wherein operations are categorized as the Practice Area (PA). Step 4404 involves conducting an operational assessment, which includes running test T40 at step 4406. The results are evaluated in step 4308 to determine if values for parameters T40-P-1822 and T40-P-1823 are greater than or equal to 70. If either value is less than or equal to 70, maturity level (ML) is set to 1 at step 4410. If both values are greater than or equal to 70, the process proceeds to run test T41 at step 4412.

At step 4414, test T41 evaluates parameter T41-P-1832, which should be greater than or equal to 70. If the value is lower than or equal to 70, ML is set to 2 at step 4416. If the value is greater than or equal to 70, ML is set to 3 at step 4418, concluding the operation practice area.

The process for the system practice area is initiated at step 4420. A system assessment begins with running test T40 at step 4422, followed by evaluating parameter T40-P-1921 at step 4324. If the parameter value is lower than or equal to 70, ML is set to 1 at step 4426. If the value is greater than or equal to 70, the next step involves running test T41 at step 4428.

Step 4430 checks the results of test T41, specifically parameters T41-P-1922 and T41-P-1923. If either value is lower than or equal to 70, ML is set to 1 at step 4432. If both values are greater than or equal to 70, the process proceeds to run test T42 at step 4434. Test T42 evaluates parameters T42-P-1931, T42-P-1932, and T42-P-1934 at step 4436. If any of these values are lower than or equal to 70, ML is set to 2 at step 4438. If all values are greater than or equal to 70, the process proceeds to run test T43 at step 4440.

Step 4442 involves evaluating parameter T43-P-1941, and if the value is lower than or equal to 70, ML is set to 3 at step 4444. If the value is greater than or equal to 70, the next step is running test T44 at step 4446, which checks parameter T44-P-1951 at step 4448. If the parameter value is lower than or equal to 70, ML is set to 4 at step 4450, and if greater than or equal to 70, ML is set to 5 at step 4452, concluding the system practice area evaluation.

The following tables provide further details of cybersecurity issues and attacks, and cybersecurity codes, and a full list of best practices.

TABLE 41

| Cybersecurity Issues and Attacks | |
| --- | --- |
| Attack | Ref. |
| Account, Identity, Credentials & Access Attacks | [90] [92] |
| Botnets | [101] [107] |
| Control Attacks | [180] [130] |
| Data Attacks | [101] [180] |
| (Distributed) Denial of Service (DoS) & (DDoS) | [101] [180] [107] |
| Emails Attacks | [105] |
| Files Attacks | [101] |
| Malicious insider/Trusting Issues | [180] |
| Malware | [101] [105] [180] [107] |
| Man in The Middle | [101] |
| Mobile Attacks | [105] |
| Theft (Money, Intellectual Property) | [101] [105] |
| Phishing, Spamming, and Social Engineering | [101] [107] [130] |
| Ransomware | [101] [105] [130] |
| Regulatory compliance | [180] |
| Resources abuse | [180] |
| Shared technology vulnerabilities | [180] |
| Spyware | [101] [130] |
| Unrepaired/Rogue software | [101] |
| Virtualization Attacks | [180] |
| Virus, Trojan, and Worm | [79] [89] [92] |
| Web, web services & APIs Attacks | [180] [107] |
| Wiper Attacks | [101] |

[79] A. García, F. Dominguez, L. Calle, J. Martinez, and C. Raymundo, "Personal data protection maturity model for the micro financial sector in Peru," *International Journal of Engineering Research and Technology*, vol. 11, no. 4, pp. 649-660, 2018, doi: 10.1109/CATA.2018.8398649.

[89] R. A.-I. I. C. on T. for and undefined 2013, "A dynamic capability maturity model for improving cyber security,"

*ieeexplore.ieee.org*, Accessed: Nov. 29, 2021. [Online]. Available: https://ieeexplore.ieee.org/abstract/document/ 6699005/

[90] W. Zhao, G. W.-P. of the 50th Hawaii, and undefined 2017, "An evolution roadmap for community cyber security information sharing maturity model," *scholarspace.manoa.hawaii.edu*, Accessed: 2021. November 15, [Online]. Available: https://scholarspace.manoa.hawaii.edu/handle/10125/41443

[92] M. F. Saleh, "The three dimensions of security," *researchgate.net*, no. 5, p. 85, 2011, Accessed: Nov. 29, 2021. [Online]. Available: https://www.researchgate.net/ profile/Malik-Saleh/publication/216462798_The_Three Dimensions_of_Security/links/0c960519f190ca74eb0 00000/The-Three-Dimensions-of-Security.pdf

[101] M. T.-2021 I. C. on Military and undefined 2021, "Cybersecurity as a New Type of Security and Its New Perception," *ieeexplore.ieee.org*, Accessed: Feb. 5, 2022. [Online]. Available: https://ieeexplore.ieee.org/abstract/ document/9502751/

[105] Ö. Durmus, A. Varol, N. V.-2019 1st I. Informatics, and undefined 2019, "Infrastructure Requirements for Cybersecurity," *ieeexplore.ieee.org*, Accessed: Nov. 15, 2021. [Online]. Available: https://ieeexplore.ieee.org/abstract/document/8965503/

[107] T. Mahmood, U. A.-2013 2nd national conference on, and undefined 2013, "Security analytics: Big data analytics for cybersecurity: A review of trends, techniques and tools," ieeexplore.ieee.org, Accessed: Nov. 15, 2021. [Online]. Available: https://ieeexplore.ieee.org/abstract/document/6725337/

[120] Rodrigues, . . . . B. M.-2021 16th I., and undefined 2021, "Cybersecurity risks: A behavioural approach through the influence of media and information literacy," *ieeexplore.ieee.org*, Accessed: Nov. 13, 2021. [Online]. Available: https://ieeexplore.ieee.org/abstract/document/ 9476383/

[130] J. Srinivas, A. Das, N. K.-F. G. C. Systems, and undefined 2019, "Government regulations in cyber security: Framework, standards and recommendations," *Elsevier*, Accessed: Nov. 15, 2021. Available: [Online]. https://www.sciencedirect.com/science/article/pii/ S0167739X18316753

[180] S. Mthunzi, E. Benkhelifa, . . . . T. B.-F. G., and undefined 2020, "Cloud computing security taxonomy: From an atomistic to a holistic view," *Elsevier*, Accessed: Feb. 5, 2022. [Online]. Available: https://www.sciencedirect.com/science/article/pii/S0167739X19300871

TABLE 42

| Cybersecurity Codes | | |
| --- | --- | --- |
| # | Cybersecurity Code | References |
| 1 | Access Control | [44] [81] [86] [87] [89] [92] |
| 2 | Account monitoring and control | [181] |
| 3 | Application Software Security | [181] |
| 4 | Assessment & Authorization | [60] |
| 5 | Assets Management | [81] [86] [87] [91] |
| 6 | Attack & Attacks Taxonomy | [182] [183] |
| 7 | Audit & Accountability | [60] [80] [81] [99] [100] [184] [183] |
| 8 | Auditability | [97] |
| 9 | Authenticity & Trustworthiness | [44] [79] [80] [81] |
| 10 | Availability | [44] [79] [80] [98] [183] |
| 11 | Awareness & Training | [60] [81] [99] [184] [181] |
| 12 | Benchmarking | [182] |
| 13 | Boundary defense | [181] |
| 14 | Communications | [98] [86] [87] |
| 15 | Compliance | [98] |

TABLE 42-continued

Cybersecurity Codes

| # | Cybersecurity Code | References |
|---|---|---|
| 16 | Confidentiality | [44] [79] [80] [81] [183] |
| 17 | Configuration | [44] [81] [86] [87] [89] [90] [91] |
| 18 | Contingency | [60] [81] [100] [99] |
| 19 | Continuous vulnerability assessment and remediation | [181] |
| 20 | Control privileged accounts | [181] |
| 21 | Controlled access based on need to know | [181] |
| 22 | Cost | [183] |
| 23 | Cryptography | [98] |
| 24 | Cyberthreat information sharing and analysis | [182] |
| 25 | Data protection | [184] [181] |
| 26 | Data recovery capability | [181] |
| 27 | Defect | [183] |
| 28 | Defensibility | [183] |
| 29 | Design | [183] |
| 30 | E-mail and web browser protection | [181] |
| 31 | Endpoint Protection | [184] |
| 32 | Event management | [182] |
| 33 | Human Resource Security | [98] |
| 34 | Identification and Authentication | [60] |
| 35 | Implementation | [183] |
| 36 | Incident response and management | [44] [89] [90] [91] [183] |
| 37 | Information Security Aspects & Programs | [98] [184] |
| 38 | Integrity | [44] [79] [80] [81] [183] |
| 39 | Inventory Authorized | [181] |
| 40 | Limit and control ports, protocols, and services | [181] |
| 41 | Maintenance | [81] [86] [87] |
| 42 | Maintenance, monitoring, and analysis of audit logs | [44] [90] |
| 43 | Malware Management & Defense | [90] [91] |
| 44 | Media Protection | [60] |
| 45 | Mobile Device Security | [184] |
| 46 | Network Protection | [184] |
| 47 | Non-repudiation | [44] [80] [81] |
| 48 | Operation Security | [98] |
| 49 | Organization of Information Security | [98] |
| 50 | Password Management | [184] |
| 51 | Penetration tests and red team exercises | [181] |
| 52 | People & Personnel Security | [60] [99] [183] |
| 53 | Physical & Environmental | [44] [81] [82] [89] |
| 54 | Planning & Requirements | [60] [81] [100] [99] |
| 55 | Portable Media | [184] |
| 56 | Possession & Control | [96] |
| 57 | Privacy | [97] [183] |
| 58 | Process | [183] |
| 59 | Project & Program Management | [60] [183] |
| 60 | Reliability | [98] |
| 61 | Remediation information | [182] |
| 62 | Requirements | [183] |
| 63 | Resource | [183] |
| 64 | Risk Management & Assessment | [44] [89] |
| 65 | Software assurance | [182] |
| 66 | Source Code & Version Control | [183] |
| 67 | Supplier Relationships | [98] |
| 68 | Systems: Acquisition, Development, Maintenance, Protection | [60] [98] |
| 69 | Testing | [81] [86] [87] |
| 70 | Third-Party Assessment | [184] |
| 71 | Transmission Protection | [184] |
| 72 | Utility | [96] |
| 73 | Vulnerability Management | [89] [91] [183] |
| 74 | Wireless Security | [184] [181] |

[44] "The MITRE Corporation." https://www.mitre.org/(accessed Apr. 14, 2021).

[60] M. B.-N. I. of S. and undefined 2018, "Framework for improving critical infrastructure cybersecurity," *isawaterwastewater.com*, Accessed: Nov. 29, 2021. [Online]. Available: http://isawaterwastewater.com/wp-content/uploads/2018/08/WWAC-2018-NIST-Barrett_final.pdf

[79] A. García, F. Dominguez, L. Calle, J. Martinez, and C. Raymundo, "Personal data protection maturity model for the micro financial sector in Peru," *International Journal of Engineering Research and Technology*, vol. 11, no. 4, pp. 649-660, 2018, doi: 10.1109/CATA.2018.8398649.

[80] Citigroup, "Citigroup Information Security Evaluation Model (Citi-ISEM)," 2000. https://csrc.nist.rip/csspab/june13-15/Citigroup.pdf (accessed Dec. 1, 2021).

[81] G. Drivas, A. Chatzopoulou, L. Maglaras, C. Lambrinoudakis, A. Cook, and H. Janicke, "A nis directive compliant cybersecurity maturity assessment framework,"

*ieeexplore.ieee.org*, Accessed: November 2021. 15, [Online]. Available: https://ieeexplore.ieee.org/abstract/document/9202470/

[82] S. N. G. Gourisetti, S. Mix, M. Mylrea, C. Bonebrake, and M. Touhiduzzaman, "Secure design and development cybersecurity capability maturity model (SD2-C2M2): Next-generation cyber resilience by design," *Pervasive-Health: Pervasive Computing Technologies for Health-care*, April 2019, doi: 10.1145/3332448.3332461.

[86] Y. Maleh, A. Sahid, M. B.-EDPACS, and undefined 2021, "A MATURITY FRAMEWORK FOR CYBERSE-CURITY GOVERNANCE IN ORGANIZATIONS," *Tay-lor & Francis*, vol. 63, no. 6, pp. 1-22, 2021, doi: 10.1080/07366981.2020.1815354.

[87] O. O. Akinsanya, M. Papadaki, and L. Sun, "Towards a maturity model for health-care cloud security (M2HCS)," *Information and Computer Security*, vol. 28, no. 3, pp. 321-345, 2019, doi: 10.1108/ICS-05-2019-0060.

[89] R. A.-I. I. C. on T. for and undefined 2013, "A dynamic capability maturity model for improving cyber security," *ieeexplore.ieee.org*, Accessed: Nov. 29, 2021. [Online]. Available: https://ieeexplore.ieee.org/abstract/document/6699005/

[90] W. Zhao, G. W.-P. of the 50th Hawaii, and undefined 2017, "An evolution roadmap for community cyber security information sharing maturity model," *scholar-space.manoa.hawaii.edu*, Accessed: 2021. November 15, [Online]. Available: https://scholarspace.manoa.ha-waii.edu/handle/10125/41443

[91] A. Emer, M. Unterhofer, E. R.-I. Engineering, and undefined 2021, "A Cybersecurity Assessment Model for Small and Medium-Sized Enterprises," *ieeexplore.ie-ee.org*, Accessed: Nov. 15, 2021. [Online]. Available: https://ieeexplore.ieee.org/abstract/document/9424999/

[92] M. F. Saleh, "The three dimensions of security," *researchgate.net*, no. 5, p. 85, 2011, Accessed: Nov. 29, 2021. [Online]. Available: https://www.researchgate.net/profile/Malik-Saleh/publication/216462798_The_Three Dimensions_of_Security/links/0c960519f190ca74eb0 00000/The-Three-Dimensions-of-Security.pdf

[96] G. P.-B.-I. S. P. at L. University and undefined 2019, "The parkerian hexad," cs.lewisu.edu, Accessed: Feb. 5, 2022. [Online]. Available: cs.lewisu.edu/mathcs/msis-projects/papers/georgiependerbey.pdf.

[97] Y. Cherdantseva and J. Hilton, "A reference model of information assurance & security," *Proceedings*—2013 *International Conference on Availability, Reliability and Security, ARES* 2013, pp. 546-555, 2013, doi: 10.1109/ARES.2013.72.

[98] "ISO—ISO/IEC 27000—key International Standard for information security revised." www.iso.org/news/ref2266.html (accessed Feb. 5, 2022).

[181] "CIS Controls v8 Released|SANS Institute." https://www.sans.org/blog/cis-controls-v8/(accessed Feb. 6, 2022).

[182] P. Nespoli, F. Gómez Mármol, and J. Maestre Vidal, "Battling against cyberattacks: towards pre-standardization of countermeasures," *Cluster Computing*, vol. 24, no. 1, pp. 57-81, March 2021, doi: 10.1007/S10586-020-03198-9.

[183] P. Morrison, D. Moye, R. Pandita, L. W.-I. and Software, and undefined 2018, "Mapping the field of software life cycle security metrics," Elsevier, vol. 102, pp. 146-159, 2018, doi: 10.1016/j.infsof 0.2018.05.011.

[184] "HITRUST Alliance Information Risk Management and Compliance." https://hitrustalliance.net/(accessed Feb. 6, 2022).

Table 43 is a list of all best practices for the maturity model. The table contains the following fields.

: a practice identifier (e.g. P-0121, P-0721):

First two digits: the number of PA: 01 to 22.

Third digit: ML: 1 to 5.

Fourth digit: sequence, 1, 2, and so on.

ML: the maturity level where the practice falls in, based on each level definition.

CCA: the name of the category of capability area.

CA: the name of the capability area.

PA: the name of the practice area.

Practice Text: stating or describing the practice details.

TY: the type of the practice is optional (O) or core (C).

TABLE 43

| # | ML | CCA | CA | PA | Practice Text | TY |
|---|---|---|---|---|---|---|
| | | | | | Model's Best Practices | |
| P-0121 | 2 | D | SWE | SRQ | "Review requirements' documents by a cybersecurity specialist." | O |
| P-0131 | 3 | D | SWE | SRQ | "Access and identity management configurations of project systems environments are audited to ensure environmental security and integrity." | O |
| P-0132 | 3 | D | SWE | SRQ | "Analyze security needs and software requirements to determine design feasibility within time and cost constraints and security mandates." | O |
| P-0133 | 3 | D | SWE | SRQ | "Determine coding and testing standards, security testing tools, code scanning tools, and code reviews." | O |
| P-0134 | 3 | D | SWE | SRQ | "Identifying security requirements is converted into functionality that can be implemented in the software and tests that can be performed to validate its performance." | O |
| P-0135 | 3 | D | SWE | SRQ | "Identify security requirements for the system based on the risk posed by its compromise." | O |
| P-0221 | 2 | D | SWE | SDS | "Build security measures into the design of IT solutions. E.g., defining coding protocols, depth of the defense, the configuration of security features, and so on." | O |
| P-0231 | 3 | D | SWE | SDS | "Architectural trust level (segregation of interfaces, defense in depth) to allow proper cyber security analysis." | O |
| P-0232 | 3 | D | SWE | SDS | "Corporate standards for project cybersecurity processes are up to date." | O |
| P-0233 | 3 | D | SWE | SDS | "Resources for improving cybersecurity skills that pertain to project work are made readily available to the entire team." | O |

TABLE 43-continued

Model's Best Practices

| # | ML | CCA | CA | PA | Practice Text | TY |
|---|----|-----|----|----|---------------|----|
| P-0234 | 3 | D | SWE | SDS | "Identify and use secure design practices to ensure that security requirements can be implemented appropriately and prevent other defects." | O |
| P-0321 | 2 | D | SWE | SDV | "Ensure that the secure development practices are being utilized and secure code is being produced, usually done by the development leader or management." | O |
| P-0331 | 3 | D | SWE | SDV | "Ensure secure code development, which results from the combination of security-conscious development practices, developer diligence, and testing." | O |
| P-0332 | 3 | D | SWE | ISDV | "Ensure following secure development practices, which are critical to producing a secure application. While secure code deals with the absence of vulnerability-producing bugs in the code base, the impact of the presence (or absence) of secure development practices goes beyond the quality of the code produced." | O |
| P-0333 | 3 | D | SWE | SDV | "Select development components and their security validation." | O |
| P-0334 | 3 | D | SWE | SDV | "Validated the infrastructure support. Since the security of an application is inherently reliant on the IT infrastructure that it runs on top of and which supports it, a secure implementation requires that this support infrastructure be secure and that its security not be compromised by the addition of the application being implemented." | O |
| P-0421 | 2 | D | SWE | STS | "Testability during development (test interface) and operations." | C |
| P-0431 | 3 | D | SWE | STS | "Develop and perform secure program testing, validation, review, or assessment to identify potential flaws in codes and mitigate vulnerabilities." | C |
| P-0432 | 3 | D | SWE | STS | "Perform penetration testing for new or updated applications." | C |
| P-0531 | 3 | D | ISWE | SDP | "The software is updatable since it may continue to be enhanced to provide users with additional functionality." | C |
| P-0532 | 3 | D | SWE | SDP | "Securely conduct security maintenance activities. These maintenance activities may include design, development, and implementation. They are also considered while the system is being modified or updated." | C |
| P-0541 | 4 | D | SWE | SDP | "Use statistics to ensure that all project cybersecurity processes and standards are appropriately employed." | C |
| P-0621 | 2 | D | SWE | SAP | "Errors and Exceptions: Choose and outline a standardized approach to structured error and exception handling." | C |
| P-0622 | 2 | D | SWE | SAP | "Errors and Exceptions: Minimize the information disclosure while displaying a customized error message." | C |
| P-0623 | 2 | D | SWE | SAP | "Enable XSS protection." | C |
| P-0631 | 3 | D | SWE | SAP | "Errors and Exceptions: Store exceptions in the error log." | C |
| P-0632 | 3 | D | SWE | SAP | "Develop security compliance processes or audits for external services, e.g., cloud service providers and data centers." | O |
| P-0633 | 3 | D | SWE | SAP | "Errors and Exceptions: Specify the error handling libraries." | O |
| P-0634 | 3 | D | SWE | SAP | "Errors and Exceptions: Document and test exceptions by technical and functional owners for all job variants, i.e., day, month, quarter, year, or holiday." | O |
| P-0721 | 2 | D | SWE | SDC | "The existence of securely stored key documentation in order to inform users how to use the system securely. System documentation may augment general training to prepare users to work in areas not as commonly used." | C |
| P-0731 | 3 | D | SWE | SDC | "Stored and maintain documentation and code in a secure repository with strict version control." | C |
| P-0732 | 3 | D | SWE | SDC | "Use other projects experiences and lessons learned to contribute to corporate cybersecurity knowledge." | C |
| P-0821 | 2 | D | OPR | OAD | "Document and escalate incidents (including event's history, status, and potential impact for further action) that may cause an ongoing and immediate impact on the environment." | C |
| P-0831 | 3 | D | OPR | OAD | "Prepare audit reports that identify technical and procedural findings and recommend remediation strategies/solutions." | C |
| P-0832 | 3 | D | OPR | OAD | "Manage the indexing, cataloging, storage, and access to explicit organizational knowledge, e.g., hard copy and digital files." | O |
| P-0841 | 4 | D | OPR | OAD | "Collect and maintain data needed to meet system cybersecurity reporting." | C |
| P-0842 | 4 | D | OPR | OAD | "Conduct analysis of log files, evidence, and other information to determine the best methods for identifying the perpetrator(s) of any intrusion." | C |
| P-0843 | 4 | D | OPR | OAD | "Execute monitoring and reviewing procedures and other controls." | C |
| P-0844 | 4 | D | OPR | OAD | "Monitor and report changes in threat dispositions, activities, tactics, capabilities, objectives, etc., as related to designated cyber operations warning problem sets." | C |

TABLE 43-continued

Model's Best Practices

| # | ML | CCA | CA | PA | Practice Text | TY |
|---|---|---|---|---|---|---|
| P-0845 | 4 | D | OPR | OAD | "Monitor and report on validated threat activities." | C |
| P-0846 | 4 | D | OPR | JOAD | "Adopt a cybersecurity and audits solution that records actions and events. Establish project audit practice. Derive test cases from known security requirements." | O |
| P-0847 | 4 | D | OPR | OAD | "Information gleaned from records of potential and actual IT security incidents and security alerts, such as those issued by software vendors, are considered as detailed test results." | O |
| P-0848 | 4 | D | OPR | OAD | "Monitor and maintain databases to ensure optimal performance." | O |
| P-0851 | 5 | D | OPR | OAD | "Existence of a system for monitoring the digital economy development, providing a feedback function at various levels (national, regional, local, and sectoral). Also, allowing to stake out the achievement of political goals, observe the current activities in terms of compliance with strategic priorities, track the results of programs and projects, and get the necessary information on existing imbalances and obstacles to implementing strategies programs, and action plans." | C |
| P-0921 | 2 | D | OPR | OMT | "Perform asset management of information technology resources periodically." | C |
| P-0922 | 2 | D | OPR | OMT | "Perform and manage daily operations through information systems and require internet connectivity." | C |
| P-0923 | 2 | D | OPR | OMT | "Construct access paths to suites of information, e.g., link pages, to facilitate end-users access." | O |
| P-0931 | 3 | D | OPR | OMT | "Implement procedures and controls for detection and response to security events." | C |
| P-0932 | 3 | D | OPR | OMT | "Manage security-related incidents by developing and training incident response teams to identify and limit exposure, manage communications, and coordinate with regulatory bodies." | C |
| P-0933 | 3 | D | OPR | OMT | "Perform backup and recovery of databases to ensure data integrity." | C |
| P-0934 | 3 | D | OPR | OMT | "Perform cybersecurity testing and repairs on developed applications, systems, servers, and hardware." | C |
| P-0935 | 3 | D | OPR | OMT | "Use the preventive controls, security controls aiming to prevent any threat, e.g., restricting access to the company's network, and programs that may prevent unauthorized access." | C |
| P-0941 | 4 | D | OPR | OMT | "Assess and monitor cybersecurity related to system implementation and testing practices." | C |
| P-0942 | 4 | D | OPR | OMT | "Diagnose and resolve customer-reported system incidents, problems, and events." | C |
| P-0943 | 4 | D | OPR | OMT | "Practical corrective actions are taken to address identified weaknesses, including those identified from potential or actual IT security incidents or through IT security alerts issued by trusted sources." | C |
| P-0944 | 4 | D | OPR | OMT | "Situations to be tracked Information systems, air conditioning, and cooling systems. Security violation event notifications and incident response stages. Whether critical apps are performing correctly or not and monitoring their performance." | C |
| P-0945 | 4 | D | OPR | JOMT | "Tests are routinely conducted to evaluate the adequacy and effectiveness of all implementations." | C |
| P-0946 | 4 | D | OPR | OMT | "Tests ensure that all policies, procedures, and controls are acting as intended and ensure the appropriate IT security level." | C |
| P-0947 | 4 | D | OPR | OMT | "Troubleshoot hardware and software interface and interoperability problems." | C |
| P-0951 | 5 | D | OPR | OMT | "Performs configuration management, problem management, capacity management, and financial management for databases and data management systems." | C |
| P-0952 | 5 | D | OPR | OMT | "Tests at least once a year DDOS tests DNS service tests. Domain and end-user computer configuration tests. E-mail service tests. Enterprise-specific software. Firewall tests. Penetration testing of open Web applications. Scanning for vulnerabilities in components open to the external network. Screening for vulnerabilities in the internal network components. Social engineering tests. URL and content filtering tests Virtualization systems tests. Database configuration tests." | C |

TABLE 43-continued

Model's Best Practices

| # | ML | CCA | CA | PA | Practice Text | TY |
|---|----|-----|-----|-----|---------------|-----|
| P-1041 | 4 | D | OPR | OTR | "Utilize open-source language such as R and apply quantitative techniques, e.g., descriptive and inferential statistics, sampling, experimental design, parametric and non-parametric tests of difference, ordinary least squares regression, and general line." | O |
| P-1051 | 5 | D | OPR | OTR | "Identify all cybersecurity improvement plans needing cybersecurity to be integrated into them, like Standard Operating Procedures (SOP) or other improvement plans." | O |
| P-1052 | 5 | D | OPR | OTR | "Track customers' experiences and predict their needs. Customers decide if a product or a service has any market value, so digitally mature organizations use their know-how, new ideas, and new technological possibilities to track customers' behavior and habits in order to influence, predict, levy, or create new needs that can be satisfied with their offer." | O |
| P-1121 | 2 | M | RSK | RCP | "Address security implications in the software acceptance phase, including completion criteria, risk acceptance and documentation, standards, and methods of independent testing." | C |
| P-1122 | 2 | M | RSK | RCP | "Develop a contingency plan for the turnover of key roles." | C |
| P-1131 | 3 | M | RSK | RCP | "Collect and analyze intrusion artifacts (e.g., source code, malware, and system configuration) and use discovered datato enable mitigation of potential cyber defense incidents within the enterprise." | C |
| P-1132 | 3 | M | RSK | RCP | "From risk analysis to the actual deployment of global policy, security must be aligned with the business priorities of the company while respecting regulatory and legal constraints." | C |
| P-1133 | 3 | M | RSK | RCP | "Ensure that information security measures are appropriate for threats and asset value." | C |
| P-1141 | 4 | M | RSK | RCP | "Analyze incident data for emerging trends to respond to and resolve information security incidents expeditiously and effectively." | C |
| P-1142 | 4 | M | RSK | RCP | "Assess risks to information and information systems periodically and in response to events." | C |
| P-1143 | 4 | M | RSK | RCP | "Identify exposures to security-related risks, and quantify their likelihood and potential impact." | C |
| P-1144 | 4 | M | RSK | RCP | "Perform risk analysis (e.g., threat, vulnerability, and probability of occurrence) whenever an application or system undergoes a significant change." | C |
| P-1145 | 4 | M | RSK | RCP | "Perform security reviews, identify gaps in security architecture, and develop a security risk management plan." | C |
| P-1146 | 4 | M | RSK | RCP | "Prioritize cybersecurity risks and risk-handling strategies based on residual risks and the organization's risk appetite." | C |
| P-1147 | 4 | M | RSK | RCP | "Manage the ongoing efficacy of cybersecurity risk-handling strategies and control options." | O |
| P-1151 | 5 | M | RSK | RCP | "Provide advice and input for Disaster Recovery, Contingency, and Continuity of Operations Plans." | C |
| P-1152 | 5 | M | RSK | RCP | "Develop a contingency plan. Operational continuity and contingency planning, meaning plan for and operate so as to preserve the continuity of operations." | O |
| P-1221 | 2 | M | RSK | RMG | "Create programs that address cyber and cyber/physical issues, vulnerabilities, and response options. | C |
| P-1222 | 2 | M | RSK | RMG | "Determine the extent of threats and recommend courses of action or countermeasures to mitigate risks. | C |
| P-1223 | 2 | M | RSK | RMG | "Effective identification of steps to be taken to minimize future threats." | C |
| P-1231 | 3 | M | RSK | RMG | "Collect intrusion artifacts (e.g., source code, malware, Trojans) and use discovered data to enable mitigation of potential cyber defense incidents within the enterprise." | C |
| P-1232 | 3 | M | RSK | RMG | "Employ a layered IT security strategy that ensures appropriate risk mitigation levels." | C |
| P-1233 | 3 | M | RSK | RMG | "Ensure that cybersecurity-enabled products or other compensating security control technologies reduce identified risk to an acceptable level." | C |
| P-1234 | 3 | M | RSK | RMG | "Ensure the management of security throughout the life cycle of Information Systems. Reduce risks related to exploiting vulnerabilities and applications." | C |
| P-1235 | 3 | M | RSK | RMG | "Mitigate and correct security deficiencies identified during security testing or recommend risk acceptance for the appropriate senior leader or authorized representative." | C |
| P-1236 | 3 | M | RSK | RMG | "Perform cyber defense incident triage, including determining scope, urgency, and potential impact, identifying the specific vulnerability, and making recommendations that enable expeditious remediation." | C |
| P-1237 | 3 | M | RSK | RMG | "Identify which of the known or unknown potential threats to the assets of the institution or establishment can be prevented. | O |

TABLE 43-continued

Model's Best Practices

| # | ML | CCA | CA | PA | Practice Text | TY |
|---|---|---|---|---|---|---|
| P-1238 | 3 | M | RSK | RMG | "Gather intelligence on threats and vulnerabilities to better understand the cybersecurity threat landscape within which the organization operates, including the actors, scenarios, and campaigns that might pose a threat." | O |
| P-1241 | 4 | M | RSK | RMG | "Analyze identified malicious activity to determine weaknesses exploited, exploitation methods, effects on system and information." | C |
| P-1242 | 4 | M | RSK | RMG | "Conduct risk analysis, feasibility study, or trade-off analysis to develop, document, and refine functional requirements and specifications." | C |
| P-1243 | 4 | M | RSK | RMG | "Implement security measures to resolve vulnerabilities, mitigate risks, and recommend security changes to system or system components as needed." | C |
| P-1321 | 2 | M | INF | IST | "Define how information is collected, stored, processed, presented, returned, and secured." | C |
| P-1331 | 3 | M | INF | IST | "Classify securely store sensitive data, e.g., users, applications, systems, and passwords." | C |
| P-1341 | 4 | M | INF | IST | "Remove all data that is no longer required for daily business purposes. Data archiving and retention should ensure keeping data as long as needed in a dedicated environment, e.g., backup servers and dedicated archives." | O |
| P-1421 | 2 | M | INF | IXC | "Ensure data integrity and data consistency cross several applications and systems, including rollback (procedures for cases of abortion or cancelation of transactions)." | O |
| P-1422 | 2 | M | INF | IXC | "Identify the type of information to be shared, e.g., nature, origin, format, quality, reliability, veracity, and lifespan." | O |
| P-1423 | 2 | M | INF | IXC | "Immediately solve any occurring security problems while transferring data." | O |
| P-1431 | 3 | M | INF | IXC | "Develop processes to accomplish bidirectional information sharing that accommodate receiving information as well as transmitting it, and ensure that these processes take into account external reporting requirements and laws. Processes should be developed within participating organizations and extended into the community." | O |
| P-1432 | 3 | M | INF | IXC | "Select information exchanging standard to formalize the shared information." | O |
| P-1441 | 4 | M | INF | IXC | "Develop tools for group communication services satisfying real-time requirements and reliable message delivery. In addition, develop tools for automated information gathering and information analysis." | O |
| P-1442 | 4 | M | INF | IXC | "Information sharing is critical for timely responses to cyber events that can have a devastating impact in seconds. Therefore, methods to facilitate the timely sharing of information and response to cyber events in the local community need to be established." | O |
| P-1551 | 5 | M | INF | INT | "Migrate all master data have through automated migration programs." | O |
| P-1552 | 5 | M | INF | INT | "The integration and the interoperability are based on common and shared standards within the company, borrowed from intra- or cross-industry de facto standards, with respect to the best practices in the industry in both the spheres of the organization and enabling technologies, it is fully planned and implemented." | O |
| P-1553 | 5 | M | INF | INT | "While integration, information security principles should be coordinated and integrated with each other and with the organization's policies and procedures." | O |
| P-1621 | 2 | E | PPL | PAC | "Create strong passwords: Including a mix of numbers, letters, and special characters. Minimum password length, e.g., 8." | C |
| P-1622 | 2 | E | PPL | PAC | "Handle Invalid Login Attempts Maximum invalid login attempts: How many invalid logins are allowed before locking out the account (5) Lockout effective period: How long should an account remain locked out (30 minutes)." | C |
| P-1623 | 2 | E | PPL | PAC | "Hash passwords using hashing algorithms such as SHA-256." | C |
| P-1624 | 2 | E | PPL | PAC | "Salt passwords to ensure that they are safe (salting adds some extra string to the user's password and then hashes it)." | C |
| P-1625 | 2 | E | PPL | PAC | "Develop a process to request access to the resources, e.g., systems, devices, and applications." | O |
| P-1626 | 2 | E | PPL | PAC | "Login App Mask password entry for the system/device/application during sign-in? Do not enable the "save your ID and password" feature on any applications." | O |
| P-1627 | 2 | E | PPL | PAC | "Move past simple passwords to strong authentication in the enterprise." | O |

TABLE 43-continued

Model's Best Practices

| # | ML | CCA | CA | PA | Practice Text | TY |
|---|---|---|---|---|---|---|
| P-1628 | 2 | E | PPL | PAC | "Take advantage of the improved convenience of a mobile strong authentication model." | O |
| P-1631 | 3 | E | PPL | PAC | "Identify, document, and test all internal and external roles within the project." | C |
| P-1632 | 3 | E | PPL | PAC | "Apply and utilize authorized cyber capabilities to enable access to targeted resources." | C |
| P-1633 | 3 | E | PPL | PAC | "Apply the principle of least privilege for systems, devices, and application accounts." | C |
| P-1634 | 3 | E | PPL | PAC | "Change Password: Require immediate password change on the initial sign-in application. Change your password frequently, e.g., every 60/90 days. Enforce password history to prevent password reuse, e.g., five times." | C |
| P-1635 | 3 | E | PPL | PAC | "Create and maintain user access control list." | C |
| P-1636 | 3 | E | PPL | PAC | "Enable using the Two-Factor Authentication (2FA): For login and critical online transactions Allow the user to set up the number and verify it. Use an alternative Authenticator tool." | C |
| P-1637 | 3 | E | PPL | PAC | "Manage user access rights to information throughout its lifecycle, including granting, denying, and revoking access privileges." | C |
| P-1638 | 3 | E | PPL | PAC | "Seale critical devices: under certain circumstances, and according to the importance of the data, access could be allowed only from devices prepared by the ICT team and sealed, which allow only a specific group of services to be run." | O |
| P-1641 | 4 | E | PPL | PAC | "Ensure that access is appropriately restricted and timely terminated for leavers, contractors, auditors, or other third parties that have previously required connection to the company's network." | C |
| P-1651 | 5 | E | PPL | PAC | "Define cybersecurity classes, and provide guidance on the protection and access control appropriate to each level." | C |
| P-1652 | 5 | E | PPL | PAC | "Enable single sign-on options." | O |
| P-1731 | 3 | E | PPL | PTR | "Disseminate security approaches, policies, and other relevant information to develop security awareness and skills." | C |
| P-1732 | 3 | E | PPL | PTR | "Implement training and awareness programs Develop the necessary training courses to everyone. Create training courses tailored to the audience and physical environment. Develop or assist in the development of course assignments. Participate in the development of training curriculum and course content." | C |
| P-1733 | 3 | E | PPL | PTR | "Implement IT security procedures and controls consistently everywhere that the procedure applies and are reinforced through training." | C |
| P-1734 | 3 | E | PPL | PTR | "Ensure that everyone, who needs to be, is aware of information security policy. Therefore, people with a need-to-know should have access to principles and be informed of applicable threats." | C |
| P-1735 | 3 | E | PPL | PTR | "Promote awareness of security issues among management and ensure sound security principles are reflected in the organization's vision and goals." | C |
| P-1736 | 3 | E | PPL | PTR | "Ensure that policies are simple and easy to understand to promote individual ownership of cyber security. Training of all new policies must be completed in a timely fashion—no more than 30 days from the implementation date." | O |
| P-1737 | 3 | E | PPL | PTR | training and awareness programs Identify and use free resources for awareness programs: Stop. Think. Connect. A program from the Department of Homeland Security (DHS) is a resource that should be examined. Research no or low-cost government and nonprofit training resources, such as DHS-Federal Emergency Management Agency (FEMA), various universities, NIST, and the National Cyber security Preparedness Consortium (NCPC)." | O |
| P-1741 | 4 | E | PPL | PTR | "Use learning outcomes statistics in adjusting the training programs. The awareness-raising system depends on the goals, objectives, and scope of strategies, programs, and actionplans, the amount of available resources, and involves the development and implementation of a set of the demo, educational and advertising projects." | O |
| P-1751 | 5 | E | PPL | PTR | "Enhance and review training and awareness programs Conduct interactive training exercises to create an effective learning environment. Identify existing awareness and training materials that are appropriate for intended audiences. | O |

TABLE 43-continued

Model's Best Practices

| # | ML | CCA | CA | PA | Practice Text | TY |
|---|----|-----|----|----|---------------|----|
| | | | | | Develop or assist in the development of computer-based training modules or classes. Support international scientific events that can provide education and training services." | |
| P-1752 | 5 | E | PPL | PTR | "Evaluate training and awareness programs Evaluate the effectiveness and comprehensiveness of existing training programs frequency, and improvements are made as appropriate. Review training documentation (e.g., Course Content Documents (CCD), lesson plans, student texts, examinations, Schedules of Instruction (SOI), and course descriptions)." | O |
| P-1753 | 5 | E | PPL | PTR | "Provide continuing education and professional development opportunities for personnel with significant cybersecurity responsibilities." | O |
| P-1821 | 2 | E | STR | SOP | "Assist in identifying, prioritizing, and coordinating the protection of critical cyber defense infrastructure and key resources." | C |
| P-1822 | 2 | E | STR | SOP | "Build, install, configure, and test dedicated cyber defense hardware." | C |
| P-1823 | 2 | E | STR | SOP | "Define IT infrastructure needs for the exchange platform, e.g., hardware, software, and networks." | C |
| P-1831 | 3 | E | STR | SOP | "Establish and maintain measures to safeguard the IT physical infrastructure from harm. Threats to be addressed include extremes of temperature, malicious intent, and utility supply disruptions." | C |
| P-1832 | 3 | E | STR | SOP | "Implement measures to protect all IT components, both physical and virtual, such as client computing devices, servers, networks, and storage devices." | C |
| P-1921 | 2 | E | STR | SSY | "Have an antivirus system; viruses should be detected by a system and precautions taken." | C |
| P-1922 | 2 | E | STR | SSY | "Have at least one firewall; it is the most basic safety device necessary to control incoming and outgoing traffic." | C |
| P-1923 | 2 | E | STR | SSY | "Have an intrusion prevention system (IPS) and intrusion detection system (IDS), which are the second layer after the firewall. They detect harmful contents that the firewall cannot detect." | C |
| P-1931 | 3 | E | STR | SSY | "Have a content filtering system." | O |
| P-1932 | 3 | E | STR | SSY | "Have a data leakage prevention system." | O |
| P-1933 | 3 | E | STR | SSY | "Have an email management and security system." | O |
| P-1934 | 3 | E | STR | SSY | "Have a vulnerability screening system." | O |
| P-1941 | 4 | E | STR | SSY | "Evaluate and assign levels of sensitivity and criticality to the information, using a defined system." | C |
| P-1951 | 5 | E | STR | SSY | "Mobilization of material and technical resources necessary for the implementation of approved strategies, programs, and action plans is being carried out, and a system is being established to inform stakeholders and the general public about the progress in their implementation." | O |
| P-2021 | 2 | I | GOV | GRM | "Top management support creates and reviews digitalization topics, goals, and what new technologies can contribute and explore new business models. The owner or manager must lead the transformation and formulation of cyber-related policies. It is required that the management is asking for data-based digital transformation, to identify challenges, risks, or changing customer expectations." | C |
| P-2022 | 2 | I | GOV | GRM | "Develop cyber strategic plans that outline the vision, mission, and goals that align with the organization's strategic plan." | O |
| P-2031 | 3 | I | GOV | GRM | "Define what cybersecurity and digital transformation mean to the organization's business; it is important to be clear and precise. Along with a comprehensive IT security program as a part of the culture, the definition should explain that DT is not simply creating a new website, developing a mobile app, going 'paperless,' or adopting social media marketing. Instead, DT is a composition of technology, processes, and people—and it must be positioned as an enabler of business transformation." | C |
| P-2032 | 3 | I | GOV | GRM | "Define a digital roadmap strategy of business goals or digital transformation, along with an implementation plan." | O |
| P-2033 | 3 | I | GOV | GRM | "Technology and innovation strategy must be developed as a subset of overall company strategy, and created in response to market needs." | O |
| P-2041 | 4 | I | GOV | GRM | "Contribute to developing, staffing, and coordinating cyber operations policies, performance standards, plans, and approval packages with internal or external decision-makers." | C |
| P-2042 | 4 | I | GOV | GRM | "Identify your current digital maturity. Identifying specific strengths to enhance or weaknesses to tune-up can create the foundation for the digital roadmap while also providing a comparative benchmark." | O |

TABLE 43-continued

Model's Best Practices

| # | ML | CCA | CA | PA | Practice Text | TY |
|---|----|-----|-----|-----|---------------|-----|
| P-2051 | 5 | I | GOV | GRM | "Lead and align information technology security priorities with the security strategy." | C |
| P-2121 | 2 | I | GOV | GGO | "Develop and document systems administration standard operating procedures." | C |
| P-2122 | 2 | I | GOV | GGO | "Develop or integrate cybersecurity designs for systems with multilevel security in multiple data classification levels, e.g., UNCLASSIFIED, SECRET, and TOP SECRET." | C |
| P-2131 | 3 | I | GOV | GGO | "Develop and manage enterprise-wide procedures to ensure the development of new products and services is consistent with company privacy policies and legal obligations. As a result, management is aware of all applicable law, legal, regulatory, and contractual information security requirements." | C |
| P-2132 | 3 | I | GOV | GGO | "Develop, communicate, and support the organization's cybersecurity objectives. Establish and maintain security policies and controls, taking into account relevant security standards, regulatory and legislative security requirements, and the organization's security goals." | C |
| P-2133 | 3 | I | GOV | GGO | "Ensure that the application of security patches for commercial products integrated into system design meet the timelines dictated by the management authority for the intended operational environment." | C |
| P-2134 | 3 | I | GOV | GGO | "Identify applicable law, statutory and contractual obligations that might impact the organization. Establish security and compliance baseline and understand per-system risks." | C |
| P-2135 | 3 | I | GOV | GGO | "Utilize readily available templates for policies and procedures from free online sources such as the Escal Institute of Advanced Technologies (SANS Institute), the National Institute of Standards and Technology (NIST), or the Multi-State Information Sharing and Analysis Center (ISAC)." | C |
| P-2141 | 4 | I | GOV | GGO | "Analyze organization's cyber defense policies and configurations and evaluate compliance with regulations and organizational directives." | C |
| P-2142 | 4 | I | GOV | GGO | "Verify that applications and systems security postures are implemented as stated, document deviations, using quantitative measures, and recommend required actions to correct those deviations." | C |
| P-2151 | 5 | I | GOV | GGO | "Continuously validate, apply, and obey the organization against applicable statutes, regulations, and policies." | C |
| P-2152 | 5 | I | GOV | GGO | "Ensure that improvements and processes achieve their objectives." | C |
| P-2153 | 5 | I | GOV | GGO | "Ensure that information security policy and supporting standards, baselines, procedures, and guidelines are developed and maintained periodically." | C |
| P-2154 | 5 | I | GOV | GGO | "Verify and update security documentation reflecting the applications and systems security design features." | C |
| P-2231 | 3 | I | GOV | GFU | "Develop procedures for providing feedback and lessons learned to collection managers, asset managers, and processing, exploitation, and dissemination centers." | O |
| P-2232 | 3 | I | GOV | GFU | "Formal, up-to-date documented policies stated as shall or will statements exist and are readily available to employees." | O |
| P-2233 | 3 | I | GOV | GFU | "Policies establish a continuous cycle of assessing risk and implementation and use monitoring for program effectiveness." | O |
| P-2241 | 4 | I | GOV | GFU | "Analyze feedback and lessons learned that convey the results of events or exercises. | O |
| P-2242 | 4 | I | GOV | GFU | "Use feedback and lesson learned results to identify opportunities to improve collection management efficiency and effectiveness." | O |
| P-2251 | 5 | I | GOV | GFU | "Collaborate with stakeholders to establish the enterprise continuity of operations program, strategy, and mission assurance." | O |
| P-2252 | 5 | I | GOV | GFU | "Develop, implement, document, and recommend changes to appropriate procedures, policies, and planning documents." | O |
| P-2253 | 5 | I | GOV | GFU | "Policy plans and improvements are in place, and there is a follow-up while the published policies are implemented." | O |
| P-2254 | 5 | I | GOV | GFU | "Provides recommendations to leadership based on significant threats and vulnerabilities." | O |

Figure 45:
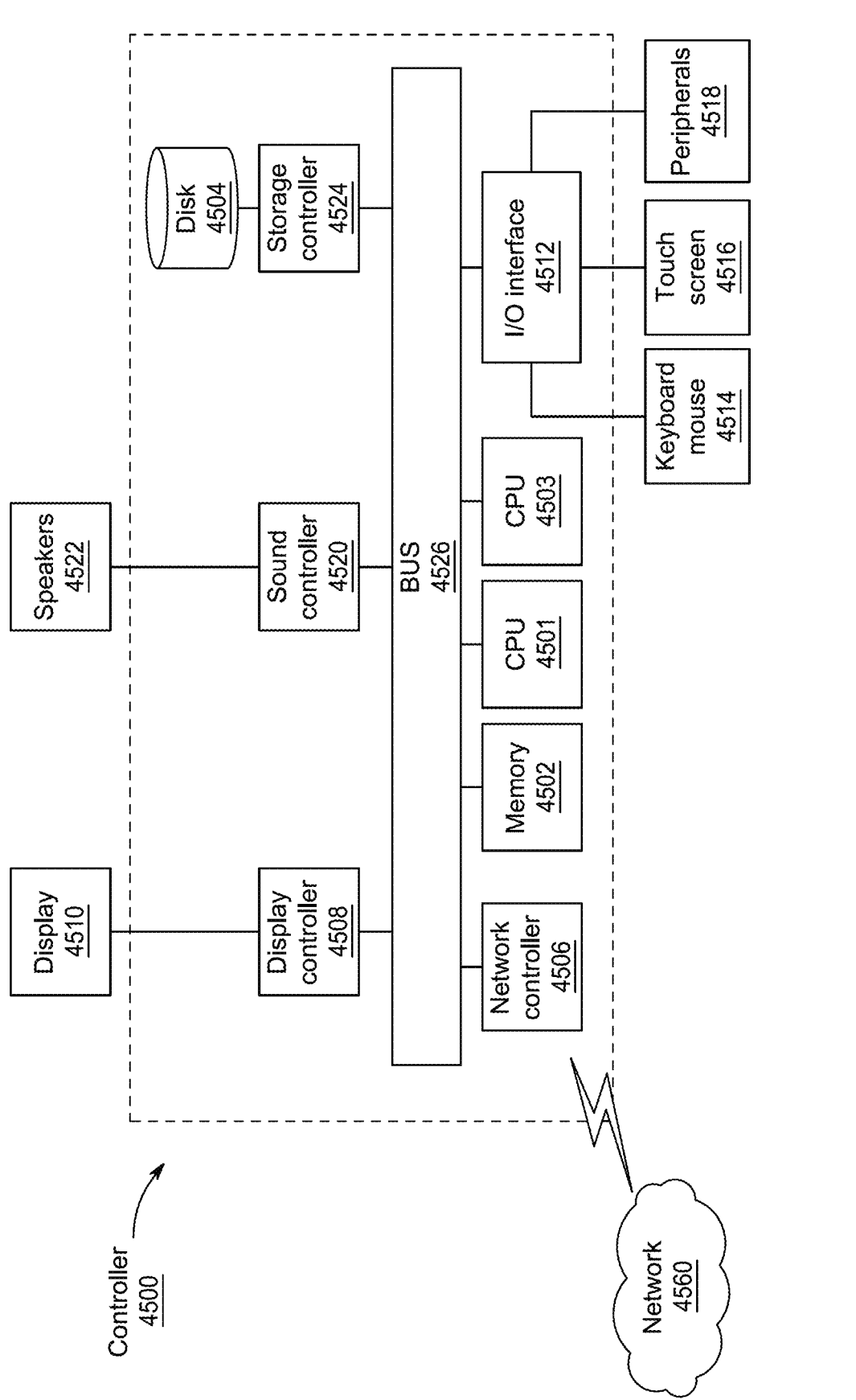
FIG. 45 is an illustration of a non-limiting example of details of computing hardware used in the framework system for performing and improving a cybersecurity maturity level of a digitally transforming organization, according to certain embodiments.

Next, further details of the hardware description of the computing environment according to exemplary embodiments are described with reference to FIG. 45. In FIG. 45, a controller 4500 is described as representative of the system 4500 of FIG. 45 in which the controller 4500 is a computing device that includes a CPU 4501 which performs the processes described above/below. The process data and instructions may be stored in memory 4502. These processes and instructions may also be stored on a storage medium disk 4504 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device with which the computing device communicates, such as a server or computer.

Further, the present disclosure may be provided as a utility application, background daemon, or component of an operating system, or combination thereof, executing in conjunction with CPU 4501, 4503 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 4501 or CPU 4503 may be a Xenon or Core processor from Intel of America or an Opteron processor from AMD of America, or may be other processor types that would be recognized by one of ordinary skill in the art. Alternatively, the CPU 4501, 4503 may be implemented on an FPGA, ASIC, PLD, or using discrete logic circuits, as one of ordinary skill in the art would recognize. Further, CPU 4501, 4503 may be implemented as multiple processors cooperatively working in parallel to perform the instructions of the inventive processes described above.

The computing device in FIG. 45 also includes a network controller 4506, such as an Intel Ethernet PRO network interface card from Intel Corporation of America, for interfacing with network 4560. As can be appreciated, the network 4560 can be a public network, such as the Internet, or a private network such as a LAN or WAN network, or any combination thereof and can also include PSTN or ISDN sub-networks. The network 4560 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

The computing device further includes a display controller 4508, such as an NVIDIA Geforce GTX or Quadro graphics adapter from NVIDIA Corporation of America for interfacing with display 4510, such as a Hewlett Packard HPL2445w LCD monitor. A general-purpose I/O interface 4512 interfaces with a keyboard and/or mouse 4514 as well as a touch screen panel 4516 on or separate from display 4510. General-purpose I/O interface also connects to a variety of peripherals 4518 including printers and scanners, such as an OfficeJet or DeskJet from Hewlett Packard.

A sound controller 4520 is also provided in the computing device such as Sound Blaster X-Fi Titanium from Creative, to interface with speakers/microphone 4522 thereby providing sounds and/or music.

The general-purpose storage controller 4524 connects the storage medium disk 4504 with communication bus 4526, which may be an ISA, EISA, VESA, PCI, or similar, for interconnecting all of the components of the computing device. A description of the general features and functionality of the display 4510, keyboard and/or mouse 4514, as well as the display controller 4508, storage controller 4524, network controller 4506, sound controller 4520, and general-purpose I/O interface 4512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 46.

Figure 46:
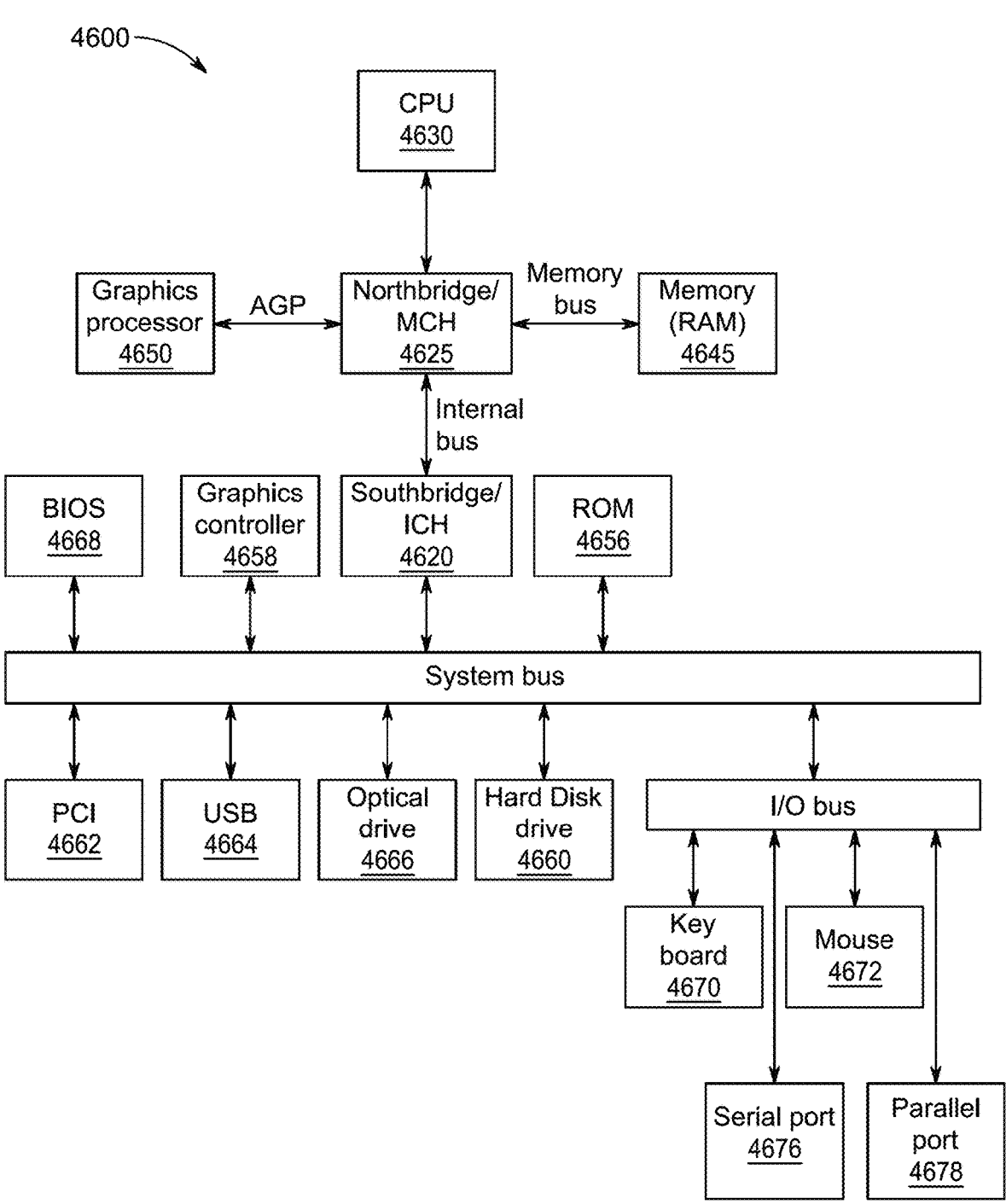
FIG. 46 is an exemplary schematic diagram of a data processing system used within the framework system for performing and improving a cybersecurity maturity level of a digitally transforming organization, according to certain embodiments.

FIG. 46 shows a schematic diagram of a data processing system, according to certain embodiments, for performing the functions of the exemplary embodiments. The data processing system is an example of a computer in which code or instructions implementing the processes of the illustrative embodiments may be located.

In FIG. 46, data processing system 4600 employs a hub architecture including a north bridge and memory controller hub (NB/MCH) 4625 and a south bridge and input/output (I/O) controller hub (SB/ICH) 4620. The central processing unit (CPU) 4630 is connected to NB/MCH 4625. The NB/MCH 4625 also connects to the memory 4645 via a memory bus and connects to the graphics processor 4650 via an accelerated graphics port (AGP). The NB/MCH 4625 also connects to the SB/ICH 4620 via an internal bus (e.g., a unified media interface or a direct media interface). The CPU Processing unit 4630 may contain one or more processors and even may be implemented using one or more heterogeneous processor systems.

Figure 47:
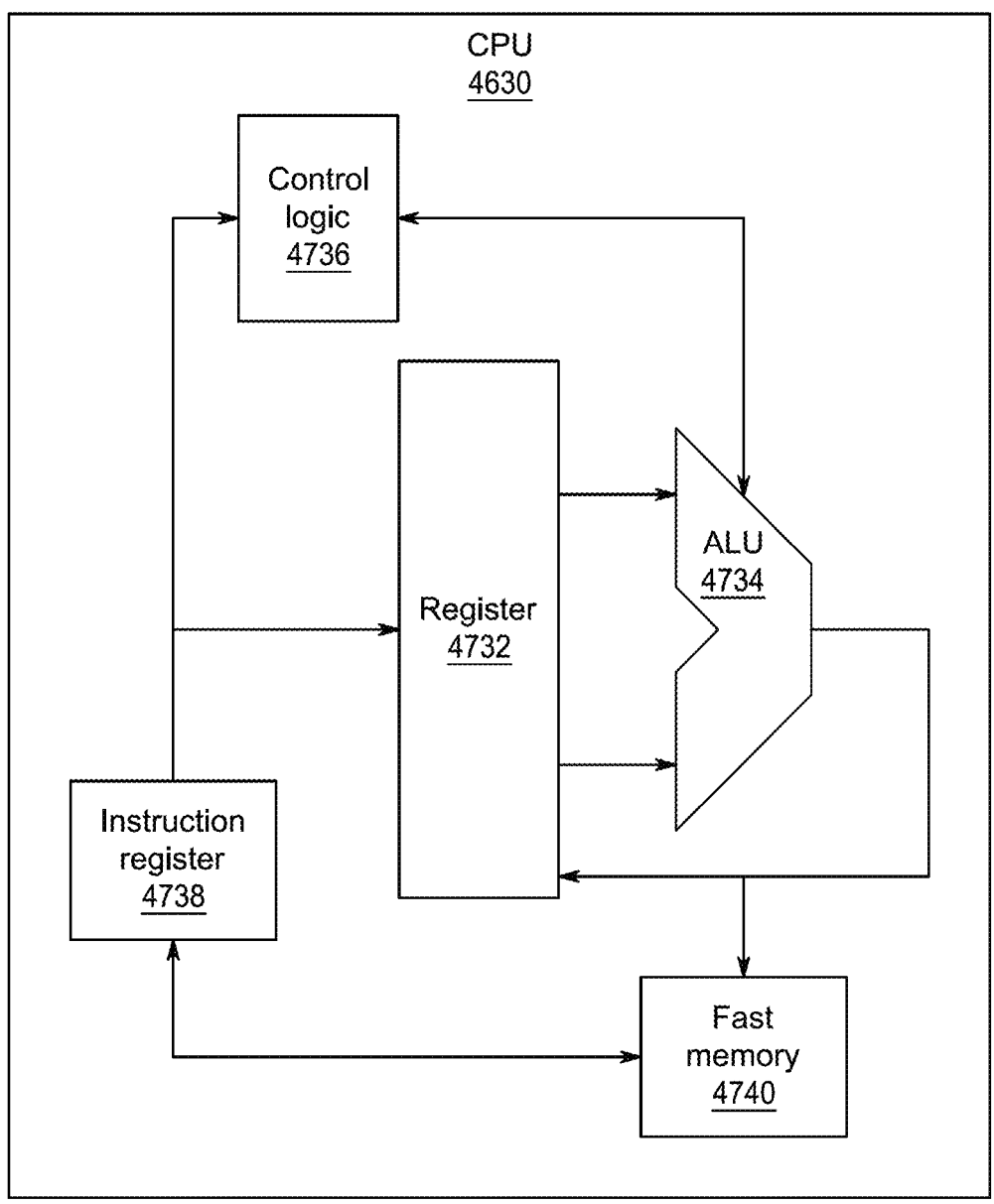
FIG. 47 is an exemplary schematic diagram of a processor used with the framework system for performing and improving a cybersecurity maturity level of a digitally transforming organization, according to certain embodiments.

For example, FIG. 47 shows one implementation of CPU 4630. In one implementation, the instruction register 4738 retrieves instructions from the fast memory 4740. At least part of these instructions are fetched from the instruction register 4738 by the control logic 4736 and interpreted according to the instruction set architecture of the CPU 4730. Part of the instructions can also be directed to the register 4732. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using the arithmetic logic unit (ALU) 4734 that loads values from the register 4732 and performs logical and mathematical operations on the loaded values according to the instructions. The results from these operations can be fed back into the register and/or stored in the fast memory 4740. According to certain implementations, the instruction set architecture of the CPU 4630 can use a reduced instruction set architecture, a complex instruction set architecture, a vector processor architecture, or a very large instruction word architecture. Furthermore, the CPU 4630 can be based on the Von Neuman model or the Harvard model. The CPU 4630 can be a digital signal processor, an FPGA, an ASIC, a PLA, a PLD, or a CPLD. Further, the CPU 4630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 46, the data processing system 4600 can include that the SB/ICH 4620 is coupled through a system bus to an I/O Bus, a read-only memory (ROM) 4656, a universal serial bus (USB) port 4664, a flash binary input/output system (BIOS) 4668, and a graphics controller 4658. PCI/PCIe devices can also be coupled to SB/ICH 4620 through a PCI bus 4662.

The PCI devices may include, for example, Ethernet adapters, add-in cards, and PC cards for notebook computers. The Hard disk drive 4660 and CD-ROM 4666 can use, for example, an integrated drive electronics (IDE) or serial advanced technology attachment (SATA) interface. In one implementation, the I/O bus can include a super I/O (SIO) device.

Further, the hard disk drive 4660 and optical drive 4666 can also be coupled to the SB/ICH 4620 through a system bus. In one implementation, a keyboard 4670, a mouse 4672, a parallel port 4678, and a serial port 4676 can be connected to the system bus through the I/O bus. Other peripherals and devices that can be connected to the SB/ICH 4620 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 48:
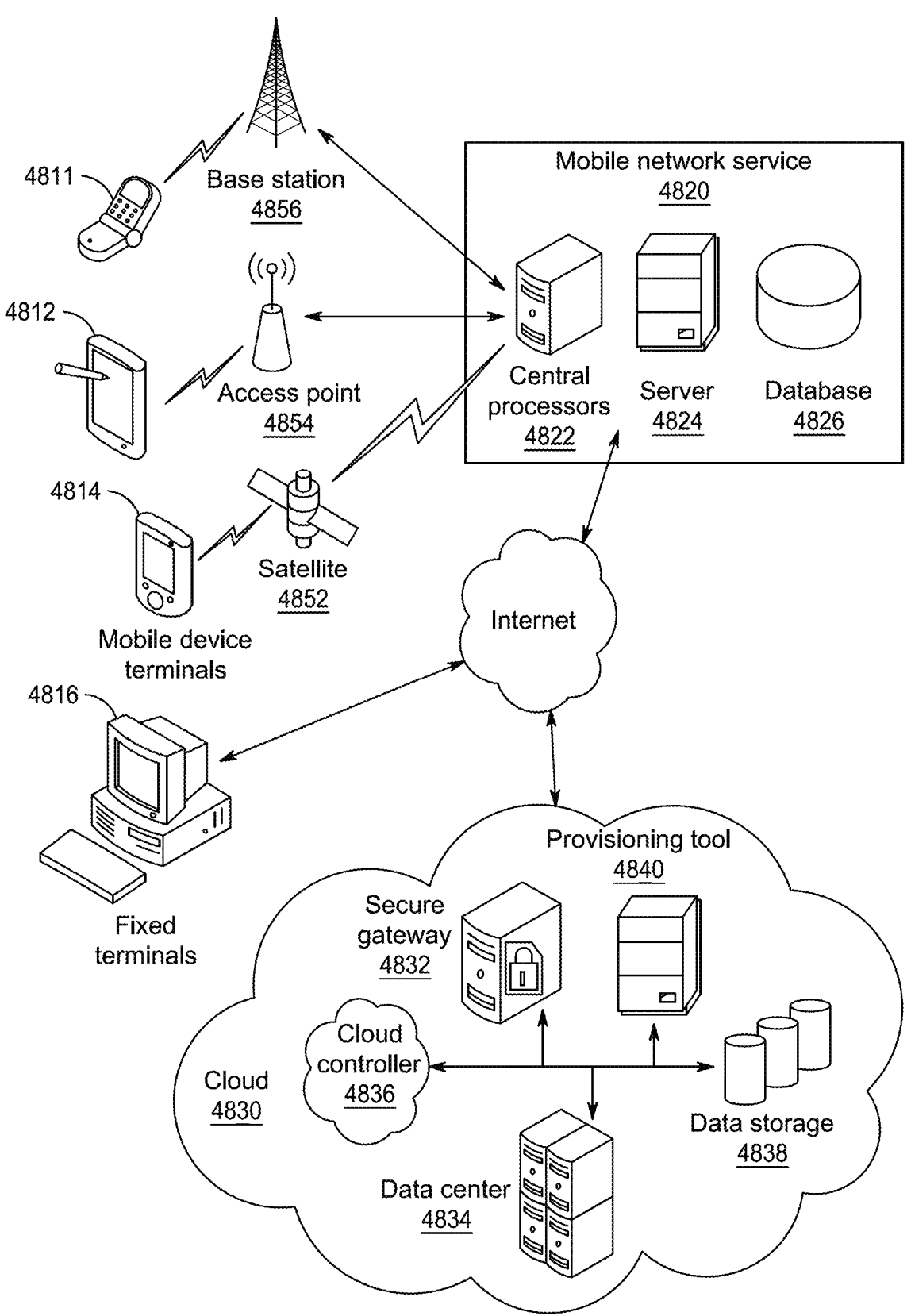
FIG. 48 is an illustration of a non-limiting example of distributed components which may share processing with a controller, according to certain embodiments.

The functions and features described herein may also be executed by various distributed components of a system, as shown in FIG. 48. For example, one or more processors may execute these system functions, wherein the processors are distributed across multiple components communicating in a network. The distributed components may include one or more client and server machines, such as cloud 4830 including a cloud controller 4836, a secure gateway 4832, a data center 4834, data storage 4838, and a provisioning tool 4847, and mobile network services 4820 including central processors 4822, a server 4824, and a database 4826, which may share processing, as shown in FIG. 48, in addition to various human interface and communication devices (e.g., display monitors 4816, smartphones 4810, tablets 4812, personal digital assistants (PDAs) 4814). The network may be a private network, such as a LAN, satellite 4852, or WAN 4854, or be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A Web-based dynamic computer-implemented method for improving a cybersecurity maturity level of a digitally transforming organization, the digitally transforming organization having a plurality of networked distributed computing devices with access to an Internet, comprising:

determining, by an administrative device, one or more capability areas of the digitally transforming organization, wherein a capability area is a group of related practice areas;

determining, by processing circuitry of the distributed computing devices, evaluation results of practice areas in a selected at least one capability area using rating options, wherein each practice area is a group of cybersecurity best practices;

automatically determining, by the administrative device based on the evaluation results, a rating value of one or more practice areas of each capability area;

displaying a rating value screen, by the administrative device, the rating value of each practice area arranged in a matrix for each capability area;

automatically determining, by the administrative device, for each capability area of the one or more capability areas of the digitally transforming organization, the cybersecurity maturity level of the capability area based on the rating value of the one or more practice areas;

displaying in a Web page maturity level screen, by the administrative device, when the cybersecurity maturity level of a respective capability area is below a threshold level, a sequence of one or more actions that would increase the cybersecurity maturity level of the respective capability area;

selecting an action in the displayed sequence of actions;

automatically running, by processing circuitry of one of the distributed computing devices, a first assessment test, for the selected action, to obtain evidence for the first assessment;

when the evidence for the first assessment is above an assessment threshold, automatically running, in the one of the distributed computing devices, a second assessment test, for a second action in the sequence of actions, to obtain evidence of the second assessment;

when the evidence for the second assessment is above the assessment threshold, automatically increasing, by the administrative device, the cybersecurity maturity level of the respective capability area;

otherwise when the evidence for the first assessment or the second assessment is below the assessment threshold, automatically updating and displaying, by the administrative device, an updated cybersecurity maturity level of the respective capability area and a revised sequence of actions;

upon completion of the sequence of the one or more actions, automatically updating, by the administrative device, the cybersecurity maturity level of the respective capability area;

automatically determining and displaying in the Web page maturity level screen, a further sequence of one or more actions that would increase the cybersecurity maturity level of another capability level to give further guidance for improvement.

2. The method of claim 1, further comprising:

determining, by the administrative device, a target cybersecurity maturity level of each capability area of the one or more capability areas;

comparing, by the administrative device, for each capability area of the one or more capability areas of the digitally transforming organization, the target cybersecurity maturity level to the determined cybersecurity maturity level;

determining, by the administrative device, based on a comparison between the target cybersecurity maturity level and the determined cybersecurity maturity level, one or more candidate capability areas; and determining, by the administrative device, one or more practice areas with a lowest rating value of each candidate capability area.

3. The method of claim 1, further comprising assigning, by the administrative device, a rating to each practice based on grouping by a range of rating values.

4. The method of claim 1, wherein the evaluation results of practice areas of the digitally transforming organization related to each of the capability areas includes evidence of the one or more practice areas of the capability area, the method further comprising categorizing the evidence as direct evidence, indirect evidence, or weakness evidence, wherein the direct evidence is proof of functional performance of the practice area, wherein the indirect evidence is affirmation of implementation of the practice area, and wherein the weakness evidence is deficiencies in the practice area.

5. The method of claim 4, further comprising:

assigning, by the administrative device, a positive or negative rating value to the evidence based on the category; and assigning the rating value to one of four possible rating options that are defined by a count of the positive and negative rating values, wherein the rating options include fully met, largely met, partially met, and does not meet.

6. The method of claim 3, wherein the cybersecurity maturity levels, from lowest to highest level, include initial, management support, improved, quantitative, and continuous improvement, according to number of best practices.

7. The method of claim 6, wherein the determining one or more capability areas is made based on a cybersecurity maturity model which includes capability areas of software engineering, running operations, risk analysis, information security, human access management, infrastructure, and governance.

8. The method of claim 7, wherein the displaying, by the administrative device, includes determining, by the administrative device using the cybersecurity maturity model, one or more practice areas that will increase the maturity level of a capability area of a respective practice area.

9. The method of claim 8, further comprising displaying, by the administrative device, detailed information of the one or more practice areas that will increase the cybersecurity maturity level.

10. The method of claim 9, further comprising displaying, by the administrative device, additional practice areas for guidance for further improvement in the cybersecurity maturity level.

11. A framework system for performing and improving a cybersecurity maturity level of a digitally transforming organization, the digitally transforming organization having a plurality of networked distributed computing devices with access to an Internet, comprising:

a memory storing a database of cybersecurity practice areas (PA) and respective PA maturity levels for a plurality of capability areas (CA), wherein each cybersecurity practice area is a group of cybersecurity best practices;

a Web-based interface for inputting a cybersecurity maturity model based on the database of cybersecurity practice areas;

an administrative device, configured to provide at least one Web page input screen for inputting the plurality of capability areas and respective target cybersecurity CA maturity levels;

at least one of the distributed computing devices configured to determine evaluation results of the practice areas in a selected at least one capability area using rating options:

the administrative device is further configured to automatically determine based on the evaluation results, a rating value of the one or more practice areas of each capability area, display in a rating value screen, via the administrative device, first indications for practice areas that have been evaluated and second indications for pending practice areas to be evaluated for each capability area, and automatically determine evaluation results for the practice areas of the practice areas to be evaluated and determine updated CA maturity levels based on the PA maturity levels for practice areas associated with respective capability areas;

display, in a Web page via the administrative device, the determined updated CA maturity level, the target CA maturity level, along with a sequence of one or more practice areas that can be performed to upgrade the CA maturity level for those capability areas that do not meet the target CA maturity level; and select an action in the displayed sequence of actions;

processing circuitry of one of the distributed computing devices, configured to automatically run a first assessment test, for the selected action, to obtain evidence for the first assessment; and when the evidence for the first assessment is above an assessment threshold, automatically run a second assessment test, for a second action in the sequence of actions, to obtain evidence of the second assessment;

the administrative device is further configured to when the evidence for the second assessment is above the assessment threshold, automatically increase the cybersecurity maturity level of the respective capability area;

otherwise when the evidence for the first assessment or the second assessment is below the assessment threshold, automatically update and display an updated cybersecurity maturity level of the respective capability area and a revised sequence of actions;

upon completion of the sequence of the one or more actions, automatically update the cybersecurity maturity level of the respective capability area; and automatically determine and display in the Web page maturity level screen, a further sequence of one or more actions action that would increase the cybersecurity maturity level of another capability level to give further guidance for improvement.

12. The system of claim 11, wherein the cybersecurity maturity model includes capability areas of software engineering, running operations, risk analysis, information security, human access management, infrastructure, and governance.

13. The system of claim 11, wherein five cybersecurity maturity levels, from lowest to highest level, include initial, management support, improved, quantitative, and continuous improvement, according to number of best practices.

14. The system of claim 13, wherein the administrative device is further configured to receive data of the digitally transformed organization by receiving practice area assessment information within each capability area, and determine, using the cybersecurity maturity model, one or more practice areas that will increase the maturity level of a capability area of a respective practice area.

15. The system of claim 14, wherein the administrative device is further configured to display in the Web page detailed information of the one or more practice areas that will increase the cybersecurity maturity level.

16. The system of claim 15, wherein the administrative device is further configured to display in the Web page additional practice areas for guidance for further improvement in the cybersecurity maturity level.

17. A system for assessing a cybersecurity maturity level of a digitally transforming organization, the digitally transforming organization having a plurality of networked computer-implemented devices with access to an Internet, comprising:

processing circuitry implanting a spreadsheet that is configured to input best practices, identified as one of core practice or optional practice for a plurality of practice areas and practice sequences, wherein each practice area is a group of cybersecurity best practices, determine based on received data of the digitally transforming organization, a rating value of one or more practice areas of each capability area, wherein a capability area is a group of related practice areas, display the one or more practice areas with indications of the determined rating value, automatically determine for each capability area of the digitally transforming organization, the cybersecurity maturity level of the capability area using the rating value of the one or more practice areas, select an action in the displayed sequence of actions, automatically run, by one of a plurality of distributed computing devices, a first assessment test, for the selected action, to obtain evidence of the first assessment, when the evidence for the first assessment is above an assessment threshold, automatically run, in the one of the distributed computing devices, a second assessment test, for a second action in the sequence of actions, to obtain evidence of the second assessment, when the evidence for the second assessment is above the assessment threshold, automatically increase by the processing circuitry the cybersecurity maturity level of the respective capability area, otherwise when the evidence for the first assessment or the second assessment is below the assessment threshold, automatically update and display by the processing circuitry an updated cybersecurity maturity level of the respective capability area and a revised sequence of actions, upon completion of the sequence of the one or more actions, automatically update by the processing circuitry the cybersecurity maturity level of the respective capability area, and automatically determine and display in the Web page maturity level screen, one or more actions that would increase the cybersecurity maturity level of another capability level to give further guidance for improvement.

18. The system of claim 17, wherein the processing circuitry is further configured to:

assign a rating level to each practice based on a plurality of ranges of rating values, and determine for each capability area of the digitally transforming organization, the cybersecurity maturity level of the capability area using the rating level of the practices.

19. The system of claim 17, wherein the data of the digitally transforming organization related to each of the capability areas includes evidence of the one or more practice areas of the capability area and wherein the evidence is categorized as direct evidence, indirect evidence, or weakness evidence, wherein the direct evidence is proof of functional performance of the practice area, wherein the indirect evidence is affirmation of implementation of the practice area, and wherein the weakness evidence is deficiencies in the practice area, wherein the processing circuitry is further configured to assign a rating level to each practice based on the evidence, and determine for each capability area of the digitally transforming organization, the cybersecurity maturity level of the capability area using the rating level of the practices.

20. The system of claim 17, wherein the processing circuitry is further configured to display indications of the determined rating value as different colors, for each of fully met, largely met, partially met, does not meet, or not applicable.

\* \* \* \* \*